(12) United States Patent
Rodenbeck et al.

(10) Patent No.: US 9,285,807 B2
(45) Date of Patent: Mar. 15, 2016

(54) ELECTRONIC USER INTERFACE FOR ELECTRONIC MIXING OF WATER FOR RESIDENTIAL FAUCETS

(75) Inventors: Robert W. Rodenbeck, Indianapolis, IN (US); Patrick B. Jonte, Zionsville, IN (US); Paul D. Koottungal, Indianapolis, IN (US); Anthony G. Spangler, Greensburg, IN (US); Michael J. Veros, Indianapolis, IN (US); Garry R. Marty, Fishers, IN (US)

(73) Assignee: Delta Faucet Company, Indianapolis, IN (US)

( * ) Notice: Subject to any disclaimer, the term of this patent is extended or adjusted under 35 U.S.C. 154(b) by 899 days.

(21) Appl. No.: 13/453,067

(22) Filed: Apr. 23, 2012

(65) Prior Publication Data

US 2012/0227849 A1 Sep. 13, 2012

Related U.S. Application Data

(62) Division of application No. 11/737,727, filed on Apr. 19, 2007, now Pat. No. 8,162,236.

(60) Provisional application No. 60/794,229, filed on Apr. 20, 2006.

(51) Int. Cl.
*E03C 1/04* (2006.01)
*G05D 23/13* (2006.01)
(Continued)

(52) U.S. Cl.
CPC ............ *G05D 23/1393* (2013.01); *E03C 1/057* (2013.01); *G05D 23/1353* (2013.01); *A62C 31/02* (2013.01); *Y10T 137/8766* (2015.04)

(58) Field of Classification Search
CPC ........... G05D 23/1393; G05D 23/1353; E03C 1/057; Y10T 137/8766; Y10T 137/87652; Y10T 137/87668; Y10T 137/87676; Y10T 137/87579; Y10T 137/9464; A62C 31/02; E03C 1/04–1/041
USPC .................... 251/129.04; 137/801, 603, 605, 137/896–898; 4/676–678, 654; 236/12.1–12.12
See application file for complete search history.

(56) References Cited

U.S. PATENT DOCUMENTS 2,337,321 A 12/1943 Freeman
2,991,481 A 7/1961 Book
(Continued)

FOREIGN PATENT DOCUMENTS

CA 2492226 7/2005
DE 3339849 5/1985
(Continued)

OTHER PUBLICATIONS

Quantum Research Group, "Gorenje Puts QSlide™ Technology into Next-Generation Kitchen Hob," Feb. 8, 2006, http://www.qprox.com/news/gorenje.php, 3 pgs.
(Continued)

*Primary Examiner* — John Bastianelli
(74) *Attorney, Agent, or Firm* — Faegre Baker Daniels LLP

(57) ABSTRACT

A water delivery system is disclosed. The water delivery system may have an electronic user interface. The electronic user interface may be a portable device. The electronic user interface may include inputs to select water temperature, water flow rates, water flow patterns, and/or task based presets. A mixing valve for use with either manual faucets or electronic faucets is disclosed.

9 Claims, 78 Drawing Sheets

(51) Int. Cl.
*E03C 1/05* (2006.01)
*A62C 31/02* (2006.01)

(56) References Cited

U.S. PATENT DOCUMENTS

| | | | |
|---|---|---|---|
| 3,081,594 A | 3/1963 | Atkins et al. |
| 3,151,340 A | 10/1964 | Teshima |
| 3,254,313 A | 5/1966 | Atkins et al. |
| 3,314,081 A | 4/1967 | Atkins et al. |
| 3,406,941 A | 10/1968 | Ichimori et al. |
| 3,588,038 A | 6/1971 | Tanaka |
| 3,610,279 A | 10/1971 | McIntosh |
| 3,651,989 A | 3/1972 | Westrich |
| 3,672,479 A | 6/1972 | Schwertfeger et al. |
| 3,685,541 A | 8/1972 | Braucksick et al. |
| 3,705,574 A | 12/1972 | Duncan |
| 3,756,456 A | 9/1973 | Georgi |
| 3,762,440 A | 10/1973 | Bryant |
| 3,799,171 A | 3/1974 | Patel |
| 3,987,819 A | 10/1976 | Scheuermann |
| 4,172,381 A | 10/1979 | Aigner |
| 4,185,336 A | 1/1980 | Young |
| 4,200,018 A | 4/1980 | Sekiwa |
| 4,201,518 A | 5/1980 | Stevenson |
| 4,280,530 A | 7/1981 | Yi |
| 4,331,292 A | 5/1982 | Zimmer |
| 4,337,388 A | 6/1982 | July |
| 4,359,186 A | 11/1982 | Kiendl |
| 4,406,313 A | 9/1983 | Bennett et al. |
| 4,407,444 A | 10/1983 | Knebel et al. |
| 4,409,694 A | 10/1983 | Barrett et al. |
| 4,410,791 A | 10/1983 | Eastep |
| 4,420,811 A | 12/1983 | Tarnay et al. |
| 4,421,269 A | 12/1983 | Ts'ao |
| 4,424,767 A | 1/1984 | Wicke et al. |
| 4,429,422 A | 2/1984 | Wareham |
| 4,436,983 A | 3/1984 | Solobay |
| 4,439,669 A | 3/1984 | Ryffel |
| 4,450,829 A | 5/1984 | Morita et al. |
| 4,459,465 A | 7/1984 | Knight |
| 4,503,575 A | 3/1985 | Knoop et al. |
| 4,532,962 A | 8/1985 | Campau |
| 4,537,348 A | 8/1985 | Gossi |
| 4,541,562 A | 9/1985 | Zukausky |
| 4,554,688 A | 11/1985 | Puccerella |
| 4,563,780 A | 1/1986 | Pollack |
| 4,567,350 A | 1/1986 | Todd, Jr. |
| 4,581,707 A | 4/1986 | Millar |
| 4,584,463 A | 4/1986 | Klages et al. |
| 4,604,515 A | 8/1986 | Davidson |
| 4,604,764 A | 8/1986 | Enzo |
| 4,606,325 A | 8/1986 | Lujan |
| 4,611,757 A | 9/1986 | Saether |
| 4,628,902 A | 12/1986 | Comber |
| 4,638,147 A | 1/1987 | Dytch et al. |
| 4,674,678 A | 6/1987 | Knebel et al. |
| 4,680,446 A | 7/1987 | Post |
| 4,682,581 A | 7/1987 | Laing et al. |
| 4,682,728 A | 7/1987 | Oudenhoven et al. |
| 4,688,277 A | 8/1987 | Kakinoki et al. |
| 4,693,415 A | 9/1987 | Sturm |
| 4,700,884 A | 10/1987 | Barrett et al. |
| 4,700,885 A | 10/1987 | Knebel |
| 4,709,728 A | 12/1987 | Ying-Chung |
| 4,713,525 A | 12/1987 | Eastep |
| 4,735,357 A | 4/1988 | Gregory et al. |
| 4,738,280 A | 4/1988 | Oberholtzer |
| 4,742,456 A | 5/1988 | Kamena |
| 4,750,472 A | 6/1988 | Fazekas |
| 4,753,265 A | 6/1988 | Barrett et al. |
| 4,756,030 A | 7/1988 | Juliver |
| 4,757,943 A | 7/1988 | Sperling et al. |
| 4,762,273 A | 8/1988 | Gregory et al. |
| 4,768,705 A | 9/1988 | Tsutsui et al. |
| 4,786,782 A | 11/1988 | Takai et al. |
| 4,798,224 A | 1/1989 | Haws |
| 4,808,793 A | 2/1989 | Hurko |
| 4,832,259 A | 5/1989 | Vandermeyden |
| 4,845,316 A | 7/1989 | Kaercher |
| 4,854,498 A | 8/1989 | Stayton |
| 4,869,287 A | 9/1989 | Pepper et al. |
| 4,869,427 A | 9/1989 | Kawamoto et al. |
| 4,870,986 A | 10/1989 | Barrett et al. |
| 4,872,485 A | 10/1989 | Laverty |
| 4,875,623 A | 10/1989 | Garris |
| 4,893,653 A | 1/1990 | Ferrigno |
| 4,896,658 A | 1/1990 | Yonekubo et al. |
| 4,901,915 A | 2/1990 | Sakakibara |
| 4,909,435 A | 3/1990 | Kidouchi et al. |
| 4,914,758 A | 4/1990 | Shaw |
| 4,916,613 A | 4/1990 | Lange et al. |
| 4,917,142 A | 4/1990 | Laing et al. |
| 4,923,116 A | 5/1990 | Homan |
| 4,930,551 A | 6/1990 | Haws |
| 4,936,289 A | 6/1990 | Peterson |
| 4,936,508 A | 6/1990 | Ingalz |
| 4,941,608 A | 7/1990 | Shimizu et al. |
| 4,945,942 A | 8/1990 | Lund |
| 4,945,943 A | 8/1990 | Cogger |
| 4,955,535 A | 9/1990 | Tsutsui et al. |
| 4,965,894 A | 10/1990 | Baus |
| 4,967,794 A | 11/1990 | Tsutsui et al. |
| 4,969,598 A | 11/1990 | Garris |
| 4,970,373 A | 11/1990 | Lutz et al. |
| 4,971,106 A | 11/1990 | Tsutsui et al. |
| 4,998,673 A | 3/1991 | Pilolla |
| 5,009,572 A | 4/1991 | Imhoff et al. |
| 5,020,127 A | 5/1991 | Eddas et al. |
| 5,033,508 A | 7/1991 | Laverty |
| 5,033,715 A | 7/1991 | Chiang |
| 5,040,106 A | 8/1991 | Maag |
| 5,042,524 A | 8/1991 | Lund |
| 5,056,712 A | 10/1991 | Enck |
| 5,057,214 A | 10/1991 | Morris |
| 5,058,804 A | 10/1991 | Yonekubo et al. |
| 5,063,955 A | 11/1991 | Sakakibara |
| 5,073,991 A | 12/1991 | Marty |
| 5,074,520 A | 12/1991 | Lee et al. |
| 5,086,526 A | 2/1992 | Van Marcke |
| 5,092,560 A | 3/1992 | Chen |
| 5,095,945 A | 3/1992 | Jensen |
| 5,105,846 A | 4/1992 | Britt |
| 5,124,934 A | 6/1992 | Kawamoto et al. |
| 5,125,433 A | 6/1992 | DeMoss et al. |
| 5,129,034 A | 7/1992 | Sydenstricker |
| 5,133,089 A | 7/1992 | Tsutsui et al. |
| 5,139,044 A | 8/1992 | Otten et al. |
| 5,143,049 A | 9/1992 | Laing et al. |
| 5,148,824 A | 9/1992 | Wilson et al. |
| 5,170,361 A | 12/1992 | Reed |
| 5,170,514 A | 12/1992 | Weigert |
| 5,170,816 A | 12/1992 | Schnieders |
| 5,170,944 A | 12/1992 | Shirai |
| 5,174,495 A | 12/1992 | Eichholz et al. |
| 5,175,892 A | 1/1993 | Shaw |
| 5,183,029 A | 2/1993 | Ranger |
| 5,184,642 A | 2/1993 | Powell |
| 5,187,816 A | 2/1993 | Chiou |
| 5,202,666 A | 4/1993 | Knippscheer |
| 5,205,318 A | 4/1993 | Massaro et al. |
| 5,206,963 A | 5/1993 | Wiens |
| 5,217,035 A | 6/1993 | Van Marcke |
| 5,224,509 A | 7/1993 | Tanaka et al. |
| 5,224,685 A | 7/1993 | Chiang et al. |
| 5,226,629 A | 7/1993 | Millman et al. |
| 5,243,717 A | 9/1993 | Yasuo |
| D340,279 S | 10/1993 | Mattis |
| 5,257,341 A | 10/1993 | Austin et al. |
| 5,261,443 A | 11/1993 | Walsh |
| 5,262,621 A | 11/1993 | Hu et al. |
| 5,265,318 A | 11/1993 | Shero |
| 5,277,219 A | 1/1994 | Lund |
| 5,287,570 A | 2/1994 | Peterson et al. |
| 5,315,719 A | 5/1994 | Tsutsui et al. |

(56) References Cited

U.S. PATENT DOCUMENTS

| | | |
|---|---|---|
| 5,323,803 A | 6/1994 | Blumenauer |
| 5,325,822 A | 7/1994 | Fernandez |
| 5,334,819 A | 8/1994 | Lin |
| 5,341,839 A | 8/1994 | Kobayashi et al. |
| 5,348,231 A | 9/1994 | Arnold et al. |
| 5,351,712 A | 10/1994 | Houlihan |
| 5,358,177 A | 10/1994 | Cashmore |
| 5,361,215 A | 11/1994 | Tompkins et al. |
| 5,362,026 A | 11/1994 | Kobayashi et al. |
| 5,385,168 A | 1/1995 | Lund |
| 5,400,961 A | 3/1995 | Tsutsui et al. |
| 5,408,578 A | 4/1995 | Bolivar |
| 5,409,037 A | 4/1995 | Wheeler et al. |
| 5,419,930 A | 5/1995 | Schucker |
| 5,429,272 A | 7/1995 | Luigi |
| 5,431,302 A | 7/1995 | Tulley et al. |
| 5,433,342 A | 7/1995 | Luro |
| 5,437,003 A | 7/1995 | Blanco |
| RE35,018 E | 8/1995 | Homan |
| 5,438,642 A | 8/1995 | Posen |
| 5,467,967 A | 11/1995 | Gillooly |
| 5,479,558 A | 12/1995 | White et al. |
| 5,482,250 A | 1/1996 | Kodaira |
| 5,504,306 A | 4/1996 | Russell et al. |
| 5,504,950 A | 4/1996 | Natalizia et al. |
| 5,511,579 A | 4/1996 | Price |
| 5,511,723 A | 4/1996 | Eki et al. |
| 5,540,555 A | 7/1996 | Corso et al. |
| 5,550,753 A | 8/1996 | Tompkins et al. |
| 5,555,912 A | 9/1996 | Saadi et al. |
| 5,564,462 A | 10/1996 | Storch |
| 5,566,702 A | 10/1996 | Philipp |
| 5,570,869 A | 11/1996 | Diaz et al. |
| 5,572,985 A | 11/1996 | Benham |
| 5,575,424 A | 11/1996 | Fleischmann |
| 5,577,660 A | 11/1996 | Hansen |
| 5,584,316 A | 12/1996 | Lund |
| 5,586,572 A | 12/1996 | Lund |
| 5,588,636 A | 12/1996 | Eichholz et al. |
| 5,595,342 A | 1/1997 | McNair et al. |
| 5,603,344 A | 2/1997 | Hall |
| 5,610,589 A | 3/1997 | Evans et al. |
| 5,622,203 A | 4/1997 | Givler et al. |
| 5,623,990 A | 4/1997 | Pirkle |
| 5,627,375 A | 5/1997 | Hsieh |
| 5,634,220 A | 6/1997 | Chiu |
| 5,682,032 A | 10/1997 | Philipp |
| 5,694,653 A | 12/1997 | Harald |
| 5,730,165 A | 3/1998 | Philipp |
| 5,735,291 A | 4/1998 | Kaonohi |
| 5,758,688 A | 6/1998 | Hamanaka et al. |
| 5,769,120 A | 6/1998 | Laverty et al. |
| 5,775,372 A | 7/1998 | Houlihan |
| 5,784,531 A | 7/1998 | Mann et al. |
| 5,790,024 A | 8/1998 | Ripingill et al. |
| 5,812,059 A | 9/1998 | Shaw et al. |
| 5,813,655 A | 9/1998 | Pinchott et al. |
| 5,819,366 A | 10/1998 | Edin |
| 5,823,229 A | 10/1998 | Bertrand et al. |
| 5,829,467 A | 11/1998 | Spicher |
| 5,829,475 A | 11/1998 | Acker |
| 5,845,844 A | 12/1998 | Zosimodis |
| 5,853,130 A | 12/1998 | Ellsworth |
| 5,855,356 A | 1/1999 | Fait |
| 5,857,717 A | 1/1999 | Caffrey |
| 5,868,311 A | 2/1999 | Cretu-Petra |
| 5,872,891 A | 2/1999 | Son |
| 5,893,387 A | 4/1999 | Paterson et al. |
| 5,918,855 A | 7/1999 | Hamanaka et al. |
| 5,934,325 A | 8/1999 | Brattoli et al. |
| 5,941,275 A | 8/1999 | Laing |
| 5,944,221 A | 8/1999 | Laing et al. |
| 5,961,095 A | 10/1999 | Schrott |
| 5,963,624 A | 10/1999 | Pope |
| 5,966,753 A | 10/1999 | Gauthier et al. |
| 5,979,776 A | 11/1999 | Williams |
| 5,983,922 A | 11/1999 | Laing et al. |
| 6,000,170 A | 12/1999 | Davis |
| 6,003,170 A | 12/1999 | Humpert et al. |
| 6,003,182 A | 12/1999 | Song |
| 6,006,784 A | 12/1999 | Tsutsui et al. |
| 6,019,130 A | 2/2000 | Rump |
| 6,026,844 A | 2/2000 | Laing et al. |
| 6,029,094 A | 2/2000 | Diffut |
| 6,032,616 A | 3/2000 | Jones |
| 6,042,885 A | 3/2000 | Woollard et al. |
| 6,059,192 A | 5/2000 | Zosimadis |
| 6,061,499 A | 5/2000 | Hlebovy |
| 6,075,454 A | 6/2000 | Yamasaki |
| 6,082,407 A | 7/2000 | Paterson et al. |
| 6,085,790 A | 7/2000 | Humpert et al. |
| 6,093,313 A | 7/2000 | Bovaird et al. |
| 6,101,452 A | 8/2000 | Krall et al. |
| 6,132,085 A | 10/2000 | Bergeron |
| 6,167,845 B1 | 1/2001 | Decker, Sr. |
| 6,175,689 B1 | 1/2001 | Blanco, Jr. |
| 6,182,683 B1 | 2/2001 | Sisk |
| 6,192,192 B1 | 2/2001 | Illy et al. |
| 6,196,065 B1 | 3/2001 | Henksmeier et al. |
| 6,202,980 B1 | 3/2001 | Vincent et al. |
| 6,220,297 B1 | 4/2001 | Marty et al. |
| 6,227,235 B1 | 5/2001 | Laing et al. |
| 6,240,250 B1 | 5/2001 | Blanco, Jr. |
| 6,250,558 B1 | 6/2001 | Dogre Cuevas |
| 6,250,601 B1 | 6/2001 | Kolar et al. |
| 6,273,394 B1 | 8/2001 | Vincent et al. |
| 6,283,139 B1 | 9/2001 | Symonds et al. |
| 6,286,764 B1 | 9/2001 | Garvey et al. |
| 6,288,707 B1 | 9/2001 | Philipp |
| 6,290,139 B1 | 9/2001 | Kolze |
| 6,290,147 B1 | 9/2001 | Bertrand et al. |
| 6,294,786 B1 | 9/2001 | Marcichow et al. |
| 6,298,875 B1 * | 10/2001 | Warshawsky et al. ......... 137/606 |
| 6,305,075 B1 | 10/2001 | Ersoy et al. |
| 6,315,208 B1 | 11/2001 | Doyle |
| 6,317,717 B1 | 11/2001 | Lindsey et al. |
| 6,321,785 B1 | 11/2001 | Bergmann |
| 6,337,635 B1 | 1/2002 | Ericksen et al. |
| 6,340,032 B1 | 1/2002 | Zosimadis |
| 6,341,389 B2 | 1/2002 | Philipps-Liebich et al. |
| 6,351,603 B2 | 2/2002 | Waithe et al. |
| 6,363,549 B2 | 4/2002 | Humpert et al. |
| 6,370,713 B2 | 4/2002 | Bosio |
| 6,377,009 B1 | 4/2002 | Philipp |
| 6,381,770 B1 | 5/2002 | Raisch |
| 6,389,226 B1 | 5/2002 | Neale et al. |
| 6,394,133 B1 * | 5/2002 | Knapp ......................... 137/615 |
| 6,438,770 B1 | 8/2002 | Hed et al. |
| 6,445,306 B1 | 9/2002 | Trovato et al. |
| 6,446,875 B1 | 9/2002 | Brooks et al. |
| 6,452,514 B1 | 9/2002 | Philipp |
| RE37,888 E | 10/2002 | Cretu-Petra |
| 6,457,355 B1 | 10/2002 | Philipp |
| 6,466,036 B1 | 10/2002 | Philipp |
| 6,473,917 B1 | 11/2002 | Mateina |
| 6,474,951 B2 | 11/2002 | Stephan et al. |
| 6,513,787 B1 | 2/2003 | Jeromson et al. |
| 6,522,078 B1 | 2/2003 | Okamoto et al. |
| 6,535,200 B2 | 3/2003 | Philipp |
| 6,536,464 B1 | 3/2003 | Lum et al. |
| 6,549,816 B2 | 4/2003 | Gauthier et al. |
| 6,574,426 B1 | 6/2003 | Blanco, Jr. |
| 6,588,377 B1 | 7/2003 | Leary et al. |
| 6,588,453 B2 | 7/2003 | Marty et al. |
| 6,598,245 B2 | 7/2003 | Nishioka |
| 6,612,267 B1 | 9/2003 | West |
| 6,619,320 B2 | 9/2003 | Parsons |
| 6,619,567 B1 | 9/2003 | Ouyoung |
| 6,622,930 B2 | 9/2003 | Laing et al. |
| 6,629,645 B2 | 10/2003 | Mountford et al. |
| 6,639,209 B1 | 10/2003 | Patterson et al. |
| 6,644,333 B2 | 11/2003 | Gloodt |
| 6,659,048 B1 | 12/2003 | DeSantis et al. |
| 6,676,024 B1 | 1/2004 | McNerney et al. |

(56) References Cited

U.S. PATENT DOCUMENTS

| | | |
|---|---|---|
| 6,684,822 B1 | 2/2004 | Lieggi |
| 6,691,338 B2 | 2/2004 | Zieger |
| 6,705,534 B1 | 3/2004 | Mueller |
| 6,707,030 B1 | 3/2004 | Watson |
| 6,734,685 B2 | 5/2004 | Rudrich |
| 6,738,996 B1 | 5/2004 | Malek et al. |
| 6,757,921 B2 | 7/2004 | Esche |
| 6,768,103 B2 | 7/2004 | Watson |
| 6,770,869 B2 | 8/2004 | Patterson et al. |
| 6,779,552 B1 | 8/2004 | Coffman |
| 6,845,526 B2 | 1/2005 | Malek et al. |
| 6,877,172 B2 | 4/2005 | Malek et al. |
| 6,892,952 B2 | 5/2005 | Chang et al. |
| 6,895,985 B2 | 5/2005 | Popper et al. |
| 6,913,203 B2 | 7/2005 | DeLangis |
| 6,955,333 B2 | 10/2005 | Patterson et al. |
| 6,956,498 B1 | 10/2005 | Gauthier et al. |
| 6,962,162 B2 | 11/2005 | Acker |
| 6,962,168 B2 | 11/2005 | McDaniel et al. |
| 6,964,404 B2 | 11/2005 | Patterson et al. |
| 6,964,405 B2 | 11/2005 | Marcichow et al. |
| 6,968,860 B1 | 11/2005 | Haenlein et al. |
| 6,993,607 B2 | 1/2006 | Philipp |
| 7,025,077 B2 | 4/2006 | Vogel |
| 7,069,941 B2 | 7/2006 | Parsons et al. |
| 7,070,125 B2 | 7/2006 | Williams et al. |
| 7,096,517 B2 | 8/2006 | Gubeli et al. |
| 7,099,649 B2 | 8/2006 | Patterson et al. |
| D528,991 S | 9/2006 | Katsuyama et al. |
| 7,150,293 B2 | 12/2006 | Jonte |
| 7,174,577 B2 | 2/2007 | Jost et al. |
| 7,232,111 B2 | 6/2007 | McDaniel et al. |
| 7,295,190 B2 | 11/2007 | Philipp |
| 7,380,731 B1 | 6/2008 | Hsu |
| 7,537,195 B2 | 5/2009 | McDaniel et al. |
| 7,690,395 B2 | 4/2010 | Jonte et al. |
| 2001/0022352 A1 | 9/2001 | Rudrich |
| 2001/0044954 A1 | 11/2001 | DiCarlo |
| 2002/0007510 A1 | 1/2002 | Mann |
| 2002/0015024 A1 | 2/2002 | Westerman et al. |
| 2002/0113134 A1 | 8/2002 | Laing et al. |
| 2002/0117122 A1 | 8/2002 | Lindner |
| 2002/0148040 A1 | 10/2002 | Mateina |
| 2002/0179723 A1 | 12/2002 | Wack et al. |
| 2003/0001025 A1 | 1/2003 | Quintana |
| 2003/0080194 A1 | 5/2003 | O'Hara et al. |
| 2003/0088338 A1 | 5/2003 | Phillips et al. |
| 2003/0089399 A1 | 5/2003 | Acker |
| 2003/0125842 A1 | 7/2003 | Chang et al. |
| 2003/0126993 A1 | 7/2003 | Lassota et al. |
| 2003/0185548 A1 | 10/2003 | Novotny et al. |
| 2003/0189108 A1 | 10/2003 | Bosio |
| 2003/0201018 A1 | 10/2003 | Bush |
| 2003/0213062 A1 | 11/2003 | Honda et al. |
| 2003/0234769 A1 | 12/2003 | Cross et al. |
| 2004/0011399 A1 | 1/2004 | Segien, Jr. |
| 2004/0041033 A1 | 3/2004 | Kemp |
| 2004/0041034 A1 | 3/2004 | Kemp |
| 2004/0061685 A1 | 4/2004 | Ostergard et al. |
| 2004/0088768 A1 | 5/2004 | Steidl |
| 2004/0088786 A1 | 5/2004 | Malek et al. |
| 2004/0144866 A1 | 7/2004 | Nelson et al. |
| 2004/0149643 A1 | 8/2004 | Vandenbelt et al. |
| 2004/0155116 A1 | 8/2004 | Wack et al. |
| 2004/0195382 A1 | 10/2004 | Anderson et al. |
| 2004/0204779 A1 | 10/2004 | Mueller et al. |
| 2004/0206405 A1 | 10/2004 | Smith et al. |
| 2004/0212599 A1 | 10/2004 | Cok et al. |
| 2004/0231725 A1* | 11/2004 | Hugger .............. G05D 23/1393 137/487.5 |
| 2004/0255375 A1 | 12/2004 | Scarlata |
| 2004/0262552 A1 | 12/2004 | Lowe |
| 2005/0001046 A1 | 1/2005 | Laing |
| 2005/0006402 A1 | 1/2005 | Acker |
| 2005/0022871 A1 | 2/2005 | Acker |
| 2005/0044625 A1 | 3/2005 | Kommers |
| 2005/0082503 A1 | 4/2005 | Patterson et al. |
| 2005/0086958 A1 | 4/2005 | Walsh |
| 2005/0117912 A1 | 6/2005 | Patterson et al. |
| 2005/0121529 A1 | 6/2005 | DeLangis |
| 2005/0125083 A1 | 6/2005 | Kiko |
| 2005/0127313 A1 | 6/2005 | Watson |
| 2005/0133100 A1 | 6/2005 | Bolderheij et al. |
| 2005/0146513 A1 | 7/2005 | Hill et al. |
| 2005/0150552 A1 | 7/2005 | Forshey |
| 2005/0150556 A1 | 7/2005 | Jonte |
| 2005/0151101 A1 | 7/2005 | McDaniel et al. |
| 2005/0167625 A1 | 8/2005 | Deen |
| 2005/0194399 A1 | 9/2005 | Proctor |
| 2005/0199841 A1 | 9/2005 | O'Maley et al. |
| 2005/0199843 A1 | 9/2005 | Jost et al. |
| 2005/0236594 A1 | 10/2005 | Lilly et al. |
| 2005/0273218 A1 | 12/2005 | Breed et al. |
| 2006/0066991 A1 | 3/2006 | Hirano et al. |
| 2006/0101575 A1 | 5/2006 | Louis |
| 2006/0130907 A1 | 6/2006 | Marty et al. |
| 2006/0130908 A1 | 6/2006 | Marty et al. |
| 2006/0138246 A1 | 6/2006 | Stowe et al. |
| 2006/0153165 A1 | 7/2006 | Beachy |
| 2006/0186215 A1 | 8/2006 | Logan |
| 2006/0200903 A1 | 9/2006 | Rodenbeck et al. |
| 2006/0201558 A1 | 9/2006 | Marty et al. |
| 2006/0202142 A1 | 9/2006 | Marty et al. |
| 2006/0212016 A1 | 9/2006 | Lavon et al. |
| 2006/0231638 A1 | 10/2006 | Belz et al. |
| 2006/0231788 A1 | 10/2006 | Cheng |
| 2006/0238428 A1 | 10/2006 | Schmitt et al. |
| 2006/0238513 A1 | 10/2006 | Philipp |
| 2006/0283511 A1 | 12/2006 | Nelson |
| 2007/0001018 A1 | 1/2007 | Schmitt et al. |
| 2007/0057215 A1 | 3/2007 | Parsons et al. |
| 2007/0069168 A1 | 3/2007 | Jonte |
| 2007/0157978 A1 | 7/2007 | Jonte et al. |
| 2007/0235672 A1 | 10/2007 | McDaniel et al. |
| 2007/0246267 A1 | 10/2007 | Koottunagal |
| 2007/0246564 A1 | 10/2007 | Rodenbeck et al. |
| 2008/0178950 A1 | 7/2008 | Marty et al. |
| 2008/0178957 A1 | 7/2008 | Thomas et al. |
| 2008/0189850 A1 | 8/2008 | Seggio et al. |
| 2008/0203195 A1 | 8/2008 | Schmitt |
| 2008/0271238 A1 | 11/2008 | Reeder et al. |
| 2009/0039176 A1 | 2/2009 | Davidson et al. |
| 2010/0012194 A1 | 1/2010 | Jonte et al. |
| 2010/0096017 A1 | 4/2010 | Jonte et al. |
| 2010/0294641 A1 | 11/2010 | Kunkel |

FOREIGN PATENT DOCUMENTS

| | | |
|---|---|---|
| DE | 04401637 | 5/1998 |
| DE | 19815324 | 11/2000 |
| EP | 0961067 | 12/1999 |
| JP | 63111383 | 5/1998 |
| JP | 00073426 | 3/2000 |
| JP | 2003-20703 | 1/2003 |
| JP | 2003105817 | 4/2003 |
| JP | 2003293411 | 10/2003 |
| JP | 2004-092023 | 3/2004 |
| JP | 2005-146551 | 6/2005 |
| KR | 10-1997-0700266 | 1/1997 |
| KR | 10-2003-0008144 | 1/2003 |
| KR | 10-2003-0077823 | 10/2003 |
| KR | 20-0382786 | 4/2005 |
| WO | WO 89/09956 | 10/1989 |
| WO | WO 91/17377 | 11/1991 |
| WO | WO 01/20204 | 3/2001 |
| WO | WO 2004/001142 | 12/2003 |
| WO | WO 2004/094990 | 11/2004 |
| WO | WO 2005/057086 | 6/2005 |
| WO | WO 2006/136256 | 12/2006 |
| WO | WO 2007/059051 | 5/2007 |

(56) References Cited

FOREIGN PATENT DOCUMENTS

| WO | WO 2007/082301 | 7/2007 |
|----|----------------|--------|
| WO | WO 2008/094651 | 8/2008 |

OTHER PUBLICATIONS

Quantum Research Group, "Qprox™ Capacitive Touch Applications," http://www.qprox.com/background/applications.php, 8 pgs.
Quantum Research Group, "QT401 QSlide™ Touch Slider IC," 2004, 16 pgs.
Quantum Research Group, "E401 User Manual," 15 pgs.
Quantum Research Group, "QT411-ISSG QSlide™ Touch Slider IC," 2004-2005, 12 pgs.
Sequine et al., Cypress Perform, "Application Notes AN2292," Oct. 31, 2005, 15 pgs.
Sequine et al., Cypress Perform, "Application Notes AN2292a," Apr. 14, 2005, 6 pgs.
Camacho et al., Freescale Semiconductor, "Touch Pad System Using MC34940/MC33794 E-Field Sensors," Feb. 2006, 52 pgs.
Zurn® Plumbing Products Group, "AquaSense® Z6903 Series", Installation, Operation, Maintenance and Parts Manual, Aug. 2001, 5 pgs.
Simmons® "Ultra-Sense® Sensor Faucets with Position-Sensitive Detection," © 2001-2002, 2 pgs.
Symmons®, "Ultra-Sense® Battery-Powered, Sensor-Operated Lavatory Faucet S-6080 Series," Oct. 2002, 4 pgs.
TOTO® Product, "Self-Generating EcoPower System Sensor Faucet, Standard Spout," Specification Sheet, Nov. 2002, 2 pgs.
Sloan® Optima® i.q. Electronic Hand Washing Faucet, Apr. 2004, 2 pgs.
ZURN® Plumbing Products Group, "AquaSense® Sensor Faucet," Jun. 9, 2004, 2 pgs.
Symmons®, "Ultra-Sense® Sensor Faucet with Position-Sensitive Detection," Aug. 2004, 4 pgs.
KWC AG, Kitchen Faucet 802285 Installation and Service Instructions, dated Jul. 2005, 8 pgs.
Technical Concepts, AutoFaucet® with "Surrouns Sensor" Technology, Oct. 2005, 4 pgs.
Symmons® Commercial Faucets: Reliability With a Sense of Style, 1 pg. 17.
Technical Concepts International, Inc., Capri AutoFaucet® with Surround Sensor™ Technology, 500556, 500576, 500577, (undated), 1 pg.
Symmons, Ultra-Sense, Bettery-Powered Faucets with PDS and Ultra-Sense AC Powered Faucets, © 1999-2004, 2 pgs.
Symmons®, "Ultra-Sense® Sensor Faucets with Position-Sensitive Detection," © 2001-2002, 2 pgs.
Various Products (available at least before Apr. 20, 2006), 5 pgs.
Extended European Search Report for corresponding European Application No. EP 07 76 1037.6, dated Apr. 26, 2010, 8 pgs.
International Search Report and Written Opinion for PCT/US2008/67116, 11 pgs.
International Preliminary Report on Patentability for PCT/US2008/001288, Sep. 22, 2009, 7 pgs.
Hal Phillip "Tough Touch Screen", appliance design, Feb. 2006, pp. 14-17.
Hego Waterdesign, "Touch Faucets—Amazing Futuristic Faucet Designs", Oct. 6, 2009, 3 pgs.
Dave Van Ess, Capacitive Sensing Builds a Better Water-Cooler Control, Cypress Semiconductor Corp., Nov. 2007.
Aviation Faucet System, Product Brochure, Franke Aquarotter GmbH, downloaded Oct. 1, 2012.
Springking Industry Col, Limited, Touch Sensor Faucet, Product Specification, copyright 2010 downloaded Oct. 1, 2012.
European Search Report for EP Application No. EP 12 19 7594, issued Jun. 6, 2013.

* cited by examiner

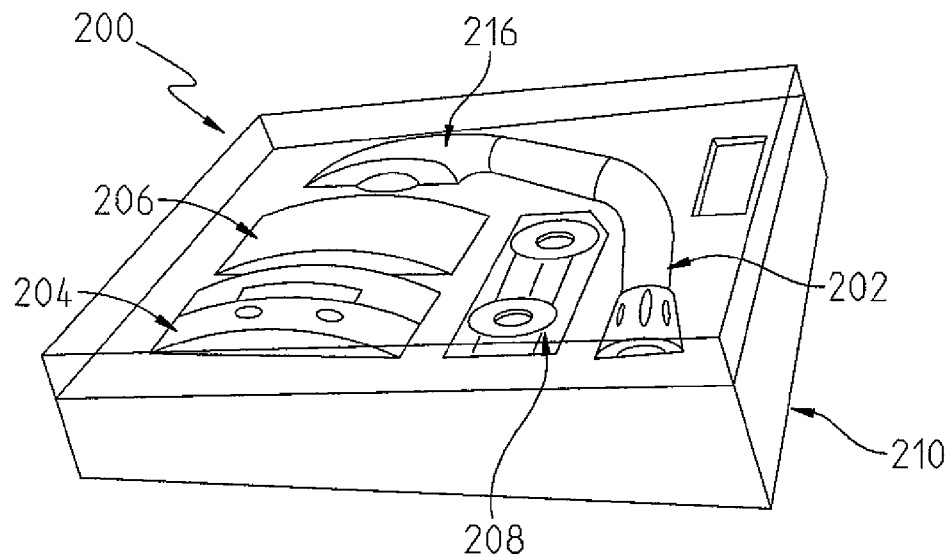
FIG. 2A
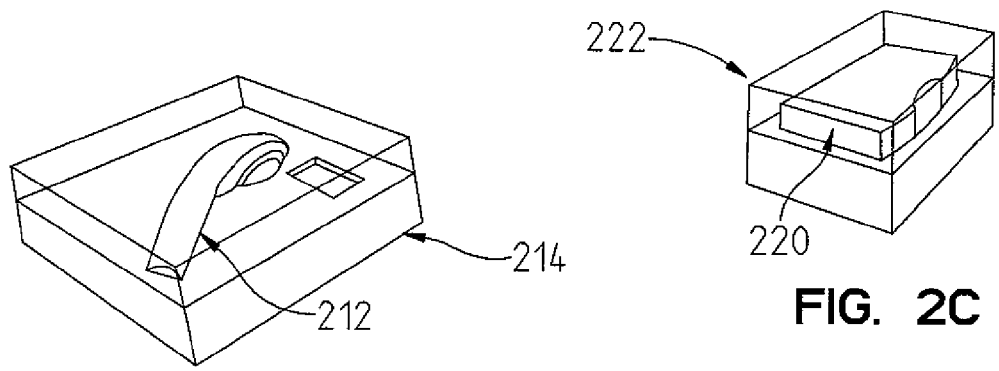
FIG. 2B
FIG. 2C
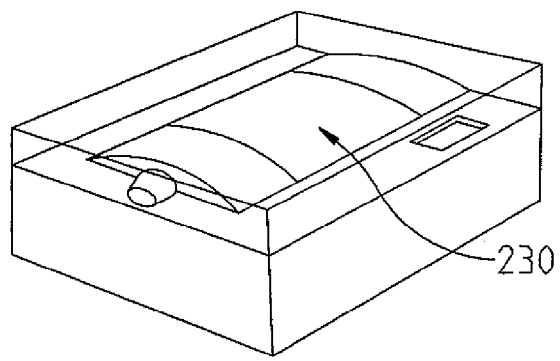
FIG. 2D

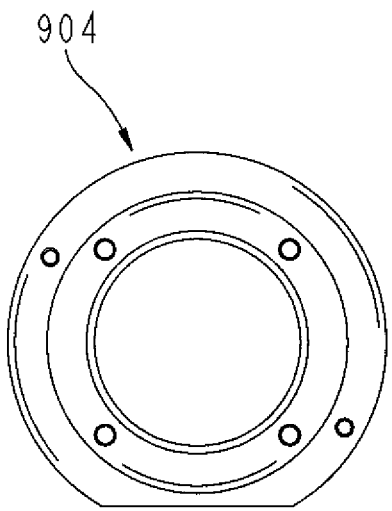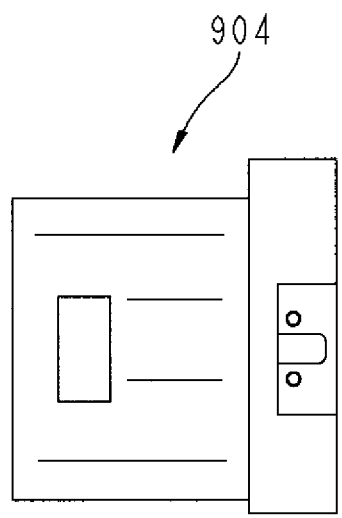
FIG. 33D    FIG. 33E
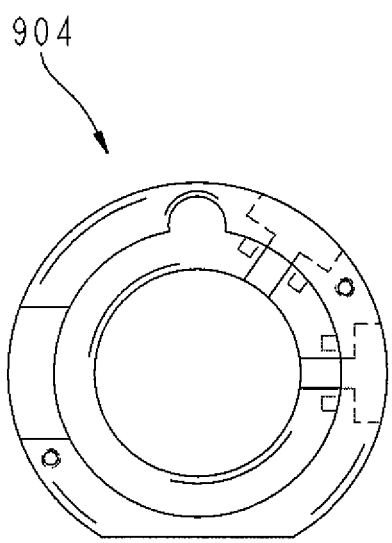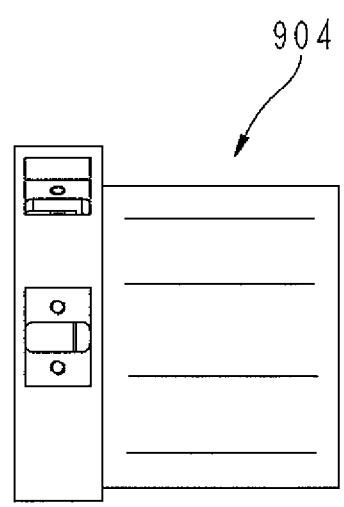
FIG. 33F    FIG. 33G

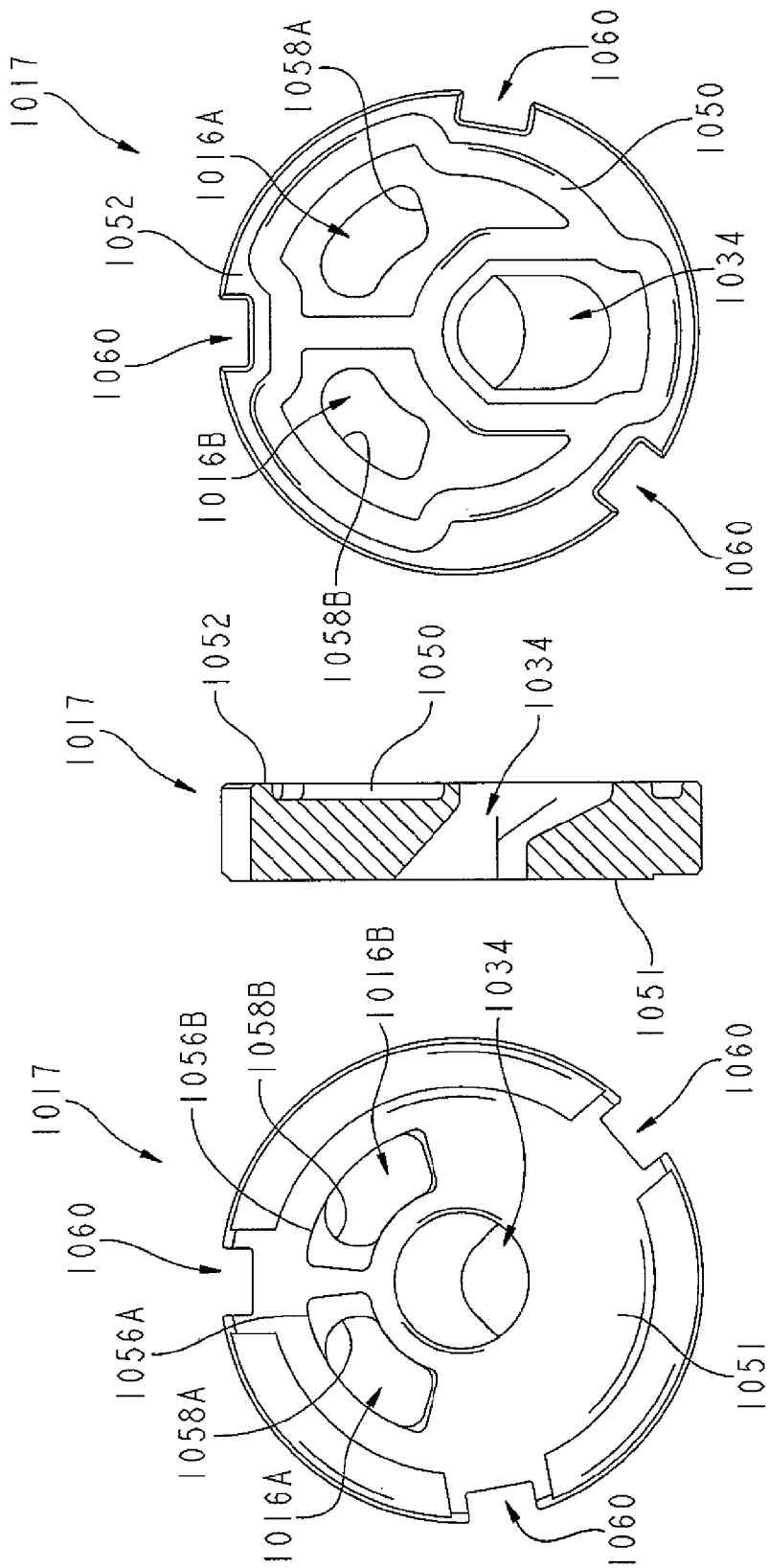

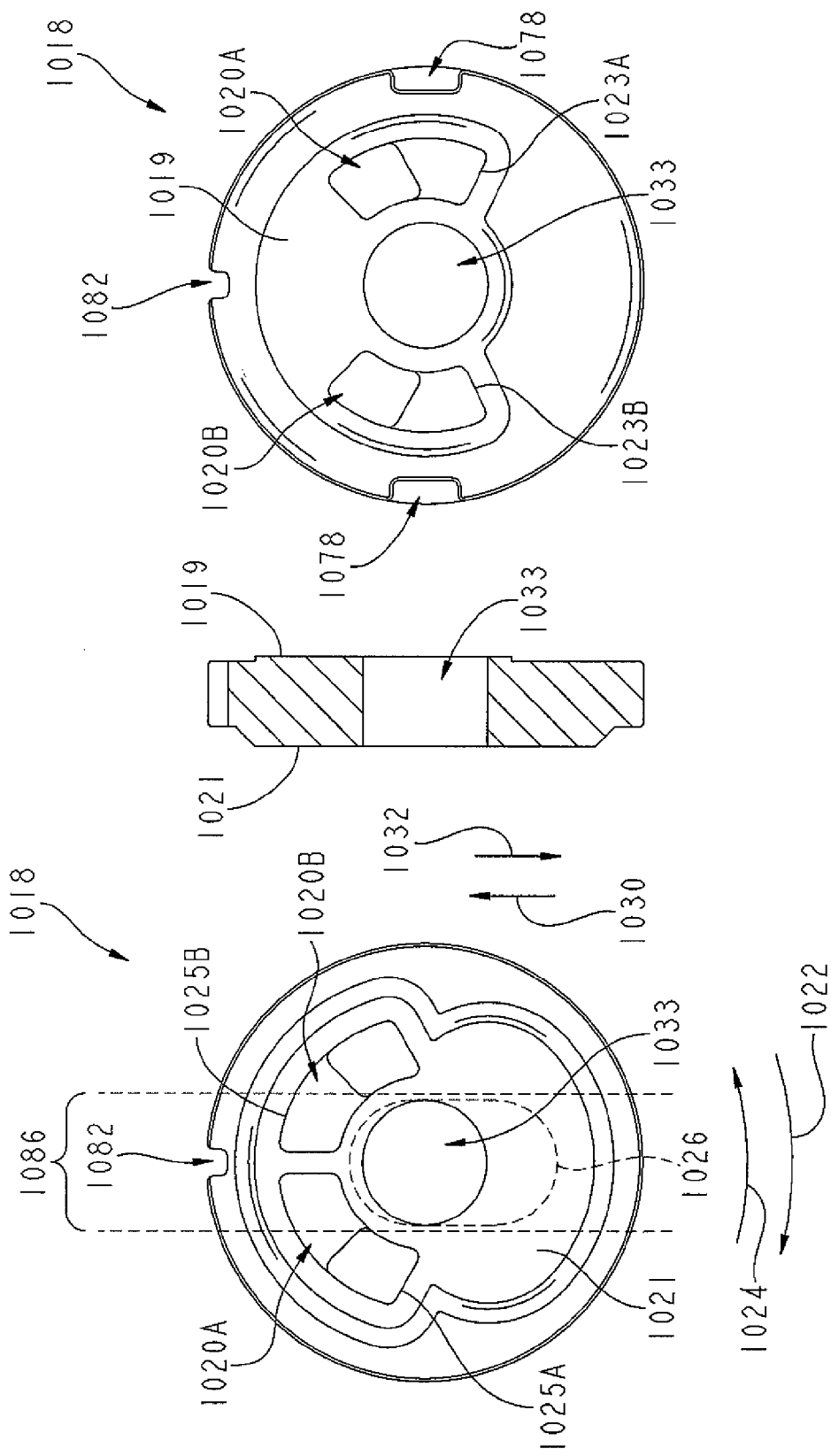

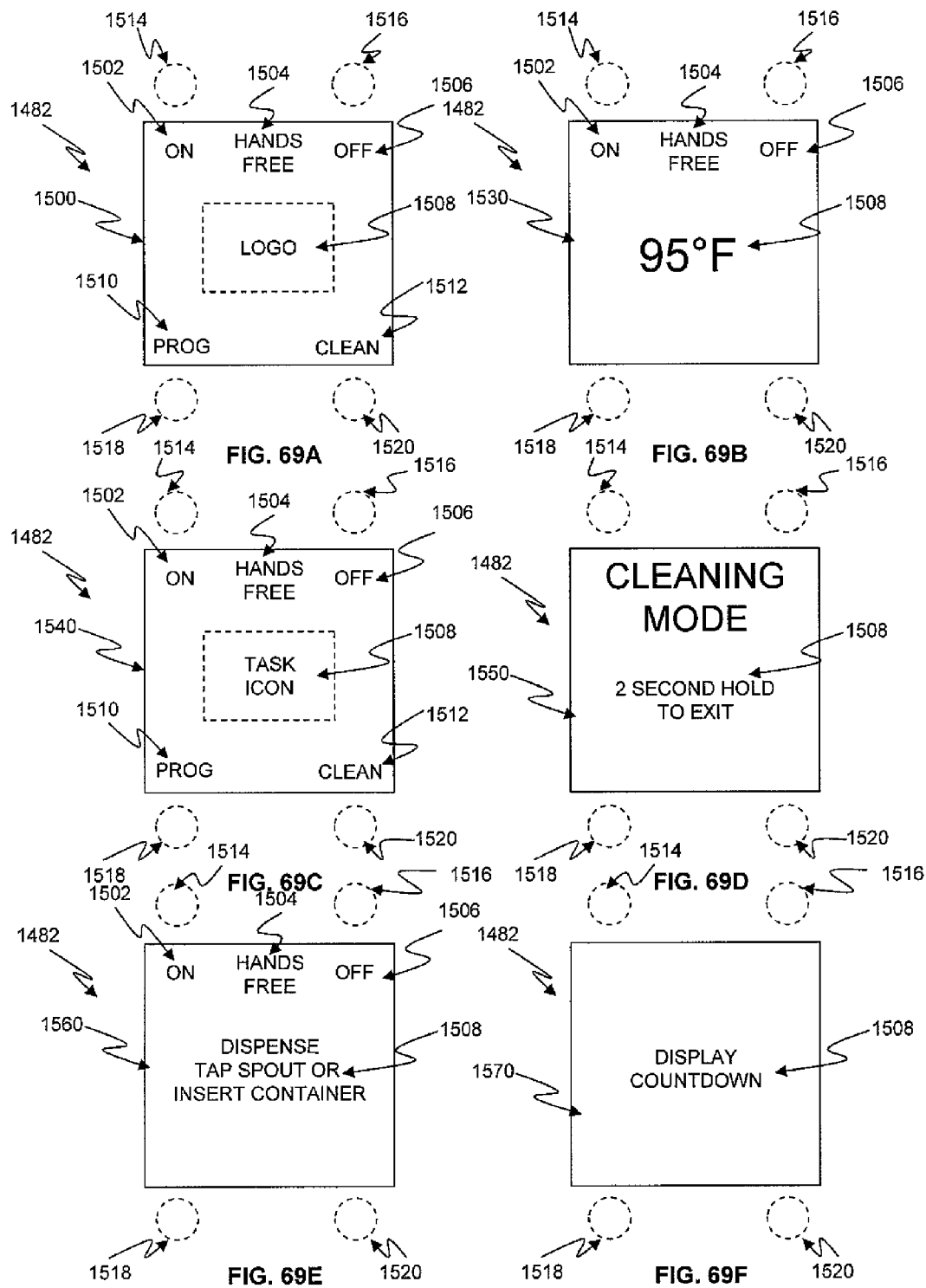

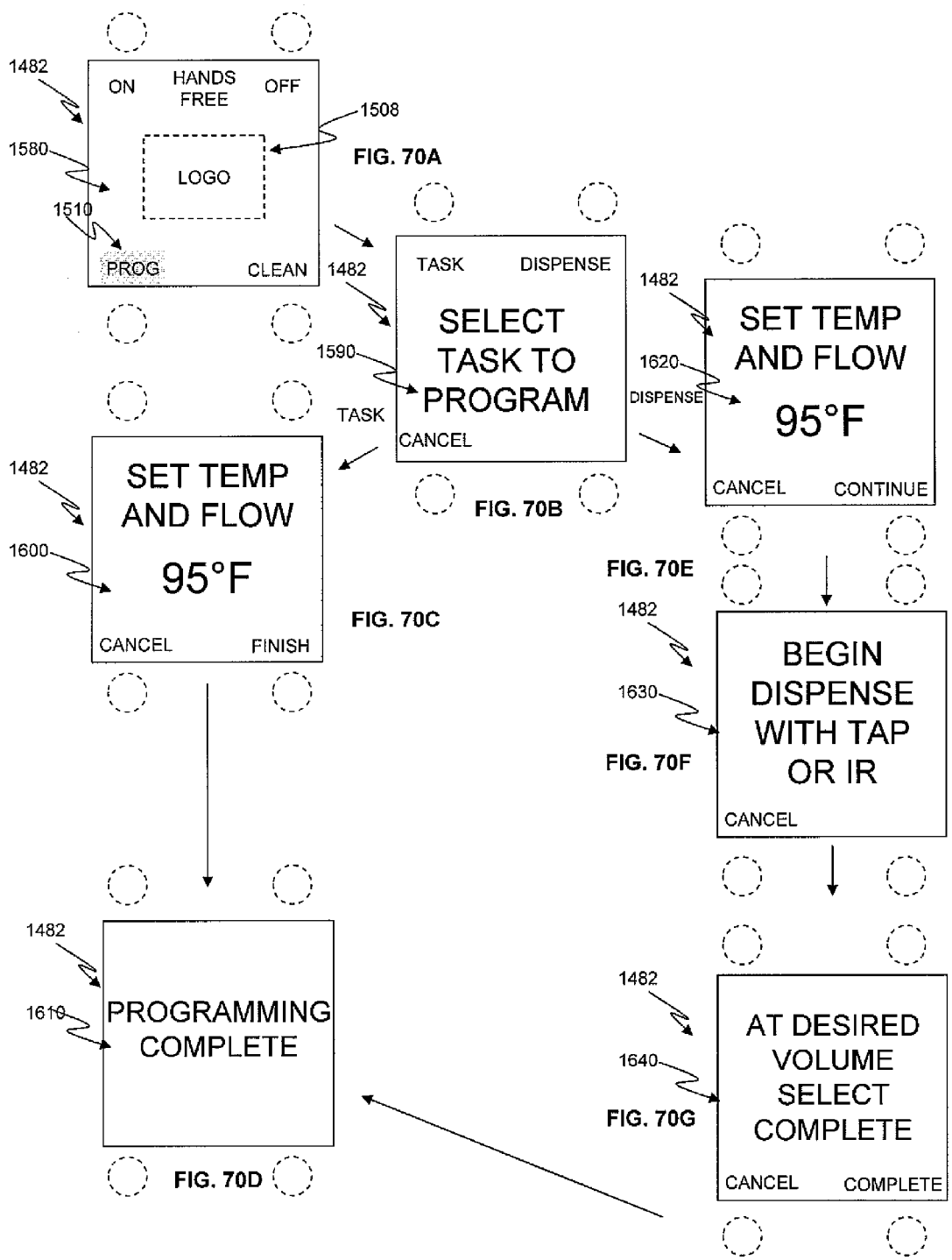

ELECTRONIC USER INTERFACE FOR ELECTRONIC MIXING OF WATER FOR RESIDENTIAL FAUCETS

CROSS REFERENCE TO RELATED APPLICATIONS

This application is a divisional patent application of U.S. patent application Ser. No. 11/737,727, filed Apr. 19, 2007, now U.S. Pat. No. 8,162,236 which claims the benefit of U.S. Provisional Application Ser. No. 60/794,229, filed Apr. 20, 2006, the disclosures of which are expressly incorporated by reference herein.

BACKGROUND AND SUMMARY OF THE INVENTION

The present invention relates generally to water delivery systems, such as faucets, and more particularly to faucets and the operation of faucets including user inputs for faucets.

Faucets are generally controlled by either a single handle which utilizes a mixing valve to proportion the flow of hot and cold water to a delivery spout, or dual-handles which utilize two individual valves to control the flow of hot and cold water. Typically, a user operates either the single handle or the two handles to regulate the flow of hot and cold water and hence both the flow rate and the temperature of the mixed water. Additionally, discrete systems are also known which provide instant hot and instant warm water. Further, the hands free activation of faucets is known.

In an exemplary embodiment of the present disclosure, an apparatus for controlling the provision of water from a source of cold water and a source of hot water is provided. The apparatus comprising an elongated curved spout having a first fluid conduit in fluid communication with a spray outlet and a second fluid conduit in fluid communication with a stream outlet; a valve in fluid communication with the source of cold water and the source of hot water and in fluid communication with the first fluid conduit and the second fluid conduit of the spout; a controller operably coupled to the valve and configured to control an operation of the valve, the controller including a receiver; and a remote user interface including a transmitter and a plurality of user inputs, the remote user interface providing a wireless indication to the controller of a state of the plurality of user inputs. The valve being positioned in at least a first position wherein the valve prevents water from entering the first fluid conduit and the second fluid conduit of the spout and a second position wherein the valve permits water to enter at least one of the first fluid conduit and the second fluid conduit of the spout.

In a further exemplary embodiment of the present disclosure, an apparatus for controlling the provision of water from a source of cold water and a source of hot water above a sink deck is provided. The apparatus comprising a mixing valve in fluid communication with the source of cold water and the source of hot water, the mixing valve being located beneath the sink deck; a diverter valve located beneath the sink deck in fluid communication with an outlet of the mixing valve, the diverter valve having a first outlet and a second outlet; an electronic user interface located above the sink deck; a spout including a first fluid conduit in fluid communication with the first outlet of the diverter valve and with a spray outlet of the spout and a second fluid conduit in fluid communication with the second outlet of the diverter valve and with a stream outlet of the spout; and a controller operably coupled to the electronic user interface and to the mixing valve.

In still a further exemplary embodiment of the present disclosure, an apparatus for controlling the provision of water from a source of cold water and a source of hot water is provided. The apparatus comprising a mixing valve in fluid communication with the source of cold water and the source of hot water; a spout in fluid communication with an outlet of the mixing valve; an electronic user interface including an electronic joystick moveable to define a selected temperature and a selected flow rate; and a controller operably coupled to the electronic user interface and to the mixing valve.

In still yet a further exemplary embodiment of the present disclosure, an apparatus for controlling the provision of water from a source of cold water and a source of hot water above a sink deck is provided. The apparatus comprising a mixing valve in fluid communication with the source of cold water and the source of hot water, the mixing valve being located beneath the sink deck; an electronic user interface located above the sink deck; a spout in fluid communication with an outlet of the mixing valve; and a controller operably coupled to the electronic user interface and to the mixing valve. The electronic user interface including a first touch slider user input for setting water temperature and a second touch slider user input for setting flow rate and a plurality of preset tasks inputs.

In yet another exemplary embodiment of the present disclosure, a mixing valve for connection to a source of hot water, to a source of cold water, and to a water delivery device is provided. The mixing valve comprising a body having a first inlet adapted to be coupled to the source of cold water, a second inlet adapted to be coupled to the source of hot water, an outlet adapted to be coupled to the water delivery device; and a moveable valve member having a fluid conduit. The moveable valve member being positionable in a first position wherein the first inlet and the second inlet are in fluid communication with the outlet in a low flow configuration, and in a second position wherein the first inlet and the second inlet are in fluid communication with the outlet in a high flow configuration. The temperature of water provided to the outlet being adjustable in both the low flow configuration and the high flow configuration by moving the moveable valve member.

In yet still another exemplary embodiment of the present disclosure, a mixing valve for connection to a source of hot water, to a source of cold water, and to a water delivery device is provided. The mixing valve comprising a valve body having a first opening in fluid communication with the source of hot water, a second opening in fluid communication with the source of cold water, and an outlet in fluid communication with the water delivery device; a first valve member having a first opening positionable in fluid communication with the first opening of the valve body and a second opening positionable in fluid communication with the second opening of the valve body, the first valve member being rotatable relative to the valve body; and a second valve member having a fluid conduit positionable in fluid communication with the first opening and the second opening of the first valve member, the second valve member being translatable relative to the first valve member. A rotation of the first valve member relative to the second valve member controlling a temperature of the water provided to the outlet and a translation of the second valve member relative to the first valve member controlling a flow rate of the water provided to the outlet.

In still a further exemplary embodiment of the present disclosure, a mixing valve for connection to a source of hot water, to a source of cold water, and to a water delivery device is provided. The mixing valve comprising a valve body having a first opening in fluid communication with the source of hot water, a second opening in fluid communication with the source of cold water, and an outlet in fluid communication with the water delivery device; a first moveable valve member in fluid communication with the first opening, the second opening, and the outlet; a second moveable valve member in fluid communication with the first opening, the second opening, and the outlet through the first moveable valve member. The regulation of the temperature and flow rate of the water provided to the outlet being independently controlled by the movement of the first valve member and the second valve member, respectively.

In another still exemplary embodiment of the present disclosure, a method of configuring a valve coupled to a source of hot water, a source of cold water, and a water delivery device is provided. The valve having a moveable valve member having a first limit position and a second limit position. The valve also having an associated controller and temperature sensor positioned to measure the water provided by the valve. The method comprising the steps of through the controller moving the moveable valve member to the first limit position; measuring the temperature of the water being provided by the valve, a first measured temperature; through the controller moving the moveable valve member to the second limit position; measuring the temperature of the water being provided by the valve, a second measured temperature; and designating the limit position corresponding to the higher of the first measured temperature and the second measured as the hot input.

In still a further exemplary embodiment of the present invention, a water delivery system for connection to at least one water inlet and a first water outlet, the water delivery system comprising: a housing including a first connector having a first shape and a second connector having a second shape differing from the first shape; a valve positioned within the housing and in fluid communication with a first port of the first connector and a second port of the second connector; a first fluid conduit adapted to be coupled to the at least one water inlet and having a first end configured to be coupled to the first port of the first connector, the first end including a body portion having a third shape being configured to cooperate with the first shape of the first connector of the housing to permit the first fluid conduit to be coupled to the first port such that the first fluid conduit is in fluid communication with the valve, the third shape being configured to not cooperate with the second shape of the second connector of the housing such that the first fluid conduit is prevented from being coupled to the second connector; and a second fluid conduit adapted to be coupled to the at least one water outlet and having a first end configured to be coupled to the second port of the second connector, the first end including a body portion having a fourth shape being configured to cooperate with the second shape of the second port of the second connector to permit the second fluid conduit to be coupled to the second port such that the second fluid conduit is in fluid communication with the valve, the fourth shape being configured to not cooperate with the first shape of the first connector of the housing such that the second fluid conduit is prevented from being coupled to the first connector.

Additional features and advantages of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The detailed description of the drawings particularly refers to the accompanying figures in which:

FIG. 2A is a perspective view of an exemplary packaged base water delivery system of FIG. 1;

FIG. 2B is a perspective view of an exemplary packaged upgrade to the base water delivery system of FIG. 2A;

FIG. 2C is a perspective view of an exemplary packaged replacement portion of the water delivery system of FIG. 2A;

FIG. 2D is a perspective view of another exemplary packaged upgrade to the base water delivery system of FIG. 2A;

FIG. 33D is a bottom view of the housing of FIG. 33A;

FIG. 33E is a side view of the housing of FIG. 33A;

FIG. 33F is a top view of the housing of FIG. 33A;

FIG. 33G is a side view of the housing of FIG. 33A;

FIG. 46A is a top view of a static valve member of the mixing valve of FIG. 42;

FIG. 46B is sectional view of the static valve member of FIG. 46A;

FIG. 46C is a bottom view of the static valve member of FIG. 46A;

FIG. 47A is a top view of a static valve member of the mixing valve of FIG. 42;

FIG. 47B is sectional view of the temperature control valve member of FIG. 47A;

FIG. 47C is a bottom view of the temperature control valve member of FIG. 47A;

FIG. 67 is an exemplary method of programming a preset button;

FIG. 68 is another exemplary method of programming a preset button;

FIGS. 69A-69F illustrate exemplary screens displayed on the display of the user input device of FIG. 66.

FIGS. 70A-70G illustrate exemplary screens displayed on the display of the user input device of FIG. 66 in a program mode.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention. Although the disclosure is described in connection with water, it should be understood that additional types of fluids may be used.

Figure 1:
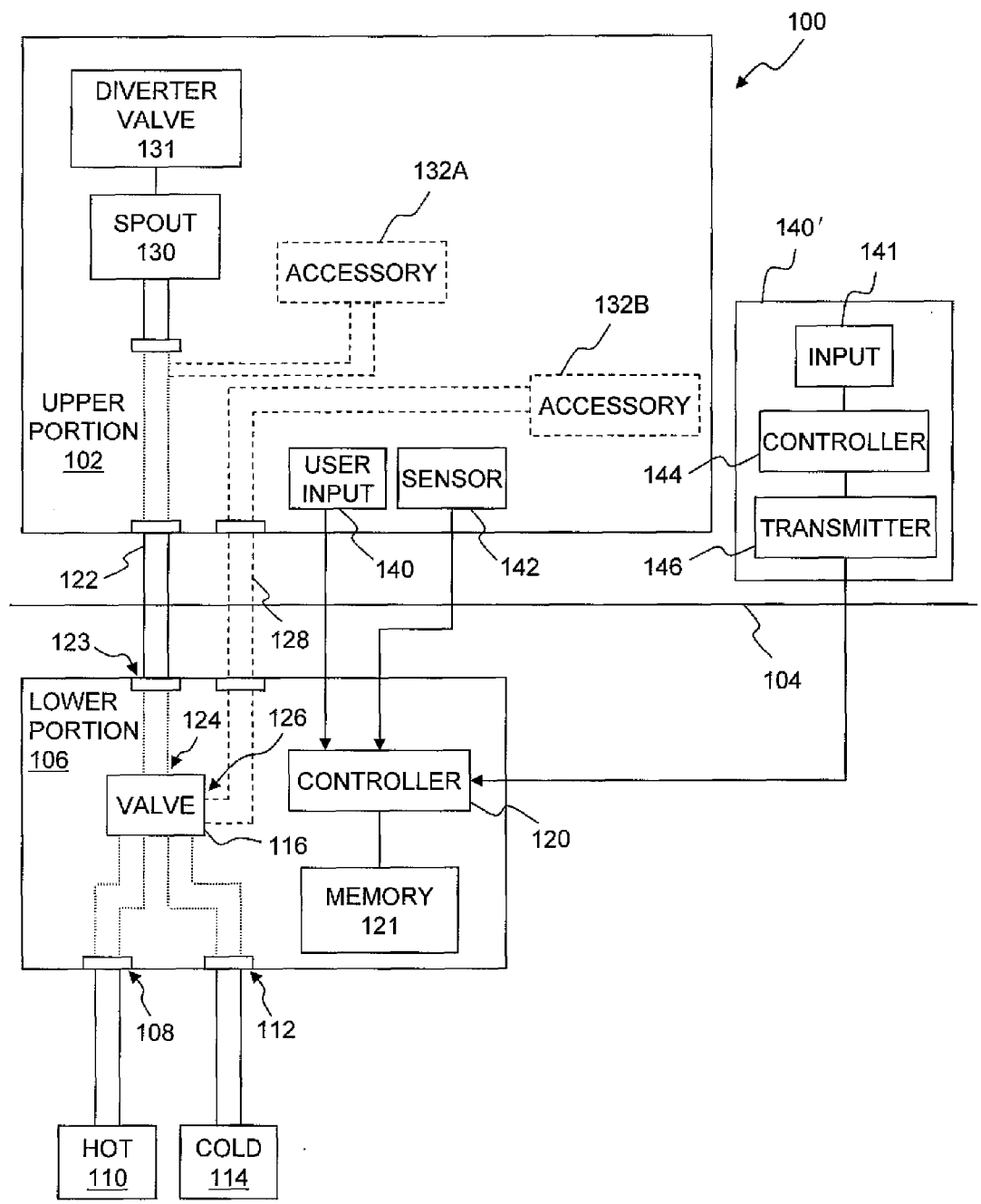
FIG. 1 is a is a diagrammatic view of a water delivery system including an upper portion above a sink deck and a lower portion below the sink deck.

Referring to FIG. 1, a diagrammatic representation of a water delivery system 100 is shown. Water delivery system 100 includes an upper portion 102 which is accessible to a user form above a sink deck 104 and a lower portion 106 which is generally inaccessible to a user from above sink deck 104. In one embodiment, upper portion 102 and lower portion 106 are both modular such that various components may be added to or subtracted from either upper portion 102 and lower portion 106.

Lower portion 106 includes a hot water inlet port 108 connected to a hot water supply 110 and a cold water inlet port 112 connected to a cold water supply 114. Lower portion 106 includes internal water conduits which permit fluid entering hot water inlet port 108 to ultimately mix with fluid entering cold water inlet port 112. In one embodiment, lower portion 106 includes a valve 116 which controls the amount of fluid from hot water supply 110 and the amount of fluid from cold water supply 114 that are mixed together. As explained herein the amount of fluid mixed together from hot water supply 110 and cold water supply 114 is determined based on one or more user inputs, such as desired fluid temperature, desired fluid flow rate, desired fluid volume, various task based inputs (such as vegetable washing, filling pots or glasses, rinsing plates, and/or washing hands), various recognized presentments (such as vegetables to wash, plates to wash, hands to wash, or other suitable presentments), and/or combinations thereof. Presentments correspond to the placement of an item proximate to a delivery end of the spout. As such, it is similar to hands-free operation except that controller 120 is able to distinguish between item types.

In one embodiment, the valve is a single electronically controlled mixing valve which is in fluid communication with both hot water supply 110 and cold water supply 114. Exemplary electronically controlled mixing valves are described in U.S. patent application Ser. No. 11/109,281, filed Apr. 19, 2005, titled "ELECTRONIC PROPORTIONING VALVE" and U.S. Provisional Patent Application Ser. No. 60/758,373, filed Jan. 12, 2006, titled "ELECTRONIC MIXING VALVE", the disclosures of which are expressly incorporated by reference herein. In one embodiment, valve 116 is a mixing valve, such as mixing valve 900 illustrated in FIGS. 32-41F. In another embodiment, valve 116 includes multiple valves, such as one for the hot input and the one for the cold input.

In one embodiment, a diverter valve, such as diverter valve 133 (see FIG. 1A), controls when water from the mixing valve 116 is provided to the user. Diverter valve 133 may have three settings: off, path A (corresponding to an internal waterway that is in communication with a stream aerator to provide a stream configuration from spout 130), and path B (corresponding to an internal waterway that is in communication with a spray aerator to provide a spray configuration from spout 130). Further, diverter valve 133 may be used to regulate a flow rate of water delivery system 100. In a metering example, diverter valve 133 may provide a first gross flow rate until the desired quantity is approached, then provide a second fine flow rate, being less than the gross flow rate, until the desired quantity is achieved. The same metering example may be achieved with mixing valve 116 as well.

Lower portion 106 further includes a controller 120. Controller 120 includes software that controls the operation of the water delivery system 100. In one embodiment, controller 120 receives inputs from various user input devices and/or sensors and provides control signals for various components, such as valve 116.

A fluid conduit 122 is shown connecting upper portion 102 and lower portion 106. Fluid conduit 122 is in fluid communication with a first output 124 of valve 116 through a port 123 of lower portion 106. In one embodiment, valve 116 includes a second output 126 which is in fluid communication with upper portion 102 through a port 127 and a second fluid conduit 128.

Upper portion 102 includes a spout 130 which is in fluid communication with fluid conduit 122. Upper portion 102 may further include an accessory 132A which is in fluid communication with fluid conduit 122 and/or an accessory 132B which is in fluid communication with fluid conduit 128. Exemplary accessories include a container filling device and a coffee pot.

Upper portion 102 may further include a user input device 140. User input device 140 may be attached to spout 130 and/or accessory 132A or 132B. User input device 140, in one embodiment, includes a touch sensor whereby a user of water delivery system 100 may specify one or more parameters of the water to be delivered, such as temperature, pressure, quantity, and/or flow pattern characteristics. In one embodiment, user input device 140 includes task inputs, temperature slider controls, and flow rate slider controls. In another embodiment, user input device 140 includes one or more mechanical inputs, such as buttons, dials, and/or handles.

Upper portion 102 may further include one or more sensors 142. Sensors 142 may be used to monitor characteristics of the water, such as temperature, dispensed water volume, water quality, and flow rate, or environmental characteristics, such as a presentment, the presence of an infrared emitting or reflecting body, a tap sensor, mode selections, such as units, and other sensors. In one embodiment, sensors 142 may be included in lower portion 106. In one embodiment, upper portion 102 includes a display which provides an indication to the user of water characteristics, such as temperature, dispensed water volume, water quality, and flow rate, or environmental characteristics, such as a presentment, the presence of an infrared emitting or reflecting body, a tap sensor, and mode selections, such as units.

Described herein are various spouts, controllers, user input devices, and other components of a water delivery system. It should be assumed that the functionality of spout 130, controller 120, user input device 140 and water delivery system 100 apply to each of the disclosed spouts, controllers, user input devices, and other components of water delivery system 100 and that the various features of each spout, controller, and other components of a water delivery system may be included as apart of any other spout, controller, user input device, or water delivery system.

Figure 13A:
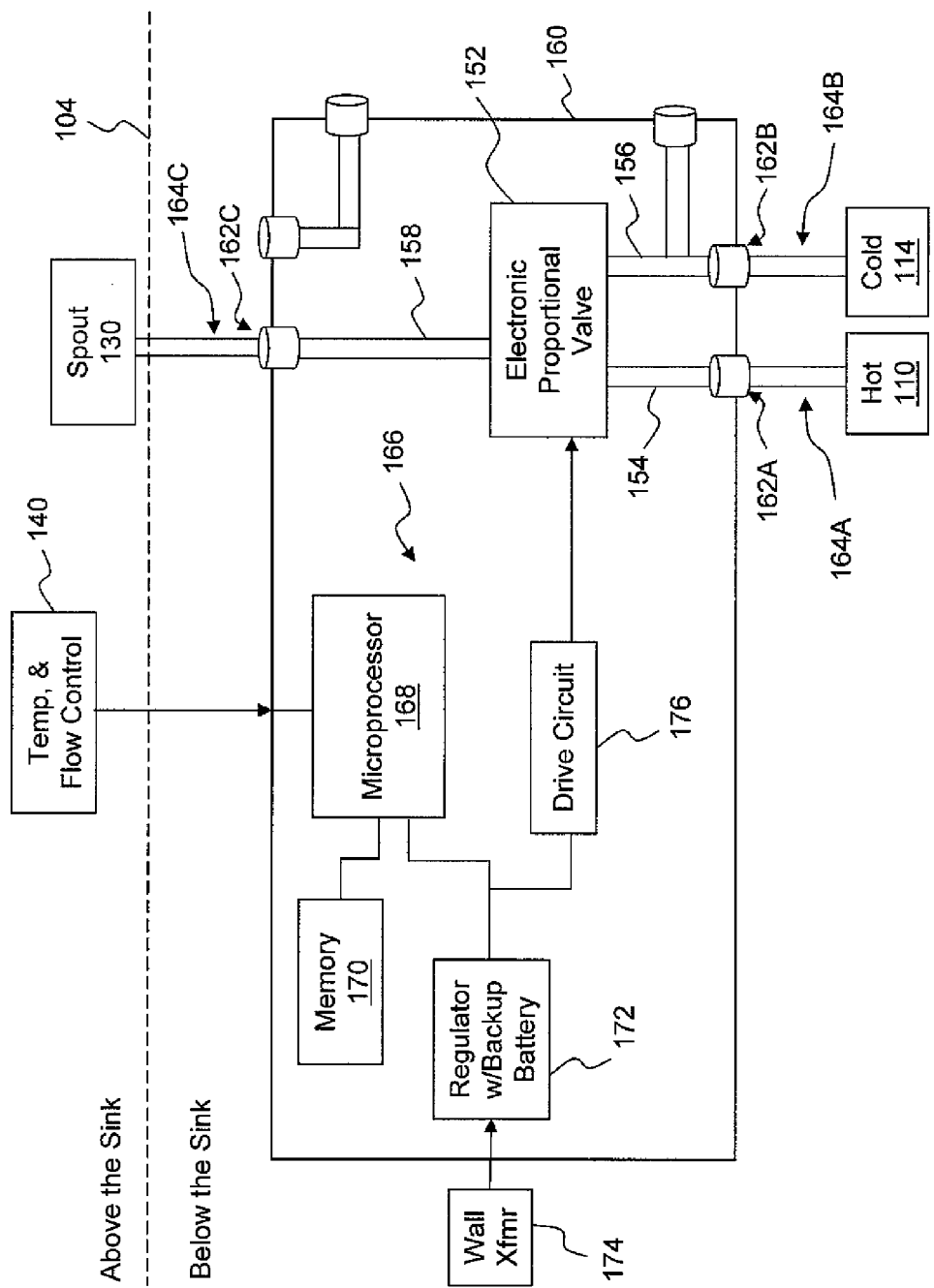
FIG. 13A is a diagrammatic view of the lower portion of FIG. 11 wherein the characteristics of the water provided to an exemplary upper portion is controlled through an open-loop configuration and illustratively including a user input for temperature selection and flow selection.

Referring to FIGS. 13A-D, an exemplary lower portion 150 is shown. Referring to FIG. 13A, lower portion 150 includes an electronic mixing valve 152 in fluid communication with two input waterways 154 and 156 and an output waterway 158. Mixing valve 152 and waterways 154, 156, and 158 are contained within a housing 160 which includes a first port 162A1, a second port 162A2, and a third port 162B. Ports 162A1-C are in fluid communication with internal waterways 154, 156, and 158, respectively. An external fluid conduit 164A is coupled to first port 162A1 and is in fluid communication with a supply of hot water 110. An external fluid conduit 164B is coupled to second port 162A2 and is in fluid communication with a supply of cold water 114. In one embodiment, the hot supply 110 and the cold supply 114 are plumbing connections provided below the sink deck. An external fluid conduit 164C is coupled to third port 162B and is in fluid communication with spout 130.

Lower portion 150 further includes a controller 166. Controller 166 includes a processor 168 and associated memory 170. In one embodiment, memory 170 includes software that is executed by processor 168 in performing the functionality described herein. Processor receives power from a regulator circuit 172 which is coupled to an external power supply 174. In the illustrated embodiment, regulator circuit 172 also includes a backup battery for use in the case of power interruption from power supply 174. In one embodiment, memory 170 is provided on board microprocessor 168. In one embodiment, memory 170 is removable.

Figure 44:
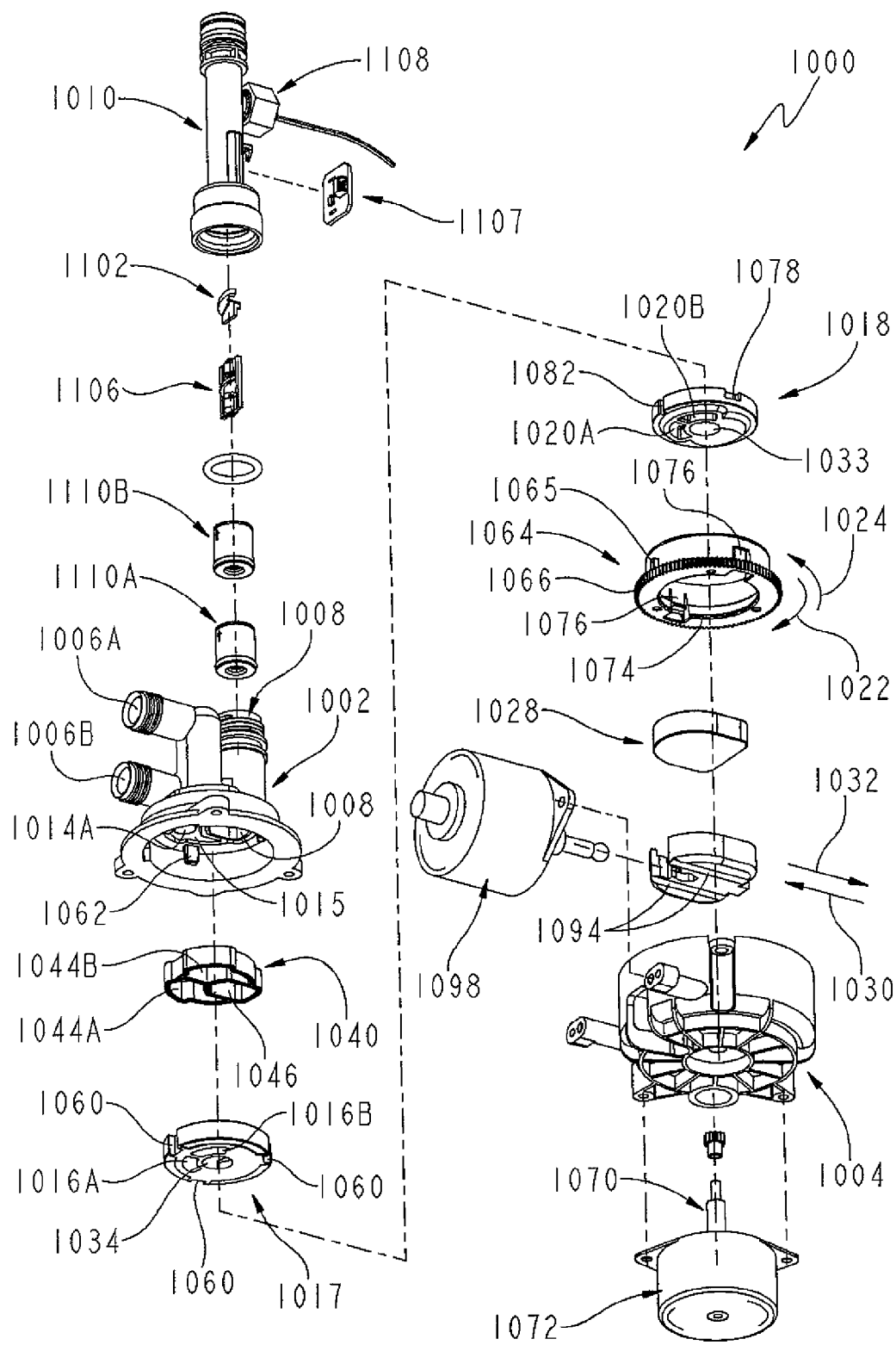
FIG. 44 is an exploded view of the mixing valve of FIG. 42.

Controller 166 adjusts the parameters of electronic proportional valve 152 through a drive circuit 176 which drives one or more motors associated with valve 152 (such as motors 1072 and 1098 shown in FIG. 44). Controller 166 receives temperature and flow settings from one or more user input devices 140 and sets the parameters of valve 152 to reflect the temperature and flow settings. The arrangement shown in FIG. 13A is an open loop arrangement because the output of valve 152 is not monitored to ensure that the requested temperature and flow are being provided to spout 130.

Figure 13B:
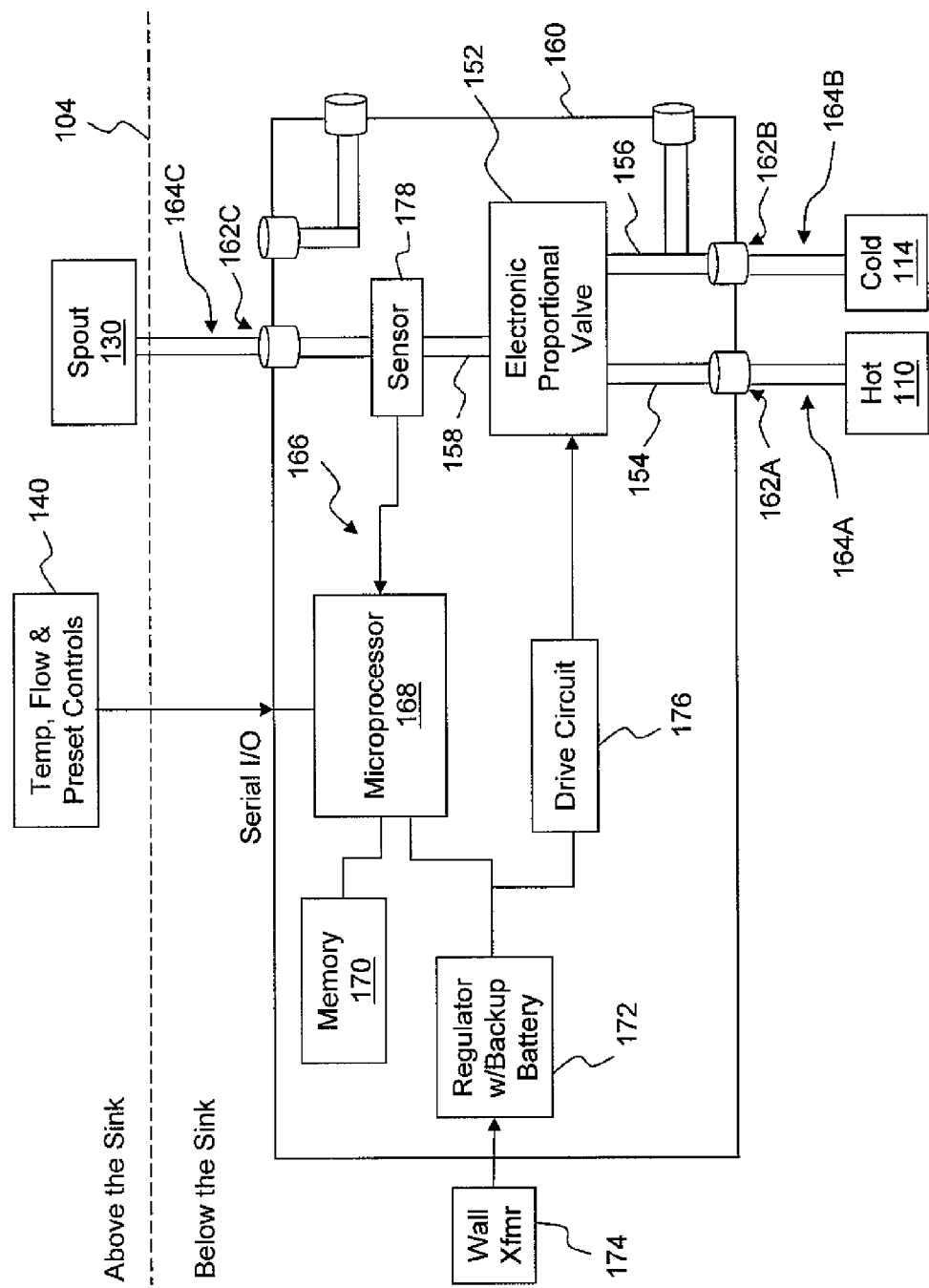
FIG. 13B is a diagrammatic view of the lower portion of FIG. 11 wherein the characteristics of the water provided to an exemplary upper portion is controlled through a closed-loop configuration and illustratively including a user input for temperature selection, flow selection, and presets.

Referring to FIG. 13B, an example of a closed loop arrangement of lower portion 150 is shown. As shown in FIG. 13B, a sensor 178 is positioned in, coupled to, or otherwise monitors internal waterway 158. Sensor 178 monitors the temperature of the water in internal waterway 158 and the flow rate of water in internal waterway 158. In one embodiment, sensor 178 is comprised of multiple sensors, such as a first sensor to measure the temperature of the water and a second sensor to measure the flow rate of the water. The closed-loop arrangement permits controller 166 to monitor the output of valve 152 and to prevent the temperature of the water becoming too high that it scalds a user. As such, the closed loop arrangement permits the inclusion of safe hot water delivery option. The closed loop arrangement also provides feedback to controller 166 which permits the delivery of the desired temperature and the desired flow rate regardless of variations in the temperatures and/or pressures of hot supply 110 and cold supply 114.

Additional sensor may provide input to controller 166. Exemplary sensors include position sensors on valve 152. The position sensors may be associated with a motor associated with valve 166, a gear associated with valve 166, and/or plates associated with valve 166. Based on the value of the position sensors, controller 166 is able to know the temperature and/or flow rate valve 152 is currently set for.

Controller 166 still receives temperature and flow settings from one or more user input devices 140 and sets the parameters of valve 152 to reflect the temperature and flow settings. In FIG. 13B, user input device 140 also includes one or more preset controls, such as hot only, cold only, and task based inputs. In the illustrated embodiment, the temperature, flow, and selection of preset controls is communicated from user input device 140 to controller 166 over a serial connection.

Figure 65:
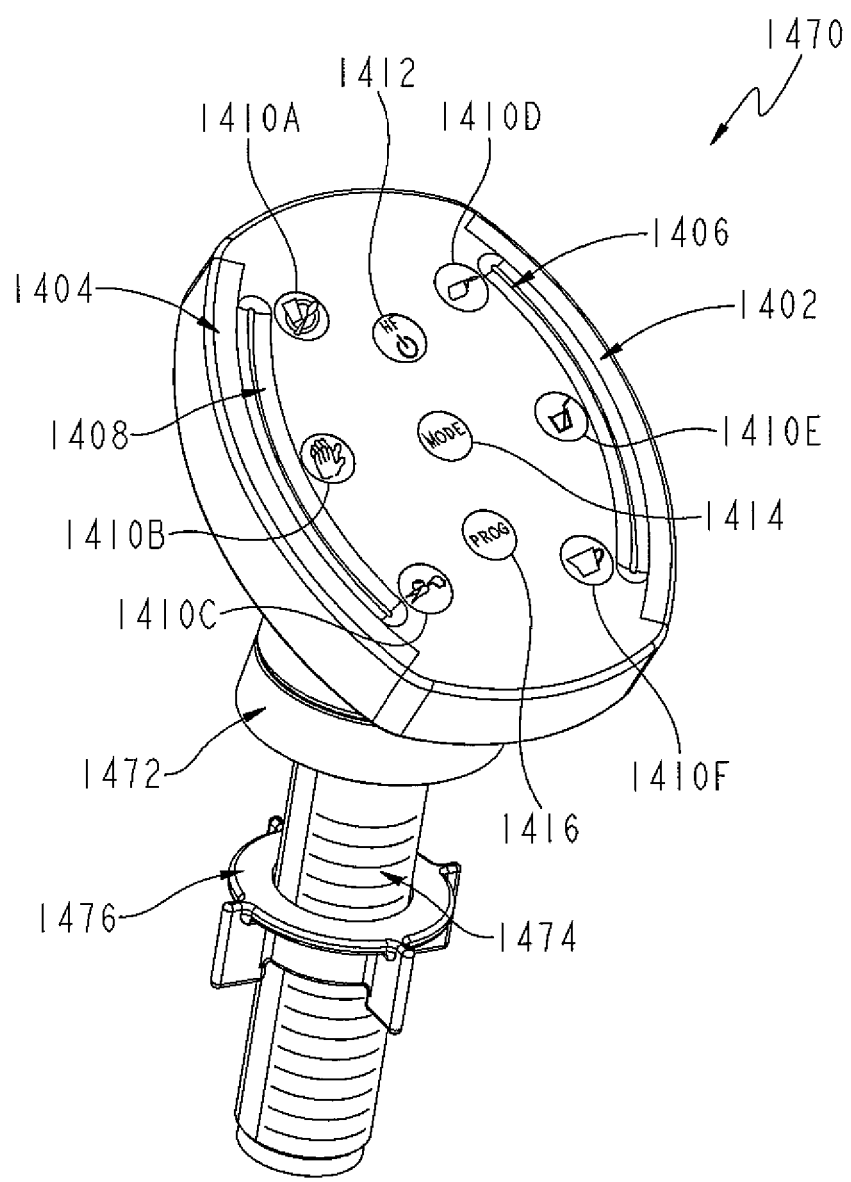
FIG. 65 is a mountable pedestal user input device including the user interface of FIG. 63.
Figure 66:
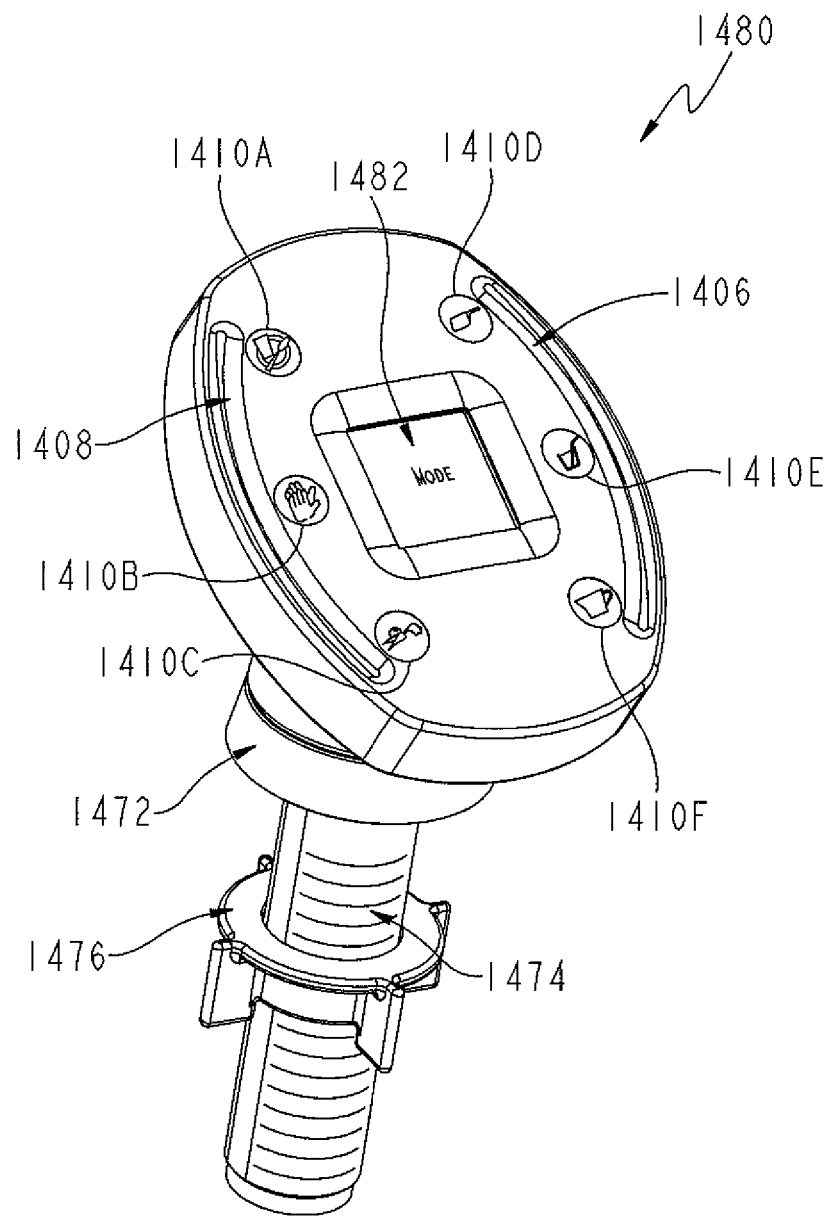
FIG. 66 shows a mountable pedestal user input device including an LCD input screen.

In FIGS. 13A-D, the connection between user input device 140 and controller 166 is shown separate from the connection between spout 130 and lower portion 150. It should be understood that user input device 140 may communicate with controller 166 either wirelessly or over a wired connection. In a wired configuration an electrical cable, such as a serial connection, may connect user input device 140 to controller 166 through the same opening 105 (see FIG. 8) in sink deck 104 as the water conduits to the spout. In one embodiment, a connector is coupled to sink deck 104 and user input device 140 and controller 166 each are coupled to the connector. An exemplary connector is connector 340 shown in FIGS. 9 and 10. In one embodiment, user input device 140 is connected to controller 166 through a wired connection that passes through a separate hole in the sink deck 104. Referring to FIGS. 65 and 66, user interface devices 1470 and 1480 are shown mounted to a pedestal that passes through a separate hole in the sink deck 104.

Figure 13C:
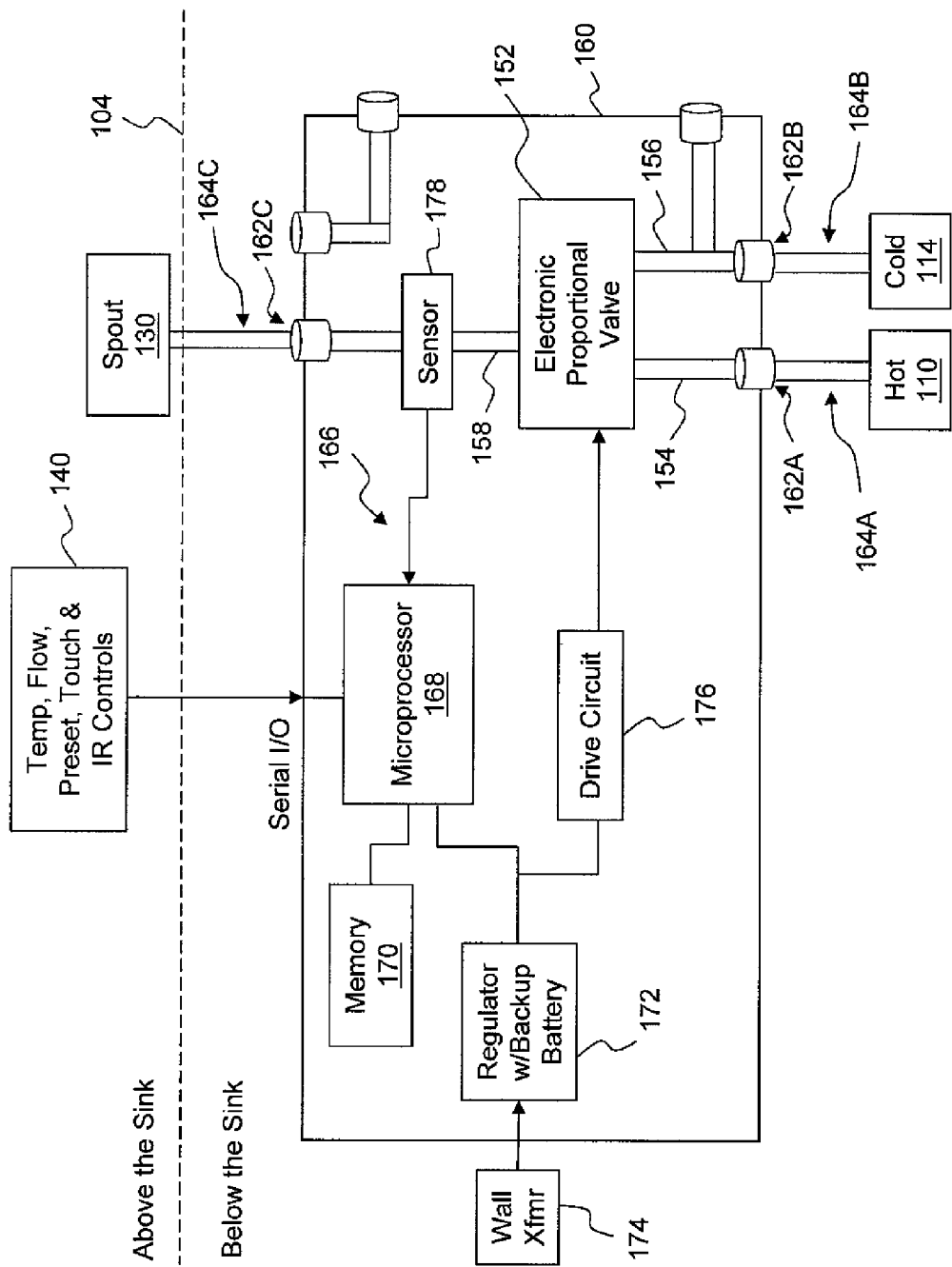
FIG. 13C is a diagrammatic view of the lower portion of FIG. 11 wherein the characteristics of the water provided to an exemplary upper portion is controlled through a closed-loop configuration and illustratively including a user input for temperature selection, flow selection, presets, and infrared based controls.

Referring to FIG. 13C, a second closed loop arrangement of lower portion 150 is shown. This closed loop arrangement is generally the same as the closed loop arrangement shown in FIG. 13B except for the addition of touch and infrared controls on user input device 140. Controller 166 responds to a tap of a touch sensor or the detection of an object by an infrared sensor to start the delivery of water. Controller 166 further responds to a subsequent tap of a touch sensor or the non-detection of an object by an infrared sensor or passage of time to suspend the delivery of water.

Figure 13D:
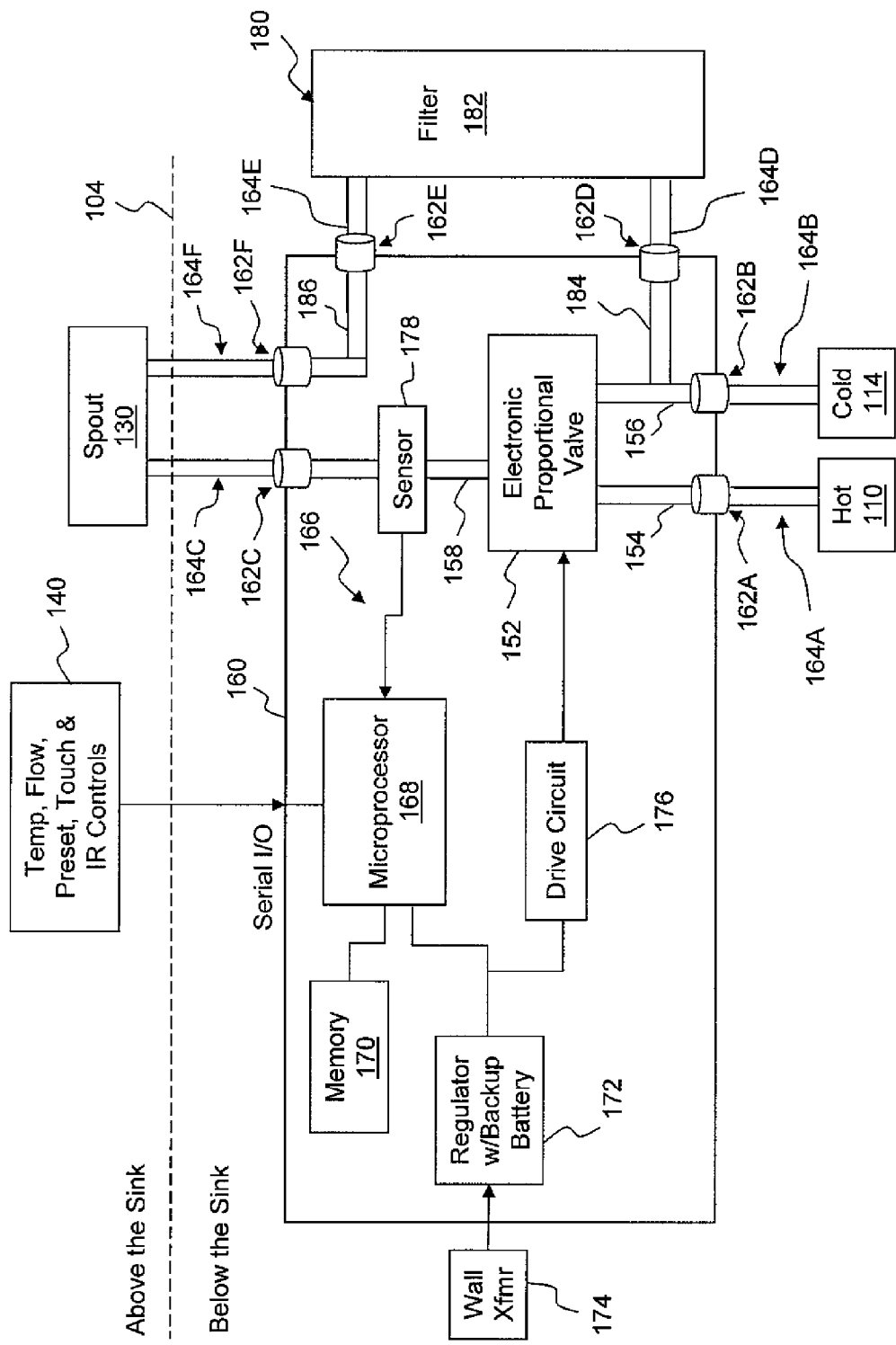
FIG. 13D is a diagrammatic view of the lower portion of FIG. 13C further including a water filtration system.

Referring to FIG. 13D, the closed loop arrangement of FIG. 13C is shown along with the inclusion of filtered water system 180. Filtered water system 180 includes a filter 182, an input waterway 164D to filter 182 and an outlet waterway 164E to filter 182. Inlet waterway 164D is coupled to a port 162D of housing 160 which is in fluid communication with an internal waterway 184 that is in fluid communication with the cold water supply 110 through internal waterway 156. Outlet waterway 164E is coupled to a port 162C of housing 160 which is in fluid communication with an internal waterway 186. Internal waterway 186 is in fluid communication with an external waterway 164F through a port 162F. Waterway 164F is in fluid communication with spout 130. Spout 130, in one embodiment, includes a valve the user may actuate to dispense cold filtered water. In one embodiment, filtered water is provided through a second, separate spout. The second spout may include any of the activation means disclosed herein. In one embodiment, the filtered water system includes a refrigeration tank to provided chilled water and a heating tank to provide instant warm or instant hot water.

Figure 13E:
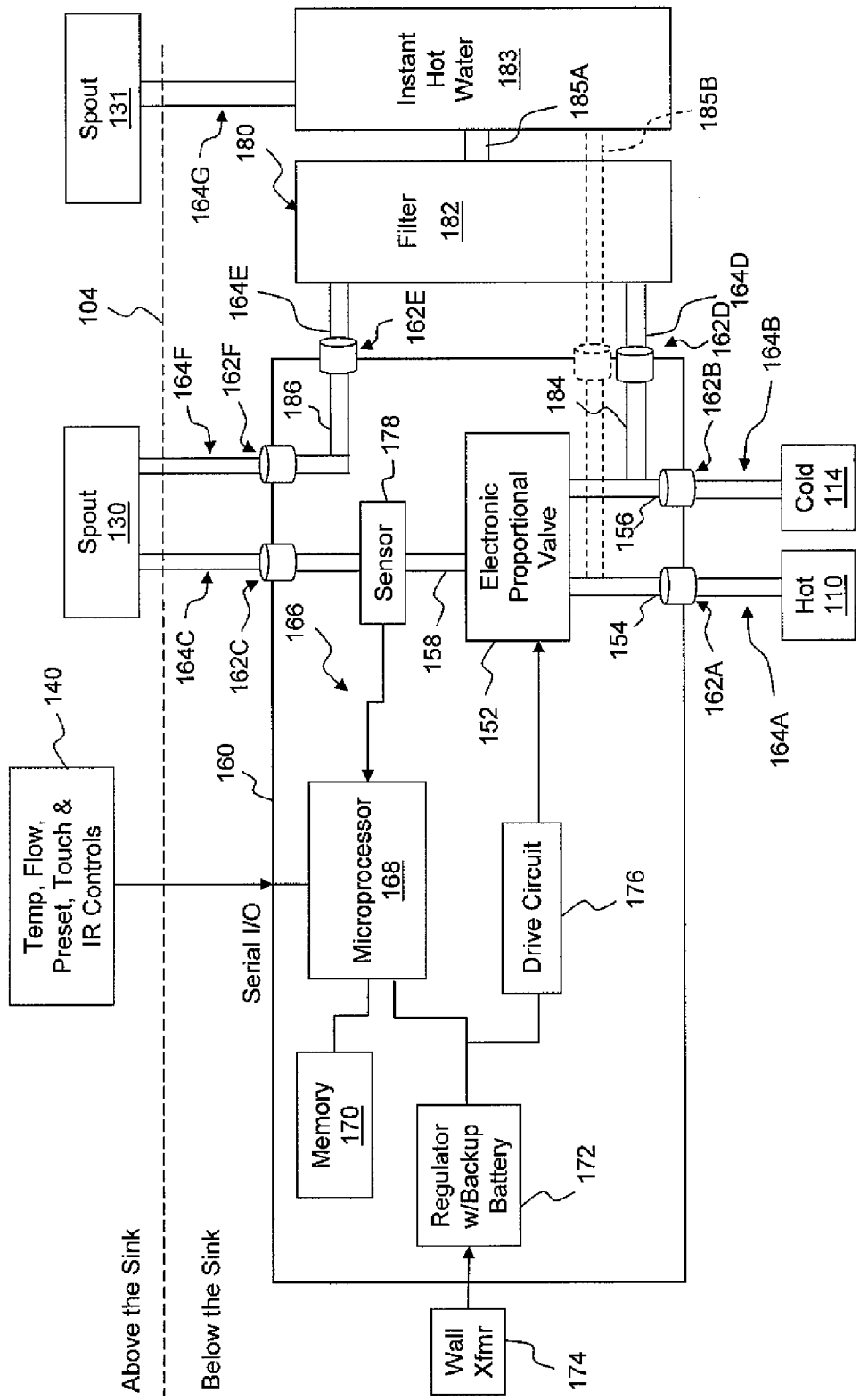
FIG. 13E is a diagrammatic view of the lower portion of FIG. 13D further including a instant hot water system.

Referring to FIG. 13E, the closed loop arrangement of FIG. 13D is shown along with an Instant Hot module 183. Exemplary Instant Hot modules are described herein. Instant Hot module 183, in one embodiment, is connected to a separate spout 131 spaced apart from spout 130 through a waterway 164G. Spout 131 may include any of the interface features disclosed herein, including task inputs and metering inputs. Instant hot module 183, in one embodiment, is connected to spout 130 through waterway 164F or another waterway internal to spout 130 and not in fluid communication with waterway 164F. Instant Hot module 183, in one embodiment, is in fluid communication with filter 182 through a waterway 185A, such that the water provided by spout 131 is filtered water. Instant Hot module 183, in one embodiment, is in fluid communication with filter 182 through a waterway 185B.

Figure 13F:
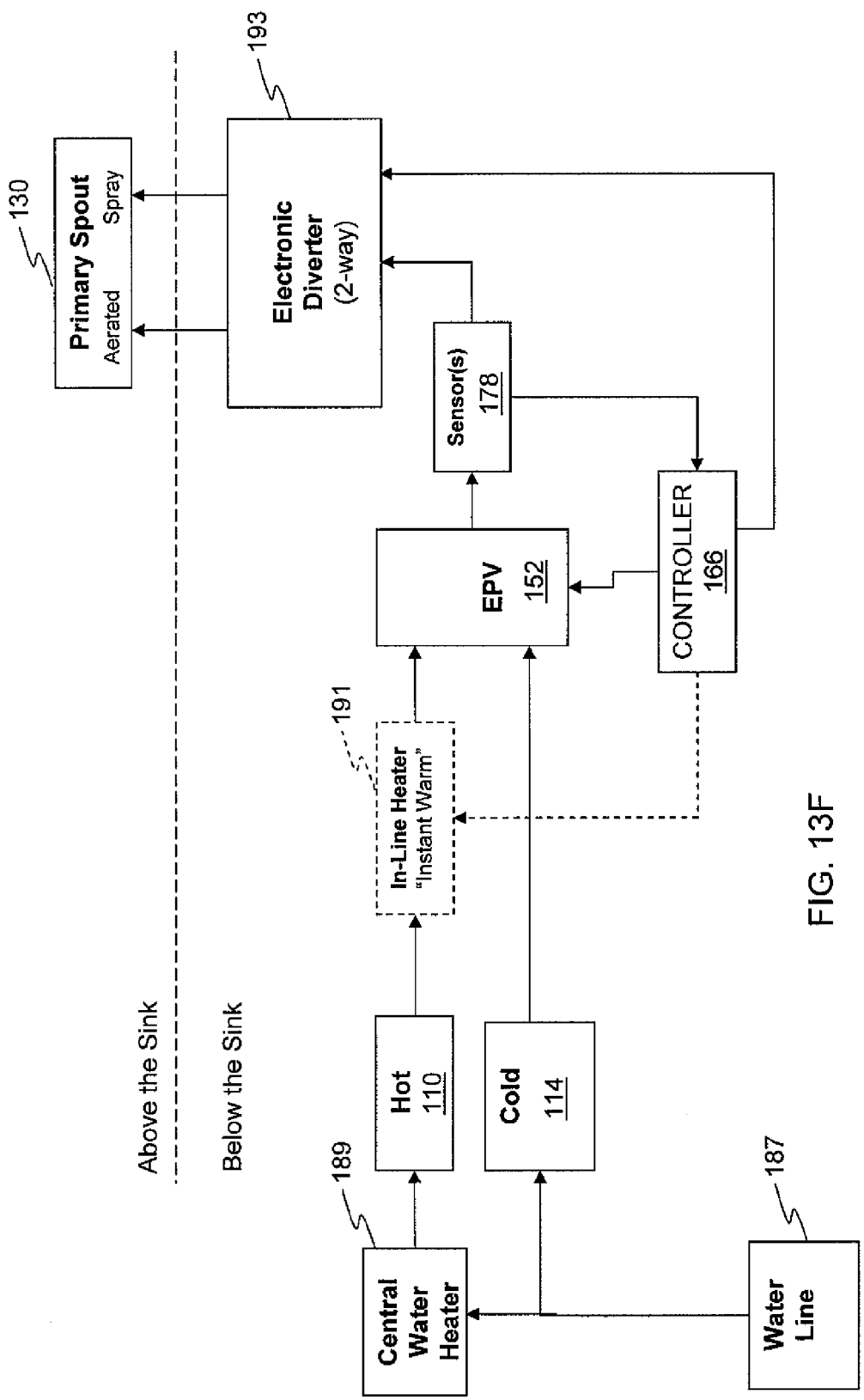
FIG. 13F is a diagrammatic view of another exemplary lower portion including an in-line heater system.

Referring to FIG. 13F, another exemplary arrangement of components is provided. As mentioned above, the supply of hot water 110 and the supply of cold water 114 may be the plumbing connections under the sink deck. The supply of cold water 114 generally is plumbed from the water line 187 entering the facility, such as the house, and may pass through other components prior to reaching the plumbing connection 114, such as a water softener. The supply of hot water 110 generally is plumbed to a central water heater 189 which heats water provided from the water line 187 to an elevated temperature. In one embodiment, central water heater 189 has a storage tank holding hot water. Central water heater is remote from sink deck 104 and is interposed between plumbing connection 110 and water line 187.

As discussed herein, the supply of hot water 110 and the supply of cold water 114 are coupled to an electronic proportioning valve or mixing valve 152. Valve 152 provides mixed water to an electronic diverter 193, the proportion of hot and cold water and the flow rate of water provided to electronic diverter 193 is controlled by valve 152 through controller 166 as discussed herein. In one embodiment, electronic diverter 193 is a two-way disk valve. In one embodiment, electronic diverter 193 is a solenoid valve.

Electronic diverter 193 is coupled to spout 130 through two waterways, one in fluid communication with a spray outlet and one in fluid communication with an aerated, stream outlet. In the illustrated embodiment, electronic diverter 193 is positioned below the sink deck. In one embodiment, electronic diverter 193 is positioned above the sink deck, such as inside spout 130 or in a pull-out portion of spout 130.

In one embodiment, an in-line heater 191 is in fluid communication with the supply of hot water 110 and valve 152. Exemplary in-line heaters 191 include a heating element positioned within a waterway or a small water tank with a heating element. In-line heater 191, in one embodiment, provides instant warm water to valve 152. An exemplary temperature for instant warm water is about 120° F. As is known it often takes a period of time before hot water from central water heater 189 to reach valve 152. In-line heater 191, in one embodiment, provides instant hot water to valve 152. An exemplary temperature for instant hot water is about 120° F., about 150° F., at least about 120° F., or in the range of about 120° F. to about 150° F. In one embodiment, an instant hot feature is added to a lavatory faucet and the temperature is about 120° F. The operation of in-line heater 191 is controlled by controller 166.

Figure 62:
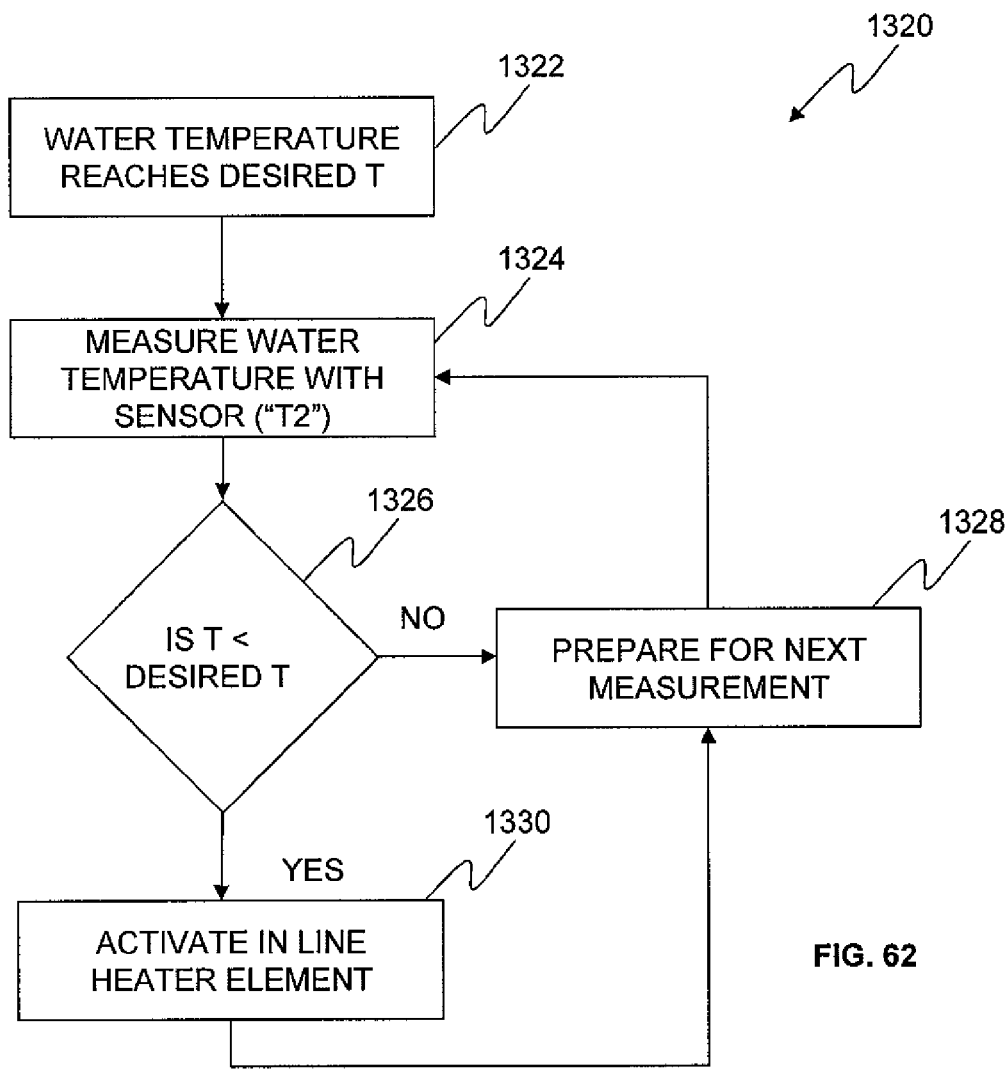
FIG. 62 is an exemplary method of maintaining a desired temperature.

In one embodiment, as illustrated in FIG. 62, in-line heater is used by controller 166 to maintain the output temperatures to spout 130 at the desired temperature. Depending on hot water usage in the house, after a task is started the central water 189 may not be able to provide sufficient amounts of hot water thereby resulting in the output temperature dropping. For small drops in the output temperature the proportion of hot water and cold water passing through valve 152 may be adjusted. In one embodiment, controller 166 utilizes in-line heater 191 to initially heat the water as well. In one example, wherein the water has been shut-off for an extended period of time, the water in the hot water plumbing returns to ambient temperature and in-line heater 191 boosts the temperature of the water passing by it until hot water reaches valve 152 from the central water heater 189. In one embodiment, controller 166 monitors the output temperature of the water leaving valve 152 with a sensor and adjusts in-line heater 191 accordingly. In one embodiment, controller monitors the temperature of the water in the hot water plumbing prior to in-line heater 191 with a sensor and adjust in-line heater accordingly. In one embodiment, controller monitors the temperature of the water in the hot water plumbing after in-line heater 191 and prior to valve 152 with a sensor and adjust in-line heater accordingly. In one embodiment, in-line heater 191 may raise the temperature of the water from about 20 to about 30 degrees at a flow rate of about one gallon per minute. In one example, the water temperature is raised about 30° F. when the water is flowing at about 0.5 gallons per minute and in-line heater 191 is using 110 VAC. In one example, the water temperature is raised about 30° F. when the water is flowing at about 2 to 3 gallons per minute and in-line heater 191 is using 230 VAC. The use of valve 152 and in-line heater 191 may be used in other applications as well, including a side spray and a shower. In one embodiment, controller 120 is able to guarantee a given temperature by setting a maximum flow rate based on the characteristics of in-line heater 191. Controller 120 may control or limit the flow rate to achieve the appropriate temperature rise. For 110 VAC, a temperature rise of 30

F may be achieved for a flow rate of about 1.0 gpm. For higher temperature rises, the flow rate may be further reduced.

Referring to FIG. 62 an exemplary method 1320 is shown. The output temperature reaches the desired temperature, as represented by block 1322. Sensor 178 measures the temperature of the output water, as represented by block 1324. If the temperature of the output water is about equal to the desired temperature, as selected through an user input, then controller 166 prepares to take the next measurement of the output temperature, as represented by blocks 1326 and 1328. In one example, the preparation for the next measurement includes waiting until a preset timer has expired. If the temperature of the output water is less than the desired temperature then controller 166 activates in-line heater 191 and prepares for the next measurement, as represented by blocks 1330 and 1328. The in-line heater is used to maintain the output temperature at a desired temperature even if the central water heater 189 is unable to do so.

Figure 13G:
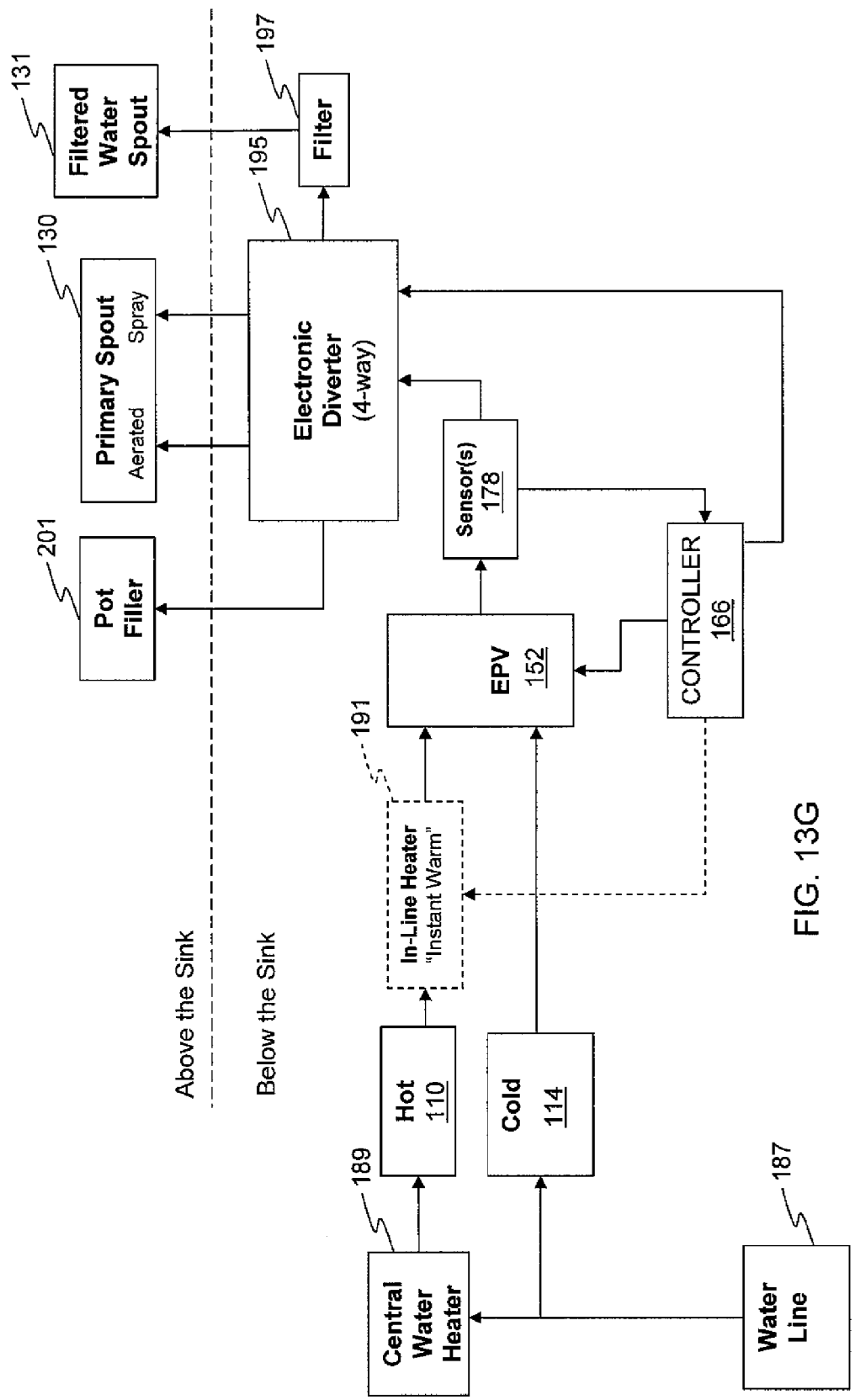
FIG. 13G is a diagrammatic view of still another exemplary lower portion including an in-line heater system and a filter system to provide filtered water to a filtered water spout.

Referring to FIG. 13G, electronic diverter valve 193 is replaced by electronic diverter 195 which is a four way diverter valve. In one embodiment, electronic diverter 195 is a two-way disk valve. In one embodiment, electronic diverter 195 is a solenoid valve.

Electronic diverter 195 is coupled to spout 130 through two waterways, one in fluid communication with a spray outlet and one in fluid communication with an aerated, stream outlet. In the illustrated embodiment, electronic diverter 195 is positioned below the sink deck. In one embodiment, electronic diverter 195 is positioned above the sink deck, such as inside spout 130 or in a pull-out portion of spout 130. Further, electronic diverter 195 has a third outlet coupled to a pot filler 201. Exemplary pot fillers are described herein. Electronic diverter 195 also has a fourth outlet in fluid communication with a filter 197. Filter 197 is in fluid communication with a second spout 131 spaced apart from spout 130. in one embodiment, filter 197 is coupled to spout 130 and provides filtered water to spout 130 in response to a filtered water task input being selected.

Figure 13H:
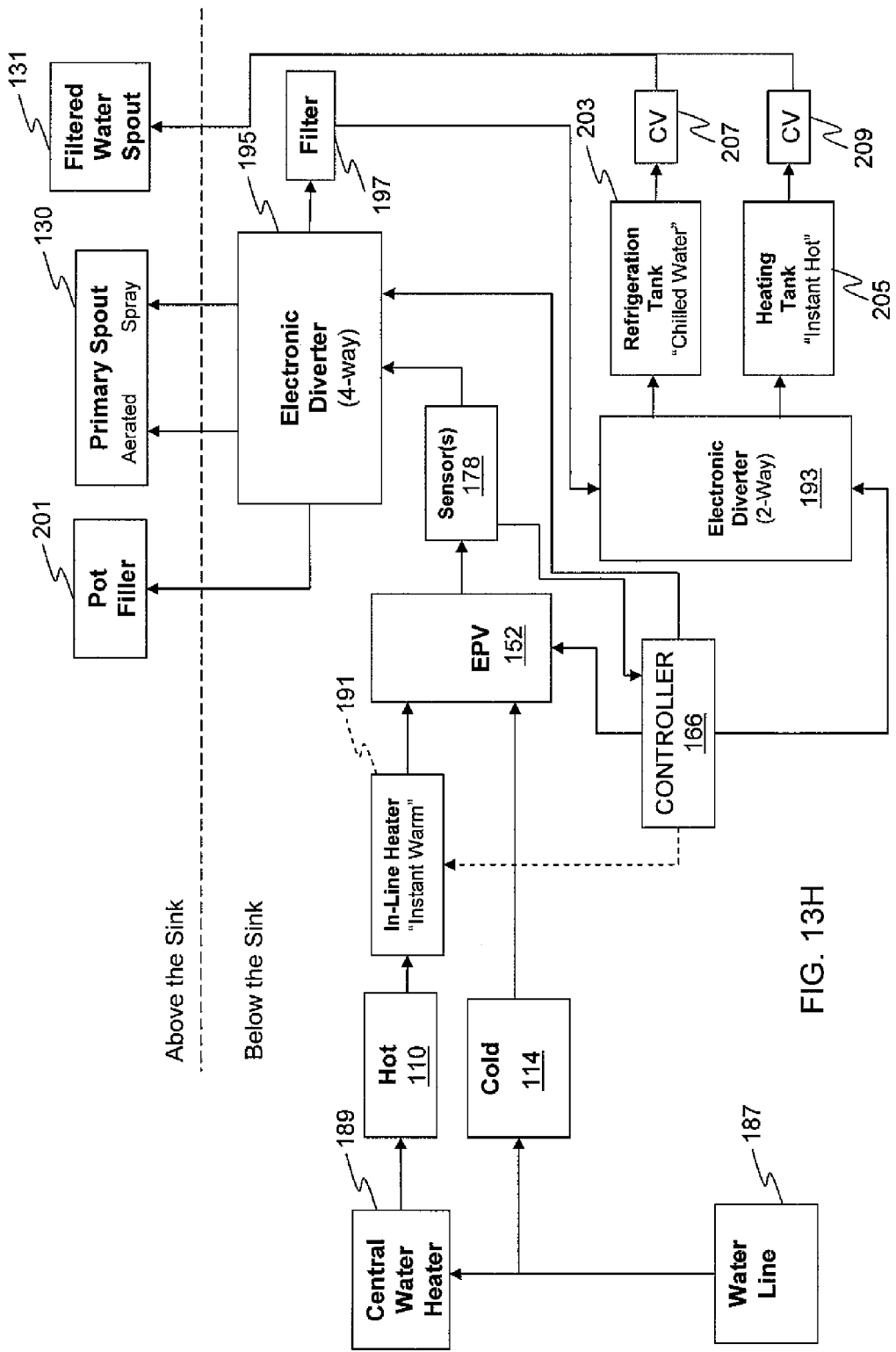
FIG. 13H is a diagrammatic view of the lower portion of FIG. 13G further including a chilled water system and an instant hot water system.

Referring to FIG. 13H, between filter 197 and spout 131 a second electronic diverter 193 is inserted. A first output from electronic diverter 193 is coupled to an instant cold unit 203. A second output from electronic diverter 193 is coupled to an instant hot unit 205. Both instant unit 203 and instant hot unit 205 include a respective check valve 207 and 209 between the respective unit 203 and 205 and spout 131 to prevent backflow into the other unit.

Figure 58:
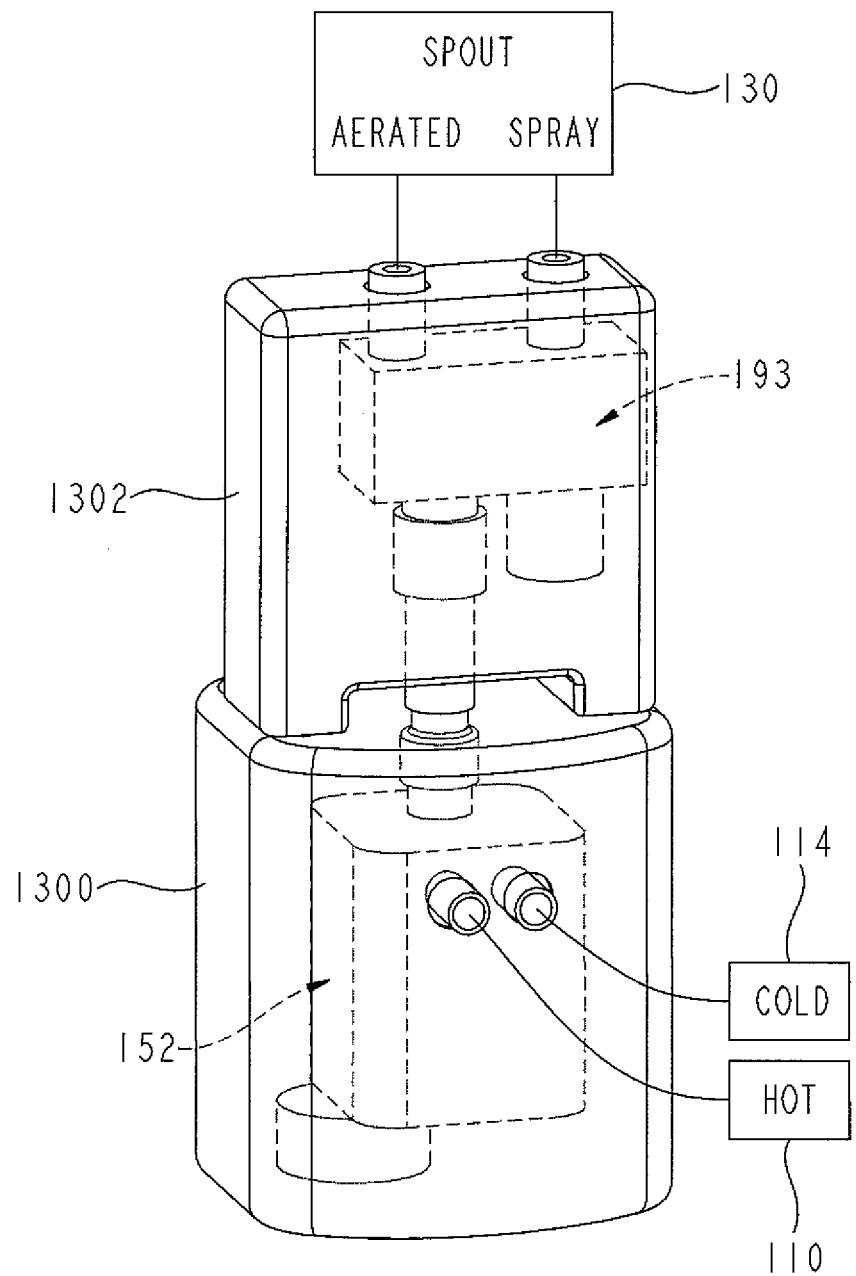
FIG. 58 is an exemplary modular lower portion.
Figure 59:
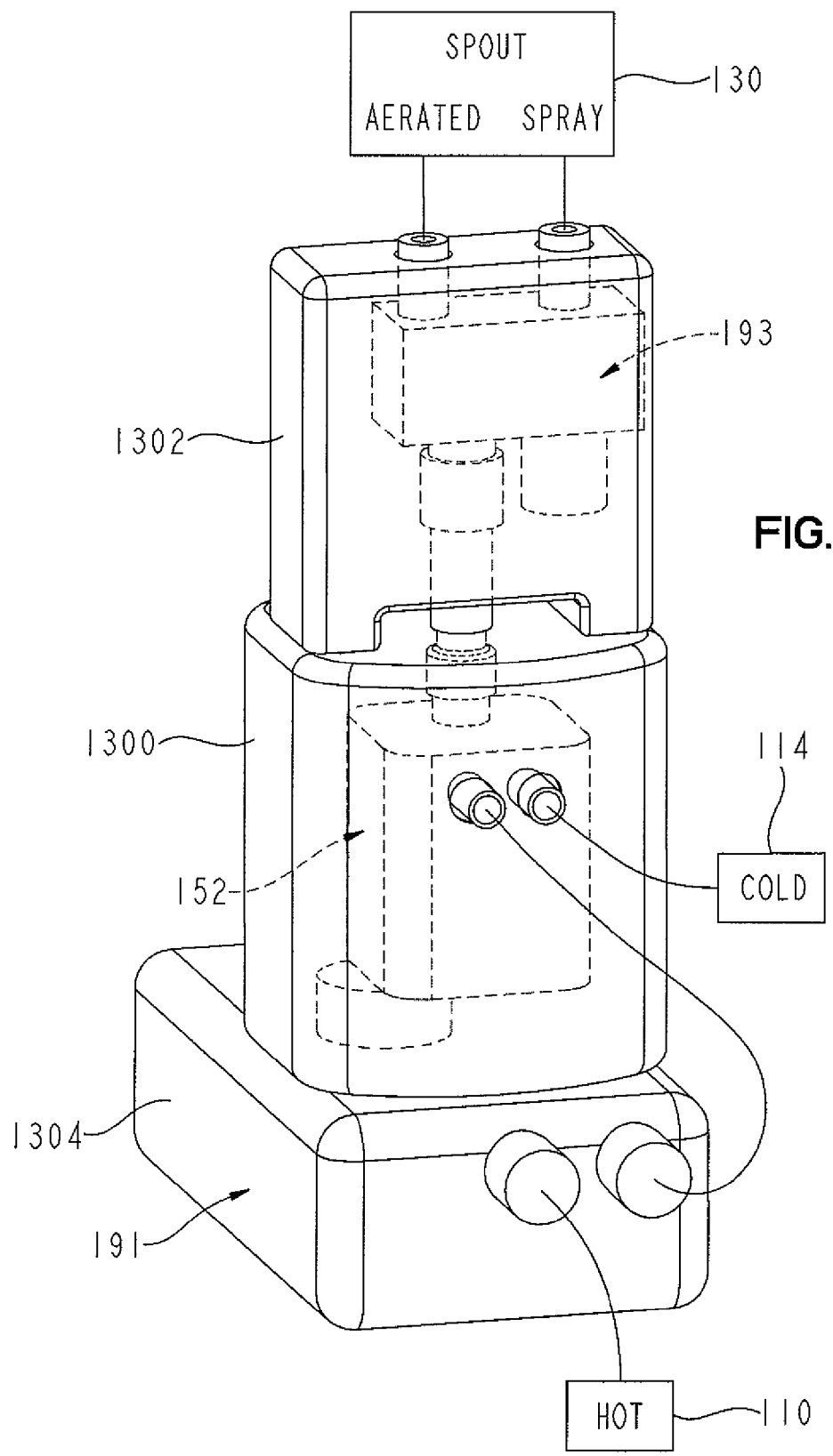
FIG. 59 is another exemplary modular lower portion.

Referring to FIG. 58, an exemplary embodiment of the arrangement in FIG. 13F is shown. Valve 152 is contained in a housing 1300 which has openings for the two inlets to hot supply 110 and cold supply 114 to extend and an opening for the outlet to extend. In one embodiment, the two inlets and/or outlet include a check valve to prevent the backflow of water. Electronic diverter 193 is enclosed in a housing 1302 which has openings for the two outlets to spout 130 to extend and an opening for the inlet from the outlet of valve 152 to extend. In one embodiment, the two outlets and/or inlet include a check valve to prevent the backflow of water. In one embodiment the outlet of housing 1300 and the inlet of housing 1302 are connected through a quick connect fitting. As such, no tools are required to connect electronic diverter valve 193 to valve 152. Referring to FIG. 59, the exemplary embodiment of FIG. 58 is shown along with an in-line heater unit 191 housed in housing 1304.

Figure 60:
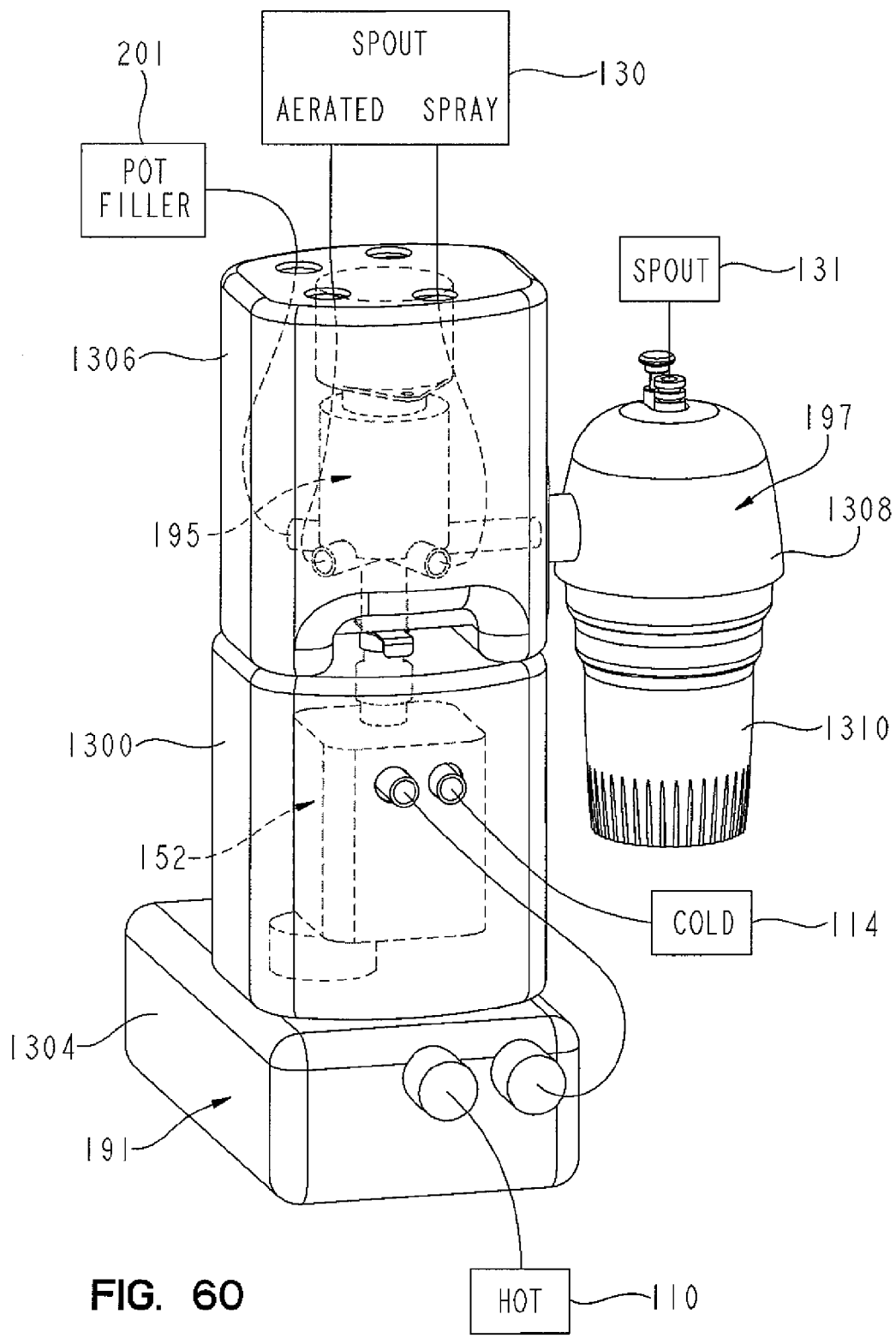
FIG. 60 is still another exemplary lower portion.

Referring to FIG. 60, an exemplary embodiment of the arrangement in FIG. 13G is shown. Electronic diverter 193 has been replaced electronic diverter 195. Electronic diverter 195 is a four way diverter valve. As shown, in FIG. 60, electronic diverter 195 is coupled to a filter unit 197, two lines to spout 130 (one to an aerated stream outlet and one to a spray outlet), and one line to a pot filler 201. Electronic diverter 195 is positioned within a housing 1306. Filter unit 197 includes a base portion and a removable filter 1310. An outlet of filter unit 197 is in fluid communication with a filtered water spout 131.

Figure 61:
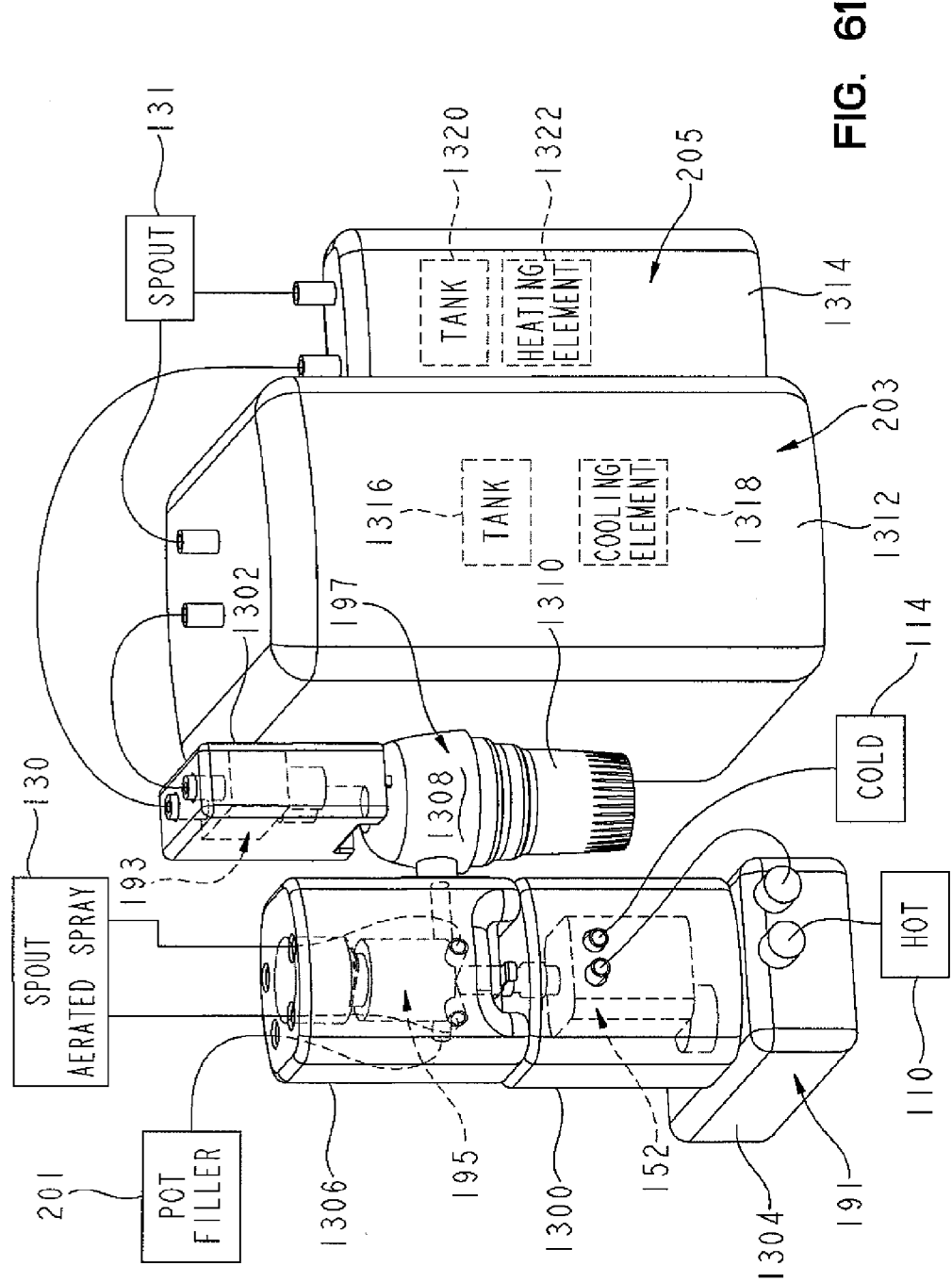
FIG. 61 is yet another exemplary lower portion.

Referring to FIG. 61, an exemplary embodiment of the arrangement in FIG. 13H is shown. As shown in FIG. 61, a two-way diverter 193 housed in housing 1302 is coupled to an outlet of filter unit 197. A first outlet of electronic diverter valve 193 is coupled to an instant cold unit 203 housed in housing 1312. Instant cold unit 203 includes a tank 1316 to hold water and a cooling element 1318 to cool the water in tank 1316. A second outlet of electronic diverter valve 193 is coupled to an instant hot unit 205 housed in housing 1314. Instant hot unit 205 includes a tank 1320 to hold water and a heating element 1322 to heat the water in tank 1320.

Figure 13I:
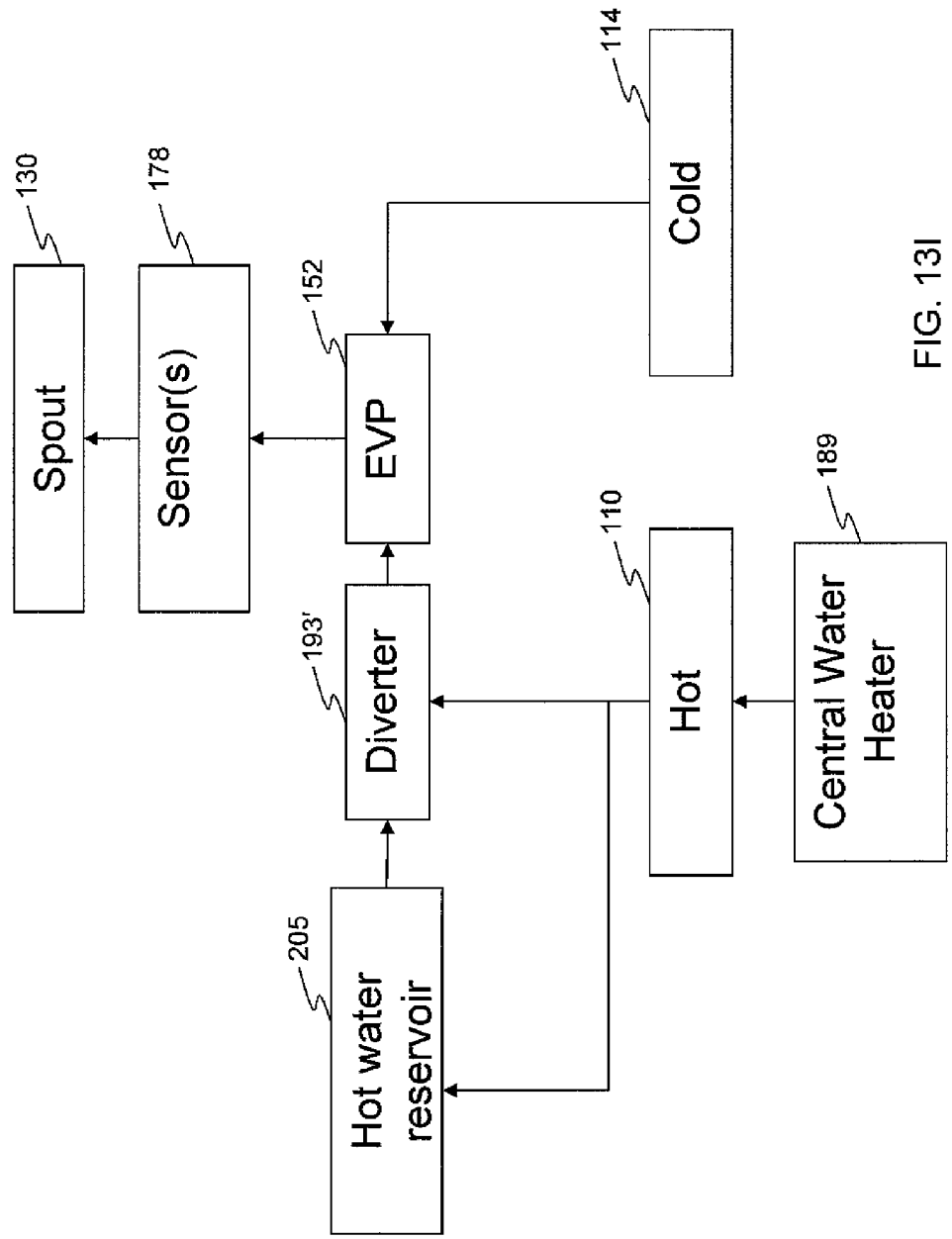
FIG. 13I is a diagrammatic view of yet another exemplary lower portion.

In one embodiment, in-line heater 191 is replaced with an instant hot water unit 205, as shown in FIG. 13I. Further, an electronic diverter valve 193' is positioned between hot water unit 205 and valve 152. Electronic diverter valve 193' includes two inputs, one connected to hot water unit 205 and one to hot water supply 110, and an output connected to valve 152. Hot water unit 205 contains sufficient hot water to provide a desired temperature until hot water is received from central water heater 189. In one embodiment, a central water heater 189 is not used and hot water reservoir provides all of the hot water needed for spout 130.

Figure 11:
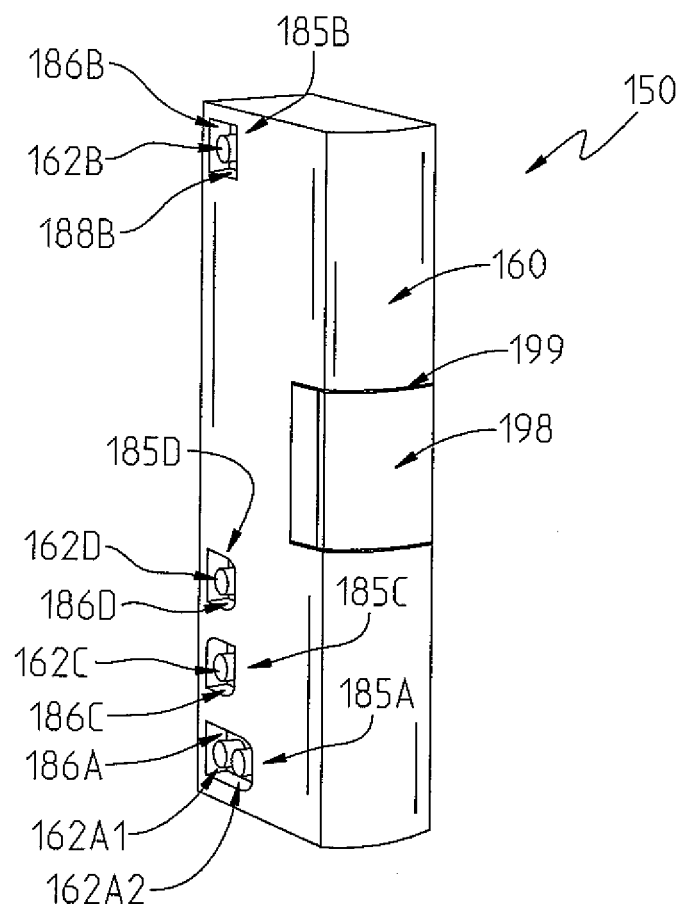
FIG. 11 is a perspective view of an exemplary lower portion of FIG. 1 having a plurality of ports.
Figure 12:
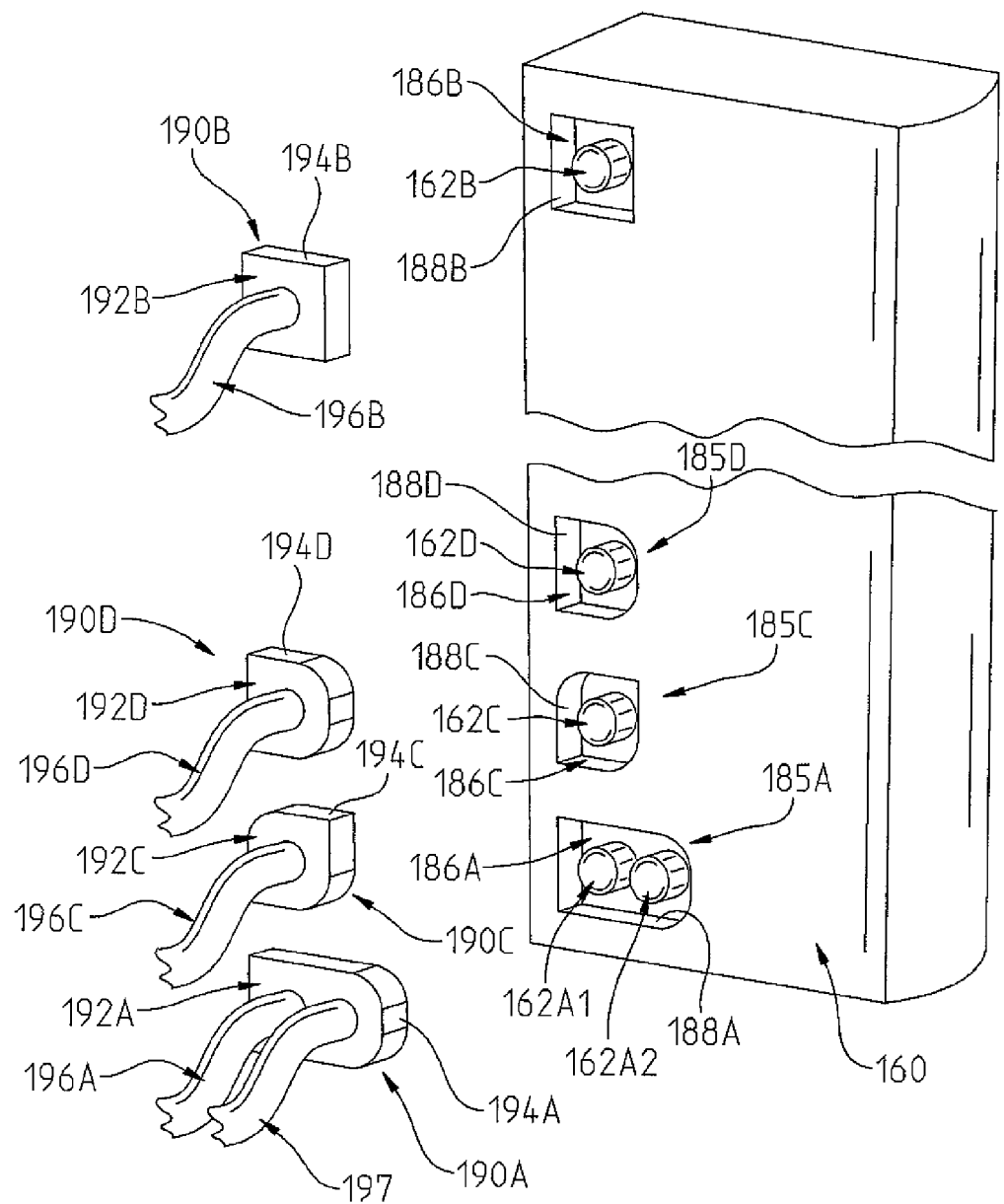
FIG. 12 is a partial view of the lower portion of FIG. 11 along with four exemplary connectors each configured to couple with one of the ports of the lower portion of FIG. 11.

Referring to FIGS. 11 and 12, an embodiment of lower portion 150 is shown. As discussed in connection with FIGS. 13A-D, lower portion 150 includes a housing 160 which houses a valve 152 and a controller 166. Lower portion 150 includes internal waterways connecting the valve with inlet ports 162A1, 162A2 and a plurality of water outlets 162B and 162D. The embodiment shown in FIGS. 11 and 12 does not illustrate ports 164E and 164F.

Referring to FIG. 12, inlet ports 162A1 and 162A2 are located in a connector 185A having a recess 186A having a first profile 188A. A water inlet connector 190A includes a body portion 192A having a profile 194A which matches profile 188A of water inlet. Water inlet connector 190A further includes a first fluid conduit 196A which is coupled to a hot water supply, such as through a screw-on coupling, and a second fluid conduit 196B which is coupled to a cold water supply, such as through a screw-on coupling. First fluid conduit 196A and second fluid conduit 196B are coupled to internal waterways 154 and 156 by advancing body portion 192A into recess 186A of connector 185A.

Referring back to FIG. 11, a water outlet connector 185B is shown. Water outlet connector 185B includes port 162B which is in fluid communication with internal passageway 158 from valve 152 and is to be coupled to a device, such as spout 130, which provides water to a user. Water outlet connector 185B includes a recess 186B having a profile 188B. A water outlet connector 190B is shown in FIG. 12 and includes a body portion 192B having a profile 194B which matches profile 188B of water outlet connector 185B. Water outlet connector 190B further includes a fluid conduit 196B which is to be coupled to a device for providing water, such as spout 130.

Also shown in FIG. 12 is an instant hot water connector 185C. Instant hot water connector 185C includes a port 162C which is in fluid communication with an internal passageway (not shown) from the valve 152 and is to be coupled to a device providing instant hot water to a user. One example of such a device is one of the spouts, such as spout 130, illustrated herein or a stand-alone dispenser. Instant hot water connector 185C includes a recess 186C having a profile 188C. An instant hot water connector 190C includes a body portion 192C having a profile 194C which matches profile 188C of instant hot water connector 185C. Instant hot water connector 190C further includes a fluid conduit 196B which is to be coupled to an outlet for providing hot water.

Further shown in FIG. 12 is a filtered cold water connector 185D. Filtered cold water connector 185D includes a port 162D which is in fluid communication with internal passageway 184 and is to be coupled to a device providing filtered cold water to a user. One example of such a device is one of the spouts illustrated herein, such as spout 130. In one embodiment, lower portion 150 includes a filter such that the water exiting through filtered cold water connector 185D is already filtered. In another embodiment as illustrated in FIG. 13D, lower portion 150 does not include a filter and the water exiting through filtered cold water connector 185D is not filtered.

Filtered cold water connector 185D includes a recess 186D having a profile 188D. A filtered cold water connector 190D includes a body portion 192D having a profile 194D which matches profile 188D of filtered cold water connector 185D. Filtered cold water connector 190D further includes a fluid conduit which is to be coupled to an outlet for providing filtered cold water.

In one embodiment, the fluid conduits of the various outlet connectors, water outlet connector 190B, filtered cold water connector 190D, and instant hot water connector 190C, are feed through a connector, such as connector 300, from above the sink deck 104 and are coupled to the respective outlet connectors 185B, 185D, 185C of lower portion 150. In another embodiment, the fluid conduits of the various outlet connectors, 190B, 190D, 190C are coupled to respective fluid conduits of a connector, such as connector 340. Outlet devices may then be coupled to various outlet connectors 345A and 345B of connector 340. As such, various spouts and/or accessories requiring fluid from one of water outlet connector 190B, filtered cold water connector 190D, and instant hot water connector 190C may simply be connected to connector 340 from above sink deck 104. In one embodiment, an accessory or spout communicates to controller 120, 166 its identity and/or its settings and modes of operation when coupled to connectors 345A and 345B.

The profiles of the respective inlet and outlet connectors 185A-D of lower portion 150 are chosen such that the various water connectors 190A-D may be coupled to lower portion 150 simply by matching profiles 192A-D of connectors 190A-D to the profiles 188A-D of the respective inlet and outlet connectors 185A-D of lower portion 150. Further, each connector 185A-D and its respective connector 190A-D have a unique matching color to provide an additional visual cue to the installer of which connector 190 should be associated with each connector 185. In one embodiment, the connectors 185A-D and the respective connectors 190A-D are matched only by color. In another embodiment, the connectors 185A-D and the respective connectors 190A-D are matched only by profile shape.

In one embodiment, the ports 162A1-E include the capability to detect when a connector 190 has been connected thereto. The detection may be performed by monitoring a resistive value associated with an electrical connection of the respective port. This connection detection is communicated to controller 166.

Returning to FIG. 11, lower portion 150 includes an access panel 198. Generally proximate to access panel 198 is a status light 199 which is illuminated when power is provided to lower portion 150. In one embodiment, an instructor chip of controller 166 is accessible by removing access panel 198. The instructor chip may be a flash memory card which includes the software required to control valve 152 and interface with the plurality of devices, such as user input device 140, of upper portion 102. As new devices are introduced with additional functionally, the instructor chip needs to be upgraded.

In one embodiment, controller 166 is connected to a wireless network in the home. Exemplary wireless RF networks may include Bluetooth based networks, Z-wave based networks, and Zigbee based networks. Assuming controller 166 has access to remote networks, such as the Internet, through the home wireless network or directly, controller 166 may periodically check for software updates from a remote network device or simply receive updates from a remote network device. In one embodiment, controller 166 accesses a web page through the remote network and checks for updates to the current software being executed by controller 166 and/or downloads additional software, such as for a new device associated with the water delivery system.

In one embodiment, a computer accessible over the wireless network contains one or more recipes that require a metered quantity of fluid. A user may select the recipe either through a menu on user input device 140 or the computer containing the recipe. In one example, controller 166 extracts an amount of fluid being provided by valve 116 from the recipe and operates valve 116 to provide the metered amount of fluid from spout 130 or an accessory, such as a pot filler. In another example, the computer containing the recipe extracts an amount of fluid being provided by valve 116 from the recipe and sends a request for the amount of fluid to controller 116 which operates valve 116 to provide the metered amount of fluid from spout 130 or an accessory, such as a pot filler.

In one embodiment, the new devices are packaged with a replacement instructor chip which includes the prior functionality of the previous instructor chip along with the additional functionality required for the new device. The upgraded instructor chip is installed in the following manner. Access panel 198 is removed. Access panel 198 interacts with or is apart of a switch that turns off power to controller 166 of lower portion 150 when access panel 198 is removed. The previous instructor chip is removed from lower portion 150 and the upgraded instructor chip is installed in lower portion 150. Access panel 198 is again coupled to the remainder of lower portion 150 thereby restoring power to controller 166.

Returning to FIG. 1, in one embodiment, upper portion 102 and lower portion 106 include modular components. As explained above, lower portion 150 provides for easy expansion of various modules, such as cold filtered water and instant hot water, and connection to hot supply 110, cold supply 114, and spout 130. Further, exemplary types of the modular aspects of water delivery system 100 are illustrated in FIGS. 2A-6. It should be noted that these are merely examples and that additional modular aspects including further accessories may be used such as the accessories described herein.

Referring to FIG. 2A, an exemplary and potentially base faucet system 200 is shown. Faucet system 200 includes a spout 202, a control module 204, a water filter 206, and wall mounting 208. Faucet system 200 is packaged as a single system in packaging 210. Referring to FIG. 2B, a spout upgrade 212 is shown. Spout upgrade 212 may be a different style than spout 202 or may include additional functionally such as an LCD display screen, user input device, infrared control, or touch control. It should be noted that is some embodiments an LCD display screen, a touch control, or additional options are included in the base spout 202. Spout upgrade 212 is packaged as a separate item in packaging 214. In one embodiment, spout upgrade replaces the entire spout 202 of the base system 200. In another embodiment, spout upgrade replaces only a portion of spout 202 of the base system 200 such as a detectable head 216 of spout 202.

Figure 3:
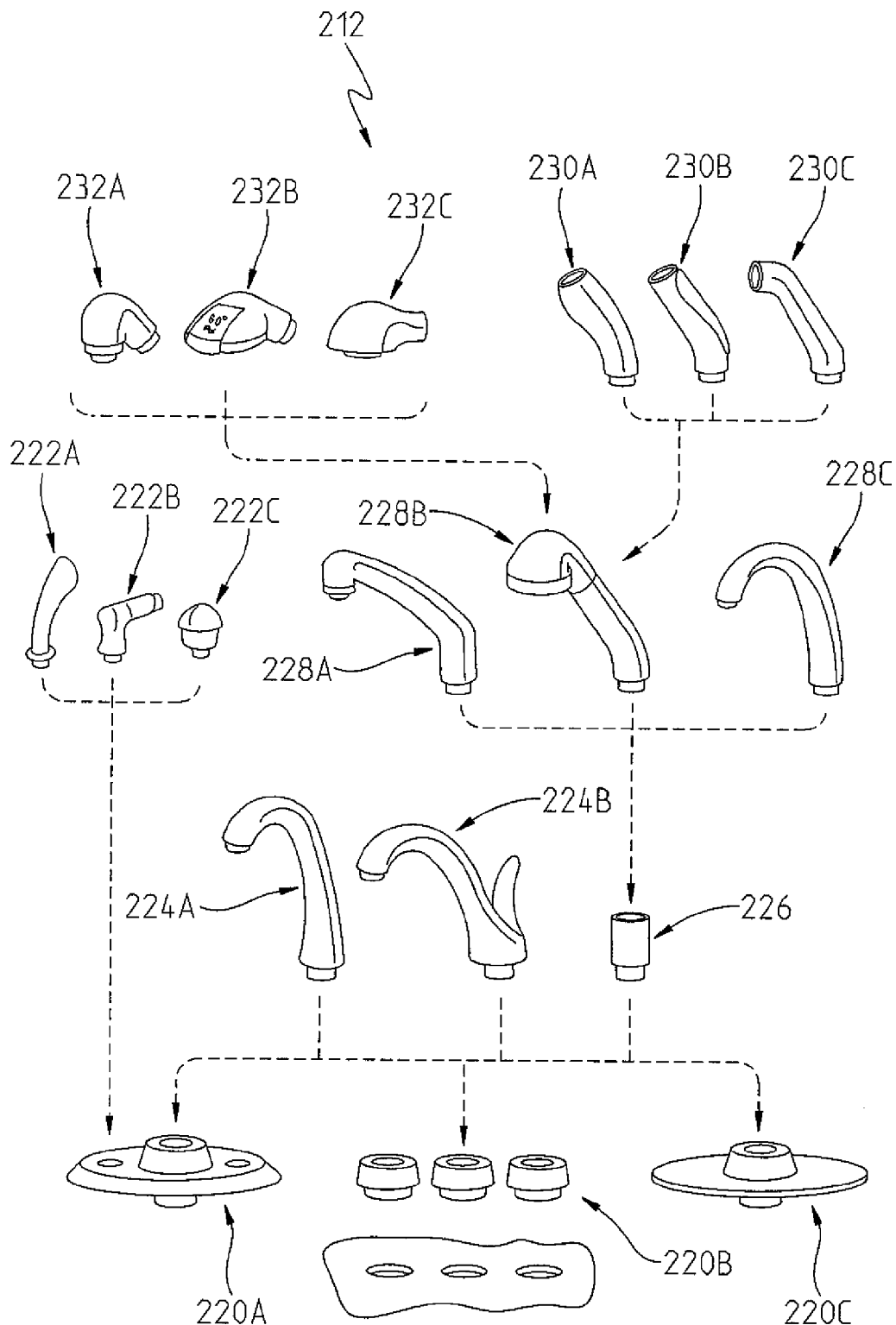
FIG. 3 is a view of a plurality of exemplary options for the upper portion of FIG. 1.

Referring to FIG. 3, various examples of spout upgrades 212 are illustrated. First, three different types of bases 220A-B are illustrated. Various valve handles 222A-C are illustrated for use with one or more bases 220A-C. Handles 222A-C use potentiometers to provide inputs to controller 120 which in turn operates valve 116. Two types of standard spout modules 224A and 224B are shown for use with one or more of bases 220A-C. A connector 226 is shown for use with one or more of bases 220A-C. In one embodiment, connector 226 is connector 340 shown in FIG. 9. Connector 226 is configured for use with the illustrated spouts 228A-C. Spout 228B is illustratively configurable with one or more spout shafts 230A-C and one or more spout heads 232A-C.

Figure 4:
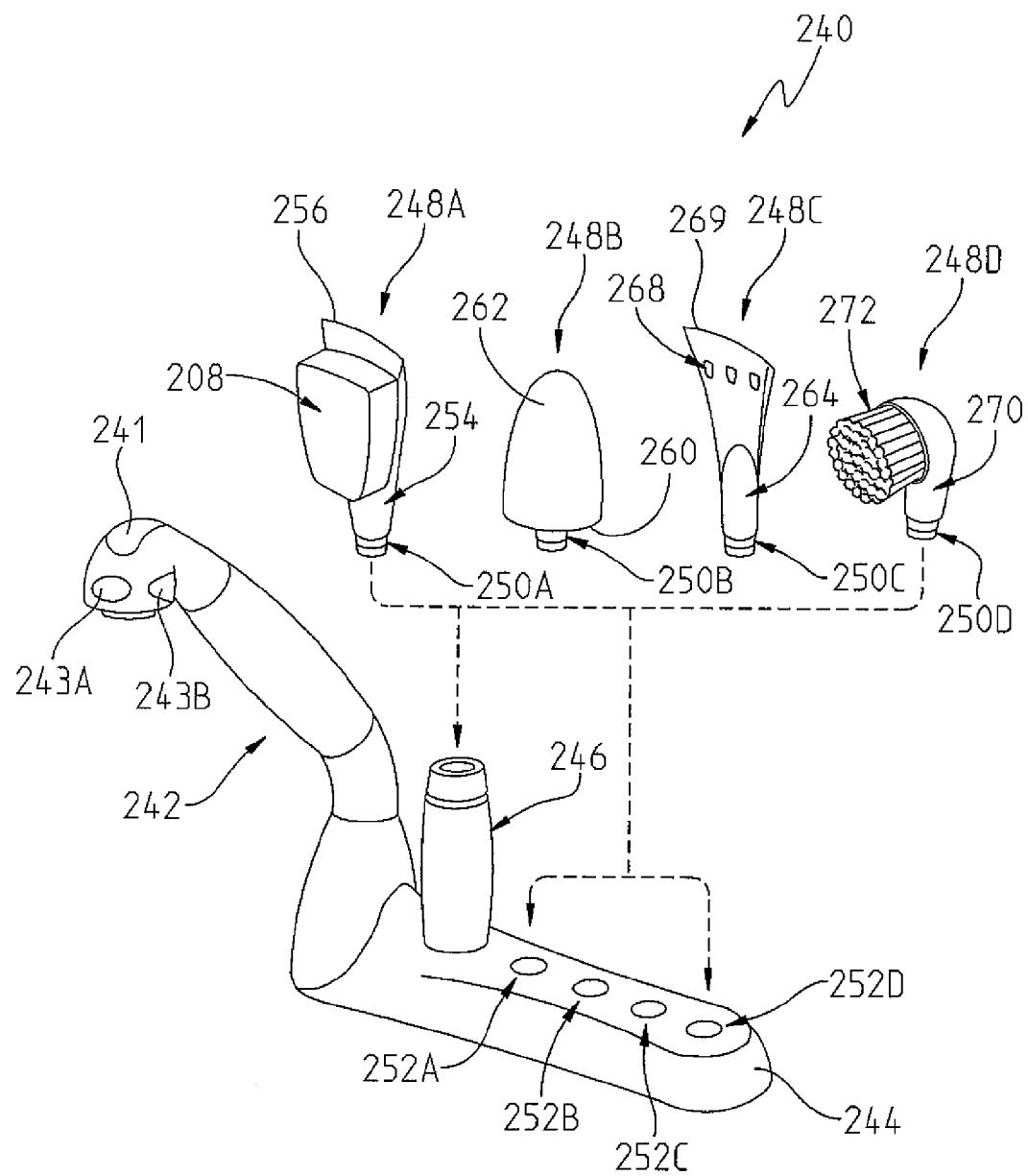
FIG. 4 is a view of an exemplary option for the upper portion of FIG. 1 including a spout and a pull-out tool having a plurality of interchangeable tool heads.

Referring to FIG. 4, another exemplary upgrade 240 is shown. Upgrade 240 includes a spout 242 which functions similar to spout 650 depicted in FIG. 26. Spout 242 includes a tap sensor 241 and a plurality of presents 243A and 243B. In one embodiment, presents 243A and 243B correspond to one of task inputs, user defined inputs, cold only, and hot only.

Upgrade 240 further includes an elongated base 244 supporting a pull-out tool handle 246 which is in fluid communication with lower portion 106, such as through fluid conduit 128. Tool handle 246 may be spaced apart from base 244, similar to traditional spray tools, to permit a user to utilize various tool heads 248A-D on various articles, such as the sink or food containers. Tool heads 248A-D each include a respective coupling 250A-D which may be individually coupled to tool handle 246 or stored in one of tool receptacles 252A-D in base 244.

Each of tool heads 248A-D is designed for a given function. Tool head 248A is a sponge scrubber including a base portion 254. Base portion 254 is coupled to tool handle 246 and includes one or more internal waterways which deliver water to a sponge element 258. Base portion 254 further includes a scraper 256.

Tool head 248B is a rotating glass cleaner including a base portion 260 and a sponge portion 262. Base portion 260 includes a first piece coupled to tool handle 246 and a second piece rotatable relative to the first piece and coupled to sponge portion 262.

Tool head 248C is a scrapper including a base portion 264. Base portion 264 is coupled to tool handle 246 and includes one or more internal waterways which deliver water to water jets 268. Base portion 264 further includes a scraper 269.

Tool head 248D is a rotating brush including a base portion 270. Base portion 270 is coupled to tool handle 246 and includes one or more internal waterways which deliver water to a rotating head portion 272 having a plurality of brush bristles.

Each of tool heads 248A-D requires various characteristics of the fluid provided to it. Tool head 248A requires a lower flow rate of fluid than the other tool heads 248B-D. Tool heads 248B-D each require a higher flow rate of fluid to rotate heads 248B and 248D and to provide sufficient pressure to the water expelled by jets 268. In one embodiment, the flow requirements are provided by controller 120.

Returning to FIG. 2C, a replacement filter 220 is shown separately packaged in packaging 222. Referring to FIG. 2D, an instant hot water system 230 is shown. In one embodiment, instant hot system 230 is a recirculation system. Exemplary recirculation systems are disclosed in U.S. Provisional Patent Application Ser. No. 60/735,569, filed Nov. 11, 2005, titled "INTEGRATED BATHROOM ELECTRONIC SYSTEM", the disclosure of which is expressly incorporated by reference herein. In one embodiment, instant hot system 230 includes a hot water tank under sink deck 104. In one embodiment, instant hot system 230 utilizes point of use heating, such as a heating element.

In one embodiment, an instant cold module is provided. The instant cold module includes a chilling elements. In one embodiment, the chilling element includes a peltier thermoelectric device.

Figure 5:
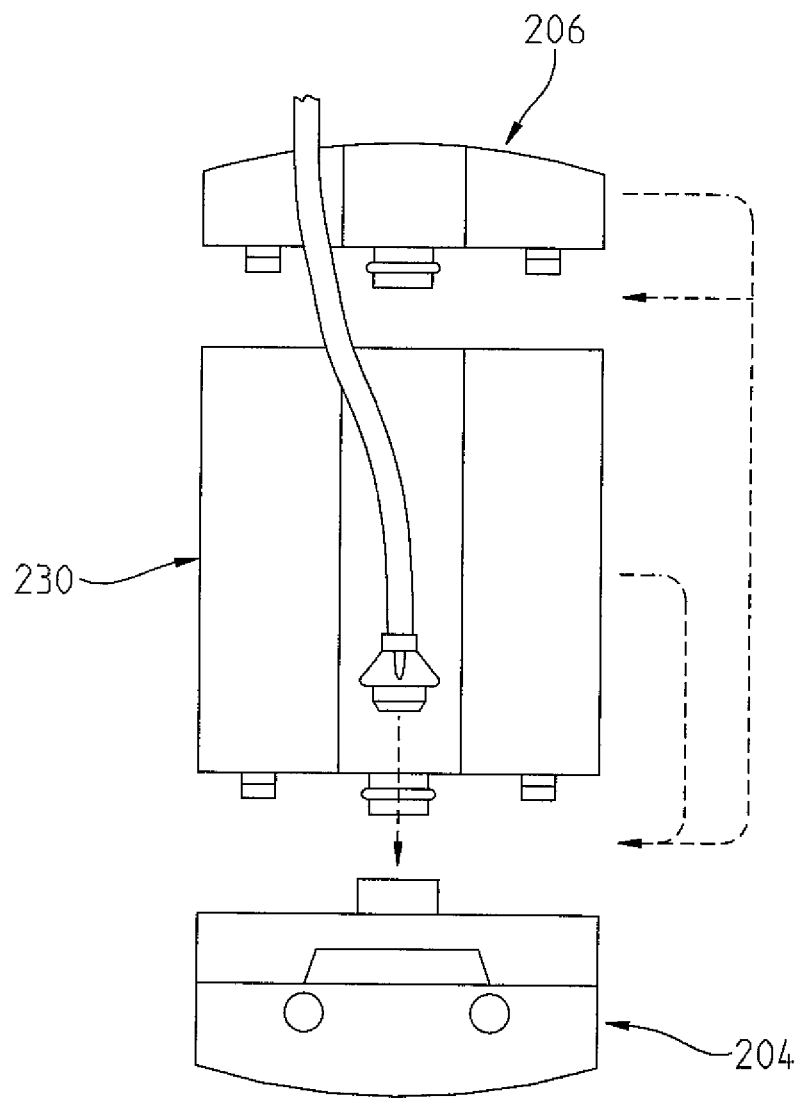
FIG. 5 is a front exploded view of an exemplary lower portion of FIG. 1.

Referring to FIG. 5 the modularity of the lower portion components shown in FIGS. 2A-2D is shown. In order to install instant hot water system 230, water filter 206 is removed and instant hot water system 230 is positioned on control module 204. Finally, the water filter 206 is positioned on instant hot water system 230. In one embodiment, each module 204, 206, and 230 interlocks together and makes the appropriate fluid and electrical connections without the use of tools.

Figures 6A, 6B:
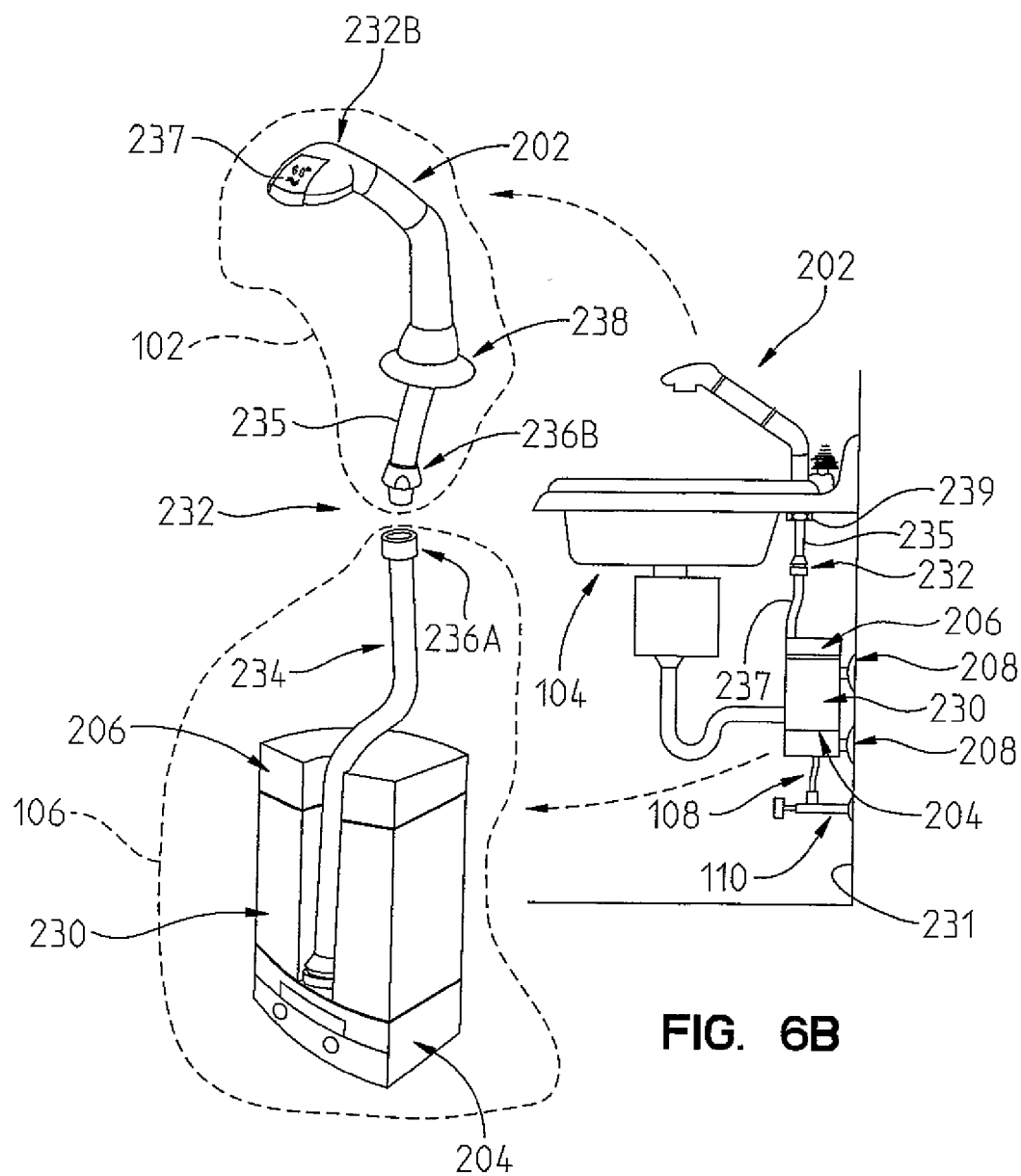
FIG. 6A is a perspective view of an exemplary upper portion of FIG. 1 and the exemplary lower portion of FIG. 5.
FIG. 6B is a side view illustrating the upper portion and the lower portion of FIG. 6A installed.

Referring to FIG. 6A, the components of FIGS. 2A-2D are shown illustratively as upper portion 102 and lower portion 106. Lower portion 106 and upper portion 102 are coupled together through a coupler 232 which includes a first coupler 236A coupled to a conduit 234 of lower portion 106 and a second coupler 236B coupled to a conduit 235 of upper portion 102. First coupler 236A and second coupler 236B cooperate to couple upper portion 102 and lower portion 106 together.

Spout 202 of upper portion 102 includes a spout head 232B having a user input device 237 integrated therewith. In one embodiment, conduit 235 includes a fluid conduit (not shown) to provide water to spout 202 and an electrical cable (not shown) to provide electrical connection with user input device 237. In a similar fashion conduit 234 could also include a fluid conduit (not shown) and an electrical cable (not shown) which couple to the fluid conduit of conduit 235 and valve 116 and electrical cable of conduit 235 and controller 120.

Referring to FIG. 6B, lower portion 106 is mounted to a wall 231 with mounting 208. Lower portion 106 is also coupled to the water supply (hot 110 is illustrated). Upper portion is positioned above sink deck 104 with conduit 235 extending through an opening 105 (see FIG. 8) in sink deck 104. First coupler 236A and 236B are coupled together. Spout 202 is secured to sink deck 104 with a coupler 239 which may be threaded onto a lower portion 238 of spout 202.

Figure 7:
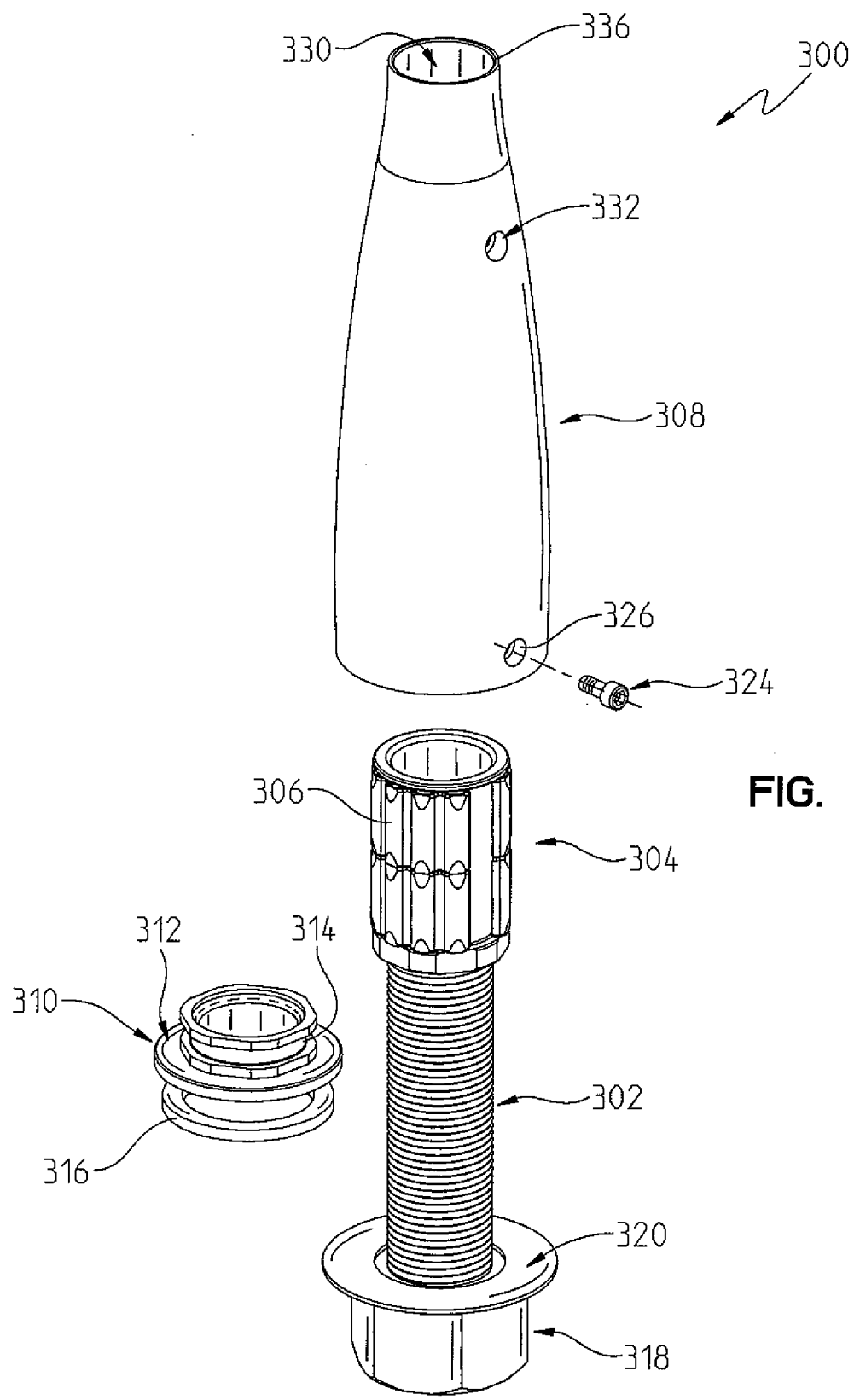
FIG. 7 is an exploded assembly view of an exemplary connector which is coupled to the sink deck and provides for the coupling of various upper portion components and lower portion components.

Referring to FIG. 7, in one embodiment, a connector 300 is provided which is to be coupled to sink deck 104 and lower portion 106 and upper portion 102 are to be coupled thereto. Connector 300 includes a base member 302 which is received in an opening 105 in sink deck 104. An external surface of base member 302 is threaded. A spacer 304 is threaded onto base member 302. Spacer 304 includes an flexible member 306 which provides a friction fit with an internal surface of a body member 308. Body member 308 as explained herein provides a base portion for upper portion 102 onto which may be coupled various components such as a spout 130. In one embodiment spout 130 is directly connected to spacer 304 instead of body member 308.

Connector 300 further includes a manifold nut 310 which includes a lower flange 312 and a circumferential recess 314. Connector 300 further includes a gasket 316 which is positioned adjacent flange portion 312 of manifold nut 310 and a lower nut 318 and associated washer 320.

Figure 8:
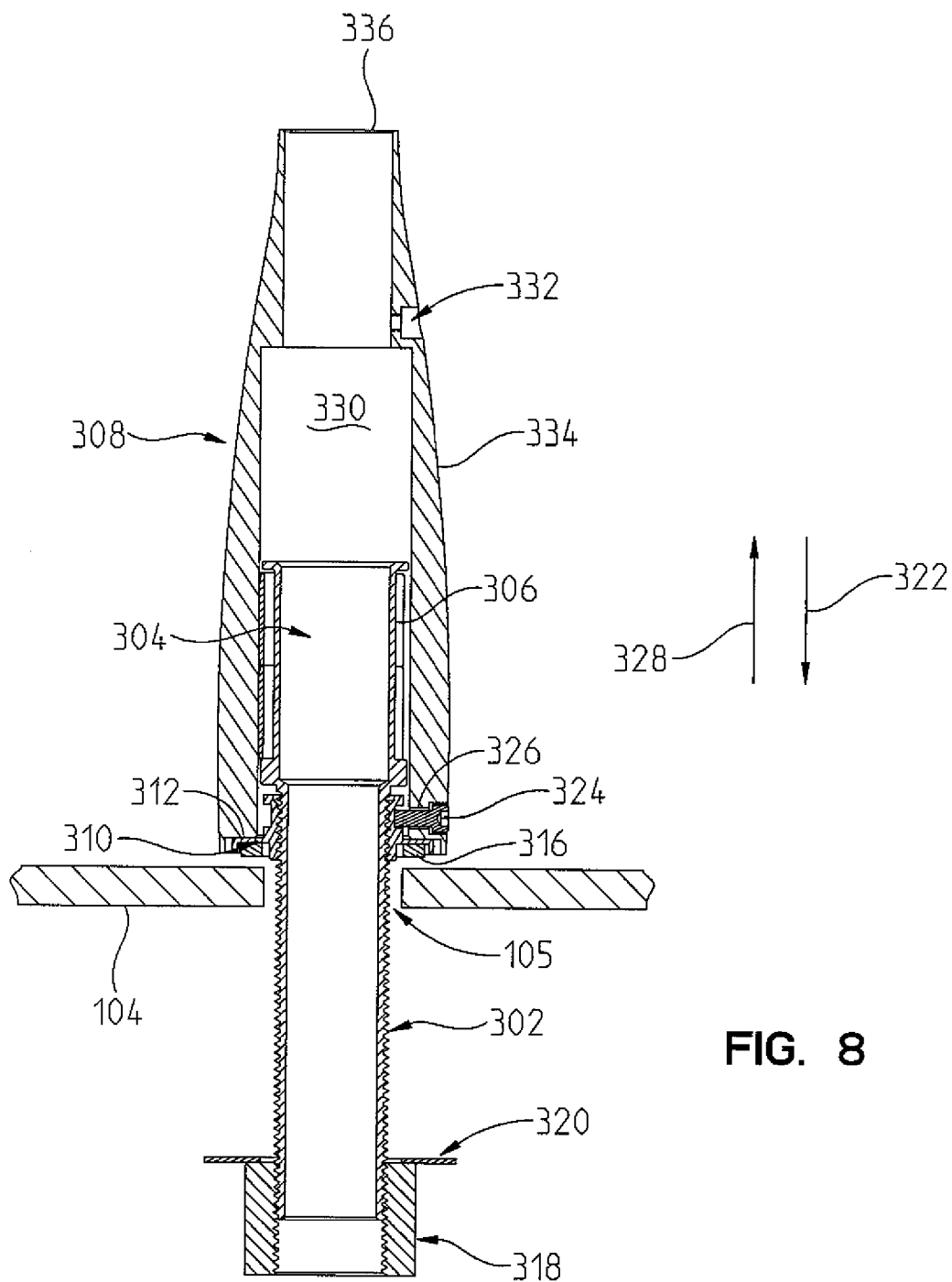
FIG. 8 is a sectional view of the connector of FIG. 7 being coupled to the sink deck.

Connector 300 is assembled to sink deck 104 in the following manner. Manifold nut 310 and spacer 304 are threaded onto base 302 and positioned as shown in FIG. 8. Gasket 316 is positioned adjacent lower flange 312 of manifold nut 310. This assembly is inserted into opening 105 in sink deck 104. Lower nut 318 and washer 320 are threaded onto base member 302 from below sink deck 104 and hand tightened from below the sink deck 104. Manifold nut 310 is then tightened with a wrench to fully secure the assembly to sink deck 104. Body member 308 is placed over the top of spacer 304 in direction 322 and a coupler 324 is received into recess 314 of manifold nut 310 through an opening 326 in body member 308. In this manner body member 308 is prevented from being raised in direction 328 relative to sink deck 104.

Referring to FIG. 8, body member 308 includes an internal passageway 330. Internal passageway 330 provides a conduit for one or more water lines (not shown) and one or more electrical lines (not shown) to pass from lower portion 106 to components of upper portion 102, such as spout 130 or accessory 132A. Further, a second internal passageway 332 is provided in body member 308. Internal passageway 332 intersects with a side wall 334 of body member 308 while internal passageway 330 intersects with a top surface 336 of body member 308. In one embodiment, internal passageway 332 provides a second connection point to body member 308 for a water connection and/or an electrical connection, such as accessory 132B.

Figure 14:
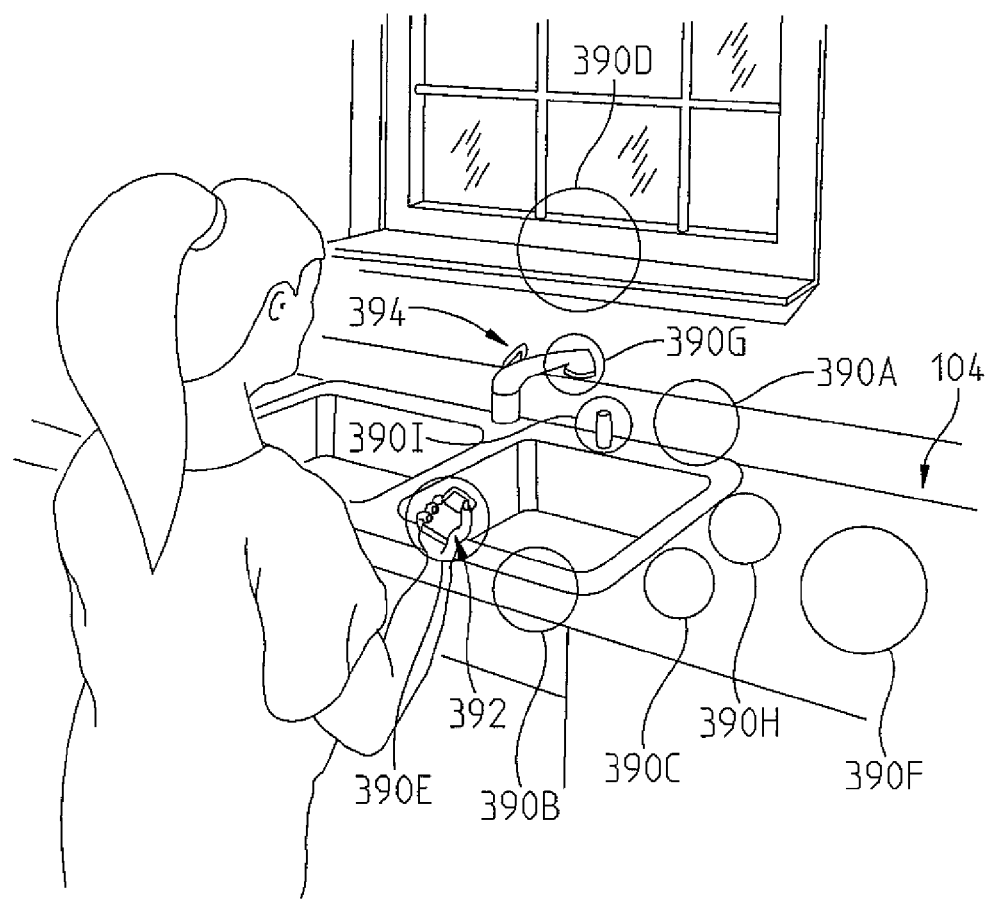
FIG. 14 is a perspective view of a sink region illustrating a plurality of locations wherein a user input device may be provided.

In one embodiment, a second sink mount is provided, such as location 3901 in FIG. 14. Referring to FIG. 65, a pedestal is passed through a second opening in the sink deck. The pedestal supporting an electronic user interface.

Figure 9:
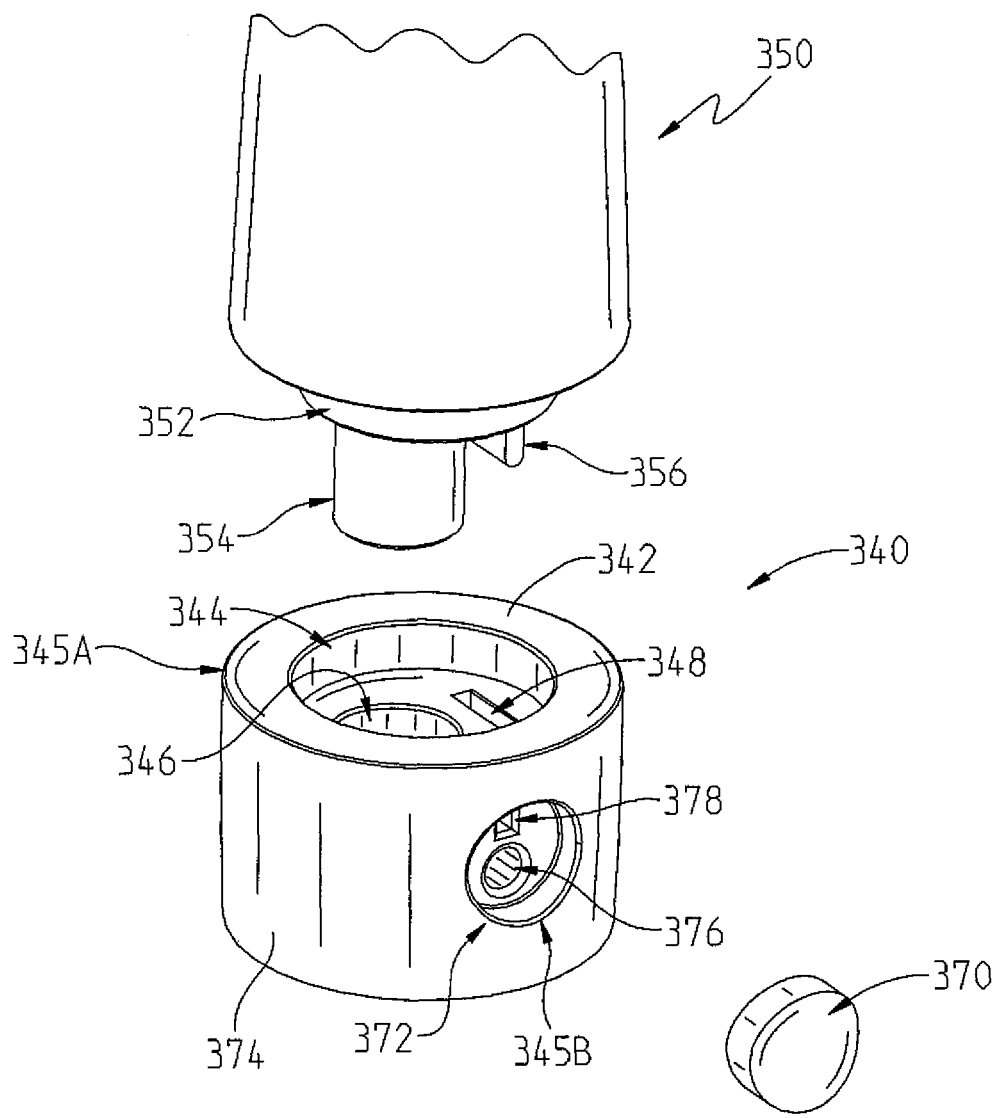
FIG. 9 is a perspective view of a second exemplary connector which is to be coupled to the sink deck and a spout spaced apart from the connector, the connector having a plurality of ports to connect fluid connectors and electrical connectors.
Figure 10:
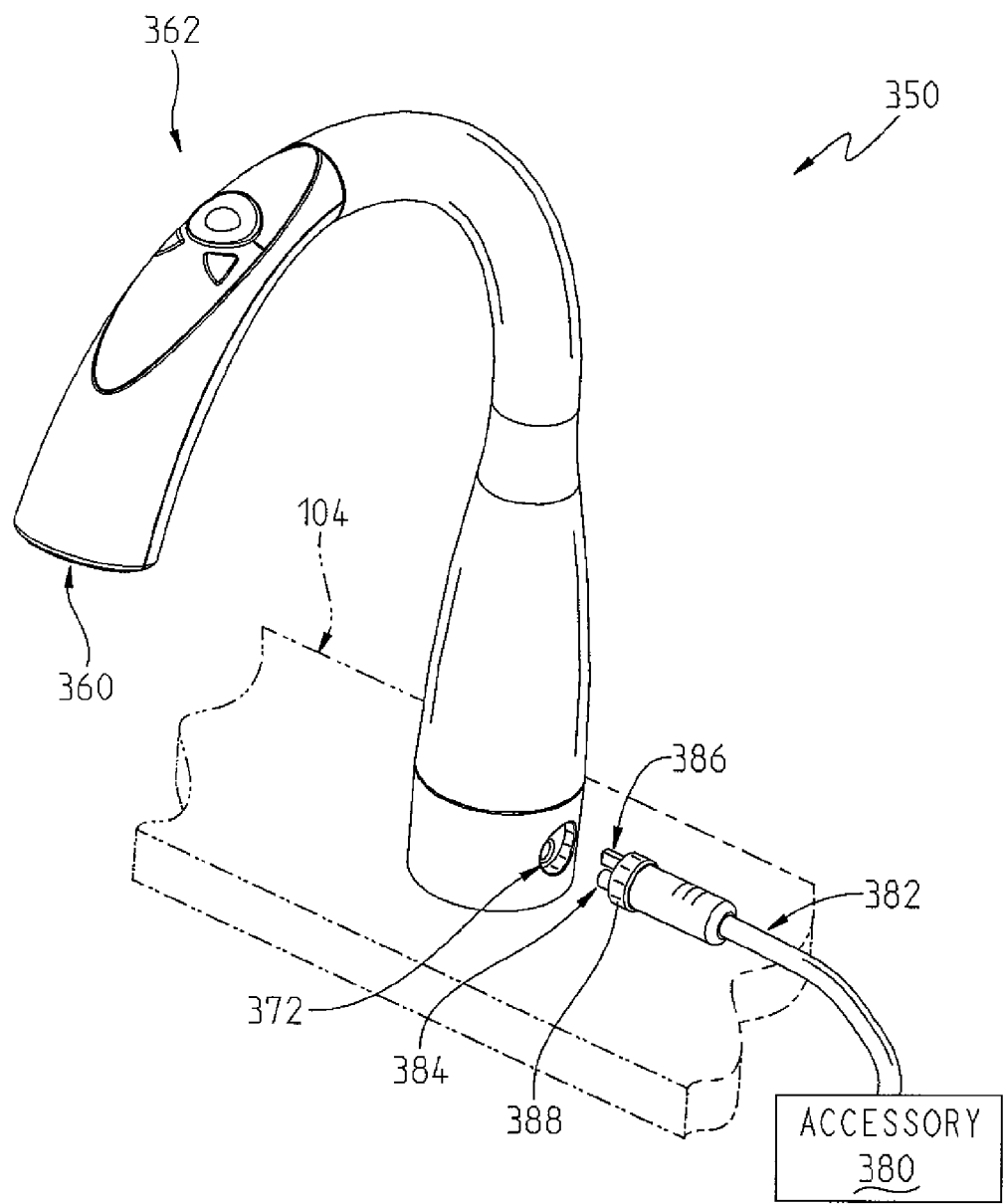
FIG. 10 is a perspective view of the connector of FIG. 9 coupled to a sink deck and having the spout of FIG. 9 coupled to a first port of the connector and an accessory spaced apart from a second port of the connector.

Referring to FIG. 9, a second connector 340 is shown. Connector 340 is assembled to deck 104 as shown in FIG. 10. In one embodiment, connector 340 is coupled to deck 104 in a similar manner as connector 300. Connector 340 includes an upper surface 342 having a recess 344 formed therein. Connector 340 also includes a first connector 345A for connecting to a spout or other device. Connector 345A includes in recess 344 a first water connection port 346 and a first electrical connection port 348. Water connection port 346 is in fluid communication with valve 116 through a fluid conduit, such as fluid conduit 122. Electrical connection port 348 is electrically coupled to controller 120 and may include contacts for multiple isolated electrical lines, such as power and ground lines, data lines, sensor lines.

A lower portion of a spout 350 is shown in FIG. 9. Spout 350 includes a reduced diameter portion 352 which is received by recess 344 of connector 340. Spout 350 further includes a first water connection port 354 and a first electrical connection port 356. First water connection port 354 of spout 350 is received by and coupled to first water connection port 346 of connector 340. Fluid is then communicated through an internal waterway of spout 350 and is discharged through an outlet 360 (see FIG. 10). First electrical connection port 356 of spout 350 is received by and coupled to first electrical connection port 348 of connector 340.

Electrical connections are made between a user input device 362 (see FIG. 10) and controller 120 through the connection of first electrical connection port 348 of connector 340 and first electrical connection port 356 of spout 350. Further, one or more sensors may be connected to controller 120 through the connection of first electrical connection 348 of connector 340 and first electrical connection 356 of spout 350.

Connector 340 further includes a removable cover 370 which is received in a recess 372 in a circumferential surface 374. Recess 372 covers a second connector 345B for connecting to a spout or other device. Second connector 345B includes a water connection port 376 and an electrical connection port 378. Water connection port 376 is in fluid communication with valve 116 through a fluid conduit, such as fluid conduit 128. Electrical connection port 378 is electrically coupled to controller 120 and may include contacts for multiple isolated electrical lines, such as power and ground lines, data lines, sensor lines.

Referring to FIG. 10, cover 370 may be removed to permit an accessory 380, such as a pot filler, to be coupled to connector 340. Accessory 380 includes a flexible conduit 382 which includes a fluid conduit (not shown) and an electrical cable (not shown). The fluid conduit of flexible conduit 382 is in fluid communication with a fluid connection port 384 on an end of flexible conduit 382 and with accessory 380. The electrical cable of accessory 380 is electrically coupled to an electrical connection port 386 on an end of flexible conduit 382 and with accessory 380.

To couple accessory 380 to connector 340, cover 370 is removed, fluid connection port 384 of flexible conduit 382 is received in fluid connection port 376 of recess 372, and electrical connection port 386 of flexible conduit 382 is received in electrical connection port 378 of recess 372. Further, flexible conduit 382 includes an enlarged diameter portion 388 which is received by recess 372 of connector 340.

In one embodiment, a plurality of spouts and a plurality of accessories are available for use with lower portion 106 through connection with connector 340. As such, each of the plurality of spouts and the plurality of accessories includes a fluid connection port and an electrical connection port sized and configured to couple to and interact with one of the fluid connection ports 346, 376 and one of the electrical connection ports 348, 378, respectively, of connector 340. By connecting with connector 340, each of the plurality spouts and the plurality of accessories may be provided with fluid from valve 116. Further, the user inputs (if available) and sensors (if available) are electrically coupled with controller 120 and/or receive electrical power from lower portion 106. It should be noted that in one embodiment, the user inputs (if available) and sensors (if available) are wirelessly coupled to controller 120.

As discussed herein, controller 120 may be coupled to various sensors and/or user inputs. Further, based on these inputs controller 120 may control the operation of valve 116 and potentially features of various coupled devices, such as spouts and/or accessories. The following provides a description of various user input devices and sensors associated with a given spout or accessory. However, it should be understood that the various user input devices and sensors may be used with a multitude of spouts and accessories and as such should not be limited to the illustrated embodiment.

Referring to FIG. 14, a user input device may provided in a plurality of locations. Nine illustrated locations are shown: mounted behind the sink 390A; mounted in front of the sink 390B; mounted on a side of the sink 390C, mounted above the sink 390D, a handheld device 392 (location 390E), such as a personal data assistant; at a remote location 390F; integrated into a spout 394 (location 390G); integrated into the counter around the sink 390H; and mounted to a pedestal coupled to the sink deck through a hole in the sink deck 3901. In one embodiment, user input device communicates wirelessly with controller 120, such as remote location or handheld device 392. In another embodiment, user input device communicates with controller 120 through a wired connection, such as integrated into spout 394. Other locations may communicate with controller 120 through either a wired connection or a wireless connection. In one embodiment, any of the wireless connections disclosed herein may be an RF wireless connection.

Figure 15:
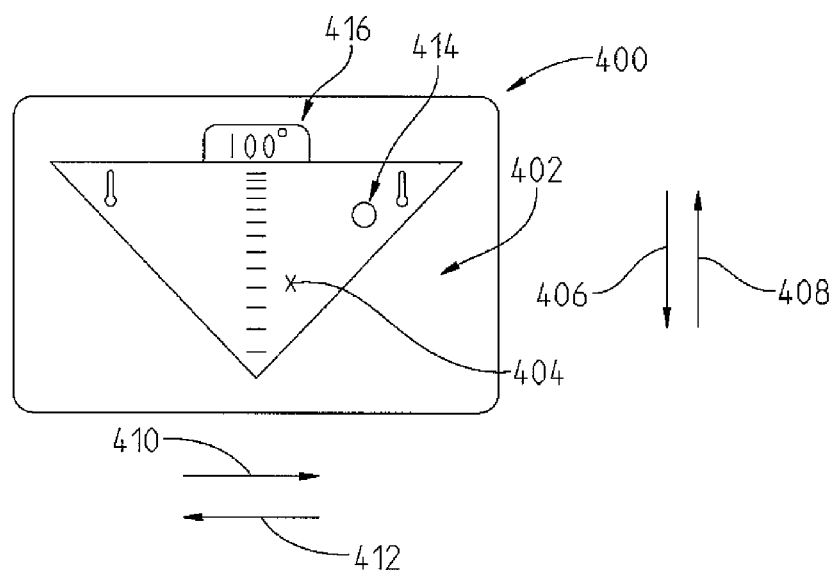
FIG. 15 is a front view of an exemplary user input device.

Referring to FIG. 15, an exemplary user input device 400 is shown. User input device 400 may be located at any of the locations 390A-I depicted in FIG. 14. User input device 400 includes a touch sensitive screen 402, such as a plurality of capacitive sensors which detect when a user touches a portion of the screen. In one embodiment, user input device 400 is coupled to controller 120 through a wired connection. In another embodiment, user input device 400 is coupled to controller 120 through a wireless connection. In the wireless configuration, user input device 400 includes a transmitter (not shown) and if two way communication is desired a receiver (not shown) along with a controller (not shown) to control the operation thereof. An illustrative example is shown in FIG. 1 as user input device 140'. User input device 140' includes an input 141, such as dials, buttons, or touch screens, a controller 144, and a transmitter 146. User inputs received by input 141 are interpreted by controller 144 which generates signals to be sent by transmitter 146 to controller 120.

A user simply touches screen 402 in a location, illustratively location 404, corresponding to a desired temperature and a desired flow rate. The flow rate may be increased by touching a location lower than location 404 in direction 406. The flow rate may be decreased by touching a location higher than location 404 in direction 408. The temperature may be increased by touching a location further to the right than location 404 in direction 410. The temperature may be decreased by touching a location further to the left than location 404 in direction 412. The selected temperature and flow rate are communicated to controller 120 which adjusts valve 116 to provide the desired temperature and flow rate.

User input device 400 includes an indicator 414 which provides a visual cue to the user of the current temperature and flow rate of the water exiting spout 130. In one embodiment, location 404 is also marked on screen 402 with a visual cue and indicator 414 migrates towards location 404 as the temperature and flow rate of the water exiting spout 130 migrates towards the desired temperature and flow rate. User input device 400 further includes a numeric indication 416 of the current temperature of the water exiting spout 130. In one embodiment, in order to provide numeric indicator 416 and/or indicator 414 user input device 400 includes a receiver which receives a wireless communication from controller 120 indicating the temperature and/or flow rate of water exiting spout 130.

In embodiment, wherein another user input device, such as moveable remote control device, a display (not shown) is provided which provides users and non-users the ability to see at a glance current water characteristics, such as temperature and flow rate. In one example, the display has the same general appearance as user input device 400.

Figure 16:
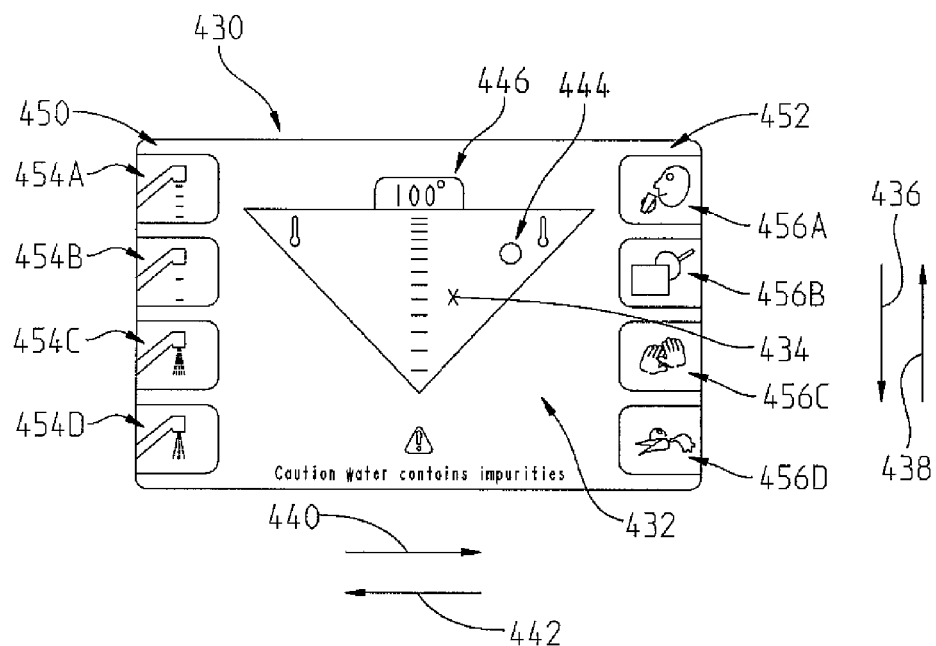
FIG. 16 is a front view of another exemplary user input device.

Referring to FIG. 16, another exemplary user input device 430 is shown. User input device 430 may be located at any of the locations 390A-I depicted in FIG. 14. User input device 430 includes a touch sensitive screen 432, such as a plurality of capacitive sensors which detect when a user touches a portion of the screen. In one embodiment, user input device 430 is coupled to controller 120 through a wired connection. In another embodiment, user input device 430 is coupled to controller 120 through a wireless connection. In the wireless configuration, user input device 430 includes a transmitter (not shown) and if two way communication is desired a receiver (not shown) along with a controller (not shown) to control the operation thereof.

A user simply touches screen 432 in a location, illustratively location 434, corresponding to a desired temperature and a desired flow rate. The flow rate may be increased by touching a location lower than location 434 in direction 436. The flow rate may be decreased by touching a location higher than location 434 in direction 438. The temperature may be increased by touching a location further to the right than location 434 in direction 440. The temperature may be decreased by touching a location further to the left than location 434 in direction 442. The selected temperature and flow rate are communicated to controller 120 which adjusts valve 116 to provide the desired temperature and flow rate.

User input device 430 includes an indicator 444 which provides a visual cue to the user of the current temperature and flow rate of the water exiting spout 130. In one embodiment, location 434 is also marked on screen 432 with a visual cue and indicator 444 migrates towards location 434 as the temperature and flow rate of the water exiting spout 130 migrates towards the desired temperature and flow rate. User input device 430 further includes a numeric indication 446 of the current temperature of the water exiting spout 130.

A plurality of presets 450 and 452 are provided as part of user input device 430. Each of presets 450 and 452 includes an icon which represents a function associated with the respective preset. To activate a preset a user touches screen 432 in a region corresponding to the icon. In one embodiment, the presets are actuatable buttons or switches, not touch activated. Presets 450, illustratively control the flow pattern of the water exiting the spout. Icons 454A and 454B correspond to a stream configuration of the water exiting spout 130 with icon 454A corresponding to a higher flow rate stream than icon 454B. Icons 454C and 454D correspond to a spray configuration of the water exiting spout 130 with icon 454C corresponding to a higher flow rate spray than icon 454D.

In one embodiment, water delivery system 100 includes a diverter valve 131 as apart of upper portion 102. In one embodiment, diverter valve 131 is a mechanical diverter valve which may provide a spray configuration in a first setting and a stream configuration in a second setting. An exemplary mechanical diverter valve is disclosed in U.S. Provisional Patent Application Ser. No. 60/756,839, filed Jan. 5, 2006, titled "PUSH BUTTON DIVERTER", the disclosure of which is expressly incorporated herein by reference. An exemplary electrically controlled valve is a solenoid valve. Exemplary diverter valves are discussed in U.S. patent application Ser. No. 11/700,556, filed Jan. 31, 2007, titled "PULL OUT WAND", the disclosure of which is expressly incorporated by reference herein.

In one embodiment, spout 130 includes a pull-out wand which includes diverter valve 131. The wand also includes one or more of the various user inputs discussed herein. In one embodiment, the wand portion and the base portion of the spout are touch sensitive, such that touching either the wand portion or the base portion will activate or deactivate the flow of water. In one embodiment, only the wand portion of the spout is touch sensitive, such that touching the wand portion will activate or deactivate the flow of water while touching the base portion will not activate or deactivate the flow of water. Details regarding exemplary pull out wands are discussed in U.S. patent application Ser. No. 11/700,556, filed Jan. 31, 2007, titled "PULL OUT WAND", the disclosure of which is expressly incorporated by reference herein.

Figure 1A:
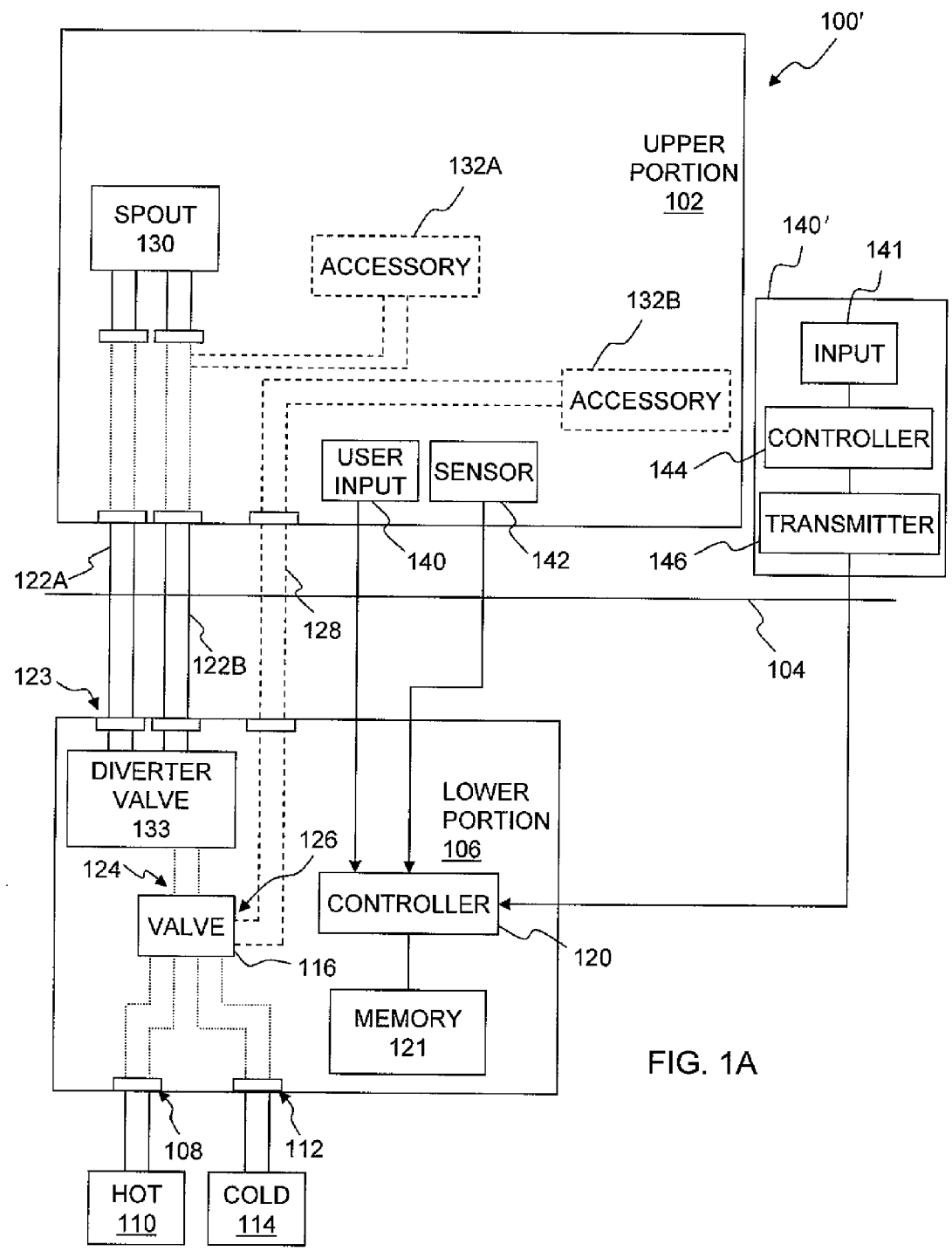
FIG. 1A is a diagrammatic view of a water delivery system including an upper portion above a sink deck and a lower portion below the sink deck, the lower portion including a diverter valve.

In one embodiment, shown in FIG. 1A water delivery system 100' is shown. Water delivery system 100' is generally the same as the illustrated embodiment of water delivery system 100, except that a diverter valve 133 is provided as apart of lower portion 106 as opposed to upper portion 102. Diverter valve 133 controls when water from the mixing valve 116 is provided to spout 130 and onto the user. Diverter valve 133 is in fluid communication with mixing valve 116 through first output 124 of mixing valve 116 and has two outputs 122A and 122B which are waterways, such as tubing, that are in fluid communication with spout 130.

Diverter valve 133 is an electronic valve controlled by controller 120. In one embodiment, diverter valve 133 has three settings off, path A (corresponding to output 123A which is in fluid communication with a stream outlet of spout 130), and path B (corresponding to output 123B which is in fluid communication with a spray outlet of spout 130). Controller 120 may set diverter valve 133 to the off setting to stop the flow of water to spout 130, to the path A setting in response to a user selection of a spray configuration, and to the path B setting in response to a user selection of a steam configuration.

Further, diverter valve 133 may be used to regulate a flow rate of water delivery system 100. In a metering example, diverter valve 133 may provide a first gross flow rate until the desired quantity is approached, then provide a second fine flow rate, being less than the gross flow rate, until the desired quantity is achieved. The same metering example may be achieved with mixing valve 116 as well.

In one embodiment, diverter valve 133 includes a separate outlet which is coupled to another internal waterway of spout 130 to provide a power spray mode. This mode may be useful in rinsing kitchenwares. In one embodiment, water delivery system 100 includes an air compressor which provides a source of compressed air which is used to increase the flow rate in the power spray mode and in the other modes. In one embodiment, the power spray mode and the spray mode both use the same internal waterway in spout 130. Exemplary diverter valves include two-way and four-way diverter valves, either comprised of disks or solenoids.

Presets 452, illustratively correspond to various tasks. For each task selected, controller 120 adjusts the temperature of the water, the flow rate of the water, and/or the position of diverter valve 131 of spout 130. Icon 456A corresponds to the task of providing drinking water. In response to the selection of icon 456A, controller 120 provides generally cold water (such as about 70° F.) in a stream configuration at a flow rate which correlates well to the filling of a drinking glass (such as a moderate flow rate). In one embodiment, controller 120 provides filtered water to drink.

Icon 456B corresponds to the task of providing water for washing kitchenwares, such as dishes. In response to the selection of icon 456B, controller 120 provides generally hot water (such as in the range of about 110° F. to about 120° F.) in a stream configuration at a flow rate which correlates well to the washing of kitchenwares (such as a moderate flow rate of about 1.5 gallons per minute)). In one embodiment, controller 120 provides the water in a spray configuration.

Icon 456C corresponds to the task of providing water for washing hands or other body parts. In response to the selection of icon 456C, controller 120 provides generally warm to hot water (such as about 104° F.) in a stream configuration at a flow rate which correlates well to the washing of hands (such as a moderate flow rate of about one gallon per minute). In one embodiment, controller 120 provides the water in a spray configuration.

Icon 456D corresponds to the task of providing water for washing foodstuffs, such as vegetables or fruit. In response to the selection of icon 456D, controller 120 provides generally cold water (full cold) in a spray configuration at a flow rate which correlates well to the washing of vegetables or fruits (such as a low flow rate of about 0.8 gallons per minute). In one embodiment, controller 120 provides the water in a spray configuration. In one embodiment, water used for cooking, either washing foodstuffs or filling a pot, uses only cold water to minimize minerals in the water. In one example, the cold water is filtered.

The use of icons 454A-D and 456A-D permit a user to rapidly switch between tasks, such as from a hot water task like washing pots and pans to a cold water task like obtaining drinking water. The user may make adjustments to the water characteristics for a preset by selecting a location 434 on screen 432. In one embodiment, presets 450 and 452 are adjustable by the user such that the user may provide customized characteristics for a given icon 454A-D and 456A-D.

Figure 17:
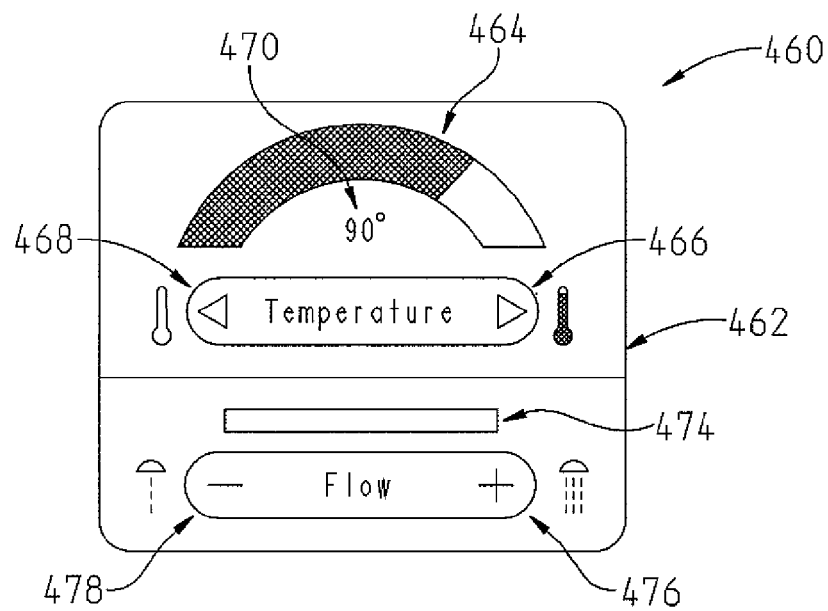
FIG. 17 is a front view of a further exemplary user input device.

Referring to FIG. 17, a further exemplary user input device 460 is shown. User input device 460 may be located at any of the locations 390A-I depicted in FIG. 14. User input device 460 includes a touch sensitive screen 462, such as a plurality of capacitive sensors which detect when a user touches a portion of the screen. In one embodiment, user input device 460 is coupled to controller 120 through a wired connection. In another embodiment, user input device 460 is coupled to controller 120 through a wireless connection. In the wireless configuration, user input device 460 includes a transmitter (not shown) and if two way communication is desired a receiver (not shown) along with a controller (not shown) to control the operation thereof.

A user may adjust the temperature by touching a location along a slider region 464 or by touching a region 466 to increase temperature or a region 468 to decrease temperature. A user may simply touch a portion of region 464 corresponding to the desired temperature or may contact region 464 and drag the finger to a portion of region 464 corresponding to the desired temperature. In one embodiment, regions 466 and 468 are switches and not portions of touch screen 462. User input device 460 includes a numeric representation 470 of the temperature as well.

A user may adjust the flow rate by touching a location along a slider region 474 or by touching a region 476 to increase the flow rate or a region 478 to decrease the flow rate. A user may simply touch a portion of region 474 corresponding to the desired flow rate or may contact region 474 and drag the finger to a portion of region 474 corresponding to the desired flow rate. In one embodiment, regions 476 and 478 are switches and not portions of touch screen 462. The selected temperature and flow rate are communicated to controller 120 which adjusts valve 116 to provide the desired temperature and flow rate.

Figure 18:
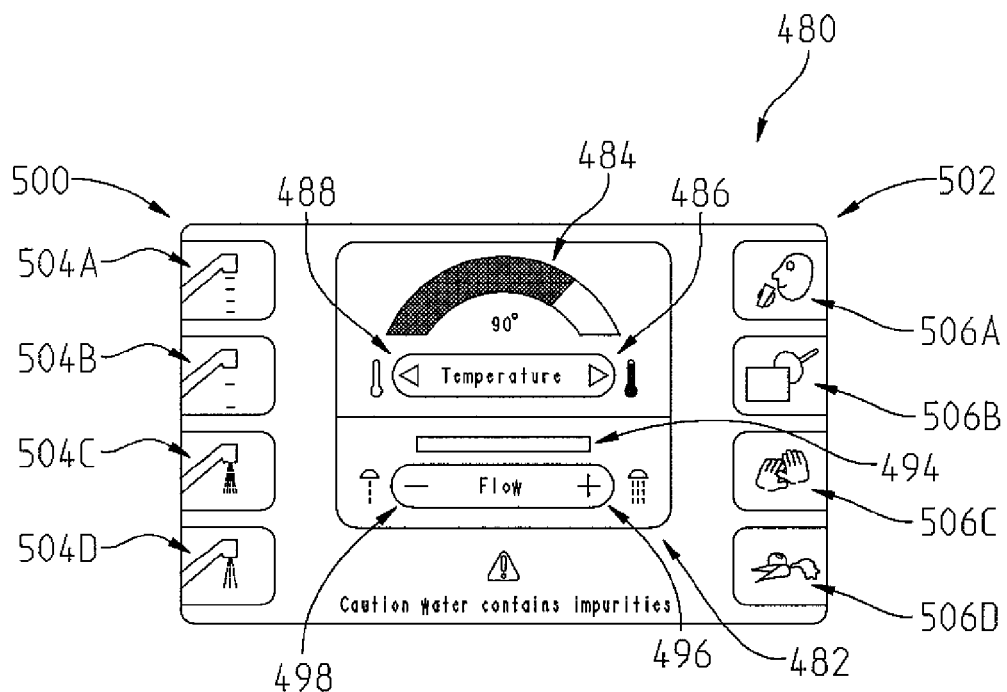
FIG. 18 is a front view of yet another exemplary user input device.

Referring to FIG. 18, a further exemplary user input device 480 is shown. User input device 480 may be located at any of the locations 390A-I depicted in FIG. 14. User input device 480 includes a touch sensitive screen 482, such as a plurality of capacitive sensors which detect when a user touches a portion of the screen. In one embodiment, user input device 480 is coupled to controller 120 through a wired connection. In another embodiment, user input device 480 is coupled to controller 120 through a wireless connection. In the wireless configuration, user input device 480 includes a transmitter (not shown) and if two way communication is desired a receiver (not shown) along with a controller (not shown) to control the operation thereof.

A user may adjust the temperature by touching a location along a slider region 484 or by touching a region 486 to increase temperature or a region 488 to decrease temperature. A user may simply touch a portion of region 484 corresponding to the desired temperature or may contact region 484 and drag the finger to a portion of region 484 corresponding to the desired temperature. In one embodiment, regions 486 and 488 are switches and not portions of touch screen 482. User input device 480 includes a numeric representation 490 of the temperature as well.

A user may adjust the flow rate by touching a location along a slider region 494 or by touching a region 496 to increase the flow rate or a region 498 to decrease the flow rate. A user may simply touch a portion of region 494 corresponding to the desired flow rate or may contact region 494 and drag the finger to a portion of region 494 corresponding to the desired flow rate. In one embodiment, regions 496 and 498 are switches and not portions of touch screen 482. The selected temperature and flow rate are communicated to controller 120 which adjusts valve 116 to provide the desired temperature and flow rate.

User input device 480 further includes a plurality of presets 500 and 502. Each of presets 500 and 502 includes an icon which represents a function associated with the respective preset. Illustratively, presets 500 includes icons 504A-D which correspond to the same functions as icons 454A-D of user input device 430 and presets 502 includes icons 506A-D which correspond to the same functions as icons 456A-D of user input device 430. To activate a preset a user touches screen 482 in a region corresponding to the icon. In one embodiment, the presets are actuatable buttons or switches, not touch regions.

The use of icons 504A-D and 506A-D permit a user to rapidly switch between tasks, such as from a hot water task like washing pots and pans to a cold water task like obtaining drinking water. The user may make adjustments to the water characteristics for a preset by selecting a different temperature with one of regions 484, 486, and 488 and/or by selecting a different flow rate with one of regions 494, 496, and 498. In one embodiment, presets 500 and 502 are adjustable by the user such that the user may provide customized characteristics for a given icon 504A-D and 506A-D.

Figure 19:
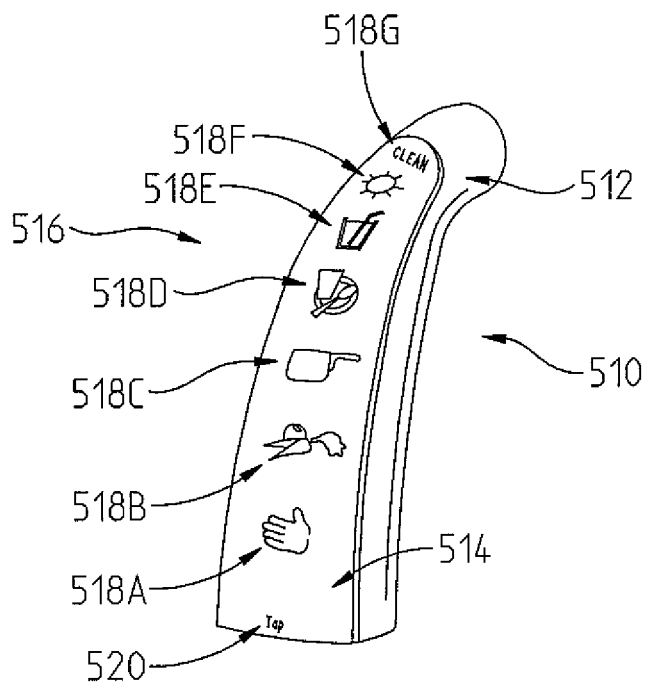
FIG. 19 is a partial perspective view of a spout having yet a further exemplary user input device incorporated into the spout.

Referring to FIG. 19, a further exemplary user input device 510 is shown. User input device 510 may be located at any of the locations 390A-I depicted in FIG. 14, but is illustratively located in location 390G integrated with a spout 512. User input device 510 includes a touch sensitive face 514, such as a plurality of capacitive sensors which detect when a user touches a portion of the face. Touch sensitive face 514 and other user input devices shown in location 390G may include a curved face with vertically oriented capacitive sensors. Additional details about the vertically oriented capacitive sensors and touch sensitive face 514 are provided in U.S. Provisional Patent Application Ser. No. 60/793,885, filed Apr. 20, 2006, titled "Vertical Touch Sensor," listing Paul D. Koottungal as the inventor, the disclosure of which is expressly incorporated by reference herein.

In one embodiment, user input device 510 is coupled to controller 120 through a wired connection. In another embodiment, user input device 510 is coupled to controller 120 through a wireless connection. In the wireless configuration, user input device 510 includes a transmitter (not shown) and if two way communication is desired a receiver (not shown) along with a controller (not shown) to control the operation thereof.

User input device 510 further includes a plurality of presets 516. Each preset 516 includes an icon 518A-G which each represent a function associated with the respective preset. To activate a preset a user touches face 514 in a region corresponding to the icon. In one embodiment, the presets are actuatable buttons or switches, not touch regions. Presets 516, illustratively correspond to various tasks. For each task selected, controller 120 adjusts the temperature of the water, the flow rate of the water, and/or the position of the diverter valve (not shown) of spout 512. The use of icons 518A-G permit a user to rapidly switch between tasks, such as from a hot water task like washing pots and pans to a cold water task like obtaining drinking water.

Icon 518A corresponds to the task of providing water for washing hands or other body parts. In response to the selection of icon 518A, controller 120 provides generally warm to hot water (such as about 104° F.) in a stream configuration at a flow rate which correlates well to the washing of hands (such as a moderate flow rate). In one embodiment, controller 120 provides the water in a spray configuration.

Icon 518B corresponds to the task of providing water for washing foodstuffs, such as vegetables or fruit. In response to the selection of icon 518B, controller 120 provides generally cold water in a spray configuration at a flow rate which correlates well to the washing of vegetables or fruit (such as a low flow rate). In one embodiment, controller 120 provides the water in a stream configuration.

Icon 518C corresponds to the task of providing water for pot filling. In one example, the user presets the amount of fluid to be dispensed. In response to the selection of icon 518C, controller 120 provides generally cold water at a flow rate which correlates well to filling the container. In one example, a high to moderate flow rate is used initially followed by a moderate to slow flow rate as the metered amount is approached.

The parameters associated with icon 518C and all the icons disclosed herein may be configured by the user. In one embodiment, the user sets the desired parameters and/or dispenses the desired quantity of fluid and then taps the respective icon multiple times, such as three, to set the parameters for the icon. The parameters may also be set remotely over a wireless network. In one embodiment, the dispensing of fluid from spout 130 commences upon the selection of an icon. In one embodiment, the dispensing of fluid from spout 130 commences upon the subsequent activation of the spout, such as through hands-free detection, a tap to region 520, voice commands, and other methods of activation discussed herein. once activated the fluid is provided in accordance with the icon previously selected. The selection of a icon, in one embodiment, has a timeout feature, such as the two timers discussed below, upon the expiration of which the water delivery system returns to a root mode.

In one embodiment, each icon includes an associated light, such as an LED, positioned behind the icon which lights when the icon is active.

Icon 518D corresponds to the task of providing water for washing kitchenwares, such as dishes. In response to the selection of icon 518D, controller 120 provides generally hot water (such as in the range of about 110° F. to about 120° F.) in a stream configuration at a flow rate which correlates well to the washing of dishes (such as a moderate flow rate). In one embodiment, controller 120 provides the water in a spray configuration.

Icon 518E corresponds to the task of providing drinking water. In response to the selection of icon 518E, controller 120 provides generally cold water in a stream configuration at a flow rate which correlates well to the filling of a drinking glass (such as a moderate flow rate). In one embodiment, controller 120 provides filtered water to drink.

Icon 518F corresponds to the task of providing instant hot water. In response to the selection of icon 518F, controller 120 provides generally hot water.

Icon 518G corresponds to the task of cleaning the faucet. As the user cleans face 514, the user does not want to activate each of the icons. As such, touching icon 518C results in the remaining icons being locked out for a period of time to permit cleaning.

Face 514 further includes a region 520 which is a tap region. By tapping region 520 the faucet is turned on, if off, or turned off, if on. In one embodiment, portions of spout 512 outside of face 514 also constitute a tap region similar to region 520.

The tap region 520 may comprise conventional capacitance sensors configured to provide a signal to the controller 120 in response to a user touching tap region 520. Tap region 520 may comprise capacitive touch sensors, such as a Q-Prox™ sensor manufactured by Quantum Research Group of Hamble, United Kingdom. Tap region 520 may operate in a manner similar to that detailed in any one of U.S. patent application Ser. No. 11/325,927, filed Jan. 5, 2006, titled "METHOD AND APPARATUS FOR DETERMINING WHEN HANDS ARE UNDER A FAUCET FOR LAVATORY APPLICATIONS"; U.S. patent application Ser. No. 11/324,901, filed Jan. 4, 2006, titled "BATTERY BOX ASSEMBLY"; U.S. patent application Ser. No. 11/325,128, filed Jan. 4, 2006, titled "SPOUT ASSEMBLY FOR AN ELECTRONIC FAUCET"; U.S. patent application Ser. No. 11/325,284, filed Jan. 4, 2006, titled "METHOD AND APPARATUS FOR PROVIDING STRAIN RELIEF OF A CABLE"; U.S. patent application Ser. No. 11/326,986, filed Jan. 5, 2006, titled "VALVE BODY ASSEMBLY WITH ELECTRONIC SWITCHING"; U.S. patent application Ser. No. 11/326,989, filed Jan. 5, 2006, titled "POSITION-SENSING DETECTOR ARRANGEMENT FOR CONTROLLING A FAUCET"; U.S. Pat. No. 6,962,168, issued Nov. 8, 2005, titled "CAPACITIVE TOUCH ON/OFF CONTROL FOR AN AUTOMATIC RESIDENTIAL FAUCET" U.S. Pat. No. 6,968,860, issued Nov. 29, 2005, titled "RESTRICTED FLOW HANDS-FREE FAUCET" U.S. Published Patent Application 2005/0151101A1, published on Jul. 14, 2005, titled "CONTROL ARRANGEMENT FOR AN AUTOMATIC RESIDENTIAL FAUCET"; and U.S. Published Patent Application 2005/0150556A1, published on Jul. 14, 2005, titled "CONTROL ARRANGEMENT FOR AN AUTOMATIC RESIDENTIAL FAUCET", the disclosures of which are expressly incorporated by reference herein. It should be further appreciated that tap sensors may be positioned within other portions of the spout or other components of water delivery system 100. It should be understood that any of the tap regions or areas described herein may include the above-mentioned sensors.

Figure 20:
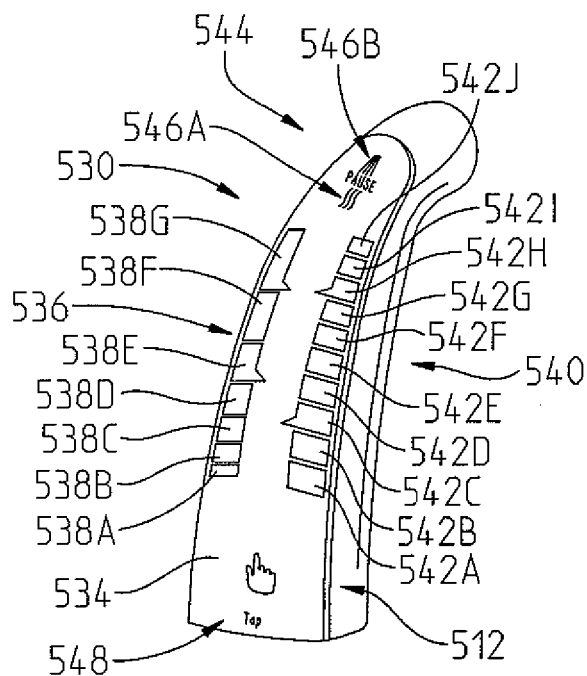
FIG. 20 is a partial perspective view of a spout having still a further exemplary user input device incorporated into the spout.

Referring to FIG. 20, a yet further exemplary user input device 530 is shown. User input device 530 may be located at any of the locations depicted in FIG. 14, but is illustratively located in location 390G integrated with a spout 512. User input device 530 includes a touch sensitive face 534, such as a plurality of capacitive sensors which detect when a user touches various portions of the face. In one embodiment, user input device 530 is coupled to controller 120 through a wired connection. In another embodiment, user input device 530 is coupled to controller 120 through a wireless connection. In the wireless configuration, user input device 530 includes a transmitter (not shown) and if two way communication is desired a receiver (not shown) along with a controller (not shown) to control the operation thereof.

User input device 530 includes a flow rate control 536 which includes a plurality of preset flow rates. A user may select one of the present temperatures by touching the corresponding icon 538A-G. Also, flow rate control 536 functions as a slider control wherein a user may touch a portion of flow rate control 536 and drag the finger up or down to change the flow rate. In addition user input device 530 includes a temperature control 540 which includes a plurality of preset temperatures. A user may select one of the preset temperatures by touching the corresponding icon 542A-J. Also, temperature control works as a slider control wherein a user may touch a portion of temperature control 540 and drag the finger up or down to change the temperature. In one embodiment, the temperature presets are different colors to correspond to the temperatures, such as a deep blue for area 542A (cold water), lighter blue for area 542C (cool water), pink for 542E (warm water), and red for area 542I (hot water). The various colors may be generated by mixing the colors from three colored LEDs through the use of a pulse width modulation technique that drives all three LEDs.

In one embodiment, sliding the finger along either flow rate control 536 or temperature control 540 provides a gross control for the respective flow rate or temperature. Once the desired gross flow rate or temperature is selected, the user may tap the sensor to provide fine control for the respective flow rate or temperature. In one example, the respective flow rate control or temperature control is divided into three regions. A first region corresponding to a fine parameter decrease zone which responses to tapping. A second region corresponding to a gross parameter zone which responses to sliding. A third region corresponding to a fine parameter increase zone which responses to tapping. As such, a user may select a gross value of a parameter (flow rate or temperature) with the second region and then either decrease the parameter with the first region or increase the parameter with the second region. In one example related to temperature, the first and third regions adjust the temperature by increments specified by controller 120, such as about 0.5° increments or about 1.0° increments. In one example, the second region is normalized to a range specified by controller 120.

User input device 530 further includes a flow pattern control 544. A user may select a stream configuration flow pattern by touching icon 546A. A user may select a spray configuration flow pattern by touching icon 546B. Controller 120 adjusts a diverter valve (not shown) in spout 512 based on the selection of either icon 546A or 546B. Face 534 further includes a region 548 which is a tap region. By tapping region 548 the faucet is turned on, if off, or turned off, if on. In one embodiment, portions of spout 512 outside of face 534 also constitute a tap region similar to region 548.

In one embodiment, a liquid crystal display ("LCD") touch screen is provided. The LCD screen may display the same icons as the interfaces discussed herein and/or include slide controls. The LCD may also be menu driven. Further, the icons displayed by the LCD are variable and may be updated as functionality changes, such as the addition of new modules. An exemplary LCD display is shown in FIG. 66.

Figure 21:
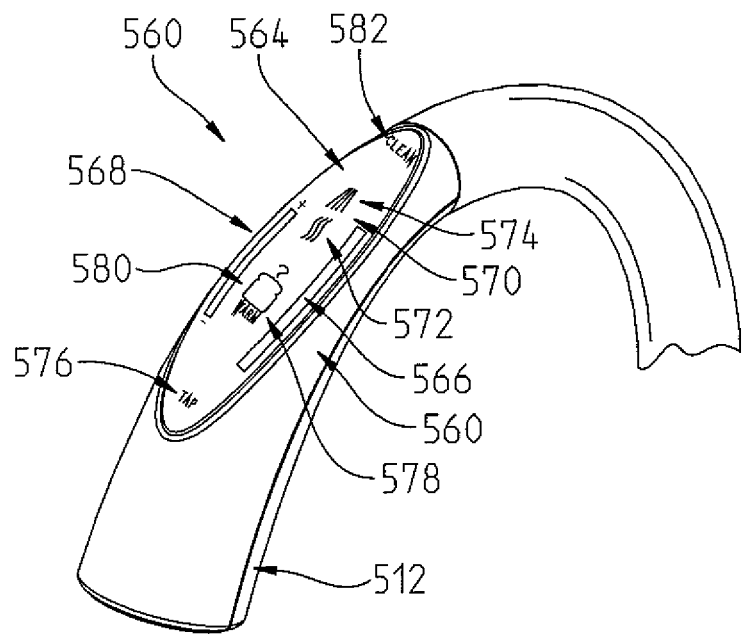
FIG. 21 is a partial perspective view of a spout having still another exemplary user input device incorporated into the spout.

Referring to FIG. 21, still another exemplary user input device 560 is shown. User input device 560 may be located at any of the locations depicted in FIG. 14, but is illustratively located in location 390G integrated with a spout 512. User input device 560 includes a touch sensitive face 564, such as a plurality of capacitive sensors which detect when a user touches various portions of the face. In one embodiment, user input device 560 is coupled to controller 120 through a wired connection. In another embodiment, user input device 560 is coupled to controller 120 through a wireless connection. In the wireless configuration, user input device 560 includes a transmitter (not shown) and if two way communication is desired a receiver (not shown) along with a controller (not shown) to control the operation thereof.

User input device 560 includes a flow rate control 568. Flow rate control 568 permits a user to select a desired flow rate of water. A user may touch and release a portion of flow rate control 568 to select a corresponding flow rate. Also, a user may touch a portion of flow rate control 568 and then slide their finger along flow rate control 568 to adjust the flow rate. By sliding the finger away from the outlet of spout 512 the flow rate is increased and by sliding the finger towards the outlet of spout 512 the flow rate is decreased. User input device 560 further includes a temperature control 566. Temperature control 566 permits a user to select a desired temperature of water. A user may touch and release a portion of temperature control 566 to select a corresponding temperature. Also, a user may touch a portion of temperature control 566 and then slide their finger along temperature control 566 to adjust the temperature. By sliding the finger away from the outlet of spout 512 the temperature is increased and by sliding the finger towards the outlet of spout 512 the temperature is decreased.

User input device 560 further includes a flow pattern control 570. A user may select a stream configuration flow pattern by touching icon 572. A user may select a spray configuration flow pattern by touching icon 574. Controller 120 adjusts a diverter valve (not shown) in spout 512 based on the selection of either icon 572 or 574. Face 564 further includes a region 576 which is a tap region. By tapping region 576 the faucet is turned on, if off, or turned off, if on. In one embodiment, portions of spout 512 outside of face 564 also constitute a tap region similar to region 576.

User input device 560 further includes one or more task presets 578. Task presets 578 adjusts one or more of temperature, flow rate, volume dispensed, and flow pattern based on the task. Illustratively a warm water icon 580 is displayed. By touching icon 580, controller 120 configures spout 512 and/or valve 116 to dispense water having a warm temperature, a flow rate corresponding to the filling of a cup, and a stream flow pattern. Further, a textual label 582 is shown. Textual label 582 includes the word "CLEAN" and corresponds to a preset for cleaning the faucet. Touching textual label 582 results in the remaining icons by locked out for a period of time such that the faucet may be cleaned. Additional tasks may be included, such as providing cold filtered drinking water.

Figure 22:
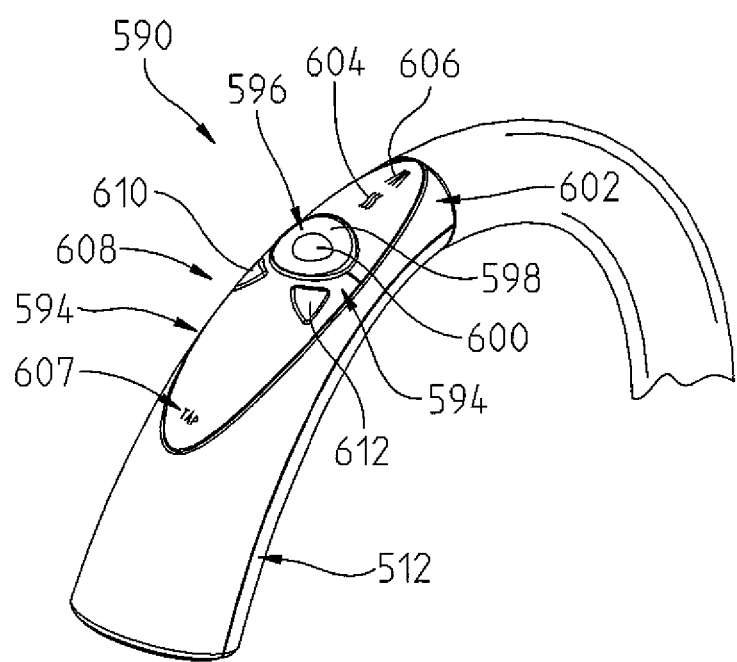
FIG. 22 is a partial perspective view of a spout having still yet another exemplary user input device incorporated into the spout.

Referring to FIG. 22, still yet another exemplary user input device 590 is shown. User input device 590 may be located at any of the locations depicted in FIG. 14, but is illustratively located in location 390G integrated with a spout 512. User input device 590 includes a touch sensitive face 594, such as a plurality of capacitive sensors which detect when a user touches various portions of the face. In one embodiment, user input device 590 is coupled to controller 120 through a wired connection. In another embodiment, user input device 590 is coupled to controller 120 through a wireless connection. In the wireless configuration, user input device 590 includes a transmitter (not shown) and if two way communication is desired a receiver (not shown) along with a controller (not shown) to control the operation thereof.

User input device 590 includes a disk shaped control 596 separate from touch sensitive face 594. Control 596 is also touch sensitive and is used to set temperature, to set flow rate, or to set temperature and flow rate. To set a first parameter, such as temperature or flow rate, with control 596 a user moves their finger along an outer circular portion 598. In one embodiment, movement in a clockwise direction increases the parameter, such as hotter water, and movement in a counter-clockwise direction decreases the parameter, such as colder water. Once the desired valve of the parameter has been achieved, the user taps a central portion 600 of control 596 to set the parameter. In the instance where both flow rate and temperature are to be controlled, a user selects a first parameter first, such as flow rate, with outer portion 598 and central portion 600 followed by the selection of a second parameter, such as temperature, with outer portion 598 and central portion 600. Additional details regarding an exemplary touch pad are disclosed in U.S. Pat. No. 7,046,230, the disclosure of which is expressly incorporated by reference herein.

User input device 590 further includes as part of face 594 a flow pattern control 602. A user may select a stream configuration flow pattern by touching icon 604. A user may select a spray configuration flow pattern by touching icon 606. Controller 120 adjusts a diverter valve (not shown) in spout 512 based on the selection of either icon 604 or 606. Face 594 further includes a region 607 which is a tap region. By tapping region 607 the faucet is turned on, if off, or turned off, if on. In one embodiment, portions of spout 512 outside of face 594 also constitute a tap region similar to region 607.

User input device 590 further includes one or more presets 608. Presets 608 adjust one or more of temperature, flow rate, volume dispensed, and flow pattern based on the settings of preset 608. Illustratively, two presets 610 and 612 are shown. Each preset may be programmed by a user to correspond to a specific task. The various programming techniques discussed herein, such as multiple taps or remote update, may be used.

Figure 23:
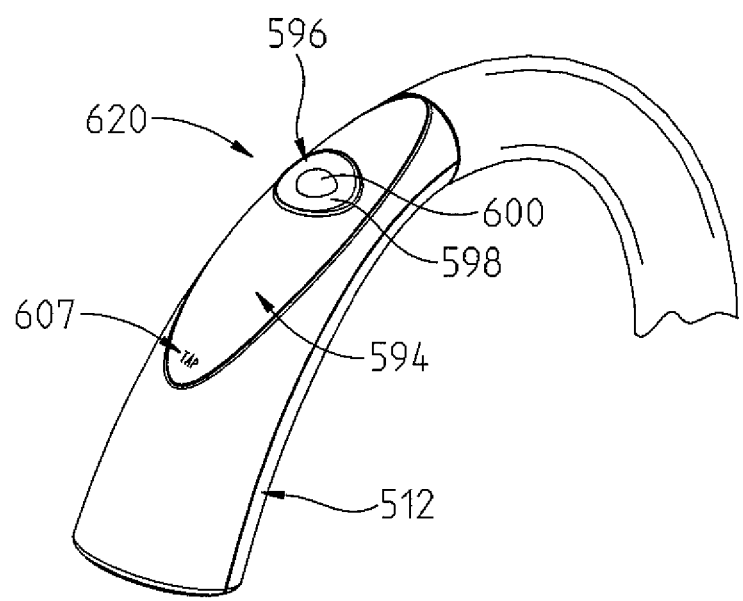
FIG. 23 is a partial perspective view of a spout having still yet a further exemplary user input device incorporated into the spout.

Referring to FIG. 23, still yet a further exemplary user input device 620 is shown. User input device 620 functions the same as user input device 590 except that flow pattern controls 602 and presets 608 have been removed.

Figure 63:
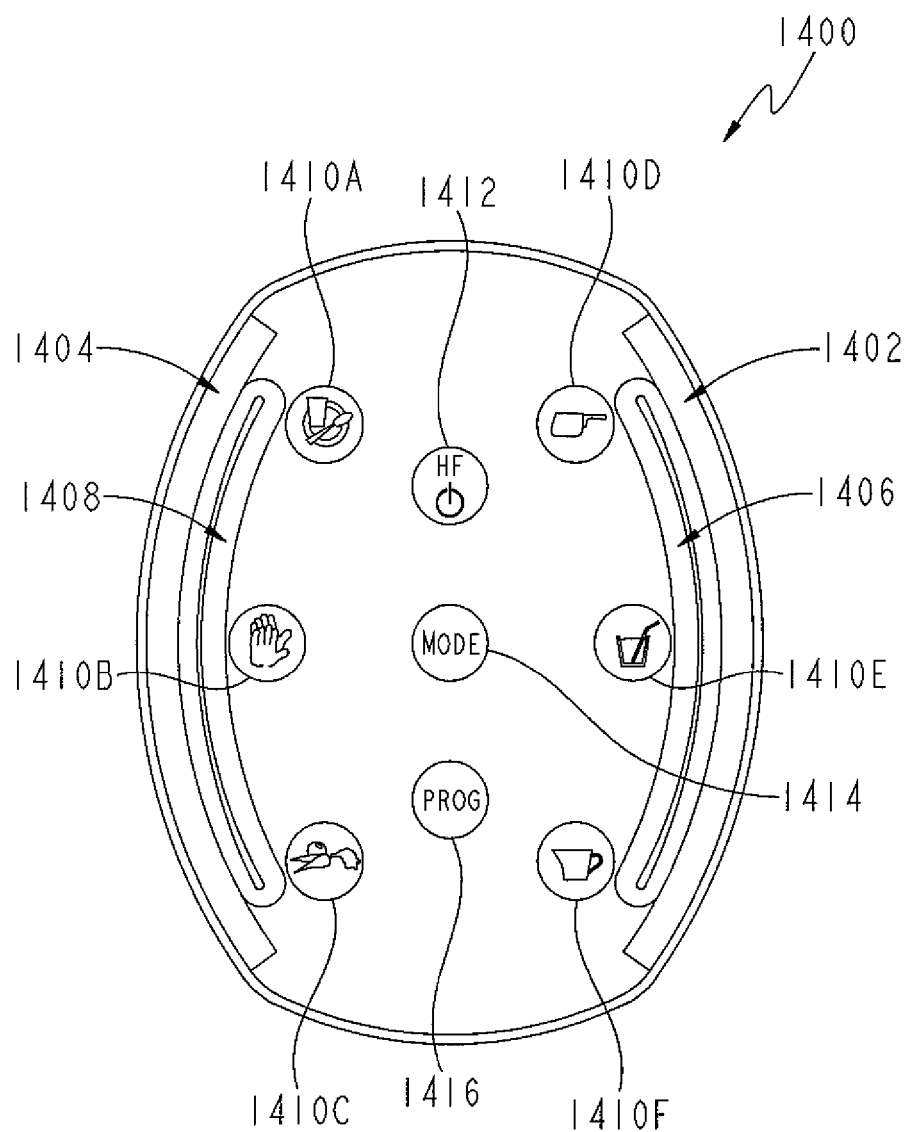
FIG. 63 is yet still a further exemplary user input interface.

Referring to FIG. 63, a further exemplary user interface 1400 is shown. Interface 1400 includes a temperature slider 1402 and a flow slider 1404. Adjacent to temperature slider 1402 and flow slider 1404 are an array of LED lights 1406, 1408, respectively. In addition, interface 1400 includes six preset inputs 1410A, 1410B, 1410C, 1410D, 1410E, and 1410F. To activate a preset 1410 a user touches the interface in a region corresponding to the icon. In one embodiment, the presets are actuatable buttons or switches, not touch regions. Presets 1410, illustratively correspond to various tasks. For each task selected, controller 120 adjusts the temperature of the water, the flow rate of the water, and/or the position of the diverter valve (not shown) of the respective spout. The use of presets 1410A-F permit a user to rapidly switch between tasks, such as from a hot water task like washing pots and pans to a cold water task like obtaining drinking water. In one embodiment, each preset includes an associated light, such as an LED, positioned behind the icon which lights when the icon is active.

Icon 1410A corresponds to the task of providing water for washing kitchenwares, such as dishes. In response to the selection of icon 1410A, controller 120 provides generally hot water (such as in the range of about 110° F. to about 120° F.) in a stream configuration at a flow rate which correlates well to the washing of dishes (such as a moderate flow rate). In one embodiment, controller 120 provides the water in a spray configuration.

Icon 1410B corresponds to the task of providing water for washing hands or other body parts. In response to the selection of icon 1410B, controller 120 provides generally warm to hot water (such as about 104° F.) in a stream configuration at a flow rate which correlates well to the washing of hands (such as a moderate flow rate). In one embodiment, controller 120 provides the water in a spray configuration.

Icon 1410C corresponds to the task of providing water for washing foodstuffs, such as vegetables or fruit. In response to the selection of icon 1410C, controller 120 provides generally cold water in a spray configuration at a flow rate which correlates well to the washing of vegetables or fruit (such as a low flow rate). In one embodiment, controller 120 provides the water in a stream configuration.

Icon 1410D corresponds to the task of providing water for pot filling. In one example, the user presets the amount of fluid to be dispensed. In response to the selection of icon 1410D, controller 120 provides generally cold water at a flow rate which correlates well to filling the container. In one example, a high to moderate flow rate is used initially followed by a moderate to slow flow rate as the metered amount is approached.

Icon 1410E corresponds to the task of providing water for a set quantity. In one example, the set quantity is about 16 ounces. In response to the selection of icon 1410E, controller 120 provides generally cold water in a stream configuration at a flow rate which correlates well to the filling of a drinking glass (such as a low-moderate flow rate). In one embodiment, the flow rate slows down towards the completion of the filling operation to provide more precise control over the volume being dispensed. In one embodiment, controller 120 provides filtered water to drink. The characteristics of the water being dispensed may be redefined by a user by programming icon 1410E to a different set of characteristics, such as temperature, flow rate, output type, and/or volume.

Icon 1410F corresponds to the task of providing water for a set quantity. In one example, the set quantity is about 8 ounces. In response to the selection of icon 1410F, controller 120 provides generally cold water in a stream configuration at a flow rate which correlates well to the filling of a drinking glass (such as a low-moderate flow rate). In one embodiment, the flow rate slows down towards the completion of the filling operation to provide more precise control over the volume being dispensed. In one embodiment, controller 120 provides filtered water to drink. The characteristics of the water being dispensed may be redefined by a user by programming icon 1410F to a different set of characteristics, such as temperature, flow rate, output type, and/or volume.

The touch area 1412 corresponding to the HF icon corresponds to the task of activating or deactivating the hands free operation of the respective spout. In response to the selection of touch area 1412, controller 120 activates the hands free sensors if deactivated or deactivates the hands free sensors if activated.

The touch area 1414 corresponding to the mode icon corresponds to a system on/off feature whereby the system may be placed in an on mode or an off mode. In response to the selection of touch area 1414, controller 120 when the system is on turns the system off when not in use or when being cleaned.

The touch area 1416 corresponding to the PROG icon corresponds to the task of programming one or presets 1410A-F. In response to the selection of touch area 1416, controller 120 activates a program mode.

Figure 67:
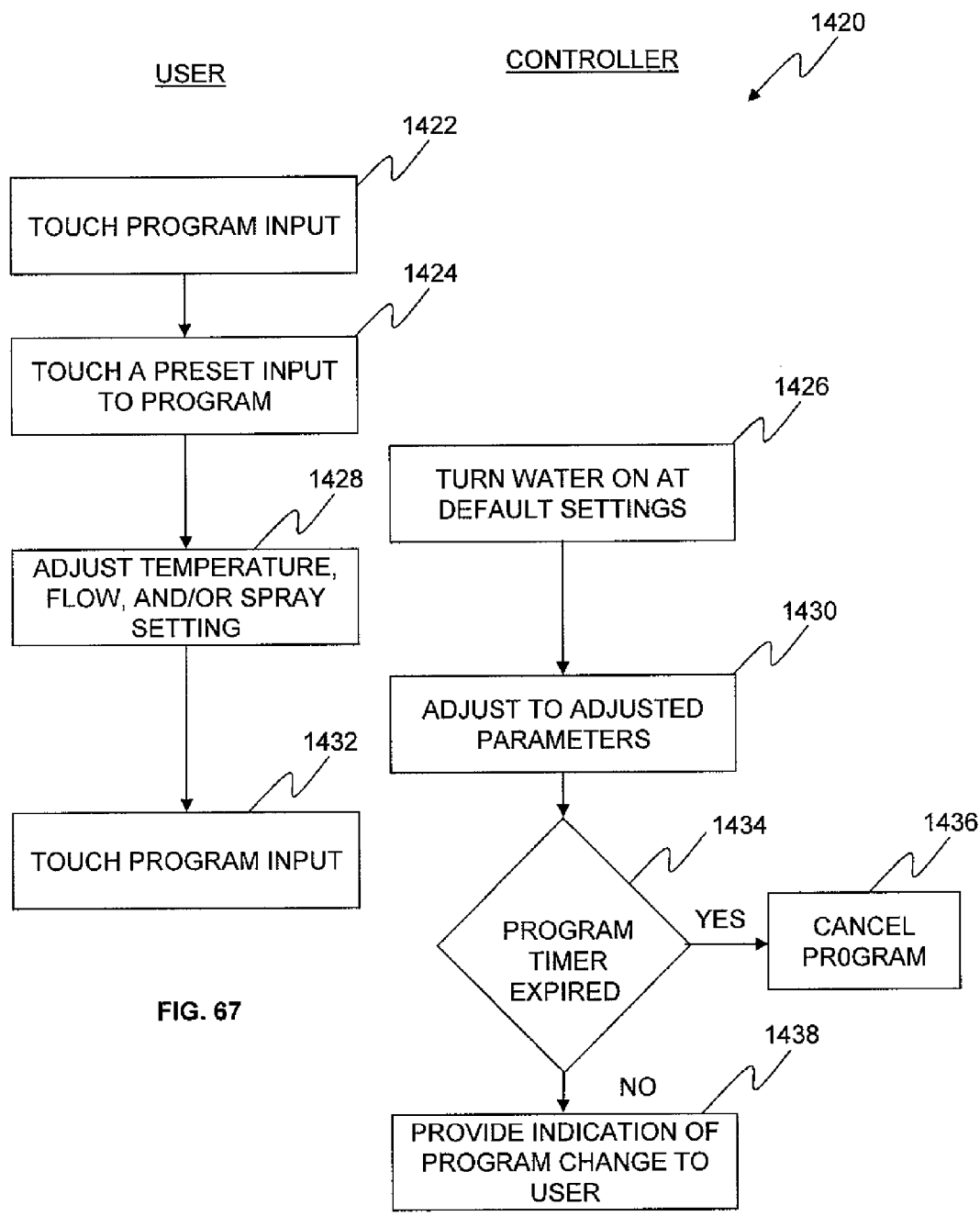

Referring to FIG. 67, an exemplary method 1420 for programming a preset 1410 is shown. A user will touch or otherwise select the program input 1416, as represented by block 1422. A user will touch or otherwise select a preset 1410 to be programmed, as represented by block 1424. Controller 120 receives the input from program input 1416 and the selected preset 1410 and turns the water on at the default setting for the preset 1410, as represented by block 1426. The user may then adjust one or more of the temperature, flow, and/or spray setting, as represented by block 1428. Controller 120 receives the input for adjusting one or more of the temperature, flow, and/or spray setting, as represented by block 1430.

A user will again touch or otherwise select the program input 1416 to end the programming of preset 1410, as represented by block 1432. Controller 120 receives the second input from program input 1416 and checks to see if a program timer has expired, as represented by block 1434. In one embodiment, a user is given one minute from the initial selection of the program input 1416 to complete any adjustments and select the program input a second time. If the program timer has expired, the program sequence is cancelled and the preset retains its prior settings, as represented by block 1436. If the program timer has not expired, an indication of the change to preset 1410 is provided to the user, as represented by block 1438. Exemplary indications include an audible signal, such as a chirp, or a visual signal, such as a flashing LED.

Figure 68:
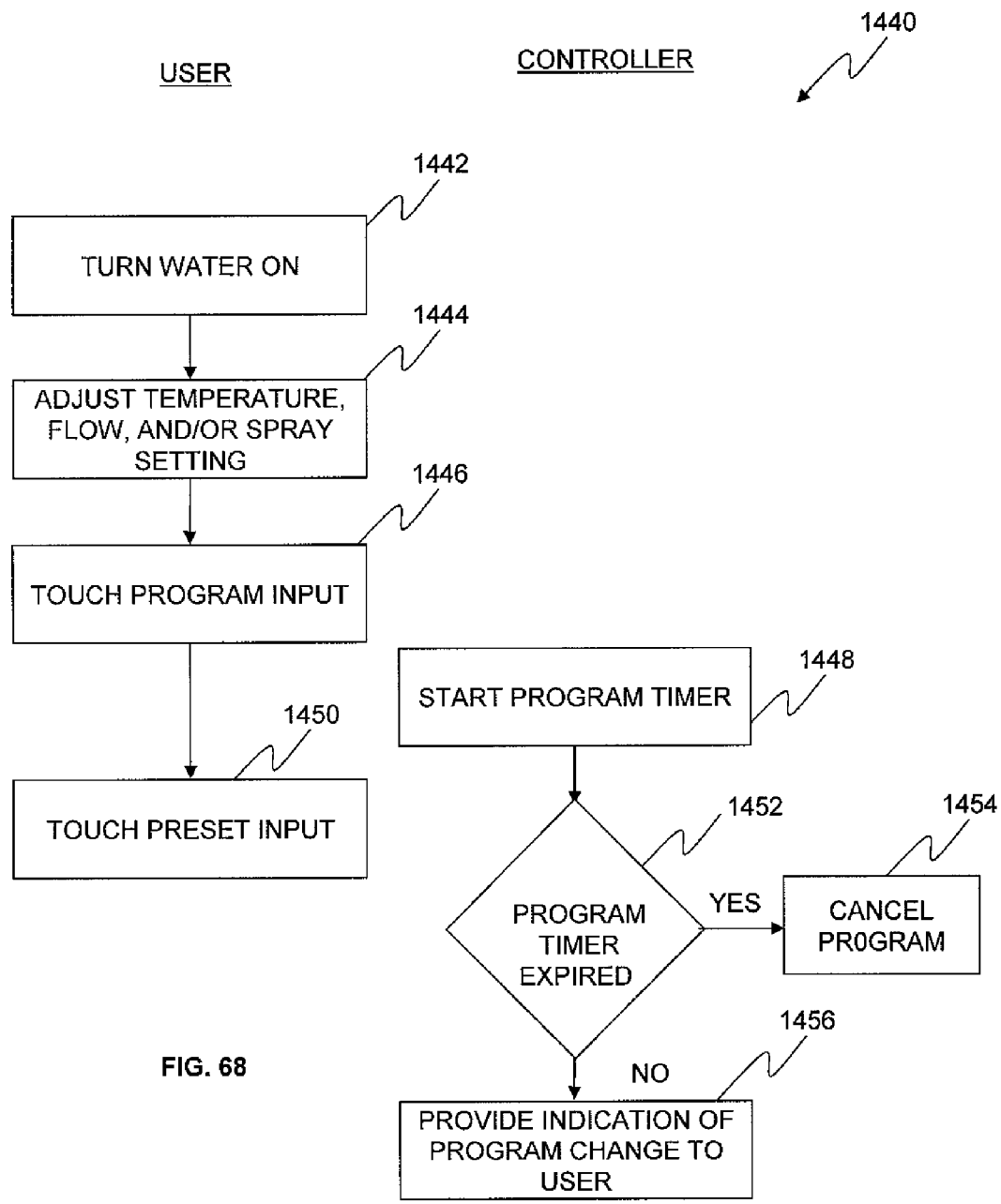

Referring to FIG. 68, an exemplary method 1440 for programming a preset 1410 is shown. A user will turn on the water, such as with touch, as represented by block 1442. The user may then adjust one or more of the temperature, flow, and/or spray setting, as represented by block 1444. Controller 120 receives the input for adjusting one or more of the temperature, flow, and/or spray setting. A user will touch or otherwise select the program input 1416, as represented by block 1446. In response to receiving the input from the program input 1416, controller 120 starts a program timer, as represented by block 1448.

A user will touch or otherwise select a preset 1410 to be programmed, as represented by block 1424. Controller 120 receives the second input from program input 1416 and checks to see if a program timer has expired, as represented by block 1452. In one embodiment, a user is given five seconds from the initial selection of the program input 1416 to select the preset input a second time. If the program timer has expired, the program sequence is cancelled and the preset retains its prior settings, as represented by block 1454. If the program timer has not expired, an indication of the change to preset 1410 is provided to the user, as represented by block 1456. Exemplary indications include an audible signal, such as a chirp, or a visual signal, such as a flashing LED.

Figure 29:
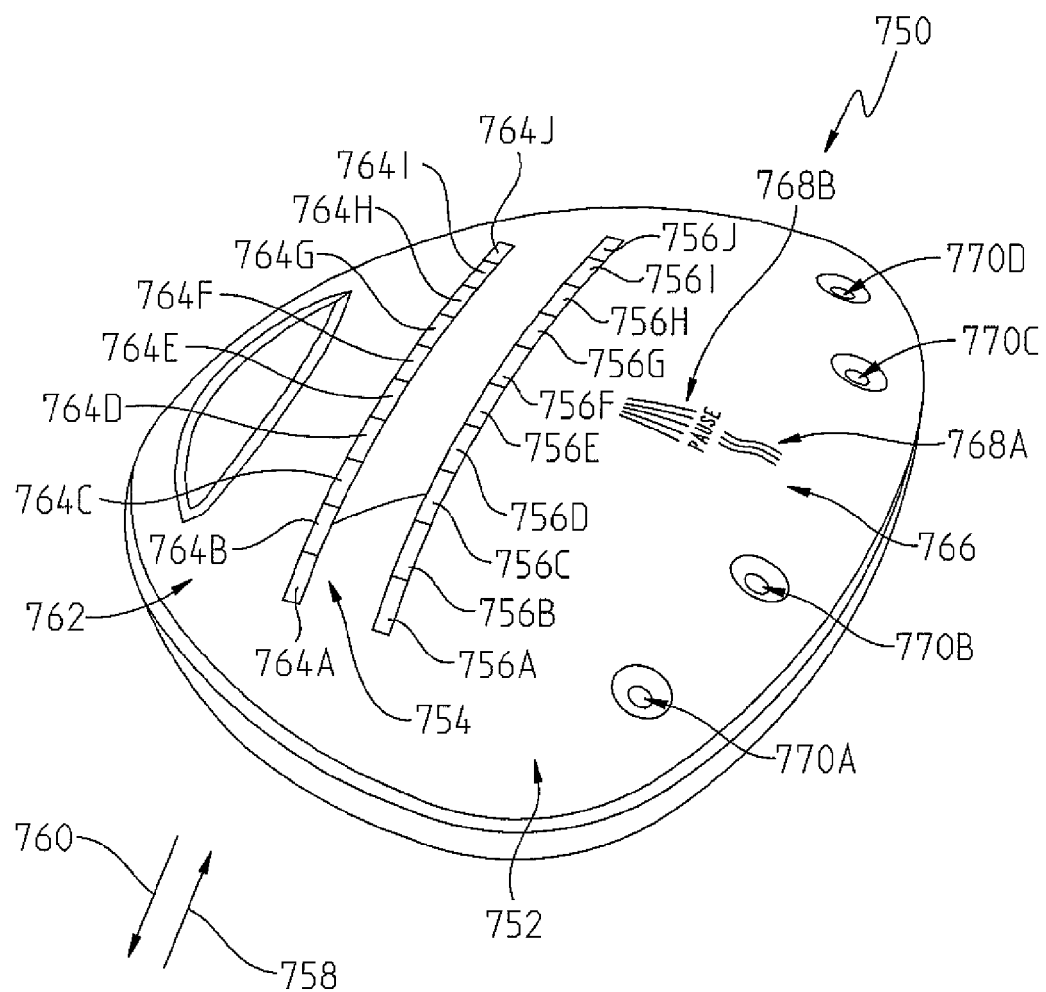
FIG. 29 is a perspective view of another portable user input device.
Figure 64:
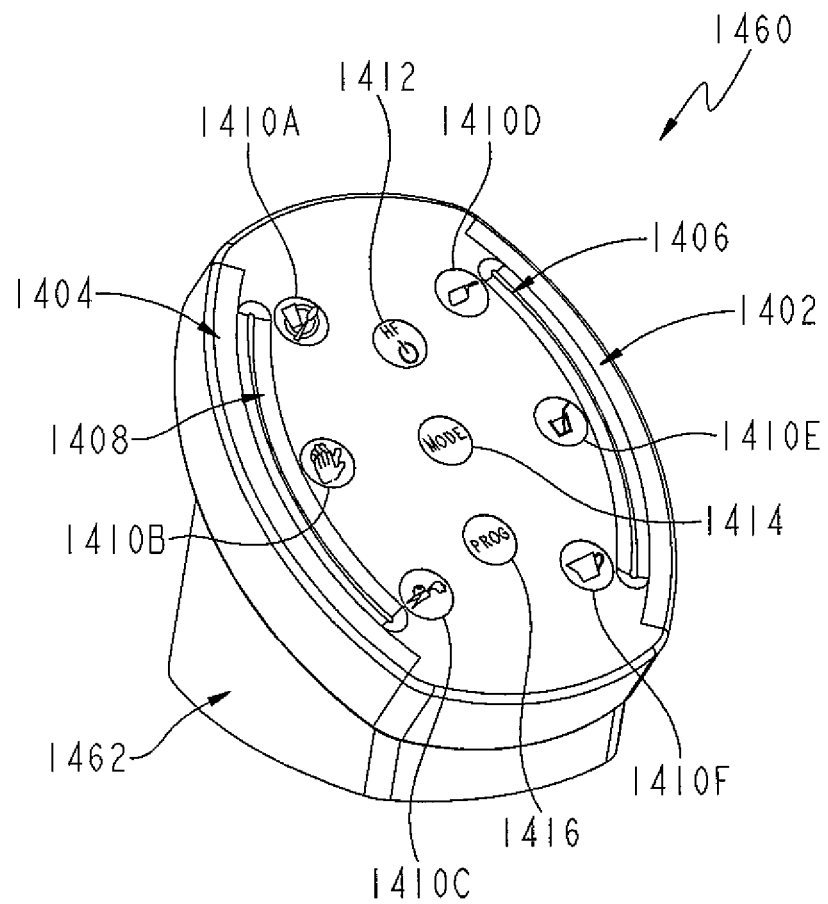
FIG. 64 is a moveable user input device including the user interface of FIG. 63.

Referring to FIG. 64, user interface 1400 is shown as a remote user interface device 1460. User interface device 1460, like user interface device 750 in FIG. 29, is moveable about a sink deck area. User interface device 1460 includes a base 1462 which sits upon the sink deck and holds user interface 1400 at an angle. User interface device 1460 communicates wirelessly with controller 120.

Referring to FIG. 64, user interface 1400 is shown as a user interface device 1470. User interface device 1470 includes a base portion 1472, a stem portion 1474 which extends through an opening in a sink deck, and a coupler 1476 which secures user interface device 1470 to the sink deck. In one embodiment, user interface device 1470 communicates wirelessly with controller 120. In one embodiment, user interface device 1470 communicates with controller 120 through a wired connection that passes through stem portion 1474.

Referring to FIG. 65, user interface device 1480 is shown. User interface device 1480 is generally similar to user interface device 1470. User interface device 1480 includes a base portion 1472, a stem portion 1474 which extends through an opening in a sink deck, and a coupler 1476 which secures user interface device 1480 to the sink deck. In one embodiment, user interface device 1480 communicates wirelessly with controller 120. In one embodiment, user interface device 1480 communicates with controller 120 through a wired connection that passes through stem portion 1474.

As shown in FIG. 66, user interface device 1480 includes a display 1482. Display 1482 is used to communicate information to a user and/or to receive information from the user. Referring to FIG. 69A, a exemplary screen 1500 of display

1482 is shown. A top portion of screen 1500 includes a first region 1502 including a text icon "ON", a second region 1504 including a text icon "HANDS FREE", a third region 1506 including a text icon "OFF", a fourth region 1508 including an icon which is a logo, a fifth region 1510 including a text icon "PROG", and a sixth region 1512 including a text icon "CLEAN". Although six regions are illustrated, display 1482 may have fewer or greater numbers of regions.

In one embodiment, display 1482 is a touch screen and controller 120 interprets a touch to a given region to correspond to the an input for the icon shown. for instance, a task icon could be shown in region 1510, and controller 120 would interpret a touch of region 1510 to correspond to a selection of that task icon. In one embodiment, display 1482 is not a touch screen and user interface device 1480 further includes inputs 1514, 1516, 1518, and 1520 positioned around display 1482. Inputs 1514, 1516, 1518, and 1520 may be buttons, touch regions, or other suitable types of inputs. In this case the icons presented in regions 1502, 1506, 1510, and 1512 define the functionality associated with inputs 1514, 1516, 1518, and 1520. This permits inputs 1514, 1516, 1518, and 1520 to be soft keys. As discussed herein the selection of one of regions 1502, 1504, 1506, 1508, 1510, and 1512 is one of the selection of a touch area of display 1482 (embodiments when it is a touch screen) or the selection of a corresponding input 1514, 1516, 1518, and 1520 associated with display 1482 (embodiments when it is not a touch screen).

In one embodiment, display 1482 is color and the color of the icon in region 1508 changes to correspond to the temperature of the water being dispensed. In one embodiment, display 1482 dims or is turned off after a period of inactively. In one example, the period of inactivity is about 10 minutes. In one embodiment, region 1508 displays one or more of a time and/or date; one or more pictures; a last setpoint when idle (such as temperature, flow, output type); the flow rate as percentage of maximum flow rate, an actual flow rate, or a graphical representation; a help menu; possible functions of the system; water quality information (if associated sensor is included); filtered water information such as filter life; and/or water usage data.

Referring to FIG. 69B, a screen 1530 corresponding to when the system is in a slider mode wherein the selected temperature is shown in region 1508. In one embodiment, the selected flow rate may also be shown. In one embodiment, a background color of display 1482 corresponds to the actual temperature of the water.

Referring to FIG. 69C, a screen 1540 corresponding to when the system is in a task mode wherein the corresponding task icon is shown in region 1508. In one embodiment, screen 1540 reverts to screen 1530 after a period of inactivity, such as 1 to 2 minutes. In one embodiment, a color of the task icon corresponds to the desired temperature of the water.

Referring to FIG. 69D, a selection of region 1512 results in the display of screen 1550. As indicated in region 1508, a user is informed that the cleaning mode has been entered and that the cleaning mode may be ended by holding the spout or another input for about 2 seconds.

Referring to FIG. 69E, a screen 1560 corresponding to when the system is in a dispense mode to dispense a specific quantity of water. In region 1508, a user is informed that dispensing may be commenced by one of tapping the spout or inserting a container (hands free activation). In one embodiment, screen 1560 also displays the quantity requested.

Referring to FIG. 69F, a countdown of the amount to be dispensed is shown on screen 1570 after dispensing has commenced. In one embodiment, the countdown is a graphical representation of a container filling up. In one embodiment, the countdown is a bar graph. In one embodiment, a percentage value is shown.

Referring to FIGS. 70A-G, a programming of a task feature and a dispense feature through display 1482 are discussed. Referring to FIG. 70A, screen 1570 is shown which is generally the same as screen 1500 of FIG. 69A along with region 1510 being selected to start the program feature. In response to the selection of region 1510, screen 1590 in FIG. 70B is shown. As shown in FIG. 70B, the text icons for regions 1502 and 1506 have changed to state "TASK" and "DISPENSE", respectively.

If region 1502 is selected, screen 1600 is shown (see FIG. 70C). The user is prompted to set the desired temperature and flow. In one embodiment, the current desired temperature is shown and/or the current desired flow rate. These values change as the user selects revised values. The user may select region 1510 to cancel programming. The may also select region 1512 to accept the changes and finish programming. In response to the selection of region 1512, screen 1610 is shown for a period of time and then screen 1500 is shown again.

If region 1506 is selected, screen 1620 is shown (see FIG. 70E). The user is prompted to set the desired temperature and flow. In one embodiment, the current desired temperature is shown and/or the current desired flow rate. These values change as the user selects revised values. The user may select region 1510 to cancel programming. The may also select region 1512 to continue to the next operation. In response to the selection of region 1512, screen 1630 is shown (see FIG. 70F) wherein the user is prompted to tap the spout or activate the hands free sensor to begin dispensing the water. Once dispensing has begun, screen 1640 is shown prompting the user to select region 1512 at the desired volume. In one embodiment, the current volume dispensed is shown on display 1482. In response to the selection of region 1512, screen 1610 is shown for a period of time and then screen 1500 is shown again.

Figure 24:
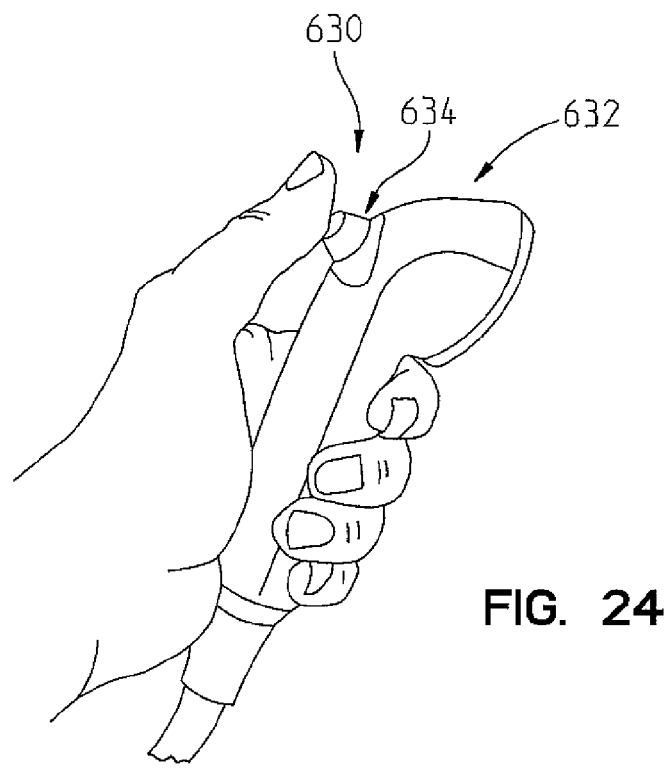
FIG. 24 is a partial perspective view of a pull-out spout having a joystick user input device.

Referring to FIG. 24, a further exemplary user input device 630 is shown. User input device 630 may be located at any of the locations depicted in FIG. 14, but is illustratively located in location 390G integrated with a spout 632. Spout 632 is a pull-out spout. As shown in FIG. 24, a user may grasp spout 632 by the hand and actuate a joystick 634 of user input device 630 with a thumb. Joystick 634 permits quick adjustments to temperature and flow rate while spout 632 is pulled out in sprayer mode. In one embodiment, user input device 630 is coupled to controller 120 through a wired connection. In another embodiment, user input device 630 is coupled to controller 120 through a wireless connection. In the wireless configuration, user input device 630 includes a transmitter (not shown) and if two way communication is desired a receiver (not shown) along with a controller (not shown) to control the operation thereof.

Figure 25:
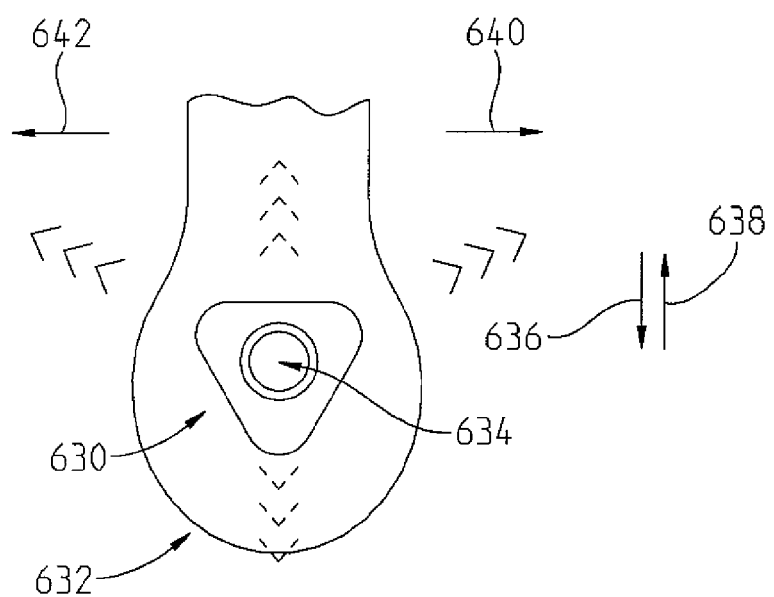
FIG. 25 is a top view of the pull-out spout of FIG. 24 illustrating the functions associated with moving the joystick in various directions.

Referring to FIG. 25, a user may move joystick 634 in direction 636 to increase the flow rate of water and in direction 638 to decrease the flow rate of water. In addition, a user may move joystick 634 generally to the left in direction 642 to increase the temperature of the water and generally to the right in direction 640 to decrease the temperature of the water.

Figure 26:
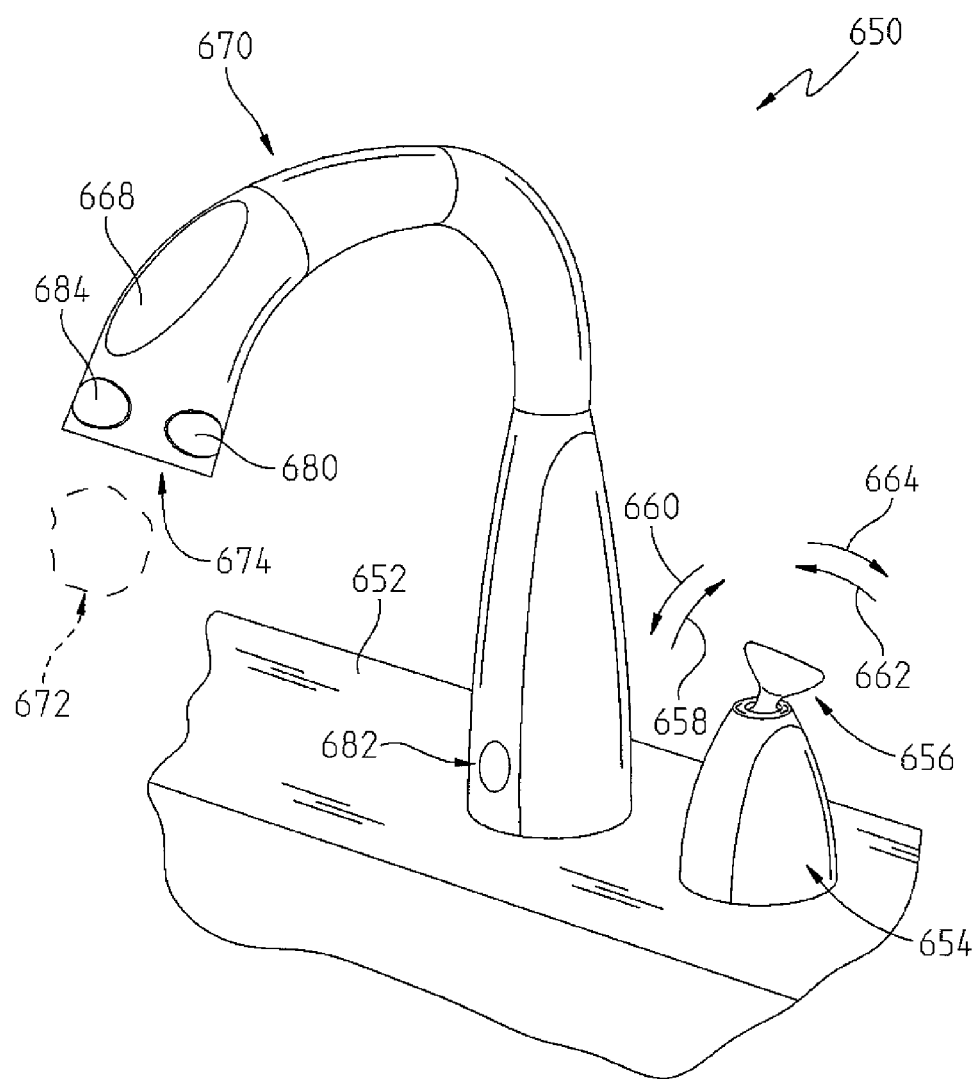
FIG. 26 is a perspective view of a spout and a separate user input device.

Referring to FIG. 26 a spout 650 is shown mounted to a sink deck 652. In one embodiment, spout 650 is mounted to sink deck 652 with connector 340. As explained herein, spout 650 includes various user input capabilities. Further, a separate user input device 654 is shown including a joystick 656. In one embodiment, hall effect sensors track the movement of joystick 656. Additional details of tracking the movement of a joystick type input with Hall effect sensors are provided in U.S. patent application Ser. No. 11/326,986, filed Jan. 5, 2006, titled "VALVE BODY ASSEMBLY WITH ELECTRONIC SWITCHING", the disclosure of which is expressly incorporated by reference herein. The position of joystick 656 is communicated to controller 120 either through a wired connection or a wireless connection. In one embodiment, joystick 656 uses resistive elements to track position.

In one embodiment, joystick 656 is used to indicate the desired temperature and flow rate of water exiting spout 650. A user would move joystick 656 in direction 658 to increase the flow rate of water and in direction 660 to decrease the flow rate of water. A user would move joystick 656 in direction 662 to increase the temperature of water and in direction 664 to decrease the temperature of water.

In one embodiment, the position of joystick 656 is known as the root or default mode. This will be the temperature and flow rate of water exiting spout 650. The flow of water from spout 650 may be activated in various manners. In one embodiment, the flow of water may be activated by touching a tap sensor, such as a capacitive sensor. In the illustrated embodiment, a tap sensor 668 is provided on the end portion 670 of spout 650. In another embodiment, other portions of spout 650 or user input device 656 may include a tap sensor which signals to controller 120 to activate the flow of water from spout 650. In a further embodiment, the flow of water may be activated by the detection of an object in a region 672 below an outlet 674 of spout 650. Thus, spout 650 operates in a hands free manner. In one embodiment, infrared sensors, cameras, or other suitable sensing or viewing devices are used to detect the presence of an object in region 672. Exemplary sensing or viewing devices include digital image sensors such as CCD devices used in digital cameras. In still a further embodiment, end portion 670 of spout 650 is a pull-out wand member and the flow of water may be activated by simply pulling end portion 670 from the remainder of spout 650. In one embodiment, the movement of end portion 670 is detected with hall effect sensors as described in U.S. patent application Ser. No. 11/325,128, filed Jan. 4, 2006, titled "SPOUT ASSEMBLY FOR AN ELECTRONIC FAUCET", U.S. patent application Ser. No. 11/325,284, filed Jan. 4, 2006, titled "SPOUT ASSEMBLY FOR AN ELECTRONIC FAUCET AND METHOD FOR PROVIDING STRAIN RELIEF OF A CABLE", and U.S. patent application Ser. No. 11/700,556, filed Jan. 31, 2007, titled "PULL OUT WAND", the disclosures of which are expressly incorporated by reference herein and is applicable to all the disclosed spouts, each of which may include a pull-out wand member.

In one embodiment, the hands free operation is activated with a wired or wireless proximity sensor that is positioned below an upper surface of sink deck 104. The proximity sensor detects the presence of a person adjacent the cabinet area of the sink in front of the faucet and activates the faucet similar to the hands free operation adjacent the spout described herein. In one embodiment the proximity sensor is an infrared sensor. In one embodiment, the proximity sensor is positioned near the floor to detect the presence of a user's feet. In one embodiment, the proximity sensor is positioned to detect the presence of a user's legs. In one embodiment, the proximity sensor is positioned to detect the presence of a user's torso. Controller 120 activates water delivery system 100 in response to the detection of the user's feet and/or deactivates water delivery system 100 in response to the absence of detection of the user's feet.

In addition to providing water at the root mode setting, controller 120 may provide water through spout 650 as various other settings based on user input. In the illustrated embodiment, a full cold user input 680 is provided as a tap region on a right side of end portion 670 of spout 650. Tapping input 680 indicates to controller 120 that full cold water is desired without requiring the user to change the root mode setting. An indicator light (not shown) beneath tap region 680 illuminates a periphery of region 680 to indicate that region 680 is activated. Flow from spout 650 may be initiated by any of the automatic manners discussed above, tapping region 668, hands free, or pulling out end portion 670 of spout 650.

In one embodiment, two timers are initiated by controller 120 in response to the activation of region 680. A first timer, designated a non-attendance timer, has a first predetermined time period wherein if the user has not commenced with dispensing water through one of the automatic manners within the predetermined time period controller 120 returns the setting to the root mode. Returning the setting to the root mode includes adjusting valve 116 to coincide with the root mode temperature and flow rate. One example, wherein the non-attendance timer may cause the return to the root mode is the situation wherein a user taps function region 680, then leaves to answer phone or door. A second timer, designated a non-irritating timer, has a second predetermined time period wherein if the user has not commenced with dispensing water through one of the automatic manners within the predetermined time period since a previous dispensing controller 120 returns the setting to the root mode. One example, wherein the non-irritating timer may cause the return to the root mode is the situation wherein a user taps function region 680, fills a first glass with cold water and subsequently presents a second glass for filling. If the second glass is presented within the second predetermined timeframe then the second glass also receives full cold water otherwise water at the root setting. The return to root mode may be considered as a safety feature. If the root mode corresponds to a warm setting, then a hot setting selected for a given task would return to a safer temperature after a period of time to prevent the inadvertent dispensing of hot water. In one embodiment, a root mode or other setting is associated with hands free activation of the spout, whereby water at that specific settings is dispensed for hands free activation.

A user may also initiate the dispensing of full cold water from spout 650 by simply holding their finger on region 680. Controller 120 recognizes the hold or grab versus the tap and dispenses water from spout 650. Once the user releases region 680 the non-irritating timer is commenced. At the timeout of the non-irritating timer (the same is applicable to the non-attendant timer) the peripheral illumination of region 680 is stopped indicating a return to root mode.

Further, in embodiments where a large portion or generally all of the spout is touch sensitive, controller 120 is able to distinguish between a touch and a grab. In one example, a tap is less about 350 milliseconds and a grab is greater than about 350 milliseconds. As grasping the spout to orient the spout will not cause the activation of water flow nor the cessation of water flow. In one embodiment, wherein the spout includes a pull-out wand portion, pulling out the wand although a grab will begin the flow of water. The detection of the pulling out of a wand portion is discussed herein. Further, the hands-free sensors will be disabled while the wand is pulled out.

In the illustrated embodiment, a hot user input 682 is provided as a tap region one of a left side (not shown) of end portion 670 of spout 650 or at a base of spout 650. Tapping input 682 indicates to controller 120 that full hot water is desired without requiring the user to change the root mode setting. An indicator light (not shown) beneath tap region 682 illuminates a periphery of region 682 to indicate that region 682 is activated. Flow from spout 650 may be initiated by any of the automatic manners discussed above, tapping region 668, hands free, or pulling out end portion 670 of spout 650.

In one embodiment, controller 120 sets an upper limit to the temperature of hot water dispensed to prevent scalding. In one example, the user presses an input, such as a button, at the base of the spout to activate the upper limit of the temperature of hot water. As such, higher temperature water may be dispensed when the button has not been depressed. When the button is pressed a red light is activated to illuminate the button.

In one embodiment, two timers, a non-attendance timer and a non-irritating timer, are initiated by controller 120 in response to the activation of region 682. These timers function the same as discussed above in connection with region 680. As with region 680, a user may also initiate the dispensing of full hot water from spout 650 by simply holding their finger on region 682. Controller 120 recognizes the hold versus the tap and dispenses water from spout 650. Once the user releases region 682 the non-irritating timer is commenced. At the timeout of the non-irritating timer (the same is applicable to the non-attendant timer) the peripheral illumination of region 682 is stopped indicating a return to root mode.

In the illustrated embodiment, a preset user input 684 is provided as a tap region on the front of end portion 670 below tap region 684. Tapping input 684 indicates to controller 120 to set valve 116 to a user preset temperature and flow rate. An indicator light (not shown) beneath tap region 684 illuminates a periphery of region 684 to indicate that region 684 is activated. Flow from spout 650 may be initiated by any of the automatic manners discussed above, tapping region 668, hands free, or pulling out end portion 670 of spout 650.

In one embodiment, two timers, a non-attendance timer and a non-irritating timer, are initiated by controller 120 in response to the activation of region 684. These timers function the same as discussed above in connection with region 680. As with region 680, a user may also initiate the dispensing of water at the preset condition from spout 650 by simply holding their finger on region 684. Controller 120 recognizes the hold versus the tap and dispenses water from spout 650. Once the user releases region 684 the non-irritating timer is commenced. At the timeout of the non-irritating timer (the same is applicable to the non-attendant timer) the peripheral illumination of region 684 is stopped indicating a return to root mode.

User preset 684 may be programmed by selecting the desired temperature and flow rate with joystick 656 and tapping region 684 three times. In response the peripheral light around region 684 will flicker three times to indicate setting has been accepted. In another embodiment, multiple user presets are similar to region 684 are provided.

In one embodiment, tapping on preset region 684 cycles the faucet through various preset modes of operation, such as vegetable washing. An associated display provides an indication of the current mode and/or water characteristic settings. Further, in an additional embodiment, portion 670 of spout 650 includes a plurality of sensors, such as infrared sensors, (not shown) on a side of portion 670. The sensors are capable of detecting the presence of a user's hand. In one example, the sensors are arranged vertically to detect a direction of travel of a hand, either upward or downward. In one embodiment, the user waves the hand in an upward fashion to indicate to controller 120 to increase the temperature of the water or another water characteristic and waves the hand in a downward fashion to indicate to controller 120 to decrease the temperature of the water or another water characteristic. In another embodiment, the user waves the hand in a first direction, such as upward, to initiate the flow of water and in a second direction, such as downward, to cease the flow of water.

Figure 27A:
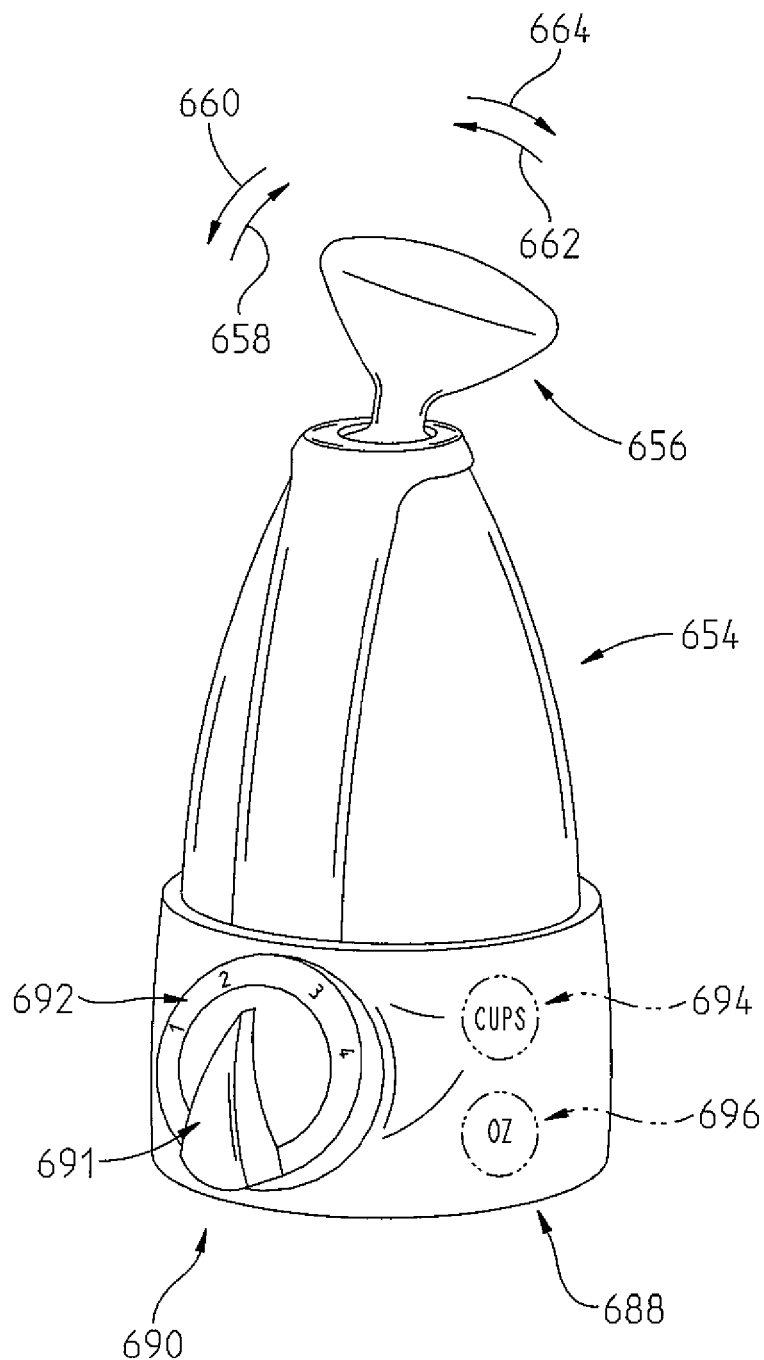
FIG. 27A is a perspective view of the user input device of FIG. 26 including a base portion which includes metering inputs.

Referring to FIG. 27A, user input device 654 is shown further including a base portion 688 which is used to select specific volumes of water to be dispensed by spout 650. Base portion 688 includes an amount input 690, illustratively a dial 691 having a plurality of corresponding indicia 692. With base portion 688 a user may precisely dispense a required amount of water for a given task, such as preparing a certain food item. In one embodiment, base portion 688 is separateable from the remainder of user input device 654. In another embodiment, base portion 688 and the remainder of user input device 654 are not separateable by a user. Further, base portion 688 includes visual indications for which unit the indicia 692 of dial 691 correspond, illustratively cups 694 and ounces 696.

A user provides the requisite input to base portion 688 as follows. First, tapping dial 691 activates the selection of a specific volume of fluid to be dispensed. Further, tapping of dial 691 toggles through the various unit options centiliters, liters, quarts, illustratively cups and ounces. The user also positions the selector dial 691 to provide the proper amount of the selected unit, such as two and one-half cups. The user may position the selector dial to select the proper amount prior to selecting the proper units. The dispensing of the precise amount of fluid may be the result of the automatic modes discussed above, such as hands-free and tapping region 668. Once the precise amount of water has been dispensed the non-irritating timer is commenced. At the timeout of the non-irritating timer (the same is applicable to the non-attendant timer) the illumination of the corresponding unit 694 and 696 is stopped indicating a return to root mode. In one embodiment, controller 120 adjusts the flow rate of the water based on the quantity of liquid to be dispensed. For example, controller 120 sets a higher flow rate when several quarts are to be dispensed, as opposed to when a single cup is to be dispensed. This ensures that large containers fill quickly and fluid does not splash out of small containers.

Figure 27B:
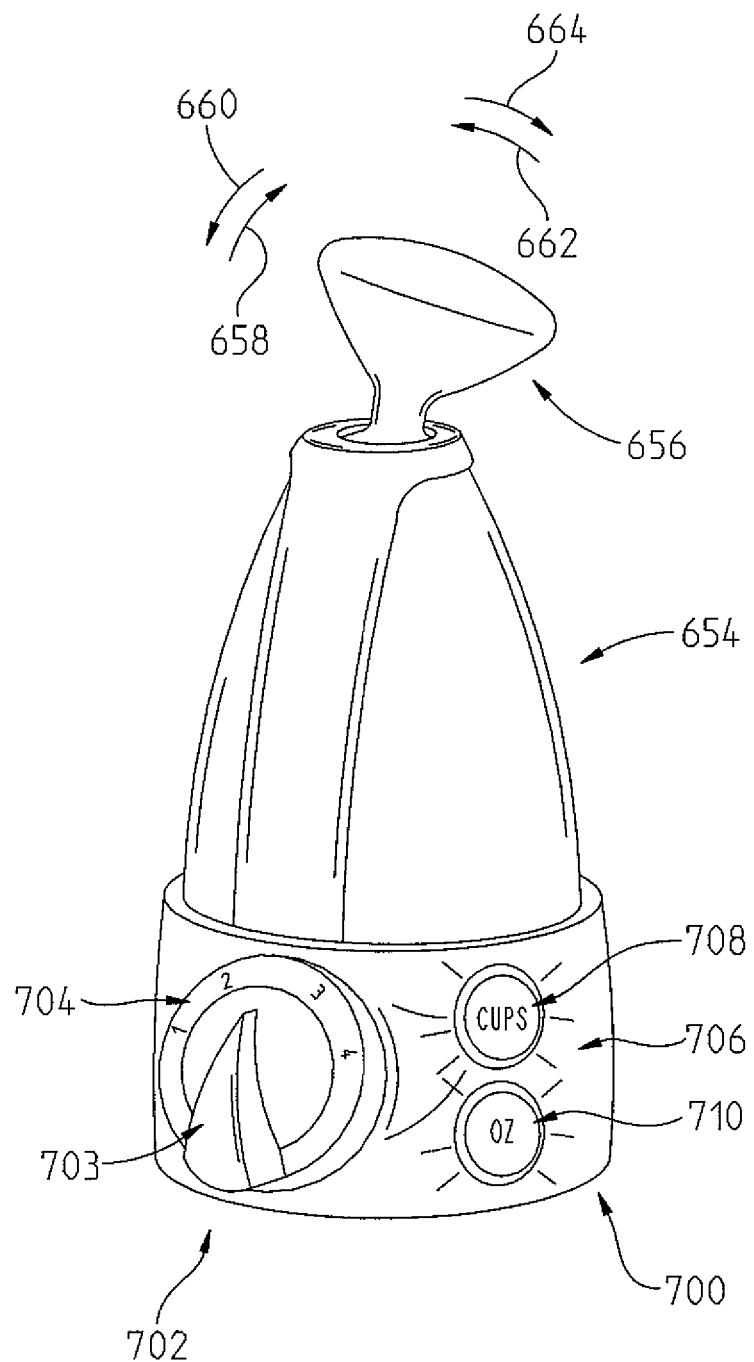
FIG. 27B is a perspective view of the user input device of FIG. 26 including a base portion which includes metering inputs.

Referring to FIG. 27B, user input device 654 is shown further including a base portion 700 which is used to select specific volumes of water to be dispensed by spout 650. Base portion 700 includes an amount input 702, illustratively a dial 703 having a plurality of corresponding indicia 704. With base portion 700 a user may precisely dispense a required amount of water for a given task, such as preparing a certain food item. In one embodiment, base portion 700 is separateable from the remainder of user input device 654. In another embodiment, base portion 700 and the remainder of user input device 654 are not separatable by a user. Further, base portion 700 includes unit inputs 706, illustratively cups 708 and ounces 710. In one embodiment, unit inputs 706 are buttons. In another embodiment, unit inputs 706 are touch regions.

A user provides the requisite input to base portion 700 as follows. By touching the appropriate input 708 or 710, the user selects the units. By positioning the selector dial 703 the proper amount of fluid is indicated. The dispensing of the precise amount of fluid may be the result of the automatic modes discussed above, such as hands-free and tapping region 668. Once the precise amount of water has been dispensed the non-irritating timer is commenced. At the timeout of the non-irritating timer (the same is applicable to the non-attendant timer) the illumination of the corresponding unit 708 or 710 is stopped indicating a return to root mode.

Figure 28:
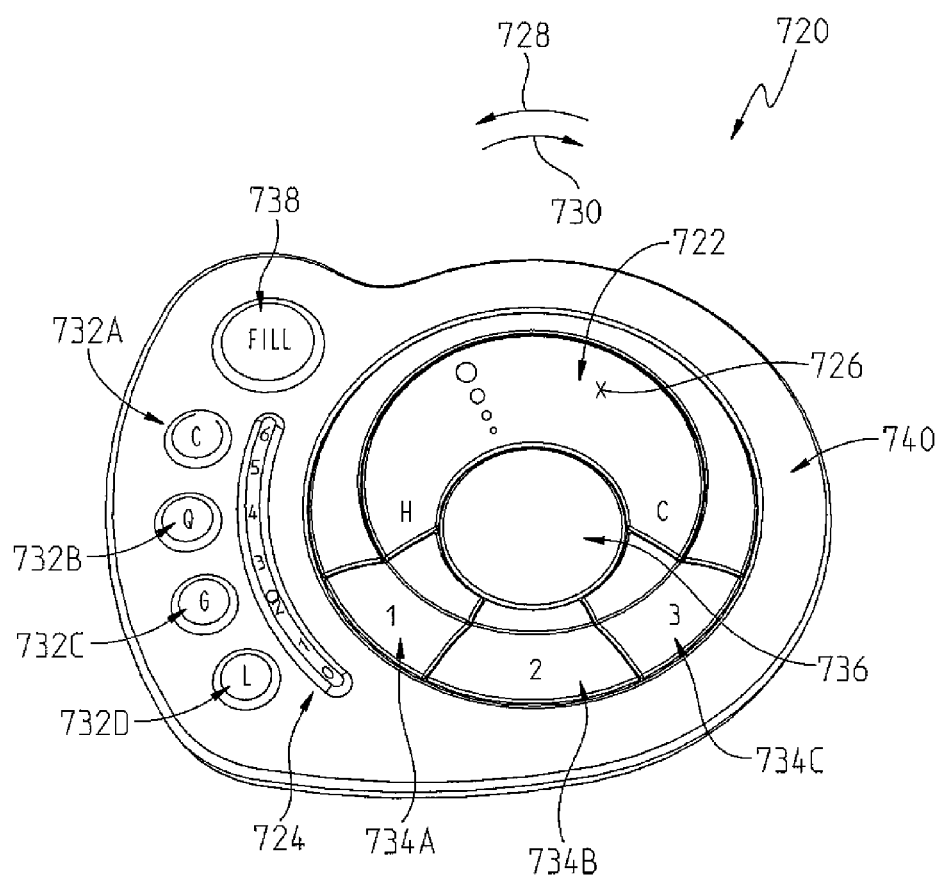
FIG. 28 is a perspective view of a portable user input device.

Referring to FIG. 28, another exemplary user input device 720 is shown. User input device 720 may be located at any of the locations depicted in FIG. 14, but is illustratively located in location 390F. User input device 720 is a portable device. User input device 720 includes two touch sensitive faces 722 and 724. In one embodiment, faces 722 an 724 include a plurality of capacitive sensors which detect when a user touches various portions of the respective face. In one embodiment, user input device 720 is coupled to controller 120 through a wired connection. In another embodiment, user input device 720 is coupled to controller 120 through a wireless connection. In the wireless configuration, user input device 720 includes a transmitter (not shown) and if two way communication is desired a receiver (not shown) along with a controller (not shown) to control the operation thereof.

Touch sensitive face 722 is used to control temperature and flow rate. Similar to user input device 400 (see FIG. 15) a user may select a temperature and a flow rate by simply tapping a location 726 on face 722. Further, a user may touch face 722 and drag the finger to adjust temperature and flow rate. Dragging the finger in direction 728 increases the temperature of the water. Dragging the finger in direction 730 decreases the temperature of the water. Dragging the finger radially outward increases the flow rate of the water. Dragging the finger radially inward decreases the flow rate of the water.

Touch sensitive face 724 is used to control the volume of water delivered by spout 650. With touch screen 724 a user may select an amount by touching the corresponding portion of touch face 724 or by sliding the finger along touch face 724 to the appropriate amount. In addition, four units buttons 732A-D are provided. A user selects the appropriate units by depressing the corresponding button. Button 732A corresponds to cups. Button 732B corresponds to quarts. Button 732C corresponds to gallons. Button 732D corresponds to liters.

User input device 720 further includes three preset buttons 734A-C. The user selects a temperature and flow rate with touch screen 722 and potentially a volume with touch screen 724 and unit buttons 732A-D and then assigns those values to one of presets 734A-C. In one embodiment, the values once selected are assigned in the following manner. A user depresses a program button 736 followed by depressing the respective one of presets 734A-C.

After the desired values are selected or a preset has been selected, the user initiates delivery of the water by depressing the fill button 738. In one embodiment, the delivery of water is initiated by the sensing of a tap sensor on the spout or the detection of an object with the hands free sensor. User input device 720 then transmits or otherwise makes available to controller 120 the selections made. Controller 120 sets valve 116 accordingly. In one embodiment a plurality of LEDs count down the quantity being dispensed. In one embodiment, touch screen 724 includes associated LEDs that count down the quantity being dispensed.

User input device 720 includes a removable cover 740. A user may remove cover 740 and replace cover 740 with another cover 740 having a preferred color or appearance, such as to match the décor of the room.

Referring to FIG. 29, another exemplary user input device 750 is shown. User input device 750 may be located at any of the locations depicted in FIG. 14, but is illustratively located in location 390F. User input device 750 is a portable device. User input device 750 includes a touch sensitive face 752 and four presets 724A-D. In one embodiment, face 722 includes a plurality of capacitive sensors which detect when a user touches various portions of face 722. In one embodiment, user input device 750 is coupled to controller 120 through a wired connection. In another embodiment, user input device 750 is coupled to controller 120 through a wireless connection. In the wireless configuration, user input device 750 includes a transmitter (not shown) and if two way communication is desired a receiver (not shown) along with a controller (not shown) to control the operation thereof.

Touch sensitive face 752 is used to control temperature, flow rate, and flow pattern. Similar to user input device 530 (see FIG. 20) a user may select a temperature by simply tapping a temperature control 754 which includes a plurality of preset temperatures. A user may select one of the preset temperatures by touching the corresponding icon 756A-J. Also, temperature control 754 works as a slider control wherein a user may touch a portion of temperature control 754 and drag the finger up or down to change the temperature. Dragging the finger in direction 758 decreases the temperature. Dragging the finger in direction 760 increases the temperature.

In addition, a user may select a flow rate by simply tapping a flow rate control 762 which includes a plurality of preset flow rates. A user may select one of the preset flow rates by touching the corresponding icon 764A-J. Also, flow rate control 762 works as a slider control wherein a user may touch a portion of flow rate control 762 and drag the finger up or down to change the flow rate. Dragging the finger in direction 758 increases the flow rate. Dragging the finger in direction 760 decreases the flow rate.

User input device 750 further includes a flow pattern control 766. A user may select a stream configuration flow pattern by touching icon 768A. A user may select a spray configuration flow pattern by touching icon 768B. Controller 120 adjusts a diverter valve in the corresponding spout, such as spout 512, based on the selection of either icon 768A and 768B.

User input device 750 further includes four presets 770A-D. Presets 770 may be set to user defined settings or presets such as washing dishes, washing foodstuffs, washing hands, filling containers, filtered water, delivery of hot water. Presets 770 may be programmed by tapping the preset multiple times, such as three, holding the preset for a longer period of time, or remotely across the wireless network.

In one embodiment, controller 120 receives an input from a microphone and sets valve 116 and or diverter valve 131 based on voice commands stated by the user. Exemplary voice commands include "water on", "water off", "temperature increase", and "temperature decrease", "wash dishes", "wash hands", "wash vegetables", "cold water", and "hot water". Additional exemplary voice commands relate to tasks and include "glass of water".

In one embodiment, controller 120 receives an input from a camera or other input which monitors a region below spout 130, such as region 672 discussed in connection with spout 650. However, instead of simply detecting the presence of an object, controller 120 based on the signals received from the camera identifies the object type, the presentment, and adjusts valve 116 and/or valve 131 accordingly.

As such, controller 120 may set valves 116 and/or valve 131 for the task of washing foodstuffs if a foodstuff is identified. In one example, when a presentment of foodstuffs, such as vegetables or meats, is identified cool water with a light spray is dispensed. Similarly, controller 120 may set valves 116 and/or valve 131 for the task of washing dishes if a dish is identified. In one example, when a presentment of kitchenwares, such as dishes or pots, is identified hot water with an aggressive flow pulsation is dispensed. Further, controller 120 may set valves 116 and/or valve 131 for the task of washing hands if a hand is identified. In one example, when a presentment of human skin, such as hands, is identified warm water with a mild flow pulsations is dispensed. In one embodiment, the flow of water is initiated when a presentment is detected and stopped when the presentment is no longer detected.

Figure 30:
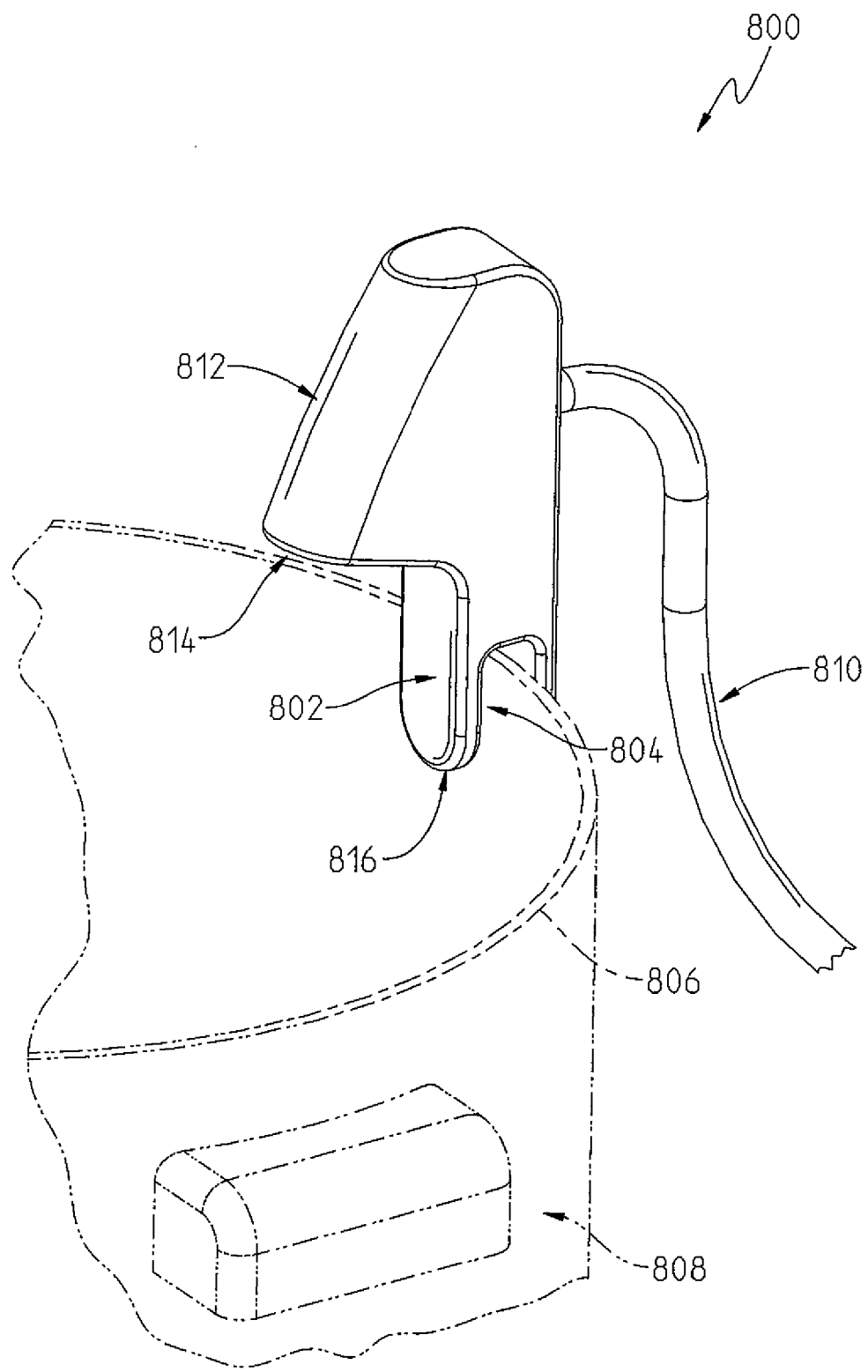
FIG. 30 is a partial perspective view of a first container filler coupled to a first container.

Referring to FIG. 30, a pot filler accessory 800 is shown. Pot filler 800 includes a lower portion 802 having a recess 804 which may be positioned over a lip 806 of a pot 808. Pot filler 800 further includes a water conduit 810 which may be plumbed into the wall or connected to a port of connector 340. In one embodiment, water conduit 810 is a retractable water conduit.

Pot filler 800 includes a tap region 812 which activates or deactivates the flow of water from an outlet 814 of pot filler 800. In one embodiment, pot filler 800 includes a valve and a controller which is activated by tap region 810. In another embodiment, wherein pot filler 800 is connected to connector 340 water conduit 810 includes an electrical cable that is connected to connection 378 of connector 340. The input from tap region 810 is communicated to controller 120 through the electrical cable. In yet another embodiment, pot filler 800 includes a controller, a valve, and a receiver (and a transmitter if two way communication is desired) which communicates with controller 120 or user input 140 wirelessly.

Pot filler 800 further includes a sensor 816 in lower portion 802. Sensor 816 detects the level of fluid in pot 808 through a capacitive sensor or a resistive sensor.

Figure 31:
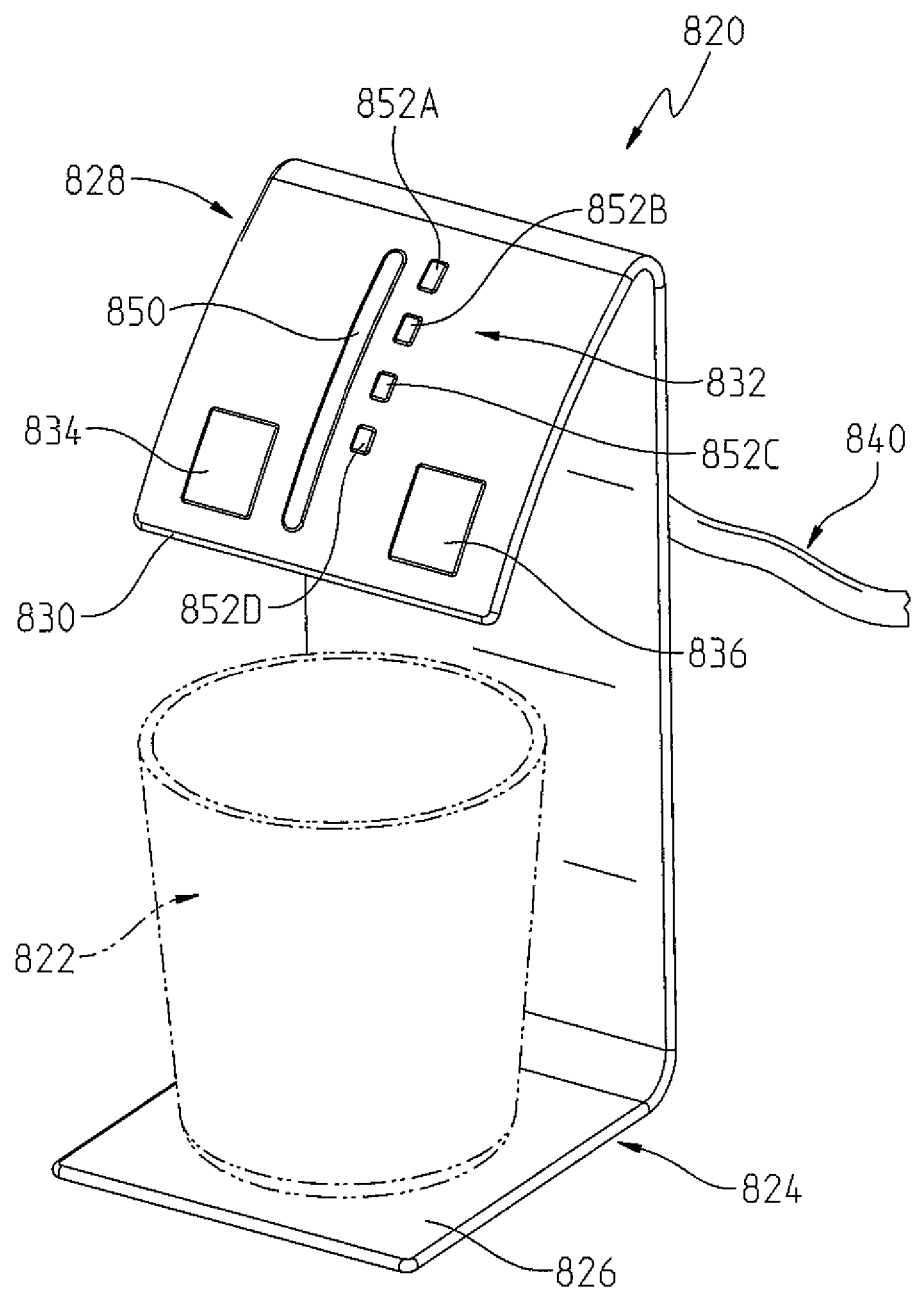
FIG. 31 is a perspective view of a second container filler and a second container.
Figure 32A:
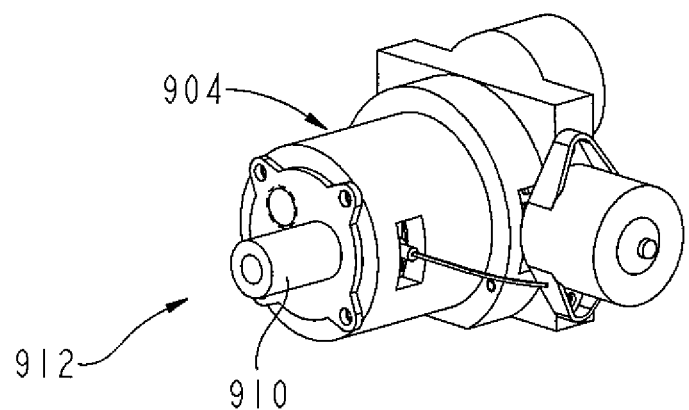
FIG. 32A is a perspective view of an exemplary mixing valve
Figure 32B:
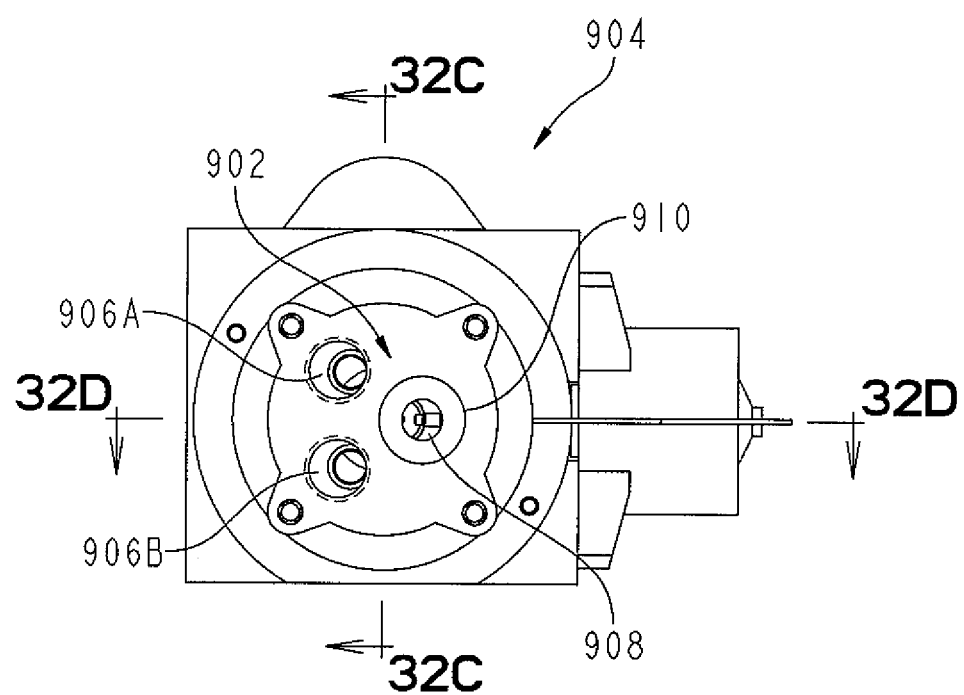
FIG. 32B is bottom view of the mixing valve of FIG. 32A.
Figure 32C:
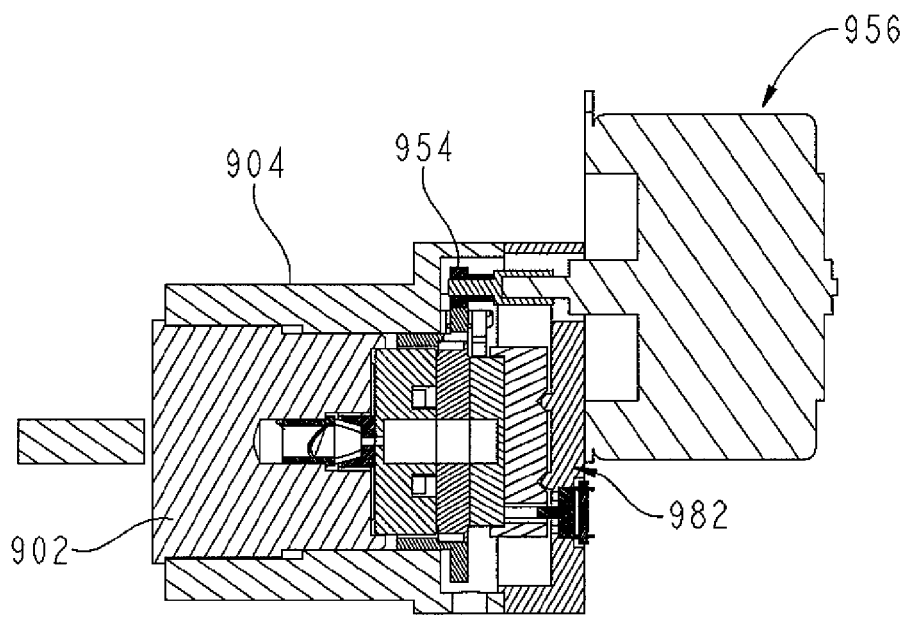
FIG. 32C is a sectional view of the mixing valve of FIG. 32A along line A in FIG. 32B.
Figure 32D:
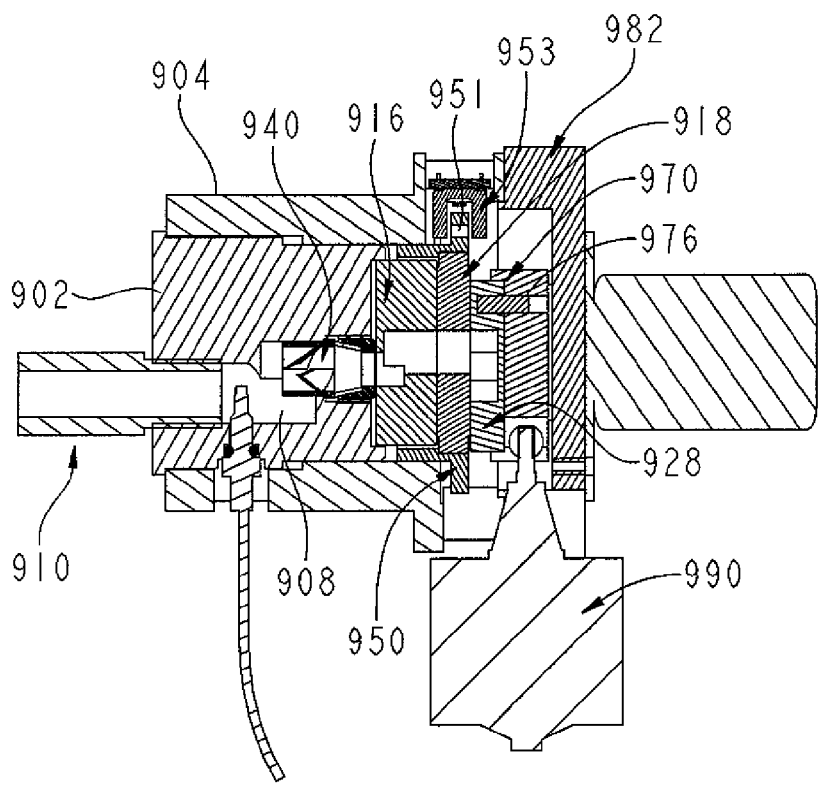
FIG. 32D is a sectional view of the mixing valve of FIG. 32A along line B in FIG. 32B.
Figure 33A:
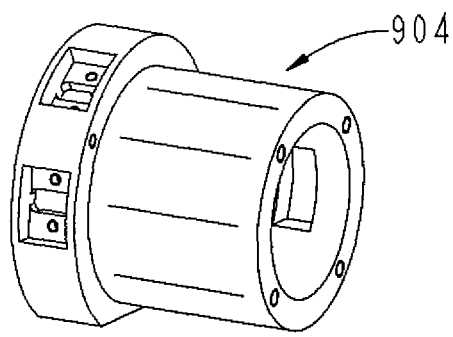
FIG. 33A is a perspective view of a housing of the mixing valve of FIG. 32A.
Figure 33B:
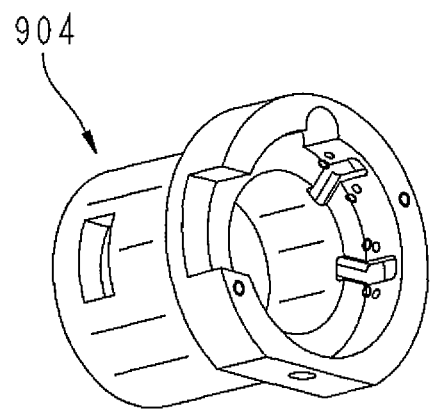
FIG. 33B is another perspective view of the housing of FIG. 33A.
Figure 33C:
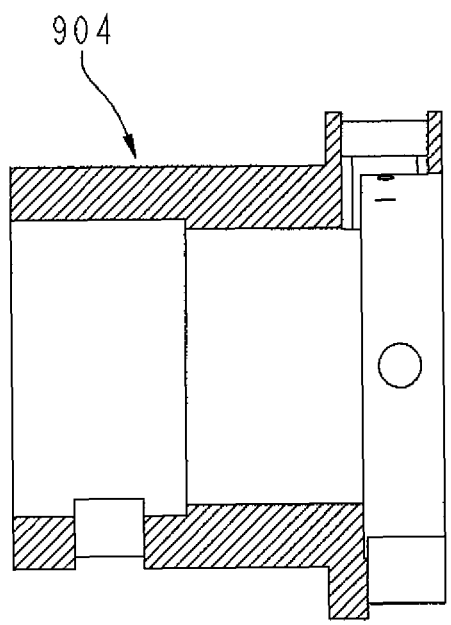
FIG. 33C is a sectional view of the housing of FIG. 33A.
Figure 34A:
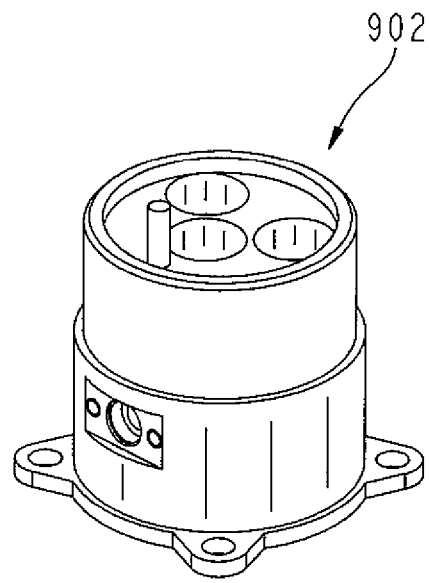
FIG. 34A is a perspective view of a valve body of the mixing valve of FIG. 32A.
Figure 34B:
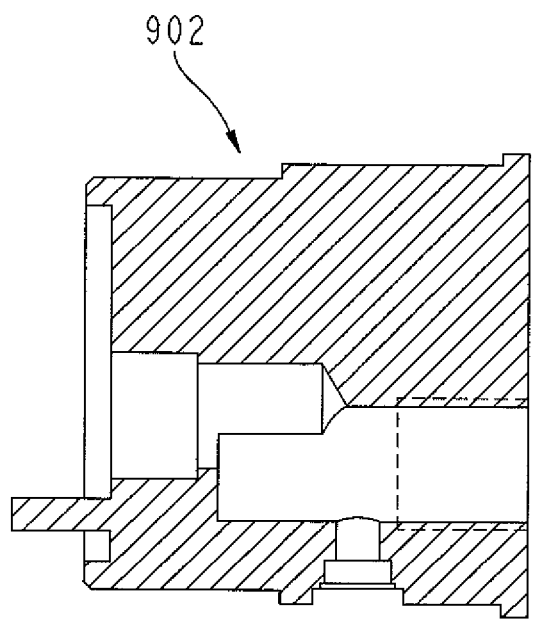
FIG. 34B is a sectional view of the valve body of FIG. 34A.
Figure 34C:
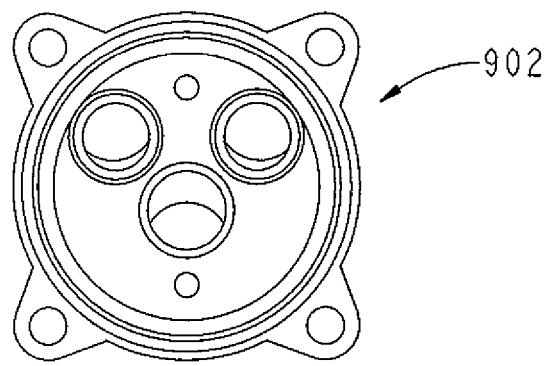
FIG. 34C is a bottom view of the valve body of FIG. 34A.
Figure 34D:
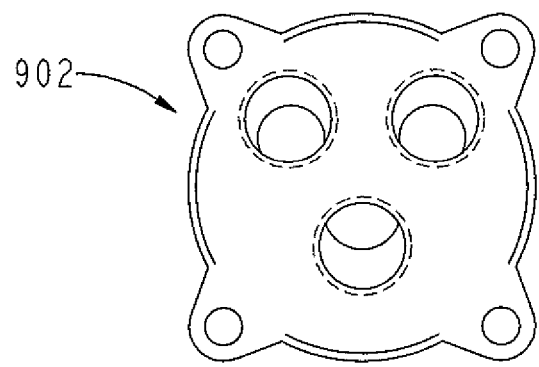
FIG. 34D is a top view of the valve body of FIG. 34A.
Figure 34E:
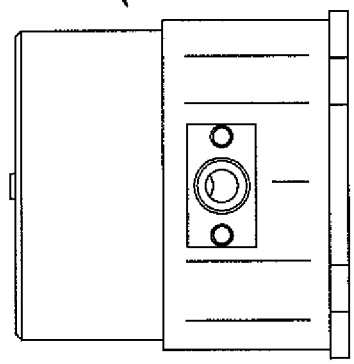
FIG. 34E is a side view of the valve body of FIG. 34A.

Referring to FIG. 31 a second container filling device 820 is shown. Container filling device 820 is illustrated for filling drinking glasses 822. However, container filling device 820 may be used to fill other types of containers, such as pots. Container filling device 820 includes a lower portion 824 having a pressure sensitive pad (not shown) in a top surface 826 which is used to detect the presence of container 822. Container filling device 820 includes an upper portion 828 which includes a sensor (not shown) in a lower edge 830. The sensor in lower edge 830 confirms the proper placement of container 822 below an outlet (not shown) of container filling device 820.

Container filling device 820 further includes a user interface 832 in upper portion 828. User interface 832 includes a touch sensitive area 834 which corresponds to hot water. A user dispenses hot water by pressing area 834. Hot water is dispensed until the user is no longer touching area 834. In one embodiment, pressing area 834 will not dispense hot water unless the sensor in the lower edge 830 and/or the pressure sensitive pad confirm the location of container 822. User interface 832 further includes a touch sensitive area 836 which corresponds to cold water. A user dispenses cold water by pressing area 836. Cold water is dispensed until the user is no longer touching area 836.

User interface 832 further includes various metered of precise volume settings. Control 850 is a slider control and adjusts a flow rate. Controls 852A-D are presets. In one embodiment, presets 852A-D correspond to preset volumes, such that filling device 820 is an electronic measuring cup. In one embodiment, presets 852A-D may be set remotely over the wireless network.

Container filling device 820 further includes a water conduit 840 which may be plumbed into the wall or connected to a port of connector 340. In one embodiment, container filling device 820 includes a valve and a controller which is activated by touching region 834 or 836. In another embodiment, wherein container filling device 820 is connected to connector 340 water conduit 810 includes an electrical cable that is connected to connection 378 of connector 340. The input from tap region 810 is communicated from container filling device 820 to controller 120 through the electrical cable.

Both accessory 800 and 820 may be used in conjunction with other user input devices, such as user input device 720. For example, a user may connect accessory 800 to connector 340 and container 808. The user would then specify a metered quantity of water to be dispensed with the input of device 720. Controller 120 then causes the dispensing of the specified quantity of water to container 808 through accessory 800.

The features described herein, including the use of an electronic proportioning valve, wireless connections to a user input device, metering, settable user inputs, function based user inputs, and/or touch slide controls, may be incorporated into additional water deliver systems such as the water delivery systems disclosed in U.S. patent application Ser. No. 11/325,927, filed Jan. 5, 2006, titled "METHOD AND APPARATUS FOR DETERMINING WHEN HANDS ARE UNDER A FAUCET FOR LAVATORY APPLICATIONS"; U.S. patent application Ser. No. 11/324,901, filed Jan. 4, 2006, titled "BATTERY BOX ASSEMBLY"; U.S. patent application Ser. No. 11/325,128, filed Jan. 4, 2006, titled "SPOUT ASSEMBLY FOR AN ELECTRONIC FAUCET"; U.S. patent application Ser. No. 11/325,284, filed Jan. 4, 2006, titled "METHOD AND APPARATUS FOR PROVIDING STRAIN RELIEF OF A CABLE"; U.S. patent application Ser. No. 11/326,986, filed Jan. 5, 2006, titled "VALVE BODY ASSEMBLY WITH ELECTRONIC SWITCHING"; U.S. patent application Ser. No. 11/326,989, filed Jan. 5, 2006, titled "POSITION-SENSING DETECTOR ARRANGEMENT FOR CONTROLLING A FAUCET"; U.S. Pat. No. 6,962,168, issued Nov. 8, 2005, titled "CAPACITIVE TOUCH ON/OFF CONTROL FOR AN AUTOMATIC RESIDENTIAL FAUCET" U.S. Pat. No. 6,968,860, issued Nov. 29, 2005, titled "RESTRICTED FLOW HANDS-FREE FAUCET" U.S. Published Patent Application 2005/0151101A1, published on Jul. 14, 2005, titled "CONTROL ARRANGEMENT FOR AN AUTOMATIC RESIDENTIAL FAUCET"; and U.S. Published Patent Application 2005/0150556A1, published on Jul. 14, 2005, titled "CONTROL ARRANGEMENT FOR AN AUTOMATIC RESIDENTIAL FAUCET", the disclosures of each being expressly incorporated by reference herein.

In one embodiment, the system described in U.S. patent application Ser. No. 11/325,927, filed Jan. 5, 2006, titled "METHOD AND APPARATUS FOR DETERMINING WHEN HANDS ARE UNDER A FAUCET FOR LAVATORY APPLICATIONS", the disclosure of which is expressly incorporated by reference herein, incorporates an additional criteria for the hands free activation. Once the hands free is activated, the more stringent activation criteria (e.g. stable signal) is disabled for a period of time, such as a 30 second time window. This has the effect of boosting performance by shortening hands free response time when objects are rapidly moving in and out of the water stream. After the 30 second window has expired the more stringent criteria will again applied with unstable signals to prevent false hands free activations. In one embodiment, the above features are incorporated into the hand free operation of water delivery system 100.

Referring to FIGS. 32-41F, an exemplary mixing valve 900 is shown. Referring to FIG. 32C and FIG. 32D, mixing valve 900 includes a valve body 902 which is positioned in a housing 904. Valve body includes two input conduits 906A (see FIG. 32B) and 906B (see FIG. 32B) which are connected to and in fluid communication with respective sources of water, such as hot water and cold water and an output conduit 908 which is in fluid communication with a conduit of fitting 910 and is ultimately provided to spout 130 or other water delivery device. Both inputs 906A and 906B and output 908 are provided on a first end 912 of mixing valve 900.

Water passing through inputs 906A and 906B are communicated to respective openings 914 (see FIG. 35 wherein valve member 916 is shown flipped to better illustrate openings 914) in static valve member 916. Water is then communicated through respective openings 920 (see FIG. 35) in temperature control valve member 918 and onto flow control valve member 928, if the respective openings 920 are in fluid communication with respective openings 926. As explained herein temperature control valve member 918 is rotatable is directions 922 and 924. Such rotation changes whether one or both of respective openings 920 are in fluid communication with respective openings 926 and the extent to which each of respective openings 920 are in fluid communication with respective openings 926.

Water is communicated from respective openings 920 to opening 926 in flow control valve member 928, if the respective openings 920 are in fluid communication with opening 926. Flow control valve member is translatable relative to temperature control valve member 918 in directions 930 and 932. Such translation changes whether openings 920 are in fluid communication with opening 926 and the extent to which openings 920 are in fluid communication with opening 926. Water is then communicated from opening 926 back through temperature control valve member 918 through opening 932, through opening 934 in static valve member 916, and onto output 908 in valve body 902.

Figure 35:
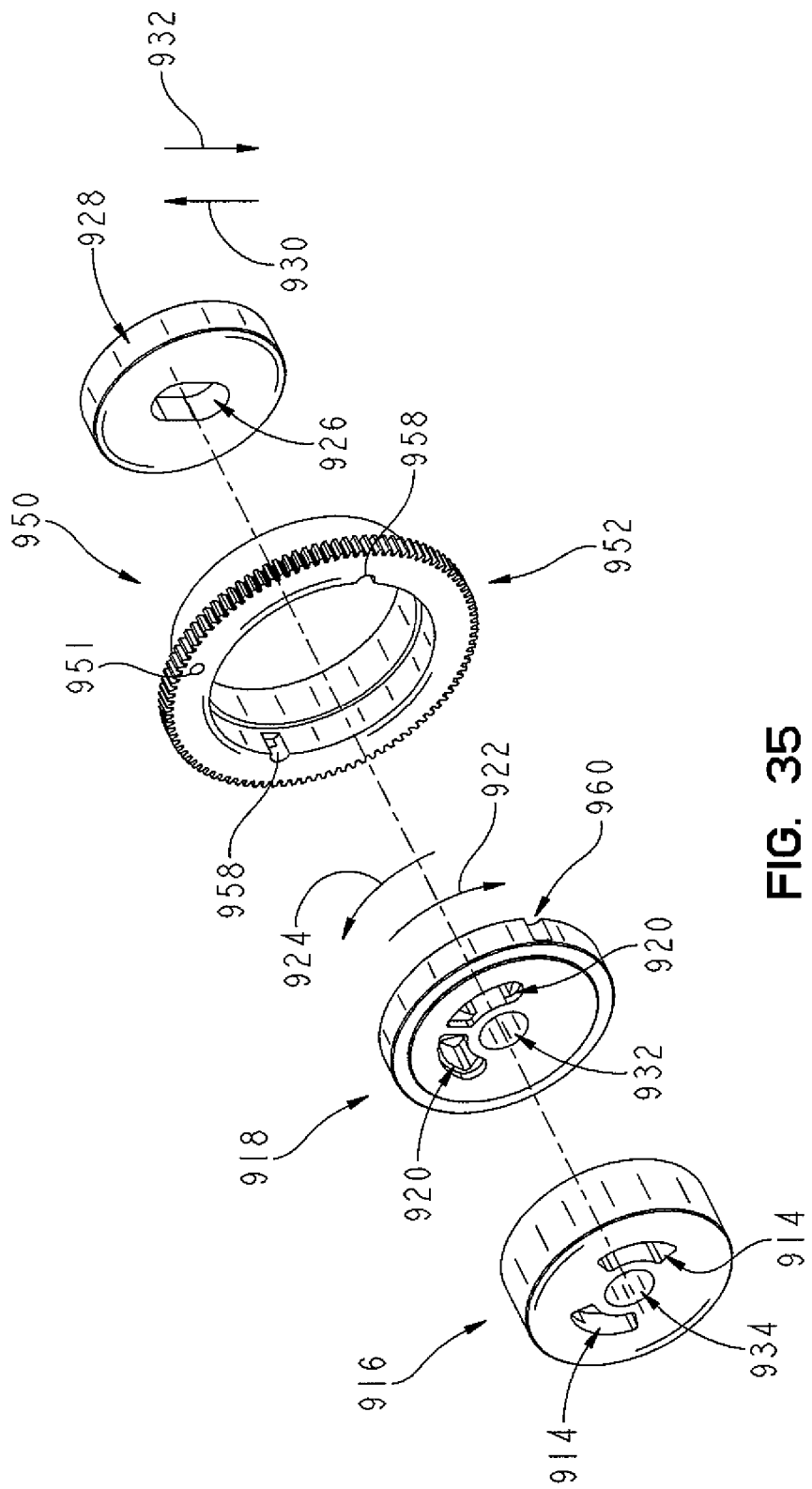
FIG. 35 is an exploded view of the three valve plates and the valve plate retainer of the mixing valve of FIG. 32A, the three valve plates including a static valve member, a temperature control valve member; and a flow control valve member.
Figure 36C:
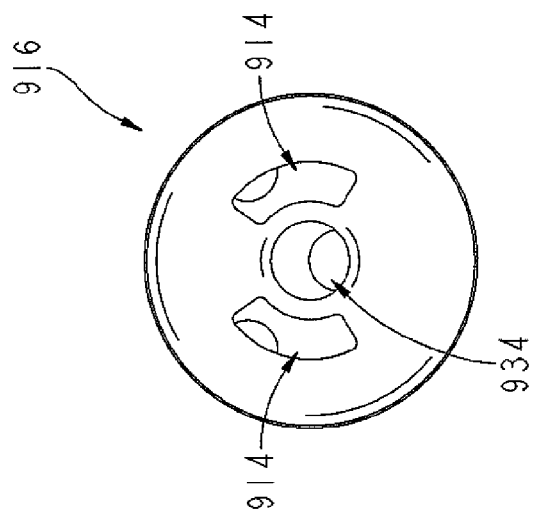
FIG. 36C is a second end view of the static valve member of FIG. 35.
Figure 36B:
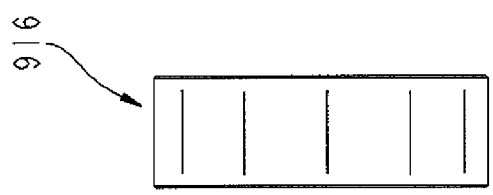
FIG. 36B is a first side view of the static valve member of FIG. 35.
Figure 36D:
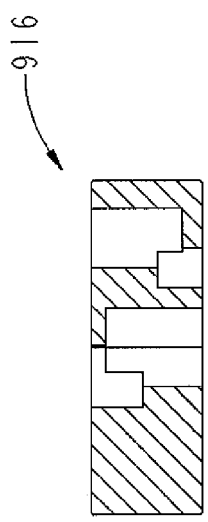
FIG. 36D is a sectional view of the static valve member of FIG. 35.
Figure 36A:
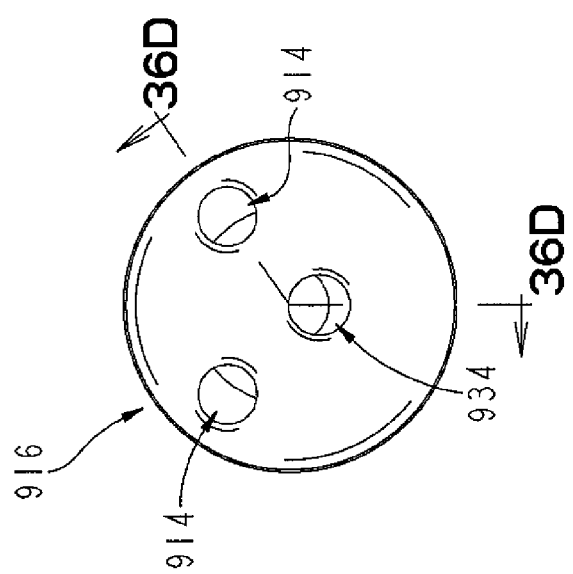
FIG. 36A is a first end view of the static valve member of FIG. 35.
Figure 37C:
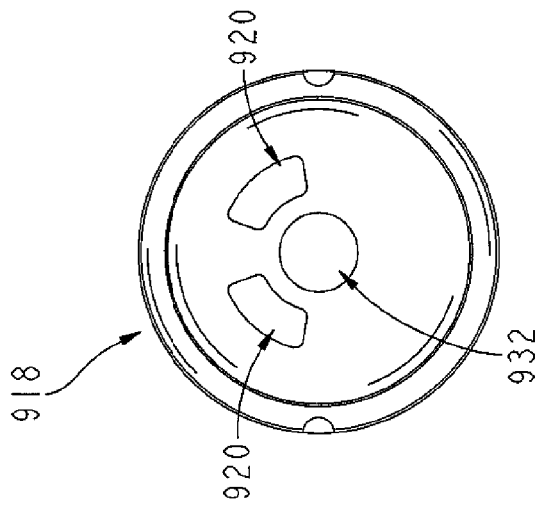
FIG. 37C is a second end view of the temperature control valve member of FIG. 35.
Figure 37B:
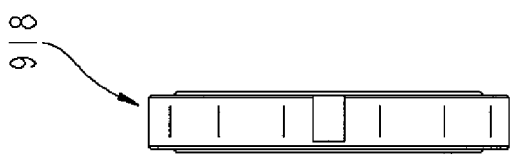
FIG. 37B is a first side view of the temperature control valve member of FIG. 35.
Figure 37D:
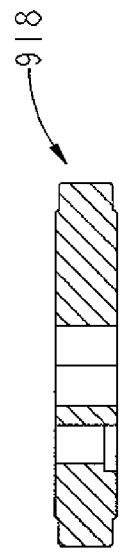
FIG. 37D is a sectional view of the temperature control valve member of FIG. 35.
Figure 37A:
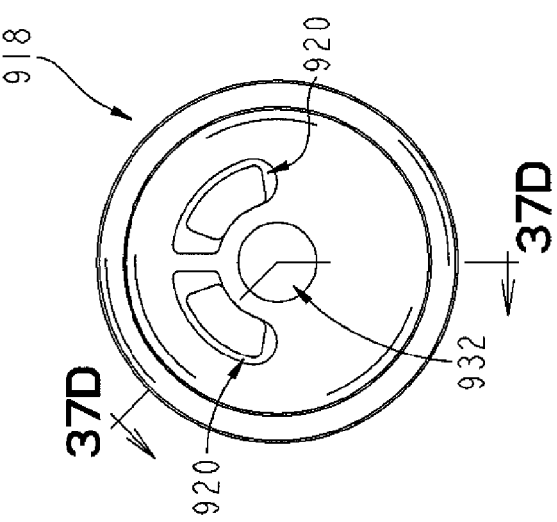
FIG. 37A is a first end view of the temperature control valve member valve of FIG. 35.
Figure 38B:
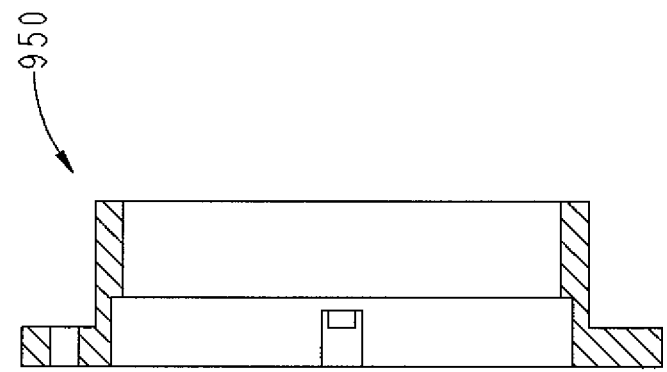
FIG. 38B is a sectional view of the valve retainer of FIG. 35.
Figure 38A:
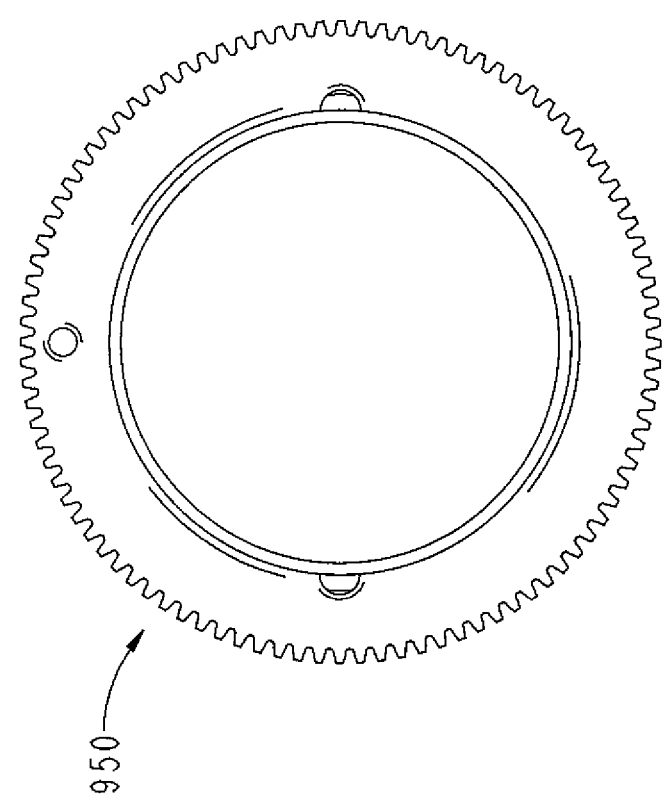
FIG. 38A is an end view of the valve retainer of FIG. 35.
Figure 39C:
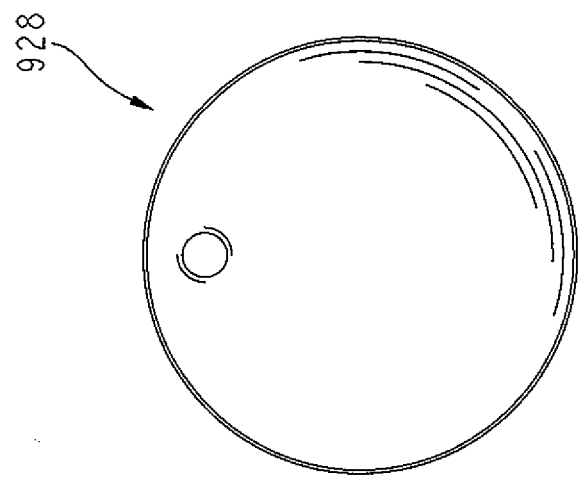
FIG. 39C is a second end view of the flow control valve member of FIG. 35.
Figure 39B:
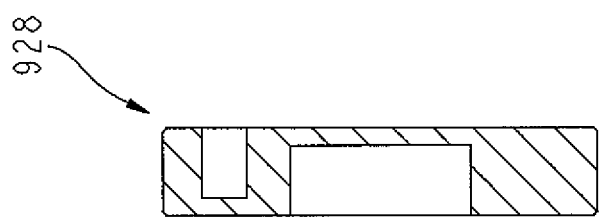
FIG. 39B is a sectional side view of the flow control valve member of FIG. 35.
Figure 39A:
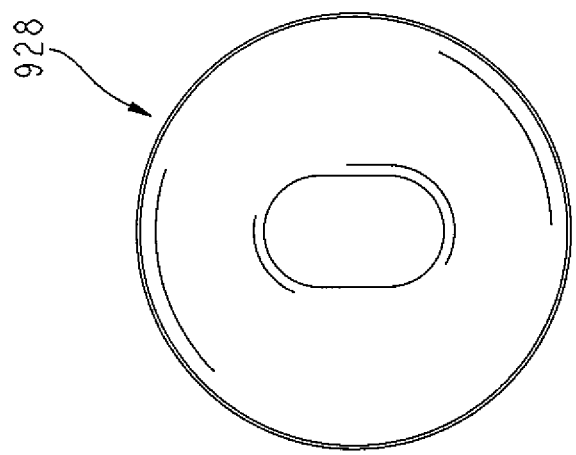
FIG. 39A is a first end view of the flow control valve member valve of FIG. 35.
Figure 40A:
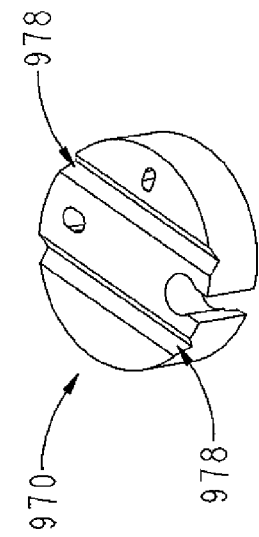
FIG. 40A is a perspective view of a second valve retainer of FIG. 32A.
Figure 40C:
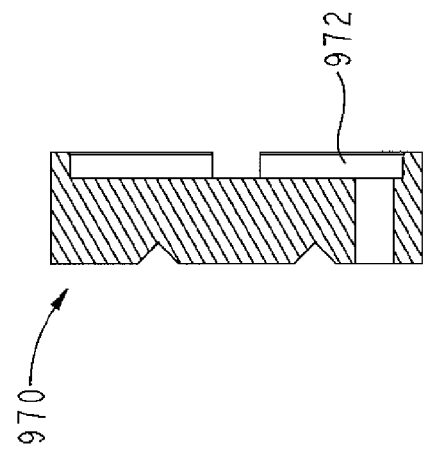
FIG. 40C is a first sectional view of the second valve retainer of FIG. 32A.
Figure 40D:
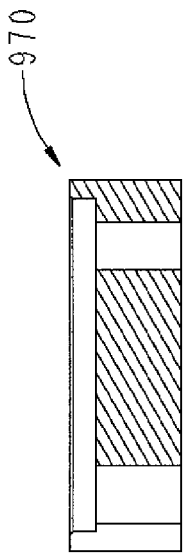
FIG. 40D is a second sectional view of the second valve retainer of FIG. 32A.
Figure 40B:
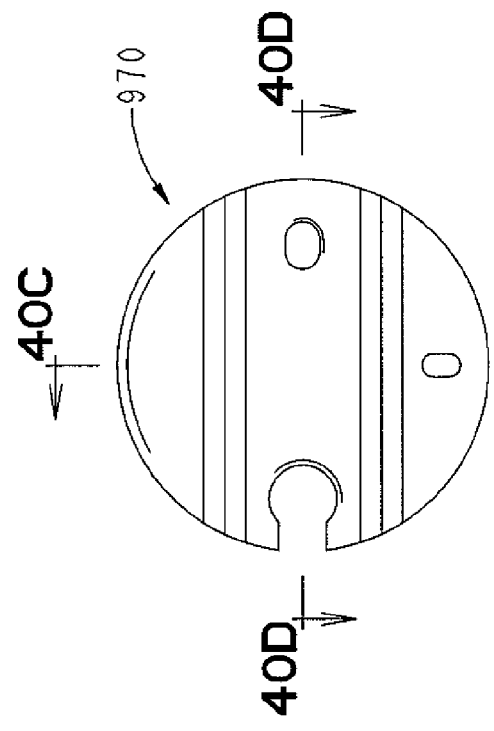
FIG. 40B is an end view of the second valve retainer of FIG. 32A.
Figure 41A:
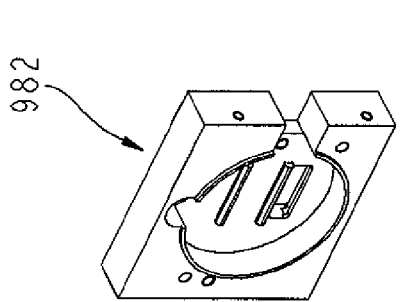
FIG. 41A is a perspective view of a housing cover of FIG. 32A.
Figure 41D:
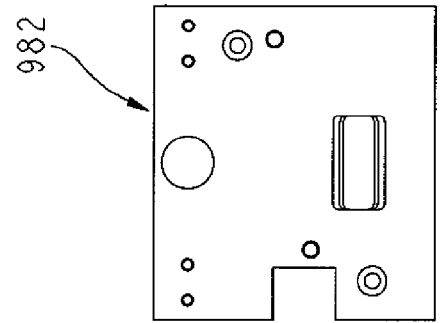
FIG. 41D is a second end view of the housing cover of FIG. 32A.
Figure 41C:
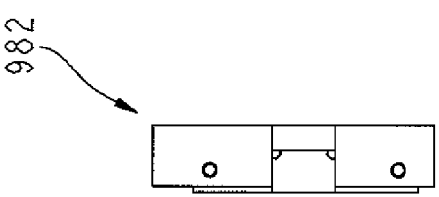
FIG. 41C is a side view of the housing cover of FIG. 32A.
Figure 41B:
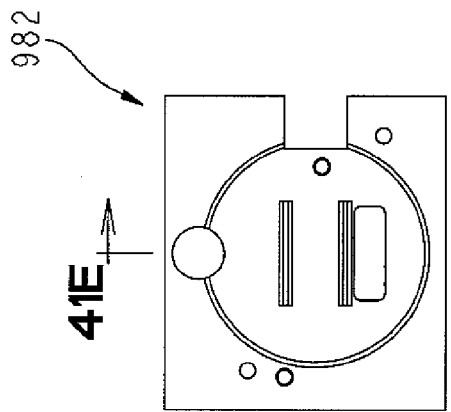
FIG. 41B is a first end view of the housing cover of FIG. 32A.
Figure 41F:
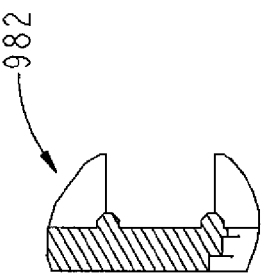
FIG. 41F is a detail view of FIG. 41E.
Figure 41E:
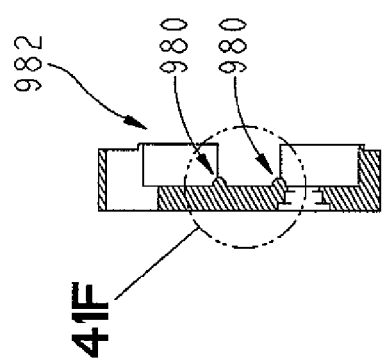
FIG. 41E is a first sectional view of the housing cover of FIG. 32A.
Figure 42:
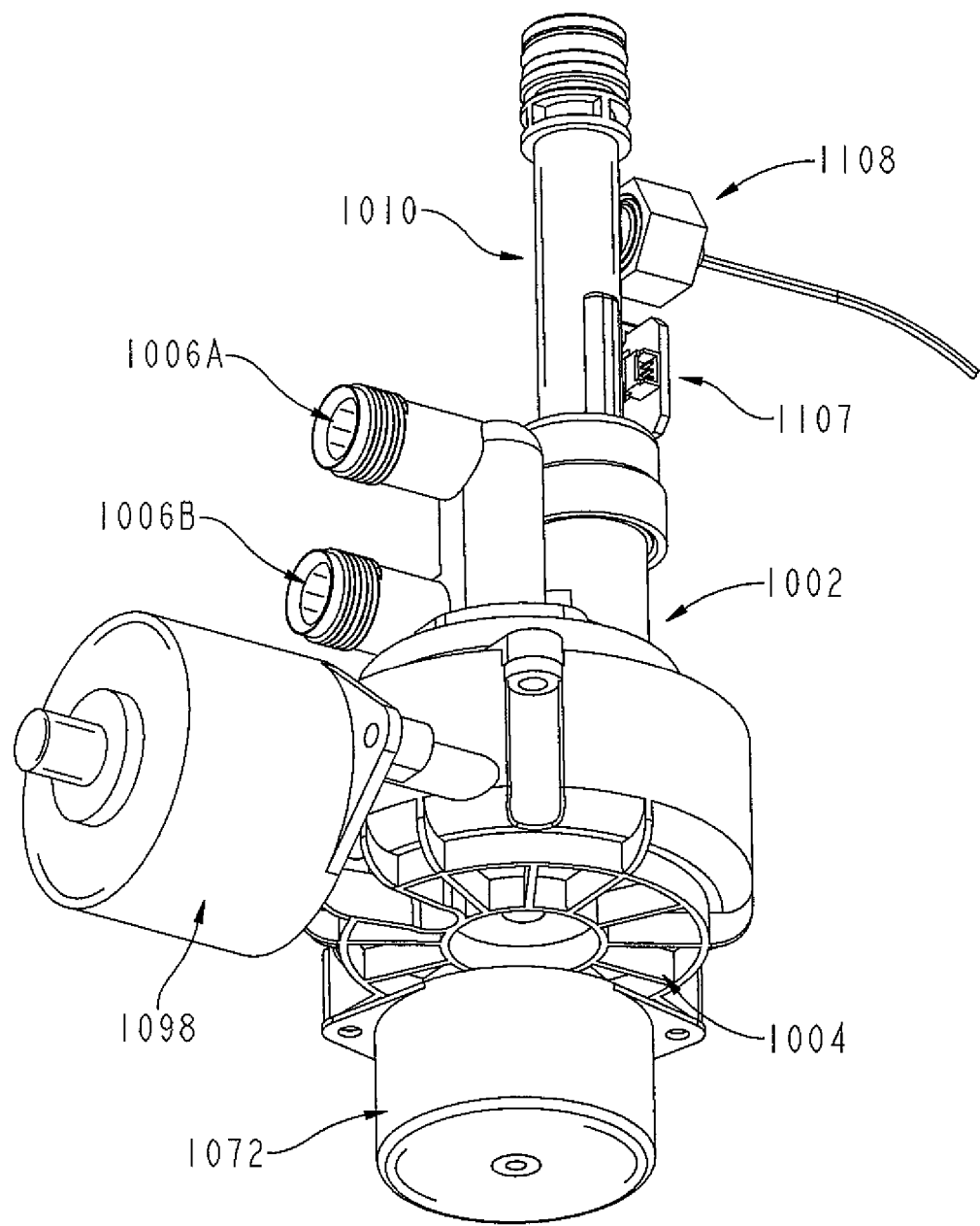
FIG. 42 is a perspective view of another exemplary mixing valve.

Returning to FIGS. 32C and 32D, a mixing element 940 which is positioned in output 908 which spins relative to valve body 902 to mix the water passing through output 908. Static valve member 916 is positioned adjacent valve body 902. A seal is formed between valve member 916 and body 902 with spring loaded seals. Temperature control valve member 918 is positioned adjacent to static valve member 916 and is retained by a valve retainer 950. As shown in FIG. 35, valve retainer 950 includes a plurality of teeth 952 which are engaged by a gear 954 (see FIG. 32C) which is coupled to a shaft of a stepper motor 956 (see FIG. 32C). Valve retainer 950 and temperature control member 918 each include respective keyways 958 and 960 which receive a key member to prevent the relative rotation of temperature control member 918 and valve retainer 950.

Stepper motor 956 rotates gear 954 to impart a rotation of temperature control valve member 918 thereby adjusting the relative amounts of fluid entering from respective openings 920 that is passed onto opening 926 in flow control member 928. As such, assuming that respective opening are in communication with hot water and cold water respectively, then the rotation of temperature control valve member 918 adjusts the temperature of water presented to opening 926 in flow control valve member. Stepper motor 956 is controlled by controller 120. Other types of motors may be used in conjunction with position control.

In the illustrated embodiment, valve retainer 950 includes an opening 951. opening 951 is aligned with an optical position sensor 953 when temperature control valve is in a default position. When in the default position light of an emitter of optical position sensor 953 passes through opening 951 to a detector of optical position sensor 953.

Flow control valve member 928 is positioned adjacent to temperature control valve member 918 and is retained with a second valve retainer 970. Second valve retainer 970 includes a recess 970 which receives flow control valve member 928. The relative position of flow control valve member 928 relative to second valve retainer is maintained through a coupler 976, illustratively a pin.

Second valve retainer 970 further includes a pair of guides 978, illustratively grooves, which interact with a pair of guides 980 on housing cover 982. Guides 978, 980 restrict the movement of valve retainer 970 and hence flow control valve member 928 to directions 930 and 932 shown in FIG. 35. Valve retainer 970 is coupled to a linear stepper motor 990 which moves valve retainer and hence flow control valve in directions 930 and 932. Stepper motor 990 is controlled by controller 120.

As discussed herein the movement of one of temperature control valve member 920 and flow control valve member 928 are independent of each other. As such, temperature and flow may be independently adjusted by adjusting the respective one of temperature control valve member 920 and flow control valve member 928.

In one embodiment, mixing valve 900 may be used with a conventional manual faucet and positioned above sink deck 104. In this embodiment, temperature control valve 920 is coupled to a manual input, such as a ring member, instead of a stepper motor. The ring member is accessible from an exterior of the faucet and may be rotated to rotate temperature control valve member 920 in directions 922 and 924. In one embodiment the ring member is the valve retainer for temperature control valve member 920. In one embodiment, a plurality of detents are provided to provide feedback to the operator of the position of temperature control valve member 920. Further, in this embodiment, flow control valve member 928 is coupled to a manual input, such as a slider or a lever, instead of stepper motor 990. The lever or slider moves flow control valve member in directions 930 and 932.

Referring to FIGS. 42-48 a mixing valve 1000 is shown. Referring to FIG. 44, mixing valve 1000 includes an upper valve body 1002 and a lower valve body 1004. Upper valve body 1002 includes two input conduits 1006A and 1006B which are connected to and in fluid communication with respective sources of water, such as hot water and cold water, and an output conduit 1008 which is in fluid communication with a conduit of fitting 1010 and is ultimately provided to spout 130. Both inputs 1006A and 1006B and output 1008 are provided on an upper portion of mixing valve 1000.

Figure 46E:
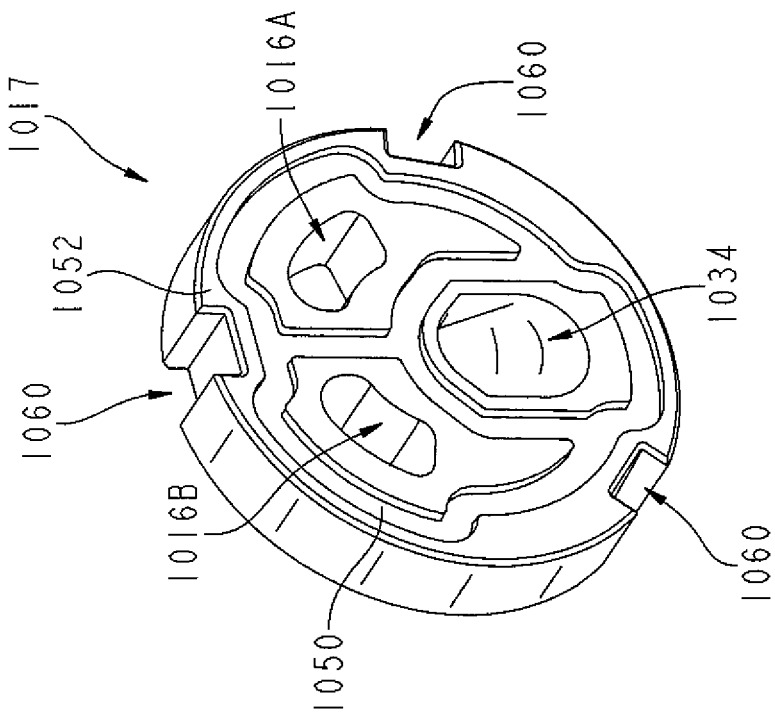
FIG. 46E is a second perspective view of the static valve member of FIG. 46A.
Figure 46D:
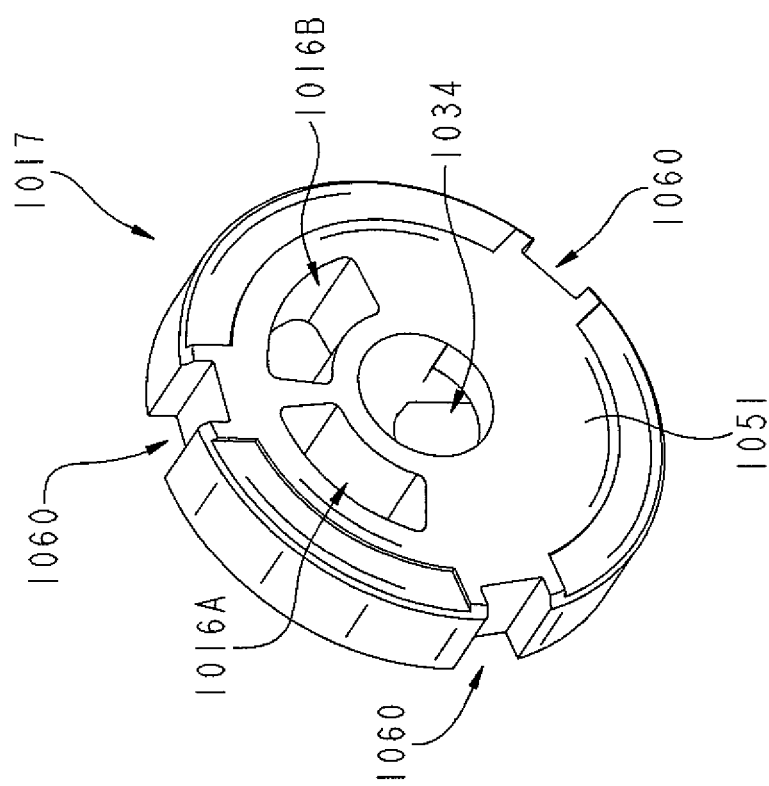
FIG. 46D is a first perspective view of the static valve member of FIG. 46A.

Water passing through inputs 1006A and 1006B are communicated to respective openings 1014 in surface 1015 (see 1014A for input 1006A in FIG. 44) and to respective opening 1016 in static valve member 1017. Water is then communicated through respective opening 1020 in temperature control valve member 1018. As shown in FIG. 46A, openings 1016A-B have a first perimeter 1056A-B at a top side 1051 of static valve member 1017 and a second perimeter 1058A-B at a bottom side 1052 of static valve member 1017.

As explained herein temperature control valve member 1018 is rotatable is directions 1022 and 1024. Such rotation changes whether one or both of respective openings 1020 are in fluid communication with a recess 1026 (see FIG. 48) in flow control valve member 1028. Flow control valve member is translatable relative to temperature control valve member 1018 in directions 1030 and 1032. Such translation changes whether openings 1020 are in fluid communication with recess 1026 and the extent to which openings 1020 are in fluid communication with recess 1026. Water is then communicated from recess 1026 back through temperature control valve member 1018 through opening 1033, through opening 1034 in static valve member 1017, and onto output 1008 in upper valve body 1002.

Figure 45:
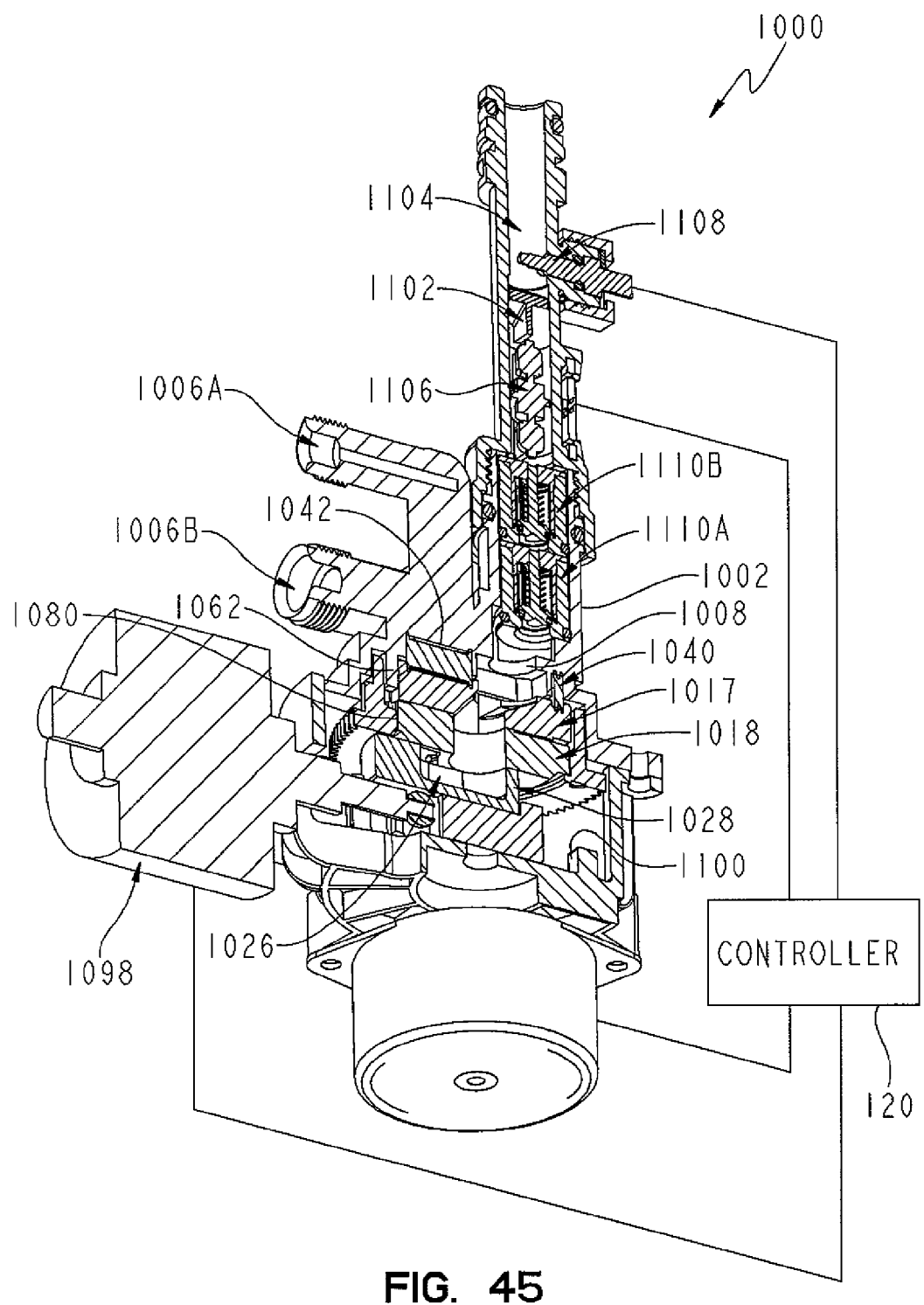
FIG. 45 is a sectional view of the mixing valve of FIG. 42.

Referring to FIGS. 44 and 45, a gasket 1040 is received in a recess in upper valve housing 1002. Gasket 1040 includes openings 1044A and 1044B which surround openings 1014A and 1014B of inputs 1006a and 1006B, respectively, and an opening 1046 which surrounds an opening 1048 of output 1008 in upper valve housing 1002. Static valve member 1017 is positioned adjacent gasket 1040. Static valve member 1017 includes a recess 1050 in a bottom surface 1052 that generally matches the shape of gasket 1040 and receives gasket 1040. Gasket 1040 provides a water tight seal between upper valve body 1002 and static valve member 1017. Static valve member 1017 includes three key features 1060 which interact with respective key features 1062 (one shown in FIGS. 44 and 45) to prevent static valve member 1017 from rotating relative to upper valve body 1002.

Figure 43:
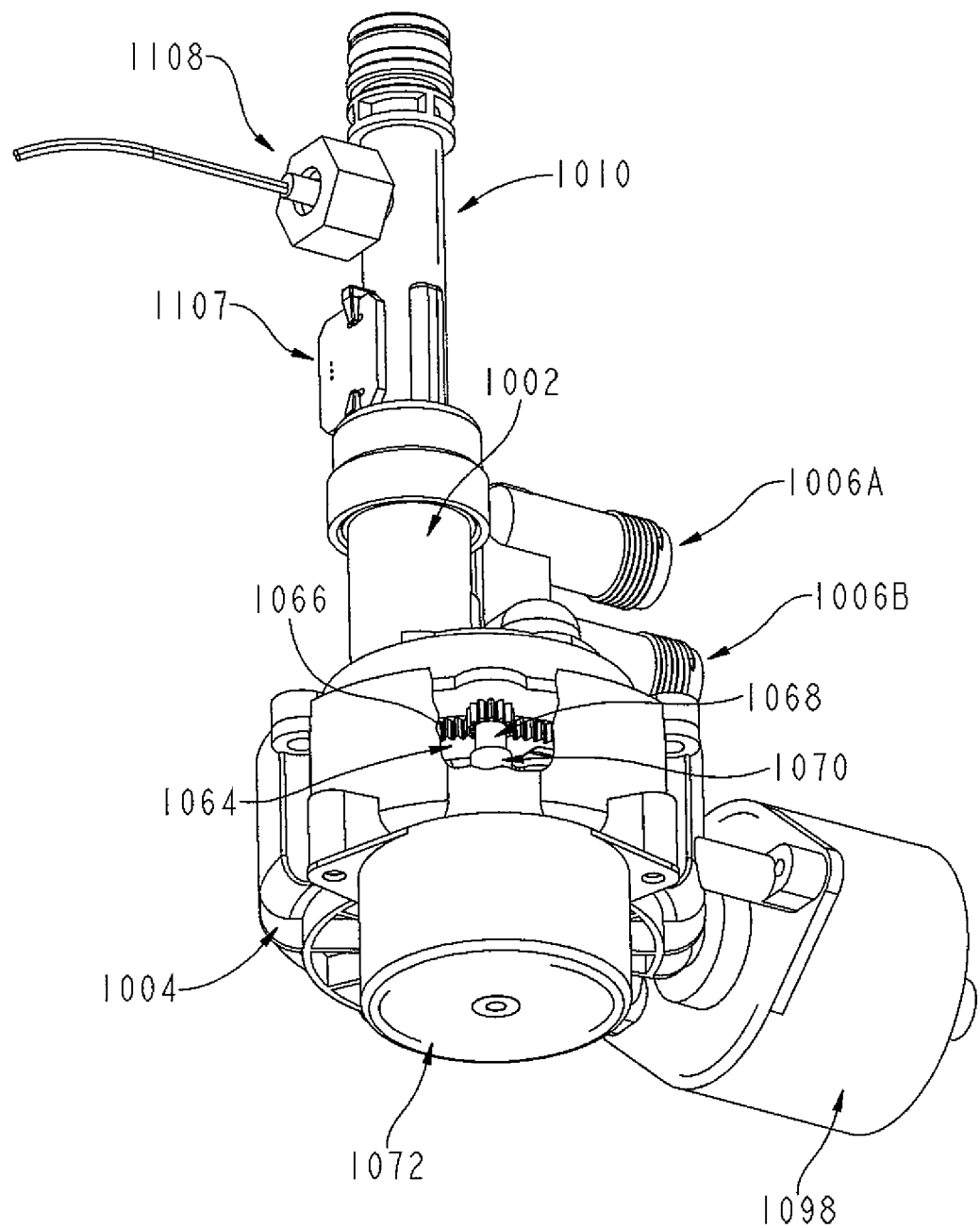
FIG. 43 is another perspective view of the mixing valve of FIG. 42.

Temperature control valve member 1018 is positioned adjacent to static valve member 1017 and is retained by a valve retainer 1064. A water tight seal is formed between surface 1051 of static valve member 1017 and surface 1019 of temperature control valve member 1018. As shown in FIG. 43, valve retainer 1064 includes a plurality of teeth 1066 which are engaged by a gear 1068 which is coupled to a shaft 1070 of a stepper motor 1072. Stepper motor 1072 is controlled by controller 120. Temperature control valve member 1018 is held in place relative to valve retainer 1064 by a flange 1074 and a plurality of holders 1076 which snap into recesses 1078 in temperature control valve member 1018.

Valve retainer 1064 and temperature control valve member 1018 each include respective key members 1080 (see FIG. 45) and 1082. Key members 1080 and 1082 prevent the relative rotation of temperature control valve member 1018 and valve retainer 1064.

Stepper motor 1072 rotates valve retainer 1064 to impart a rotation of temperature control valve member 1018 thereby adjust an amount of overlap between each of openings 1016A and 1016B relative to recess 1026 in flow control valve member 1028. In one embodiment, when valve 1000 is in an off position, openings 1020A and 1020B are completely misaligned with recess 1026, when in a full hot position the opening 1020A and 1020B corresponding to the hot input alone is in fluid communication with recess 1026, and when in a full cold position the other opening 1020A and 1020B corresponding to the cold input alone is in fluid communication with recess 1026. Openings 1020A and 1020B have a respective first perimeter 1023A and 1023B at surface 1019 and a respective second perimeter 1025A and 1025B at surface 1021. In one embodiment, the off position is not controlled by the rotation of temperature control valve member 1018 or flow control valve member 1028. but rather by a solenoid valve placed between mixing valve 1000 and an outlet of spout 130.

Figures 47D, 47E:
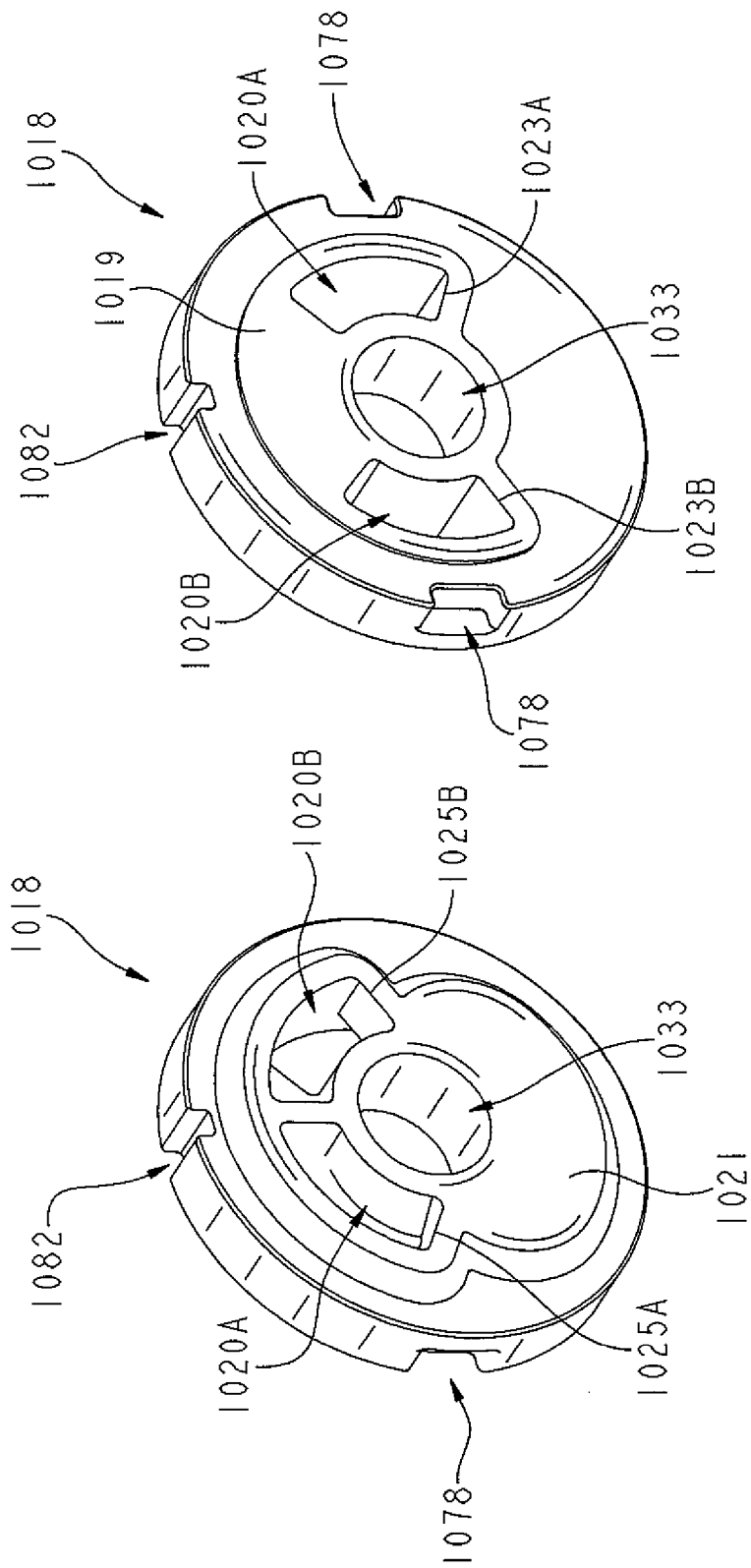
FIG. 47D is a first perspective view of the temperature control valve member of FIG. 47A.
FIG. 47E is a second perspective view of the temperature control valve member of FIG. 47A.
Figure 48:
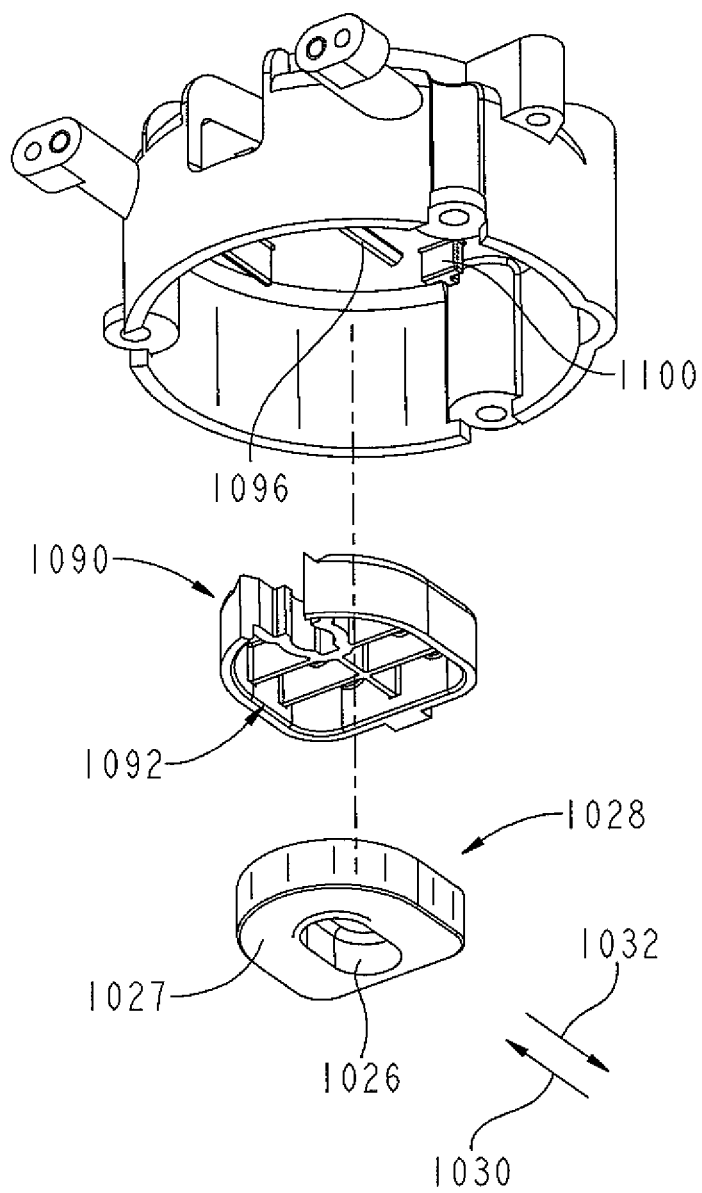
FIG. 48 is a perspective view of a flow control valve member of the mixing valve of FIG. 42, a flow control valve member retainer, and a portion of the housing.

As explained herein, flow control valve member 1028 is translatable relative to temperature control valve member 1018 to adjust the amount of overlap between openings 1020A and 1020B and recess 1026. Referring to FIG. 47A, a perimeter of recess 1026 is shown in phantom in a location corresponding to an off position because neither opening 1020A or 1020B is in fluid communication with recess 1026. As flow control valve member 1028 is translated in direction 1030 recess 1026 begins to overlap the portions of openings 1020A and 1020B which are located in region 1086 which corresponds to the lateral extent of recess 1026. As shown in FIG. 47A, a portion of both openings 1020A and 1020B reside in region 1086. Thus as recess 1026 is moved in direction 1030 a warm water is provided to output 1008. Further, it is easy to see how by rotating temperature control disk 1018 in one of directions 1022 or 1024 the proportion of overlap of both openings 1020A and 1020B is adjusted. Complete control over the temperature and flow rate of water being provided to output 1008 is controlled through the interface between temperature control valve member 1018 and flow control valve member 1028 and the relative locations of each.

Returning to FIG. 44, flow control valve member 1028 is positioned adjacent to temperature control valve member 1018 such that surface 1027 of flow control valve member 1028 and surface 1021 of temperature control valve member 1018 form a water tight seal. In one embodiment, each of static valve member 1017, temperature control valve member 1018, and flow control valve member 1028 are made of a ceramic composition.

Flow control valve member 1028 is retained in place with a second valve retainer 1090. Second valve retainer 1090 includes a recess 1092 which receives flow control valve member 1028. Second valve retainer 1090 further includes a pair of guides 1094, illustratively grooves, which interact with a pair of guides 1096 (one shown in FIG. 48) on lower valve body member 1004. Guides 1094, 1096 restrict the movement of valve retainer 1090 and hence flow control valve member 1028 to directions 1030 and 1032 shown in FIG. 48. The movement of flow control valve member 1028 in direction 1032 is limited by a stop 1100 provided on lower valve body member 1004. Valve retainer 1090 is coupled to a linear stepper motor 1098 which moves valve retainer 1090 and hence flow control valve 1028 in directions 1030 and 1032. Stepper motor 1098 is controlled by controller 120.

In one embodiment, mixing valve 1000 may be used with a conventional manual faucet and positioned above sink deck 104. In this embodiment, temperature control valve member 1018 is coupled to a manual input, such as a ring member, instead of a stepper motor. The ring member is accessible from an exterior of the faucet and may be rotated to rotate temperature control valve member 1018 in directions 1022 and 1024. In one embodiment the ring member is the valve retainer for temperature control valve member 1018. In one embodiment, a plurality of detents are provided to provide feedback to the operator of the position of temperature control valve member 1018. Further, in this embodiment, flow control valve member 1028 is coupled to a manual input, such as a slider or a lever, instead of stepper motor 1098. The lever or slider moves flow control valve member in directions 1030 and 1032.

Returning to FIGS. 44 and 45, a mixing element 1102 is positioned in fluid conduit 1104 of fitting 1010. Mixing element 1102 mixes the water passing through fluid conduit 1104. Further, a flow turbine 1106 spins as water flows past it and the spinning of flow turbine 1106 is detected by a hall effect sensor 1107 which provides an indication of the flow rate of the fluid to controller 120. Further, a temperature sensor 1108 is positioned in fluid conduit 1104 and provides an indication of the temperature of the fluid to controller 102. Also, included in fluid conduit 1104 are two check valves 1110A and 1110B which prevent water from reentering mixing valve 1000. In one embodiment, one or both of check valves 1110A and 1110B are positioned in spout 130 or a pull out wand portion of spout 130.

Figure 49:
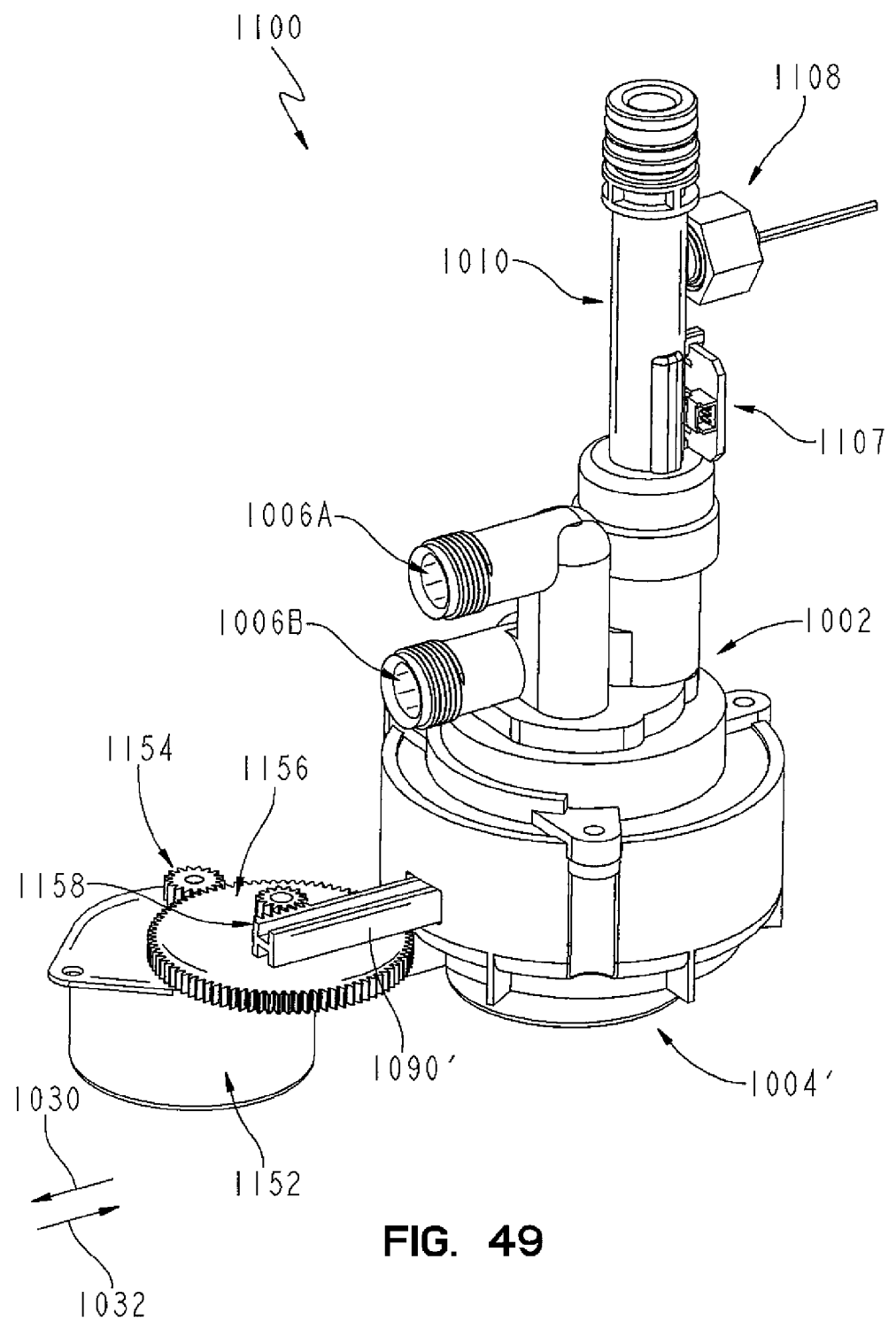
FIG. 49 is a perspective view of yet another exemplary mixing valve.
Figure 50:
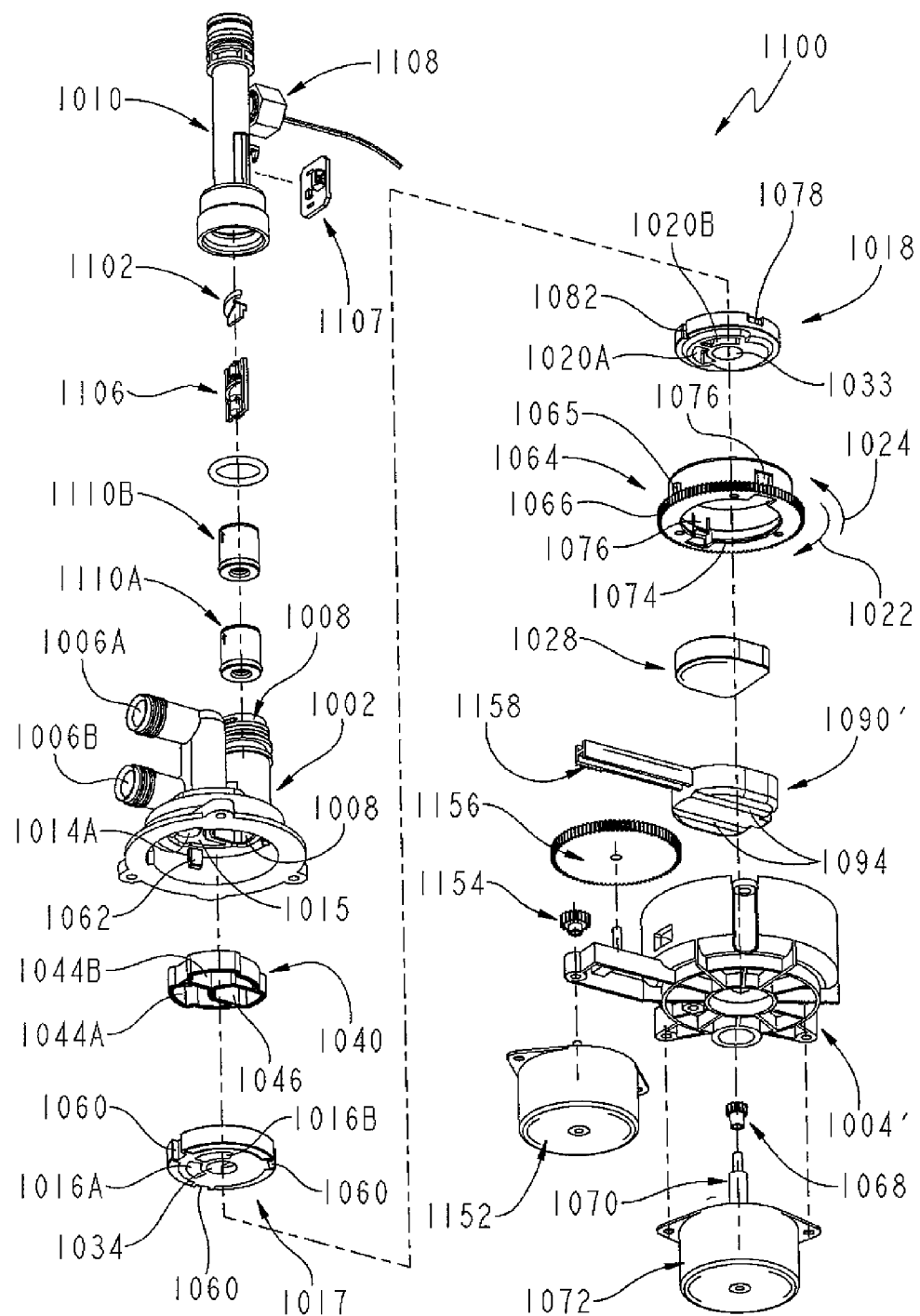
FIG. 50 is an exploded view of the mixing valve of FIG. 49.

Referring to FIGS. 49 and 50, another exemplary mixing valve 1150 is shown. Mixing valve 1150 operates in a similar manner to mixing valve 1000, except for valve retainer 1090' being coupled to a stepper motor 1152 through a first gear 1154 and a second gear 1156 instead of to linear stepper motor 1098. Valve retainer 1090' includes teeth 1158 which engage gear 1156 and convert the rotational motion of gear 1156 into a linear motion in directions 1030 and 1032. Housing 1004' is modified to support stepper motor 1152.

Referring to FIGS. 51-56, yet another exemplary mixing valve 1200 is shown. Mixing valve 1200 includes a similar lower housing 1202 as mixing valve 1100. Housing 1202 includes inputs 1204A and 1204B which are coupled to sources of water, such as a hot water source and a cold water source, and an output 1206. Housing 1202 includes a recess 1210 for receiving a gasket 1212. Gasket 1212, like gasket 1040, includes openings 1214A and 1214B to surround the openings of inputs 1204A and 1204B and opening 1216 to surround output 1206.

Water passing through inputs 1204A and 1204B are communicated to respective openings 1220A and 1220B in a static valve member 1222. Static valve member 1222 includes a recess 1224 to receive gasket 1212 and an opening 1226 which is in fluid communication with output 1206. Water is then communicated to a recess 1228 is a temperature and flow control valve member 1230. Temperature and flow control valve member 1230 is retained in a valve retainer 1236 and is rotatable in directions 1232 and 1234 due to a rotation of valve retainer 1236. T temperature and flow control valve member 1230 and valve retainer 1236 each include respective key members 1238 and 1240 which locate temperature and flow control valve member 1230 relative to valve retainer 1236 and prevent the rotation of temperature and flow control valve member 1230 relative to valve retainer 1236.

Figure 51:
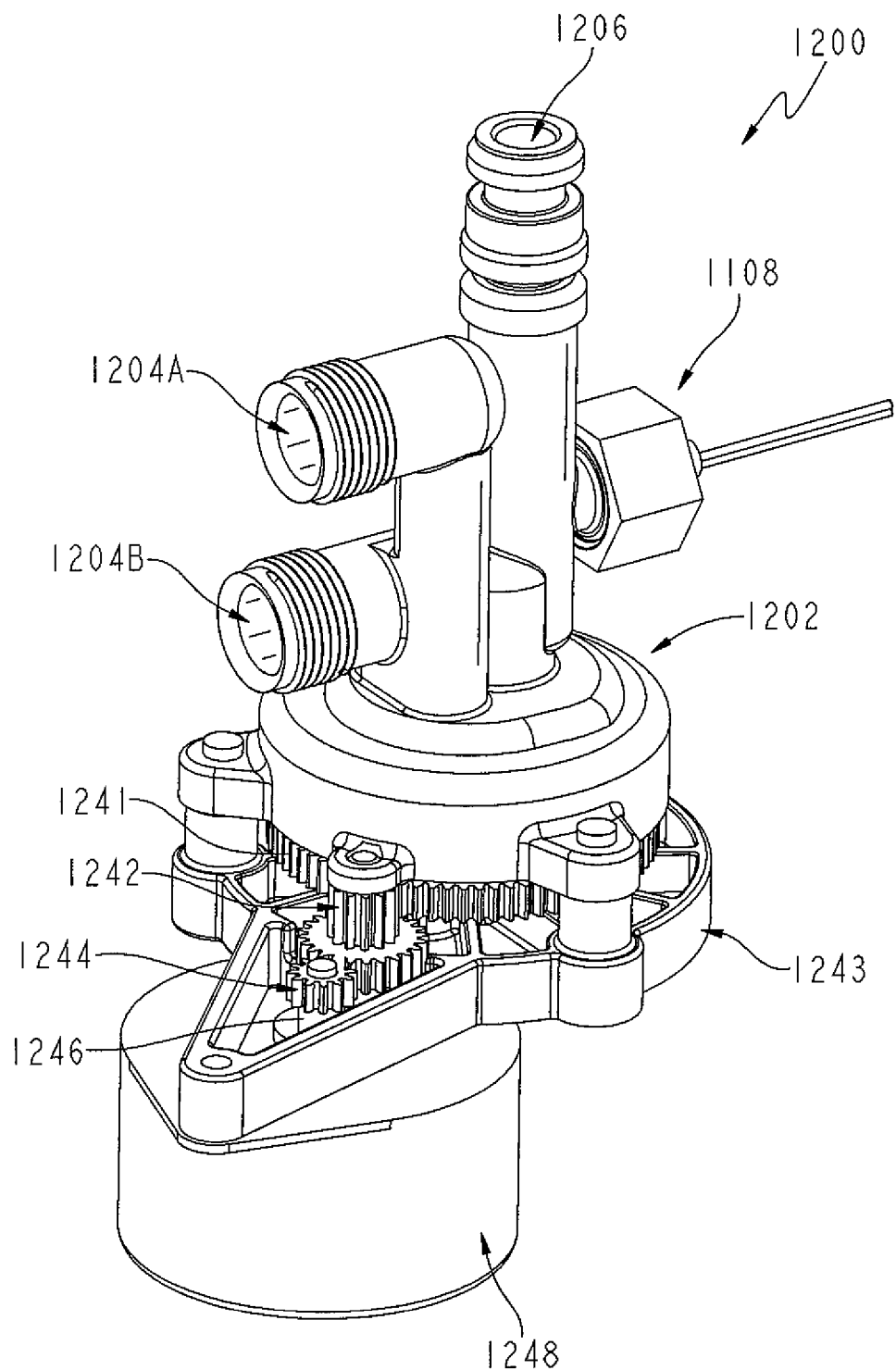
FIG. 51 is a perspective view of a further exemplary mixing valve.
Figure 52:
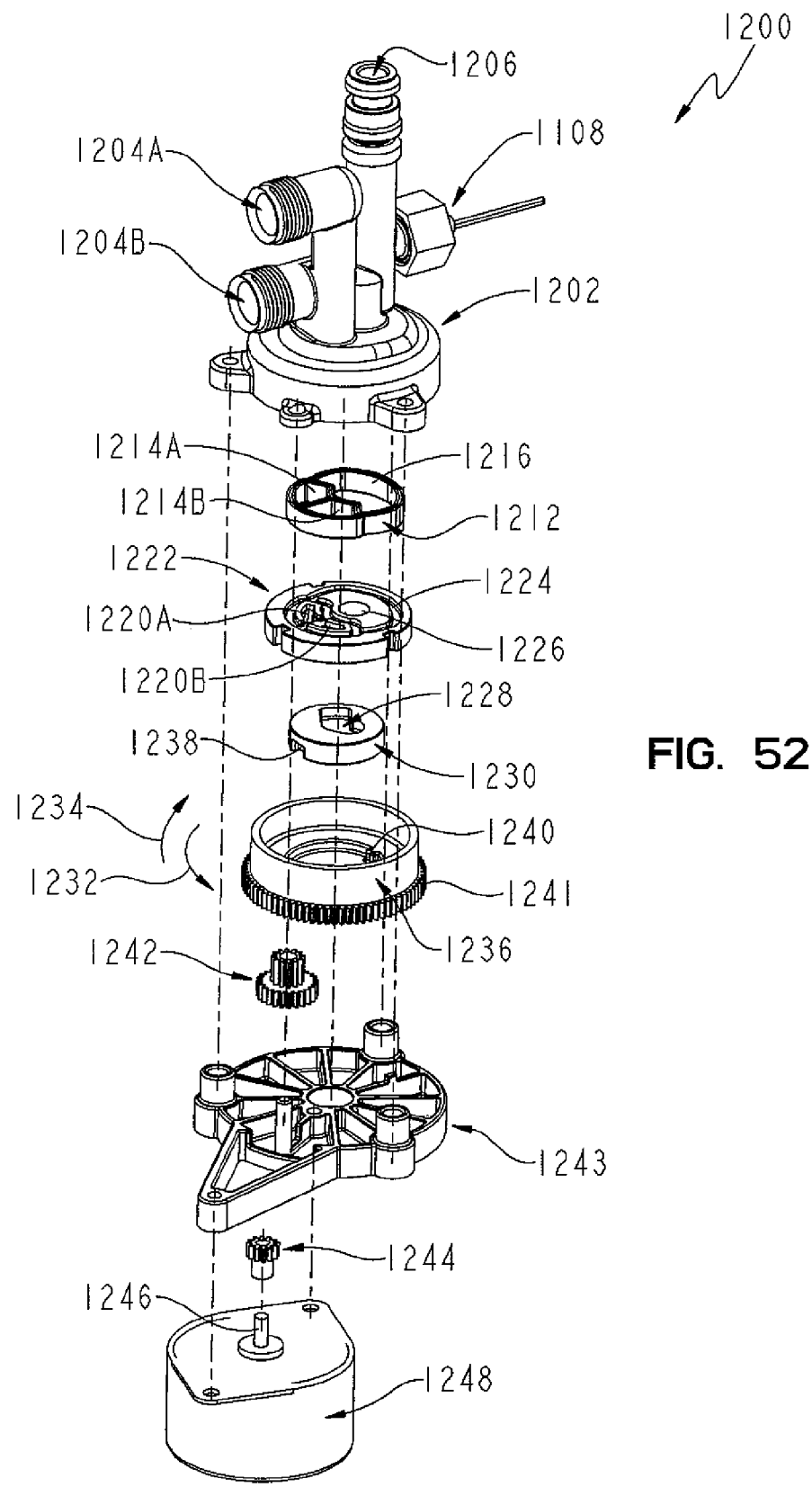
FIG. 52 is an exploded view of the mixing valve of FIG. 51.
Figure 53:
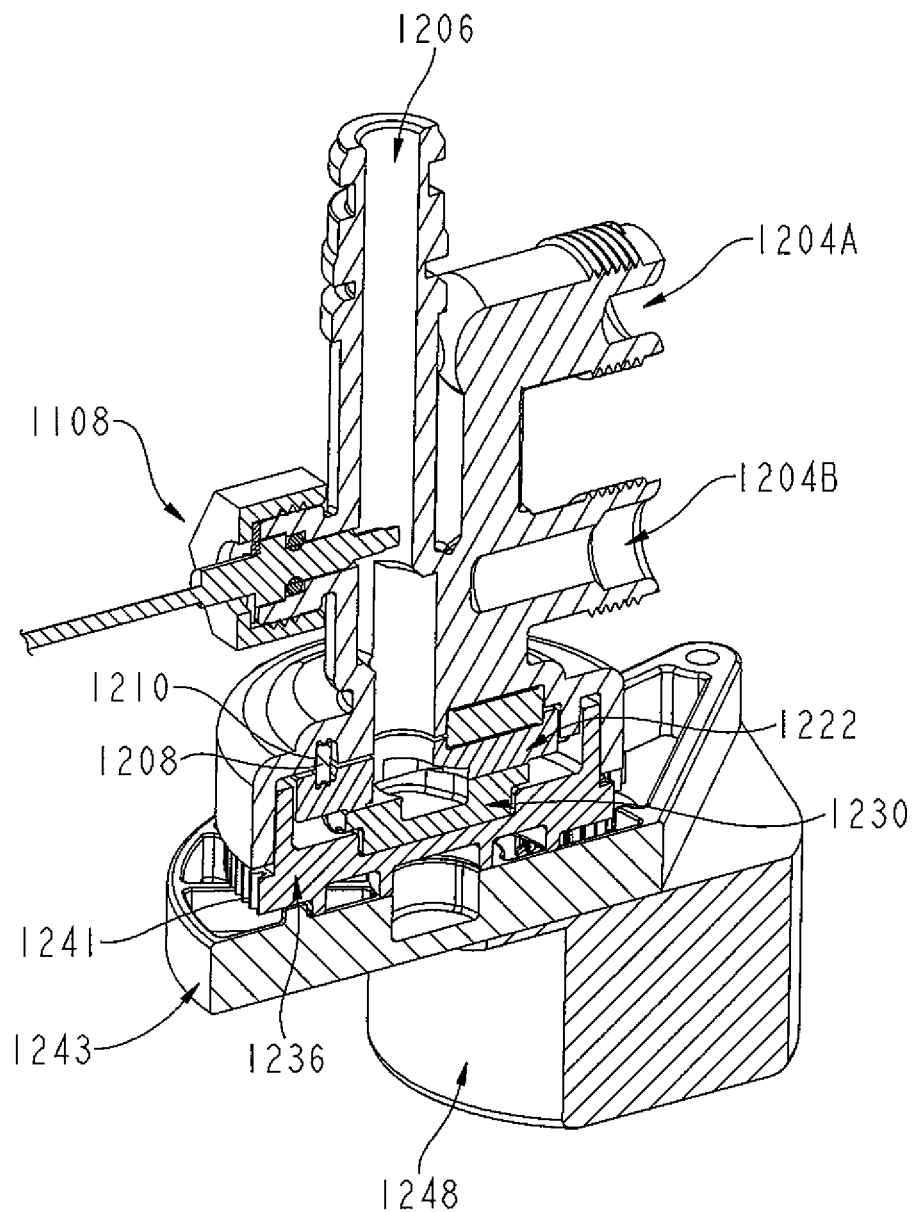
FIG. 53 is a sectional view of the mixing valve of FIG. 51.

An upper housing 1243 is positioned adjacent to valve retainer 1236 and holds temperature and flow control valve member 1230 in a fluid tight relationship relative to static valve member 1222. Referring to FIG. 51, a gear 1241 of valve retainer 1236 is engaged with a first gear 1242 that is coupled to upper housing 1243 which is in turn engaged with a second gear 1244 that is coupled to a shaft 1246 of a stepper motor 1248. Motor 1248 rotates gear 1244, which in turn rotates gear 1242, which in turn rotates valve retainer 1236 and temperature and flow control valve member 1230.

Unlike mixing valves 1000 and 1100 both of which have generally infinite flow control due to the translation of flow control valve member 1028, mixing valve 1200 has a low flow setting and a high flow setting which is selected based on the angular orientation of recess 1028.

Figure 54:
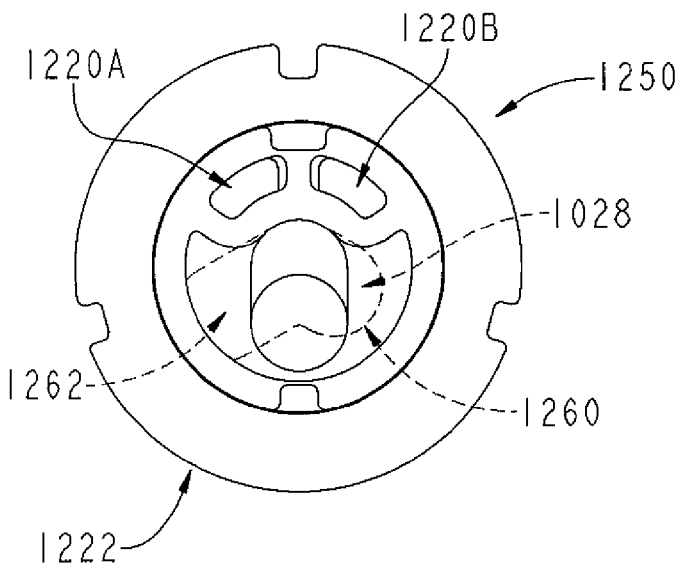
FIG. 54 is a view of the valve control members of the mixing valve of FIG. 51 in an off configuration.
Figure 55:
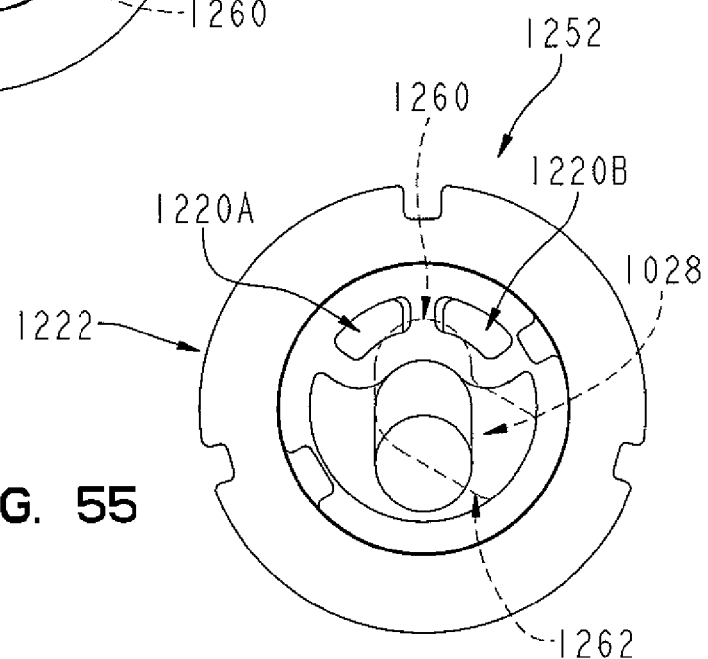
FIG. 55 is a view of the valve control members of the mixing valve of FIG. 51 in a low flow configuration.
Figure 56:
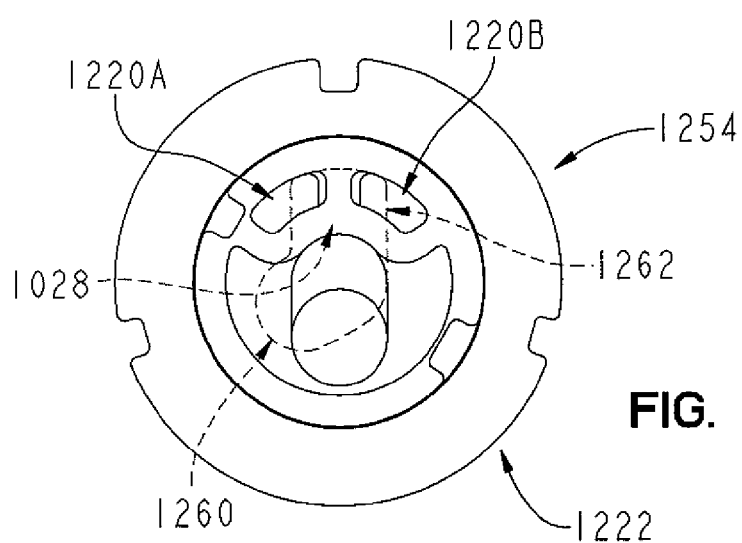
FIG. 56 is a view of the valve control members of the mixing valve of FIG. 51 in a high flow configuration.

Referring to FIGS. 54-56, mixing valve 1200 is shown in an off configuration (FIG. 54) 1250, a low flow configuration (FIG. 55) 1252, and a high flow configuration (FIG. 56) 1254. Referring to FIG. 54, temperature and flow control valve member 1230 is shown in an off configuration and recess 1028 in temperature and flow control valve member 1230 is not in fluid communication with either of openings 1220A or 1220B in static valve member 1222. As such, water is not communicated from inputs 1204A and 1204B to output 1206 in configuration 1250.

Referring to FIG. 55, temperature and flow control valve member 1230 is shown in an low flow configuration 1252 and a first portion 1260 of recess 1028 in temperature and flow control valve member 1230 is in fluid communication with both of openings 1220A or 1220B in static valve member 1222 and in fluid communication with opening 1226 in static valve member 1222 which is in fluid communication with output 1206. As such, water is communicated from inputs 1204A and 1204B to output 1206 in configuration 1250. Temperature and flow control valve member 1230 is moved to configuration 1252 by rotating temperature and flow control valve member 1230 in direction 1234 from the off configuration 1250. As shown in FIG. 55, temperature and flow control valve member 1230 receives water from both openings 1220A and 1220B. Thus, providing a warm water mixture to output 1206. By rotating temperature and flow control valve member 1230 in direction 1234 a lesser amount of opening 1220B is in fluid communication with recess 1228. Assuming opening 1220A corresponds to cold water and opening 1220B corresponds to hot water, the water communicated to output 1208 would be colder than the configuration shown in FIG. 55. By rotating temperature and flow control valve member 1230 even further in direction 1234 opening 1220B is no longer in fluid communication with recess 1228. This would correspond to a full cold setting for the low flow configuration 1252. By rotating temperature and flow control valve member 1230 in direction 1232 a lesser amount of opening 1220A is in fluid communication with recess 1228. The water communicated to output 1208 would be hotter than the configuration shown in FIG. 55. By rotating temperature and flow control valve member 1230 even further in direction 1232 opening 1220A is no longer in fluid communication with recess 1228. This would correspond to a full hot setting for the low flow configuration 1252.

Referring to FIG. 56, temperature and flow control valve member 1230 is shown in an high flow configuration 1254 and a second portion 1262 of recess 1028 in temperature and flow control valve member 1230 is in fluid communication with both of openings 1220A or 1220B in static valve member 1222 and in fluid communication with opening 1226 in static valve member 1222 which is in fluid communication with output 1206. As such, water is communicated from inputs 1204A and 1204B to output 1206 in configuration 1250. Temperature and flow control valve member 1230 is moved to configuration 1254 by rotating temperature and flow control valve member 1230 in direction 1232 from the off configuration 1250. As shown in FIG. 56, temperature and flow control valve member 1230 receives water from both openings 1220A and 1220B. Thus, providing a warm water mixture to output 1206. By rotating temperature and flow control valve member 1230 in direction 1234 a lesser amount of opening 1220B is in fluid communication with recess 1228. The water communicated to output 1208 would be colder than the configuration shown in FIG. 56. By rotating temperature and flow control valve member 1230 even further in direction 1234 opening 1220B is no longer in fluid communication with recess 1228. This would correspond to a full cold setting for the high flow configuration 1254. By rotating temperature and flow control valve member 1230 in direction 1232 a lesser amount of opening 1220A is in fluid communication with recess 1228. The water communicated to output 1208 would be hotter than the configuration shown in FIG. 56. By rotating temperature and flow control valve member 1230 even further in direction 1232 opening 1220A is no longer in fluid communication with recess 1228. This would correspond to a full hot setting for the high flow configuration 1254.

As shown in FIGS. 55 and 56, first portion 1260 of recess 1228 overlaps less with openings 1220A and 1220B than second portion 1262 in the respective low full configuration 1252 and high flow configuration 1254. By having a greater overlap between second portion 1262 and openings 1220A and 1220B, the flow rate of high flow configuration 1254 is higher than the flow rate of low flow configuration 1252.

In one embodiment, mixing valve 1200 may be used with a conventional manual faucet and positioned above sink deck 104. In this embodiment, temperature and flow control valve member 1230 is coupled to a manual input, such as a ring member, instead of a stepper motor. The ring member is accessible from an exterior of the faucet and may be rotated to rotate temperature and flow control valve member 1230 in directions 1232 and 1234. In one embodiment the ring member is the valve retainer for temperature and flow control valve member 1230. In one embodiment, a plurality of detents are provided to provide feedback to the operator of the position of the off configuration 1250, the low flow configuration 1252, and the high flow configuration 1254.

Controller 120 includes software to determine the connections made to the inputs of mixing valves disclosed herein. Using mixing valve 1000 in FIGS. 42-48 as an example, controller 120 performs the following installation configuration method 1280. Each mixing valve includes one or more stop surfaces to limit the rotation of the rotatable valve member in each direction. (See rib 1065 on valve retainer 1064 in FIG. 44 which interacts with a feature, such as a channel, on the valve body to limit the rotation of temperature control valve member 1018.) One of the limits is intended to correspond to a full "hot" position and the other of the limits is intended to correspond to a full "cold" position.

Figure 57:
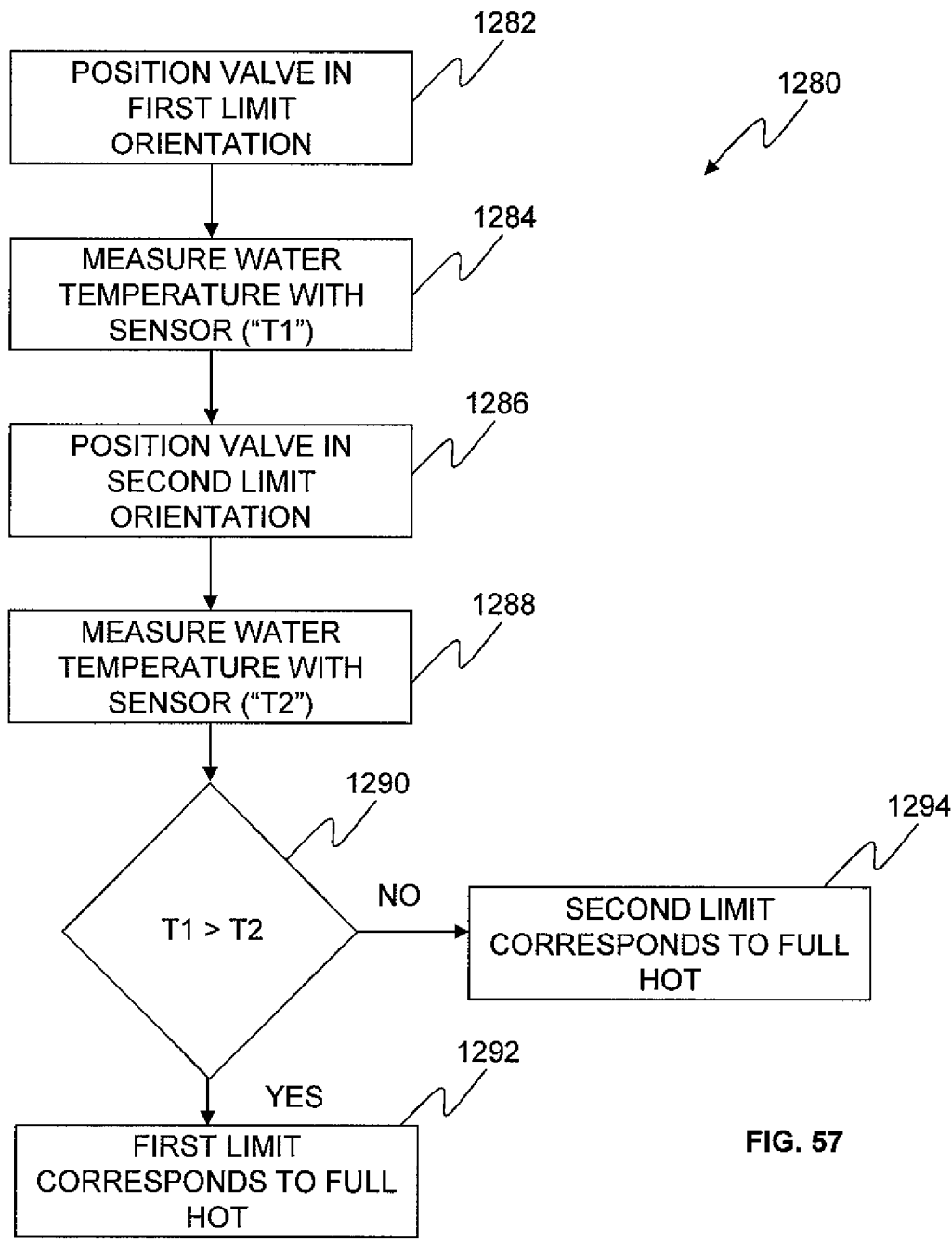
FIG. 57 is an exemplary method of configuring a mixing valve after installation.

Referring to FIG. 57, in the installation configuration method 1280 controller 120 moves temperature control valve member 1018 to a first limit position, as represented in block 1282, and measures the temperature of the water in output 1008 with temperature sensor 1108, as represented by block 1284. Controller 120 then moves temperature control valve member 1018 to a second limit position, as represented in block 1286, and measures the temperature of the water in output 1008 with temperature sensor 1108, as represented by block 1288. In one embodiment, controller 120 waits a first period of time before measuring to allow the water to reach a steady state temperature. Controller 120 then compares the first measured temperature to the second measured temperature, as represented by block 1290. If the first measured temperature is higher than the second measured temperature then the first limit position corresponds to a full hot position, as represented by block 1292. If not then the second limit position corresponds to a full hot position, as represented by block 1294. With the installation configuration method controller 120, an installer is free to hook a hot water source to either of inputs 1006A and 1006B and the cold water source to the other of inputs 1006A and 1006B and controller 120 will compensate for the choice made by the installer.

Although the invention has been described in detail with reference to certain preferred embodiments, variations and modifications exist within the spirit and scope of the invention as described and defined in the following claims.

The invention claimed is:

1. An apparatus for controlling the provision of water from a source of cold water and a source of hot water, the apparatus comprising:
   a mixing valve in fluid communication with the source of cold water and the source of hot water;
   a spout in fluid communication with an outlet of the mixing valve;
   an electronic user interface including an electronic joystick moveable to define a selected temperature and a selected flow rate;
   a controller operably coupled to the electronic user interface and to the mixing valve;
   a connector coupled to a sink deck and coupled to the spout, the connector having a plurality of ports each of which includes a fluid connector and an electrical connector;
   wherein the connector is in fluid communication with the mixing valve and operably coupled to the controller;
   wherein a fluid connector of the spout and an electrical connector of the spout are coupled to a first port of the connector; and
   wherein a container filler apparatus is coupled to a second port of the connector.

2. The apparatus of claim 1, wherein the container filler apparatus is configured to be coupled to a container.

3. The apparatus of claim 1, wherein the container filler apparatus includes a tap sensor to start the filling of a container.

4. The apparatus of claim 1, wherein the container filler apparatus supports a container.

5. The apparatus of claim 1, wherein the container filler apparatus includes a metered input.

6. An apparatus for controlling the provision of water from a source of cold water and a source of hot water, the apparatus comprising:
   a mixing valve in fluid communication with the source of cold water and the source of hot water;
   a spout in fluid communication with an outlet of the mixing valve;
   an electronic user interface including an electronic joystick moveable to define a selected temperature and a selected flow rate;
   a controller operably coupled to the electronic user interface and to the mixing valve;
   a diverter valve located beneath a sink deck in fluid communication with an outlet of the mixing valve, the diverter valve having a first outlet and a second outlet; and
   wherein the mixing valve is located beneath the sink deck, the electronic user interface is located above the sink deck, and the spout includes a first fluid conduit in fluid communication with the first outlet of the diverter valve and with a spray outlet of the spout and a second fluid conduit in fluid communication with the second outlet of the diverter valve and with a stream outlet of the spout.

7. An apparatus for controlling the provision of water from a source of cold water and a source of hot water, the apparatus comprising:
   a mixing valve in fluid communication with the source of cold water and the source of hot water;
   a spout in fluid communication with an outlet of the mixing valve;
   an electronic user interface including an electronic joystick moveable to define a selected temperature and a selected flow rate; and
   a controller operably coupled to the electronic user interface and to the mixing valve;
   wherein the mixing valve comprises:
   a body having a first inlet adapted to be coupled to the source of cold water, a second inlet adapted to be coupled to the source of hot water, an outlet adapted to be coupled to a water delivery device; and
   a moveable valve member having a fluid conduit, the moveable valve member being positionable in a first position wherein the first inlet and the second inlet are in fluid communication with the outlet in a low flow configuration, and in a second position wherein the first inlet and the second inlet are in fluid communication with the outlet in a high flow configuration, the temperature of water provided to the outlet being adjustable in both the low flow configuration and the high flow configuration by moving the moveable valve member.

8. An apparatus for controlling the provision of water from a source of cold water and a source of hot water, the apparatus comprising:
   a mixing valve in fluid communication with the source of cold water and the source of hot water;
   a spout in fluid communication with an outlet of the mixing valve;
   an electronic user interface including an electronic joystick moveable to define a selected temperature and a selected flow rate; and a controller operably coupled to the electronic user interface and to the mixing valve;

wherein the mixing valve comprises:

a valve body having a first opening in fluid communication with the source of hot water, a second opening in fluid communication with the source of cold water, and an outlet in fluid communication with a water delivery device;

a first valve member having a first opening positionable in fluid communication with the first opening of the valve body and a second opening positionable in fluid communication with the second opening of the valve body, the first valve member being rotatable relative to the valve body; and a second valve member having a fluid conduit positionable in fluid communication with the first opening and the second opening of the first valve member, the second valve member being translatable relative to the first valve member, wherein a rotation of the first valve member relative to the second valve member controls a temperature of the water provided to the outlet and a translation of the second valve member relative to the first valve member controls a flow rate of the water provided to the outlet.

9. An apparatus for controlling the provision of water from a source of cold water and a source of hot water, the apparatus comprising:

a mixing valve in fluid communication with the source of cold water and the source of hot water;

a spout in fluid communication with an outlet of the mixing valve;

an electronic user interface including an electronic joystick moveable to define a selected temperature and a selected flow rate; and a controller operably coupled to the electronic user interface and to the mixing valve;

wherein the mixing valve comprises:

a valve body having a first opening in fluid communication with the source of hot water, a second opening in fluid communication with the source of cold water, and an outlet in fluid communication with a water delivery device;

a first moveable valve member in fluid communication with the first opening, the second opening, and the outlet;

a second moveable valve member in fluid communication with the first opening, the second opening, and the outlet through the first moveable valve member; wherein the regulation of the temperature and flow rate of the water provided to the outlet is independently controlled by the movement of the first valve member and the second valve member, respectively.

* * * * *